United States Patent
Iyama et al.

(10) Patent No.: US 7,411,729 B2
(45) Date of Patent: Aug. 12, 2008

(54) OPTICAL FILTER, METHOD OF MANUFACTURING OPTICAL FILTER, OPTICAL SYSTEM, AND IMAGING APPARATUS

(75) Inventors: Noriyuki Iyama, Hachioji (JP); Kazuyuki Hosokawa, Hino (JP); Ken Kawamata, Tachikawa (JP); Nobuyoshi Toyohara, Sagamihara (JP); Joji Sakamoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/196,761

(22) Filed: Aug. 4, 2005

(65) Prior Publication Data

US 2006/0291061 A1    Dec. 28, 2006

(30) Foreign Application Priority Data

| Aug. 12, 2004 | (JP) | ............................. 2004-235070 |
| Sep. 8, 2004 | (JP) | ............................. 2004-261301 |
| Feb. 9, 2005 | (JP) | ............................. 2005-033680 |
| Feb. 9, 2005 | (JP) | ............................. 2005-033684 |
| Feb. 9, 2005 | (JP) | ............................. 2005-033694 |

(51) Int. Cl.
*G02B 15/14* (2006.01)

(52) U.S. Cl. ........................... 359/354; 396/79; 396/85; 359/356

(58) Field of Classification Search ................ None
See application file for complete search history.

(56) References Cited

U.S. PATENT DOCUMENTS

| 5,177,605 A * | 1/1993 | Takahashi et al. .............. 348/65 |
| 5,895,129 A * | 4/1999 | Ohta ............................. 396/79 |
| 6,124,989 A | 9/2000 | Oode et al. |
| 6,462,866 B1 * | 10/2002 | Sugiyama et al. ............ 359/359 |
| 7,142,375 B2 * | 11/2006 | Nikolov et al. ............... 359/722 |
| 2004/0090683 A1 | 5/2004 | Nagata |
| 2004/0104387 A1 | 6/2004 | Mogamiya et al. |
| 2004/0165095 A1 | 8/2004 | Shimizu et al. |

FOREIGN PATENT DOCUMENTS

| JP | 58-217901 A | 12/1983 |
| JP | 5-207350 | 8/1993 |
| JP | 11-352324 | 12/1999 |
| JP | 2000-66105 A | 3/2000 |
| JP | 2002-139662 | 5/2002 |
| JP | 2002-196243 A | 7/2002 |
| JP | 2002-277738 | 9/2002 |
| JP | 2003-029027 A | 1/2003 |
| JP | 2003-84200 A | 3/2003 |
| JP | 2004-088181 | 3/2004 |
| JP | 2004-139035 A1 | 5/2004 |
| JP | 2004-173139 A | 6/2004 |
| JP | 2004-254259 A | 9/2004 |

* cited by examiner

*Primary Examiner*—Stephone B. Allen
*Assistant Examiner*—Derek S Chapel
(74) *Attorney, Agent, or Firm*—Kenyon & Kenyon LLP

(57) ABSTRACT

An optical system includes a plurality of optical elements having finite refractive power and an electronic imaging device disposed at an image side of the optical system. At least one of the plurality of optical elements is made of resin, and an infrared-cut coating is applied to at least one face of the optical element that is made of resin.

11 Claims, 63 Drawing Sheets

OPTICAL FILTER, METHOD OF MANUFACTURING OPTICAL FILTER, OPTICAL SYSTEM, AND IMAGING APPARATUS

BACKGROUND OF THE INVENTION

1. Field of the Invention

The present invention relates to an optical system having a plurality of optical elements and to an imaging apparatus provided therewith, and relates to an optical system having a plurality of optical elements, such as lens components and prisms, for example, and to an imaging apparatus provided therewith, such as an imaging module for a digital camera or mobile telephone. More specifically, the present invention relates to an optical system in which an infrared-cut coating is applied to refractive surfaces of optical elements, to an optical filter, to a manufacturing method of an optical filter, and to an imaging apparatus provided therewith.

This application is based on Japanese Patent Applications Nos. 2004-235070, 2004-261301, 2005-033680, 2005-033684, and 2005-033694, the contents of which are incorporated herein by reference.

2. Description of Related Art

Recently, digital video cameras, digital cameras, and endoscopes provided with electronic-imaging optical systems including CCDs (charge coupled devices), CMOS (complementary metal oxide semiconductor) devices, etc. as imaging devices have been receiving attention.

Imaging devices formed of CCDs or CMOS devices have high sensitivity at wavelengths longer than the visible region of the spectrum (generally considered to be wavelengths from about 380 nm to about 750 nm), that is, in the so-called infrared region. Reduced resolution and image deterioration are caused by the received infrared light. Accordingly, in electronic imaging devices using imaging elements such as CCDs and CMOS devices, it is necessary to provide an infrared-cut filter or the like for removing infrared light in order to overcome this problem.

In general, the transmission characteristics of an infrared-cut filter are designed so that the transmittance of wavelengths above about 780 nm is as close as possible to zero.

Such infrared-cut filters include absorption-type filters in which the filter medium itself absorbs infrared light and reflection-type filters in which an infrared-cut coating that cuts infrared light is applied to the filter surface. In imaging apparatuses, such as digital cameras and video cameras, either of these types of filter, or both types of filter, is provided between a photographic lens and the imaging device.

Suitable methods for forming an infrared-cut coating include, for example, vacuum deposition and sputtering. In vacuum deposition, a material to be vaporized is thermally vaporized in a high vacuum and is deposited on a substrate to form a thin film. On the other hand, in sputtering, a high-energy atoms or molecules are made to collide with the material to be vaporized (target) and the atoms thrown off are deposited on a substrate to form a thin film.

An example of the transmittance-versus-wavelength characteristic of an absorption-type infrared-cut filter is shown in FIG. 36, and an example of the transmittance-versus-wavelength characteristic of a reflection-type infrared-cut filter is shown in FIG. 37. FIG. 36 shows the wavelength characteristic of an absorption-type infrared-cut filter available from Hoya Corporation (CD5000, thickness 0.45 mm). FIG. 37 is an example of the wavelength characteristic obtained when a 44-layer coating is formed on one surface of a flat filter.

When an infrared-cut filter, of either the absorption type or the reflection type, is disposed as described above, in order to ensure sufficient physical strength of the filter, the thickness must be at least 0.3 mm. Also, since it is necessary to maintain a certain spacing between the filter and lenses on either side thereof, there is a problem in that the overall length of the optical system becomes too large.

In addition, since the infrared-cut filter is provided separately from the optical system, an additional cost is required.

In order to solve these problems, Japanese Unexamined Patent Applications Nos. HEI-5-207350 and 2002-277738, for example, disclose a technique for making the system more compact by applying a multilayer film infrared-cut coating to one of the lens surfaces in a camera optical system. Also, Japanese Unexamined Patent Application No. 2004-88181 discloses a technique where an infrared-cut coating is vacuum deposited on the lens surface of a single lens. Japanese Unexamined Patent Application 2004-139035 discloses a technique for reducing the cost required for forming films by applying an infrared-cut coating to one surface of multiple glass plano-convex lenses in a batch.

Japanese Unexamined Patent Application Publication No. 2003-029027 discloses an infrared-cut filter in which a multilayer film is formed on both surfaces of a substrate, an infrared-cut filter including a plurality of substrates and having a multilayer film disposed between the substrates, and so on. By using a plurality of multilayer films in this way, it becomes easier to make the transmittance characteristic from the visible region to start of the infrared region drop. Also, infrared-cut filters having such a characteristic can be stably produced.

Japanese Unexamined Patent Application Publication No. 2004-173139 discloses an optical filter in which an infrared-cut filter is sandwiched between a first optical low-pass filter and a second optical low-pass filter.

Japanese Unexamined Patent Application Publication No. 2004-254259 discloses an infrared-cut filter in which a multilayer film is formed on both surfaces of a substrate and an infrared-cut filter including a plurality of substrates and having a multilayer film disposed between the substrates. According to this infrared-cut filter, by cutting infrared light with a plurality of multilayer films, it is possible to obtain light having wavelength characteristics close to the human visual sensitivity characteristics, and the design degree of freedom can be improved.

However, the conventional technologies described above have the following requirements and problems.

First, as well as imaging devices such as digital cameras and video cameras, recently, other products incorporating the electronic-imaging optical systems described above have also become commercially available, such as mobile telephones, mobile information terminals (PDAs), notebook computers and so on, and there is a strong demand to reduce the thickness, weight, and cost of such products. Accordingly, there are increasing demands for electronic-imaging optical systems with reduced thickness, weight, and cost that can be incorporated into such products.

Second, when applying an infrared-cut coating, there is a certain amount of error in the film thickness of each layer from the design value due to environmental variations, such as changes in temperature, humidity, and pressure. Therefore, as disclosed in, for example, Japanese Unexamined Patent Application Publication No. HEI-5-207350, the film thickness errors are compounded when forming a multilayer film on a lens surface. Generally, in an infrared-cut coating, a large number of layers is required to obtain the desired wavelength characteristics compared to a regular antireflection (AR)

coating. Therefore, the film thickness error is larger than in an AR coating, and defective products are often produced, resulting in the problem of decreased yield.

Furthermore, when using a reflection-type infrared-cut filter in which an infrared-cut coating for cutting infrared light is applied to the filter surface, a known problem is that the wavelength region that is cut differs when the light is incident perpendicularly and when it is incident at an angle. Therefore, when the infrared-cut filter is combined with a coaxial optical system that is compact in the optical-axis direction, the angle of incidence of light tends to be different between the central region and the distal regions of the infrared-cut filter, resulting in the problem that color nonuniformity occurs at the central region and the distal regions in an image acquired by the CCD or CMOS device.

In an absorption-type infrared-cut filter in which the filter material absorbs infrared light, there are almost no variations in the infrared-cutting characteristics due to the incidence angle of the light, unlike reflection-type infrared-cut filters; however, the infrared-cutting characteristics do vary depending on the filter thickness. In other words, if the filter is made thicker, more infrared light can be cut, but then it becomes difficult to reduce the thickness of the imaging optical system. Conversely, if the filter is made thinner, the imaging optical system can be reduced in thickness, but there is a drawback in that the amount of infrared light that can be cut is small.

BRIEF SUMMARY OF THE INVENTION

According to a first aspect, the present invention provides an imaging apparatus comprising an optical system including a plurality of optical elements having finite refracting power, wherein at least one of the plurality of optical elements is made of resin such as plastic or the like; an electronic imaging device disposed at an image side of the optical system; and an infrared-cut coating applied to at least one face of the at least one optical element that is made of resin.

According to a second aspect, the present invention provides an optical system comprising a plurality of optical elements having finite refractive power, wherein at least one of the plurality of optical elements is made of resin; and an infrared-cut coating applied to at least one face of the at least one optical element that is made of resin.

In the first and second aspects of the invention described above, an optical element having finite refractive power means an optical element having a non-zero refractive power at any of the working faces of the optical element.

According to a third aspect, the present invention provides an imaging apparatus comprising an optical system including a plurality of optical elements having finite refractive power; an electronic imaging device disposed at an image side of the optical system; and infrared-cut coatings applied to a plurality of faces of the optical elements.

In this aspect, the optical system including a plurality of optical elements preferably has infrared-cut coatings applied to a plurality of faces in the optical system.

According to a fourth aspect, the present invention provides an optical filter comprising at least two substrates that absorb infrared light and at least one infrared-cut layer that reflects infrared light, wherein the substrates are joined by sandwiching the infrared-cut layer therebetween.

According to a fifth aspect, the present invention provides an optical filter comprising at least two transparent substrates and an infrared-cut layer that reflects infrared light, wherein the infrared-cut layer is disposed only between the substrates.

According to a sixth aspect, the present invention provides an optical filter manufacturing method comprising the steps of forming an infrared-cut layer on one surface of a first substrate that absorbs infrared light; disposing a second substrate opposite the infrared-cut layer; and joining the second substrate and the infrared-cut layer.

According to a seventh aspect, the present invention provides an optical filter comprising a substrate that absorbs infrared light; an infrared-cut layer, formed on one surface of the substrate, that reflects infrared light; and an antireflection layer formed on the other surface of the substrate, wherein the infrared-cut layer and the antireflection layer are formed of multilayer structures in which a plurality of thin-film layers having different refractive indexes are laminated.

According to an eighth aspect, the present invention provides an imaging apparatus comprising an optical system including a prism member having a reflective surface with a rotationally asymmetric shape; an electronic imaging device disposed at an image side of the optical system; and a protection member that protects a light-incident surface of the electronic imaging device, wherein the protection member is a member that does not transmit infrared light.

DETAILED DESCRIPTION OF THE INVENTION

Figure 1A:
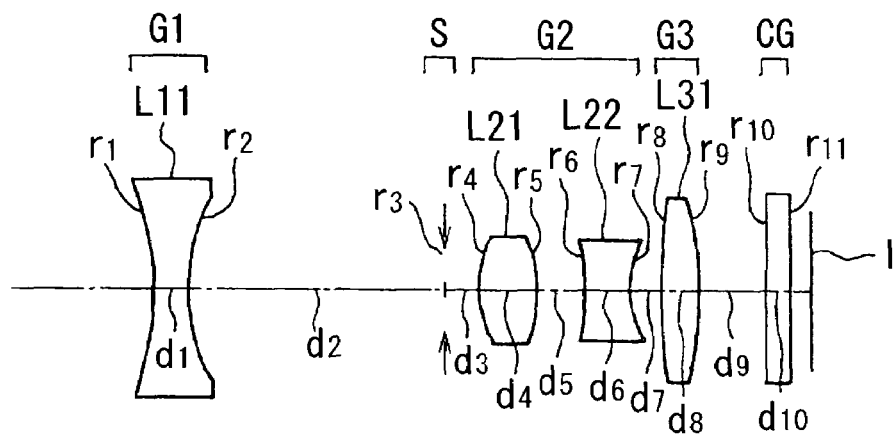
FIG. 1A is a lens diagram of a zoom lens system of Example 1 according to the present invention, at a wide-angle end, when focused at infinity.

The reasoning behind the configurations described above in the first to eighth aspects of the present invention, as well as the effects obtainable thereby, shall be described below.

With the optical system according to the first and second aspects of the present invention, constructing at least one of the plurality of optical elements of resin enables the weight of the overall optical system to be reduced, which is advantageous in that an imaging apparatus and so on of the present invention that employs such an optical system can also be reduced in weight and made more compact.

Furthermore, since optical elements made of resin can be fabricated at lower cost than optical elements made of glass, the manufacturing cost of an optical product, imaging apparatus, and so on can be reduced. Also, since resin can be more easily molded than glass, it is possible to easily fabricate optical elements having a desired shape (for example, lens components).

Moreover, in the first and second aspects of the present invention, it is preferable that infrared-cut coatings be applied to a plurality of refracting surfaces, including one face of the at least one optical element that is made of resin. By doing so, the variation in film thickness of each infrared-cut coating can be reduced, which provides an advantage in that the incidence of defective components can be reduced, which is advantageous in reducing the yield and lowering costs.

In addition, if the number of layers on one refracting surface is small, the time required for the coating process can be shortened, and the temperature rise of the optical element in the coating process can be suppressed. As a result, it is possible to prevent deformation of the resin optical elements due to the rise in temperature, thus reducing the risk of reduced imaging performance due to deteriorated surface accuracy.

More preferably, the transmittance of the overall optical system in a wavelength range of 750 to 850 nm is approximately 10% or less of the average transmittance in a wavelength range of 500 to 550 nm.

The resin material used for the optical elements in the aspects of the invention described above has a thermal deformation temperature in the range of 100° C. to 130° C. The refractive index is in the range of 1.45 to 1.65, and the Abbe number is in the range of 20 to 60.

According to the first and second aspects of the present invention, because at least one of the plurality of optical elements in the optical system is made of resin and infrared-cut coatings are applied to at least one face of the at least one optical element that is made of resin, the weight of the overall optical system can be reduced. That is, an advantage is provided in that the weight and size of an imaging apparatus or the like using such an optical system can be reduced.

Furthermore, since the optical elements made of resin can be fabricated at lower cost than optical elements made of glass, the manufacturing costs of an optical product, imaging apparatus, and so on can be reduced. Also, since resin can be molded more easily than glass, it is possible to easily fabricate optical elements having a desired shape (for example, lens components).

According to the third aspect of the present invention, applying an infrared-cut coating to a plurality of faces allows the number of layers on one face to be reduced compared to the case where an infrared-cut coating is applied to only one face, which allows variations in film thickness to be reduced. Accordingly, the incidence of defective components can be reduced, which is advantageous in improving the yield and lowering the costs.

Also, in this aspect, infrared-cut coating may be applied to a plurality of refracting surfaces, and a configuration in which the infrared-cut coating is applied to at least three faces is preferable.

With such a configuration, the number of layers on one face can be reduced, which allows the variation in film thickness of each infrared-cut coating to be further reduced. By doing so, the incidence of defective components can be reduced, which is advantageous in improving the yield and reducing the cost.

Also, further reducing the number of layers on one lens surface allows the time required for the coating process to be further reduced.

In this aspect, a preferable configuration is one in which the number of layers in the infrared-cut coating applied to at least one face is 25 or less. A more preferable configuration is one in which the number of layers is 15 or less.

Furthermore, in this aspect, a preferable configuration is one in which the number of layers in the infrared-cut coating applied to at least one face is 5 or more.

It is preferable that the infrared-cut coatings are applied to faces of different optical elements.

According to the third aspect of the present invention, since the infrared-cut coating is separately applied to a plurality of faces of the plurality of optical elements, deformation of the optical elements due to a rise in temperature during vacuum deposition, for example, can be effectively prevented compared to a case where the infrared-cut coating is applied to both faces of a single optical element, thus reducing the risk of reduced imaging performance due to deteriorated surface accuracy. This is particularly beneficial when using resin as the material of the optical elements.

Furthermore, in the third aspect, if the optical system is a unifocal optical system, the average value of the incidence angles of the chief ray at the maximum image height of the unifocal optical system with respect to each face on which the infrared-cut coating is applied is preferably smaller than the angle of incidence with respect to at least one face where the infrared-cut coating is not applied.

If the optical system is a zoom optical system, when the focal length of the zoom optical system is at a wide-angle end, the average value of incident angles of the chief ray at the maximum image height with respect to each face to which the infrared-cut coating is applied is preferably smaller than an incident angle with respect to at least one face to which the infrared-cut coating is not applied. In other words, in the zoom optical system, the focal length at the wide-angle end corresponds to the focal length of the unifocal optical system.

By doing so, the incident angle of the chief ray at the extreme periphery of the image with respect to each lens surface on which the infrared-cut coating is applied can be set to almost perpendicular incidence. As a result, variations in the reflectance of the infrared-cut coating applied to the lens surfaces at each wavelength due to an inclined angle of incidence can be reduced, which allows color irregularities at the extreme periphery of the image to be reduced.

Furthermore, in the third aspect of the invention, the transmittance of the entire optical system on an optical axis at wavelengths from 750 nm to 850 nm is preferably approximately 10% or less of the average transmittance at wavelengths from 500 nm to 550 nm.

Thus, light that is damaging to a CCD or CMOS device can be blocked.

At least one of the plurality of optical elements may be made of resin. Alternatively, at least one of the plurality of optical elements may be made of resin and at least one may be made of glass.

Including resin optical elements in the optical system allows a more lightweight optical system and imaging apparatus to be realized.

Preferably, the infrared-cut coating is applied to at least one face of the at least one optical element that is made of glass and to at least one face of the at least one optical element that is made of resin; and the number of layers in the infrared-cut coating applied to the at least one face of the at least one optical element that is made of glass is larger than the number of layers in the infrared-cut coating applied to the at least one face of the at least one optical element that is made of resin.

Making the number of layers on the glass optical elements larger allows the number of layers on the resin optical elements to be reduced, which reduces the time required for coating the resin optical elements, thus suppressing the temperature rise of the resin optical elements during the coating process. As a result, it is possible to prevent deformation of the resin optical elements due to a rise in temperature.

With the above-described technique according to the third aspect of the invention for cutting infrared light that is damaging to the imaging device, such as a CCD or CMOS device, applying the infrared-cut coating to a plurality of faces in the optical system allows the number of layers on one face to be reduced compared to a case in which the infrared-cut coating is applied to only a single face, and variations in film thickness can thus be reduced. Accordingly, the incidence of defective products is reduced, which is beneficial in improving the yield and reducing costs.

According to the fourth aspect of the present invention, since a substrate that absorbs infrared light is used, it is possible to reduce the thickness of the infrared-cut layer compared to a case using, for example, a substrate that does not absorb infrared light. In other words, by making the substrate absorb some of the infrared light, the proportion of infrared light to be reflected at the infrared-cut layer can be reduced, and therefore, the thickness of the infrared-cut layer can be decreased.

Since the infrared-cut layer is sandwiched by substrates, it can be protected from damage, and therefore, transmission of infrared light through such damaged portions can be prevented. Also, since the infrared-cut layer can be protected from damage, the fabrication of the optical filter can be simplified.

For example, when manufacturing a digital camera or the like that uses an optical filter according to this aspect of the invention, the infrared-cut layer can be protected from damage, and therefore, transmission of infrared light through such damaged portions can be prevented. As a result, the occurrence of color irregularities in the image acquired by the electronic imaging device due to transmitted infrared light can be prevented.

Sandwiching the infrared-cut layer between the substrates prevents it from coming into contact with outside air and absorbing moisture contained therein. Therefore, it is possible to prevent warpage of the optical filter due to different expansion coefficients of the substrates and the infrared-cut layer. Also, since the thickness of the infrared-cut layer is reduced, warpage of the optical filter can be more easily prevented.

Preventing contact with outside air to reduce moisture absorption allows changes in the properties of the infrared-cut layer to be prevented, and therefore, it is possible to prevent variations in the characteristics of the optical filter.

In the fourth aspect of the present invention described above, the substrates are preferably made of resin that absorbs infrared light.

According to this aspect of the invention, since the substrates are made of resin that absorbs infrared light, a lightweight optical filter can be realized and the fabrication costs can be reduced.

According to the fifth aspect of the invention, since the infrared-cut layer is sandwiched between the substrates, the infrared-cut layer can be protected from damage, and therefore, transmission of infrared light through such damaged portions can be prevented.

Also, sandwiching the infrared-cut layer between the substrates makes it more difficult to absorb moisture from the outside air. Accordingly, it is possible to prevent warpage of the optical filter due to a difference in the expansion coefficients of the substrates and the infrared-cut layer.

In the fifth aspect of the invention, the infrared-cut layer preferably has a multilayer structure in which a plurality of thin-film layers having different refractive indexes are laminated, and wherein the number of the laminated layers in the infrared-cut layer is 20 or less. More preferably, the infrared-cut layer has a multilayer structure in which high-refractive-index layers and low-refractive-index layers are alternately laminated.

According to the fifth aspect of the invention described above, since the infrared-cut layer is configured as an interference filter having a multilayer structure in which a plurality of thin-film layers with different refractive indexes are laminated, it is possible to reflect infrared light in the light incident on the infrared-cut layer. Also, by configuring the infrared-cut layer as an interference filter having a multilayer structure in which high-refractive-index layers and low-refractive-index layers are alternately laminated, it is possible to reflect infrared light in the light incident on the infrared-cut layer.

Since the number of layers in the plurality of thin-film layers having different refractive indexes that constitute the infrared-cut layer is twenty or less, warpage of the optical filter can be easily prevented, and the optical filter can be made thinner.

In the fifth aspect of the present invention described above, the substrate is preferably formed in a flat shape.

Forming the substrate in a flat shape in this way allows the infrared-cut layer to be formed with a uniform thickness. As a result, it is possible to prevent variations in the infrared-cut characteristics of the optical filter in the region of the spectrum where light is transmitted.

In the fifth aspect of the invention described above, the transmittance for light in the wavelength range from 750 nm to 850 nm is preferably approximately 10% or less compared to the average transmittance for light in a wavelength range from 500 nm to 550 nm.

By doing so, when using the optical filter of the present invention to cut infrared light entering the electronic imaging device, such as a CCD, because the transmittance for light in a wavelength range from 750 nm to 850 nm is approximately 10% or less compared to the average transmittance for light in a wavelength range from 500 nm to 550 nm, a reduction in resolution in the electronic imaging device or deterioration of the image can be prevented.

According to the sixth aspect of the invention described above, since the infrared-cut layer is formed on one surface of the first substrate and then the second substrate and the infrared cut layer are joined, it is possible to easily fabricate an optical filter in which the infrared-cut layer is sandwiched between the substrates.

In the sixth aspect of the present invention described above, the step of forming the infrared-cut layer preferably comprises laminating a plurality of thin-film layers having different refractive indexes, wherein the number of the laminated layers is preferably twenty or less. More preferably, the infrared-cut layer is formed by alternately laminating high-refractive-index layers and low-refractive-index layers.

Accordingly, since the infrared-cut layer is formed by laminating a plurality of thin-film layers having different refractive indexes, it is possible to reflect infrared light in the light incident on the infrared-cut layer. Also, since the infrared-cut layer is configured as an interference filter by alternately laminating high-refractive-index layers and low-refractive-index layers, it is possible to reflect infrared light in the light incident on the infrared-cut layer.

Since the number of layers in the plurality of thin-film layers having different refractive indexes that constitute the infrared-cut layers is twenty or less, warpage of the optical filter can be easily prevented, and the optical filter can be reduced in thickness.

According to the sixth aspect of the present invention described above, the substrate is preferably formed in a flat shape.

Forming the substrate in a flat shape in this way allows the infrared-cut layer to be formed with a uniform thickness. Accordingly, variations in the infrared-cut characteristics of the optical filter in the region of the spectrum where light is transmitted can be prevented.

In the sixth aspect of the present invention described above, an optical filter manufactured by the optical filter manufacturing method is preferably used in an imaging apparatus together with an optical system including optical elements having finite refractive power and an electronic imaging device, disposed at the image side of the optical system, which light transmitted through the optical filter enters. By using the optical filter according to this aspect in an imaging apparatus in this way, it is possible to protect the infrared-cut layer from damage, and therefore, infrared light from such damaged portions can be prevented from falling on the electronic imaging device. As a result, color irregularities in the image acquired by the electronic imaging device due to transmitted infrared light can be prevented. Also, since the infrared-cut layer can be protected from damage, the fabrication of the imaging apparatus can be simplified.

In the optical filter according to the fifth or sixth aspect of the present invention, a preferable configuration is one in which the infrared-cut layer is formed on one surface of one substrate of the at least two substrates, and a joining layer is disposed between the infrared-cut layer and the other substrate opposing the infrared-cut layer, for joining the infrared-cut layer and the other substrate.

With this configuration, since the infrared-cut layer is formed on one surface of one of the substrates of the at least two substrates, and a joining layer is provided between the infrared-cut layer and the other substrate, it is possible to join them in such a manner that the infrared-cut layer is disposed between one substrate and the other substrate.

For example, when a material having low durability at high temperatures, such as a resin, is used in the substrates, since the infrared-cut layers cannot be formed on one surface of the substrate in a high-temperature environment, the strength of the infrared-cut layer is reduced. Because the infrared-cut layer is sandwiched between substrates, the infrared-cut layer can be protected from damage in this case too.

The joining layer is preferably transparent at least in the range of wavelengths used.

In the optical filter according to the fifth or sixth aspect of the present invention, a preferable configuration is one in which the infrared-cut layer is formed on one surface of one substrate of the at least two substrates and on an opposing surface of the other substrate opposing the one surface; and a joining layer is disposed between the infrared-cut layer formed on the one surface and the infrared-cut layer formed on the opposing surface, for joining the two infrared-cut layers.

According to the configuration described above, since infrared-cut layers are formed on one surface of the one substrate of the at least two substrates and on an opposing surface of the other substrate and the joining layer is disposed between the two infrared-cut layers, they can be joined in such a manner that the infrared-cut layer is disposed between the one substrate and the other substrate.

The joining member is preferably transparent at least in the range of wavelengths used.

With the optical filter according to the fourth and fifth aspects of the present invention and the optical filter manufacturing method according to the sixth aspect of the present invention, an advantage is afforded in that infrared light can be suitably cut, the fabrication thereof is simplified, and an optical filter and imaging apparatus with reduced thickness can be realized.

According to the seventh aspect of the invention described above, by making the substrate absorb infrared light, some of the infrared light to be cut by the optical filter is absorbed in the substrate, and the remaining infrared light can be reflected by the infrared-cut layer. Therefore, the infrared light can be suitably cut by the optical filter, the required infrared-reflecting characteristics in the infrared-cut layer can be relaxed, and the number of layers in the infrared-cut layer can be reduced.

In addition, because the number of layers in the infrared-cut layer can be reduced, it is possible to reduce the stress acting on the optical filter, and deformation of the substrate due to the antireflection layer can be compensated for. Therefore, light can be made incident on the optical filter substantially perpendicularly, which allows deterioration of the transmittance characteristics and so on of the optical filter to be prevented.

The infrared-cut layer and the antireflection layer preferably have multilayer structures in which high-refractive-index layers and low-refractive-index layers are laminated.

In the seventh aspect of the invention described above, the substrate is preferably made of resin.

Forming the substrate of a resin that absorbs infrared light in this way enables a lightweight optical filter to be realized and the fabrication costs to be reduced.

Furthermore, the thickness of the antireflection layer and the thickness of the infrared-cut layer preferably satisfy condition (11) below:

$$0.05 \leq \text{(layer thickness } AR\text{)/(layer thickness } IR\text{)} \leq 1 \quad (11)$$

where, layer thickness AR is the thickness of the antireflection layer, and layer thickness IR is the thickness of the infrared-cut layer.

Since the thickness of the infrared-cut layer and the thickness of the antireflection layer satisfy condition (11), the stress acting on the substrate due to the infrared-cut layer and the stress acting on the substrate due to the antireflection layer cancel each other, and therefore, the deformation of the substrate can be kept within a predetermined range. Accordingly, the angle of incidence of light on the optical filter can be kept within a predetermined angular range, which allows deterioration of the transmittance characteristics and so on of the optical filter to be prevented.

The number of layers in the antireflection layer and the number of layers in the infrared-cut layer preferably satisfy condition (12) below:

$$1 < \text{(number of layers } IR\text{)/(number of layers } AR\text{)} \leq 5 \quad (12)$$

where number of layers IR is the number of layers in the infrared-cut layer, and number of layers AR is the number of layers in the antireflection layer.

Since the number of layers in the infrared-cut layer and the number of layers in the antireflection layer satisfy condition (12), the stress acting on the substrate due to the infrared-cut layer and the stress acting on the substrate due to the antireflection layer cancel each other, which allows the deformation of the substrate to be kept within a predetermined range. Therefore, the angle of incidence of light on the optical filter can be kept within a predetermined angular range, which allows deterioration of the transmittance characteristics and so on of the optical filter to be prevented.

Preferably, the number of layers in the antireflection layer and the number of layers in the infrared-cut layer further satisfy condition (13) below:

$$1 < \text{(number of layers } IR\text{)/(number of layers } AR\text{)} \leq 2.5 \quad (13)$$

where number of layers IR is the number of layers in the infrared-cut layer, and number of layers AR is the number of layers in the antireflection layer.

Since the number of layers in the infrared-cut layer and the number of layers in the antireflection layer satisfy condition (13), the stress acting on the substrate due to the infrared-cut layer and the stress acting on the substrate due to the antireflection layer can be made to balance each other more, which allows the deformation of the substrate to be kept within a predetermined range. Therefore, the angle of incidence of light to the optical filter can be kept within a more narrow predetermined angular range, which allows deterioration of the transmittance characteristics and so on of the optical filter to be prevented more effectively.

In the optical filter according to the seventh aspect of the present invention described above, the transmittance for light in a wavelength range from 750 nm to 850 nm is preferably approximately 10% or less compared to the average transmittance for light in a wavelength range from 500 nm to 550 nm.

For example, when using the optical filter of the present invention to cut infrared light entering the electronic imaging device, such as a CCD, because the transmittance for light in a wavelength range from 750 nm to 850 nm is approximately 10% or less compared to the average transmittance for light in a wavelength range from 500 nm to 550 nm, a reduction in the resolution of the electronic imaging device and image degradation can be prevented.

The optical filter according to the seventh aspect of the present invention described above is preferably used in an imaging apparatus together with an optical system including an optical element having a finite refractive power and an electronic imaging device, disposed at an image side of the optical system, which light transmitted through the optical filter enters.

By using the optical filter according to the seventh aspect of the present invention in an imaging apparatus in this way, infrared light in the light entering the electronic imaging device can be suitably cut. Also, since the optical filter can be reduced in size and thickness, it is possible to realize a compact, thin imaging apparatus.

Since deformation of the transmittance characteristics and so on of the optical filter can be prevented, it is possible to prevent color irregularities in the image acquired by the electronic imaging device due to transmitted infrared light.

According to the optical filter of the seventh embodiment of the present invention described above, an advantage is provided in that infrared light is suitably cut by the optical filter and it is possible to realize an optical filter with reduced size and thickness in which deterioration of the transmittance characteristics (wavelength characteristics) is prevented.

According to the eighth aspect of the present invention described above, by using an optical system including a prism member having reflective surfaces with rotationally asymmetric shapes, the optical system can be reduced in size, that is, thickness, in the optical-axis direction, and therefore, an imaging apparatus with reduced size, weight, and thickness can be realized.

When the optical system is reduced in size and thickness in the optical-axis direction, it is possible to make light incident on the protection member and the electronic imaging device at an angle closer to the perpendicular compared to a coaxial optical system. For example, when using a reflective infrared-cut coating as the member that does not transmit infrared light, since it is designed to exhibit suitable infrared-cutting performance when light is incident substantially perpendicularly, infrared light can be efficiently cut by making the light incident at an angle close to the perpendicular. Also, by reducing the amount of angular variation of the incident light, variations in the wavelength range of light cut by the infrared-cut coating can be reduced.

Since the protection member of the electronic imaging device serves as the member that does not transmit infrared light, the imaging apparatus can be reduced in size and thickness in the optical-axis direction compared to a case where a separate member that does not transmit infrared light is provided.

What is meant by not transmitting infrared light, as used herein, is that the amount of transmitted infrared light in the incident infrared light is approximately 10% or less; this may be achieved by reflecting the infrared light or by absorbing the infrared light.

In this aspect of the invention, the protection member is preferably formed of a substrate that is transparent to light in an operating wavelength range and an infrared-cut coating, provided on at least one surface of the substrate, that reflects infrared light.

According to the configuration described above, by providing the infrared-cut layer on at least one surface of the substrate of the protection member, it is possible to reflect only infrared light in the light incident on the protection member, thus cutting the infrared light. Since the substrate is transparent at the wavelengths used, it is possible to acquire images with the electronic imaging device.

The infrared-cut layer that reflects infrared light can be reduced in size and thickness in the optical-axis direction, and therefore, it is also possible to reduce the size, weight, and thickness of the imaging apparatus. Also, since the infrared wavelength characteristics are sharper than an absorbing-type infrared-cut filter, color irregularities in the image acquired by the electronic imaging device can be suppressed.

In this aspect of the invention, the substrate preferably exhibits birefringence. More preferably, the substrate is formed of at least one liquid crystal panel.

According to this configuration, by using a substrate exhibiting birefringence, Moire fringes can be prevented in the image acquired by the electronic imaging device. More specifically, Moire fringes can be prevented by using a substrate formed of at least one liquid crystal panel.

In this aspect of the invention, the protection member is preferably fixed to the electronic imaging device using a joining member that is cured by ultraviolet light, and the protection member preferably transmits ultraviolet light.

By furnishing the protection member with ultraviolet-transmitting characteristics and fixing the protection member to the electronic imaging device using the joining member that is cured by ultraviolet light, it is possible to control the time required to join the protection member and the electronic imaging device. In other words, by joining the protection member and the electronic imaging device using the joining member and controlling the amount of ultraviolet light radiated from the protection member side, the time required to cure the joining member can be controlled.

For example, by increasing the intensity of irradiated ultraviolet light, the time required for joining can be reduced. Alternatively, by controlling the intensity of irradiated ultraviolet light within a predetermined standard range, the bonding strength between the protection member and the electronic imaging device can be maintained within a predetermined standard range.

In this aspect of the invention, the protection member is preferably made at least of resin.

By forming the protection member at least of resin, a lightweight protection member can be realized, and the fabrication costs can be reduced.

In this aspect of the invention, a chamfer is preferably formed on the protection member.

By forming a chamfer, the edge of the protection member can be prevented from being chipped. Therefore, small particles that would otherwise be chipped off from the protection member can be prevented from adhering to the light-incident surface of the imaging device and blocking the image.

In this aspect of the invention, the protection member is preferably formed in a flat shape.

Forming the protection member in a flat shape allows the infrared-cut layer to be easily formed on the surface of the protection member with a uniform thickness.

In this aspect of the invention, the protection member preferably includes an infrared-absorbing member that absorbs at least infrared light.

Including an infrared-absorbing member in the protection member allows the infrared-cutting characteristics to be improved.

With the imaging apparatus according to the eighth aspect of the present invention described above, an advantage is provided in that infrared light entering the imaging device is cut, color irregularities in the acquired image are prevented, and the imaging apparatus can be reduced in size and thickness in the optical-axis direction.

Examples 1 to 5 of an optical system according to the present invention will be described below.

Figure 1B:
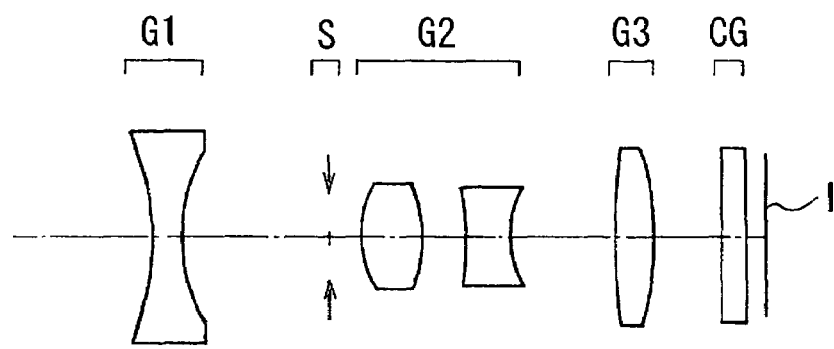
FIG. 1B is a lens diagram of the zoom lens system of Example 1 according to the present invention, at an intermediate position, when focused at infinity.
Figure 1C:
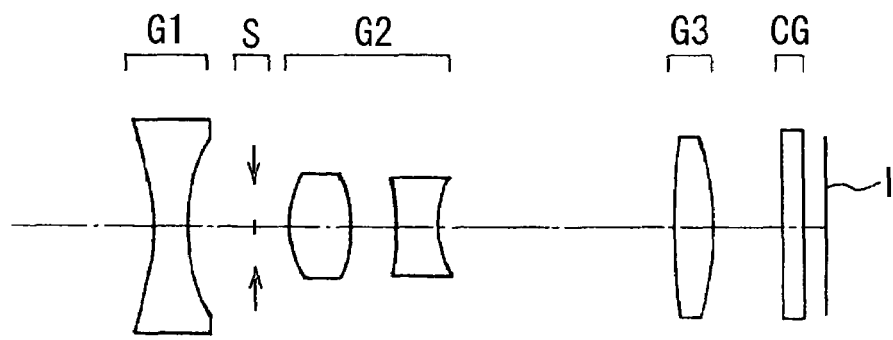
FIG. 1C is a lens diagram of the zoom lens system of Example 1 according to the present invention, at a telephoto end, when focused at infinity.
Figure 2A:
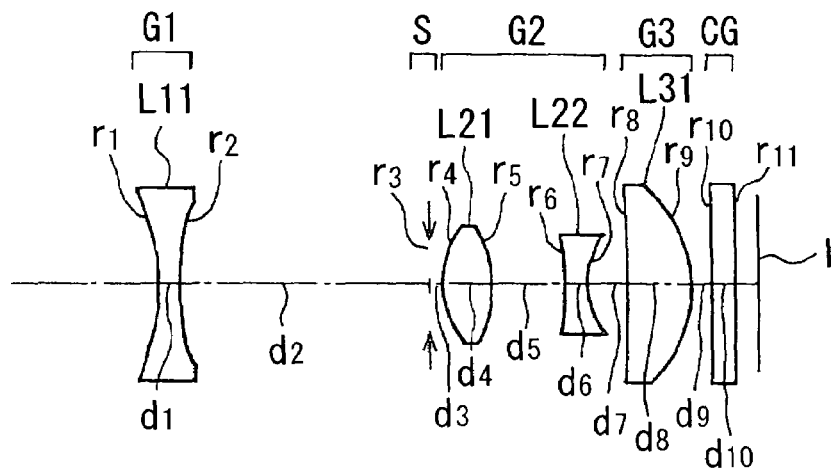
FIG. 2A is a lens diagram of a zoom lens system of Example 3 according to the present invention, at a wide-angle end, when focused at infinity.
Figure 2B:
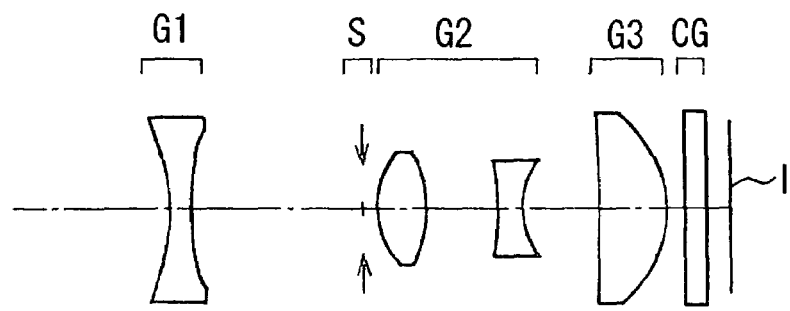
FIG. 2B is a lens diagram of the zoom lens system of Example 3 according to the present invention, at an intermediate position, when focused at infinity.
Figure 2C:
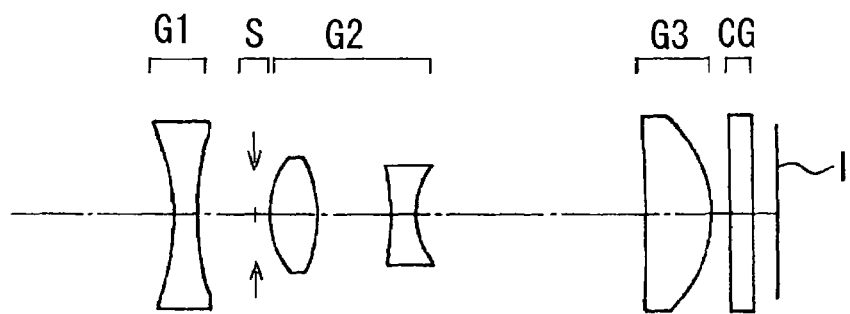
FIG. 2C is a lens diagram of the zoom lens system of Example 3 according to the present invention, at a telephoto end, when focused at infinity.
Figure 3:
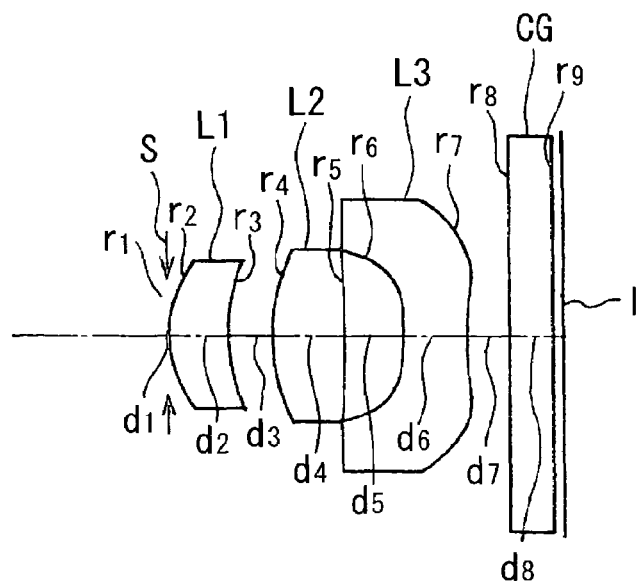
FIG. 3 is a lens diagram of an imaging lens of Example 5 according to the present invention, when focused at infinity.

Lens diagrams of zoom lenses of Example 1 and Example 2 at a wide-angle end, an intermediate position, and a telephoto end, when focused at infinity, are shown in FIGS. 1A to 1C, respectively. Lens diagrams of zoom lenses of Example 3 and Example 4 at a wide-angle end, an intermediate position, and a telephoto end, when focused at infinity, are shown in FIGS. 2A to 2C, respectively. A lens diagram of an imaging lens of Example 5, when focused at infinity, is shown in FIG. 3.

In FIGS. 1A to 1C and FIGS. 2A to 2C, a first lens group is indicated by G1, an aperture stop is indicated by S, a second lens group is indicated by G2, a third lens group is indicated by G3, a cover glass of an electronic imaging device is indicated by CG, and an image plane is indicated by I. In FIG. 3, an aperture stop is indicated by S, a first negative lens is indicated by L1, a second positive lens is indicated by L2, a third negative lens is indicated by L3, a cover glass of an electronic imaging device is indicated by CG, and an image plane is indicated by I.

As shown in FIGS. 1A to 1C, the zoom lens system of Example 1 is constructed of the first lens group G1, which has negative refractive power and which is formed of a biconcave lens L1; the aperture stop S; the second lens group G2, which has positive refractive power and which is formed of a biconvex lens L21 and a biconcave lens L22; the third lens group G3, which has positive refractive power and which is formed of a biconvex lens L31; and the cover glass CG, in sequence from the object side.

In this Example, the lenses in lens group G1 to lens group G3 are all formed of resin lenses.

When zooming from the wide-angle end to the telephoto end, the first lens group G1 moves closer to the image side and then further away, as the telephoto end nears (that is, it moves away from the object side and then closer again), and the second lens group G2 moves towards the object side together with the aperture stop S. The third lens group G3 is fixed.

Aspheric surfaces are provided at both surfaces of the biconcave lens L11 of the first lens group G1, at both surfaces of the biconvex lens L21 of the second lens group G2, at the image-side surface of the biconcave lens L22 of the second lens group G2, and at the image-side surface of the biconvex lens L31 of the third lens group G3.

In Example 1, a 44-layer infrared-cut coating is applied to the image-side surface (ninth face) of the biconvex lens L31 in the third lens group G3.

The layer structure of the infrared-cut coating applied to the ninth face in the optical system of Example 1 is shown in Table 1 below, in order from the substrate (that is, the lens surface) side. A transmission characteristic of the entire optical system on an optical axis of Example 1 is as shown in FIG. 4.

Figure 4:
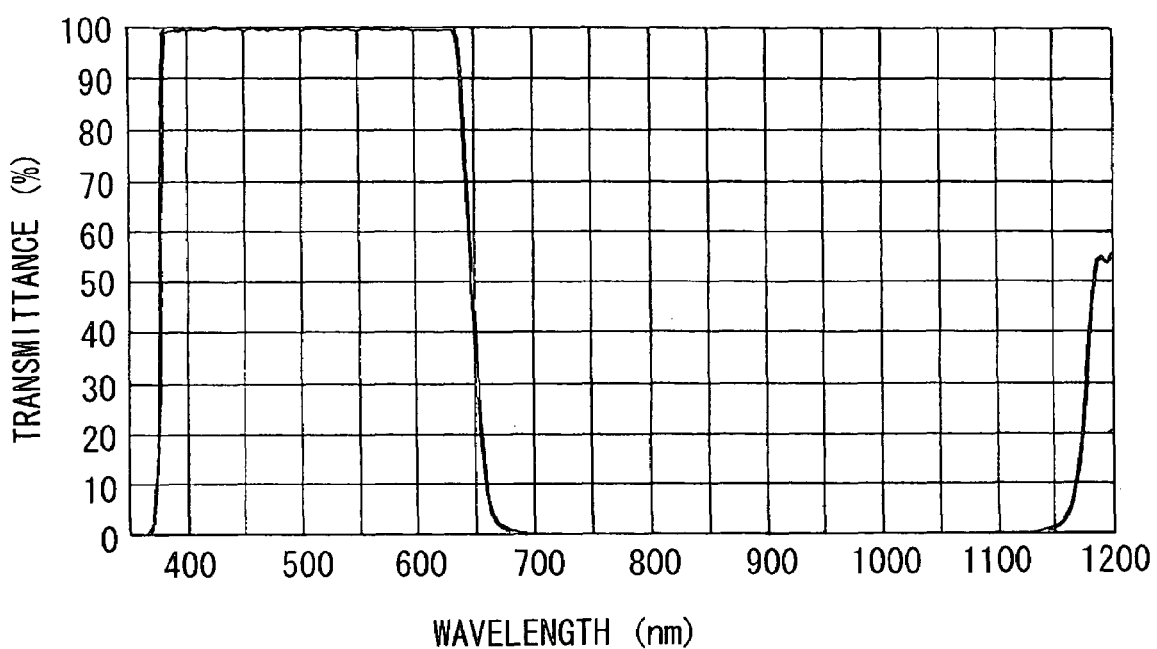
FIG. 4 is a graph showing a transmittance characteristic of the entire optical system on an optical axis of Example 1.

As shown in FIG. 4, in this Example, infrared light is suitably cut, and the desired wavelength characteristics can be obtained.

TABLE 1

| Number of layers | Film material | Optical film thickness |
| --- | --- | --- |
| 1 | $TiO_2$ | $0.2071 \times \lambda/4$ |
| 2 | $SiO_2$ | $0.395 \times \lambda/4$ |
| 3 | $TiO_2$ | $1.9539 \times \lambda/4$ |
| 4 | $SiO_2$ | $1.7543 \times \lambda/4$ |
| 5 | $TiO_2$ | $1.6061 \times \lambda/4$ |
| 6 | $SiO_2$ | $1.6097 \times \lambda/4$ |
| 7 | $TiO_2$ | $1.5417 \times \lambda/4$ |
| 8 | $SiO_2$ | $1.5714 \times \lambda/4$ |
| 9 | $TiO_2$ | $1.5146 \times \lambda/4$ |
| 10 | $SiO_2$ | $1.5589 \times \lambda/4$ |
| 11 | $TiO_2$ | $1.5051 \times \lambda/4$ |
| 12 | $SiO_2$ | $1.5563 \times \lambda/4$ |
| 13 | $TiO_2$ | $1.4976 \times \lambda/4$ |
| 14 | $SiO_2$ | $1.5567 \times \lambda/4$ |
| 15 | $TiO_2$ | $1.5026 \times \lambda/4$ |
| 16 | $SiO_2$ | $1.5647 \times \lambda/4$ |
| 17 | $TiO_2$ | $1.5137 \times \lambda/4$ |
| 18 | $SiO_2$ | $1.5811 \times \lambda/4$ |
| 19 | $TiO_2$ | $1.5388 \times \lambda/4$ |
| 20 | $SiO_2$ | $1.6133 \times \lambda/4$ |
| 21 | $TiO_2$ | $1.5979 \times \lambda/4$ |
| 22 | $SiO_2$ | $1.6941 \times \lambda/4$ |
| 23 | $TiO_2$ | $1.783 \times \lambda/4$ |
| 24 | $SiO_2$ | $1.9277 \times \lambda/4$ |
| 25 | $TiO_2$ | $1.9895 \times \lambda/4$ |
| 26 | $SiO_2$ | $2.0126 \times \lambda/4$ |
| 27 | $TiO_2$ | $2.0378 \times \lambda/4$ |
| 28 | $SiO_2$ | $2.0446 \times \lambda/4$ |
| 29 | $TiO_2$ | $2.062 \times \lambda/4$ |
| 30 | $SiO_2$ | $2.0531 \times \lambda/4$ |
| 31 | $TiO_2$ | $2.068 \times \lambda/4$ |
| 32 | $SiO_2$ | $2.0626 \times \lambda/4$ |
| 33 | $TiO_2$ | $2.069 \times \lambda/4$ |
| 34 | $SiO_2$ | $2.0591 \times \lambda/4$ |
| 35 | $TiO_2$ | $2.0707 \times \lambda/4$ |
| 36 | $SiO_2$ | $2.0552 \times \lambda/4$ |
| 37 | $TiO_2$ | $2.0612 \times \lambda/4$ |
| 38 | $SiO_2$ | $2.0468 \times \lambda/4$ |
| 39 | $TiO_2$ | $2.0475 \times \lambda/4$ |
| 40 | $SiO_2$ | $2.0273 \times \lambda/4$ |
| 41 | $TiO_2$ | $2.0072 \times \lambda/4$ |
| 42 | $SiO_2$ | $1.9692 \times \lambda/4$ |
| 43 | $TiO_2$ | $1.9273 \times \lambda/4$ |
| 44 | $SiO_2$ | $0.9515 \times \lambda/4$ |

Note:
$\lambda = 500$ nm

The zoom lens of Example 2 has the same construction as the zoom lens of Example 1 described above, except that the surface having the infrared-cut filter is different, and thus a description regarding a similar construction shall be omitted.

In Example 2, two surfaces, that is, the object-side surface (eighth face) and the image-side surface (ninth face), of the biconvex lens L31 in the third lens group G3 each have a 22-layer infrared-cut coating applied thereto.

The film structure of the infrared-cut coating applied to the eighth and ninth faces in the optical system of Example 2 is shown in Table 2, in order from the substrate side. Data regarding the incident angle at each surface for the chief ray at the maximum image height when the focal length of the optical system of Example 2 is at the wide-angle end is shown in Table 3, and the average values of the incident angle at the surfaces where the infrared-cut coatings (IR coatings) are not applied and at the surfaces where they are applied are shown in Table 4.

Figure 5:
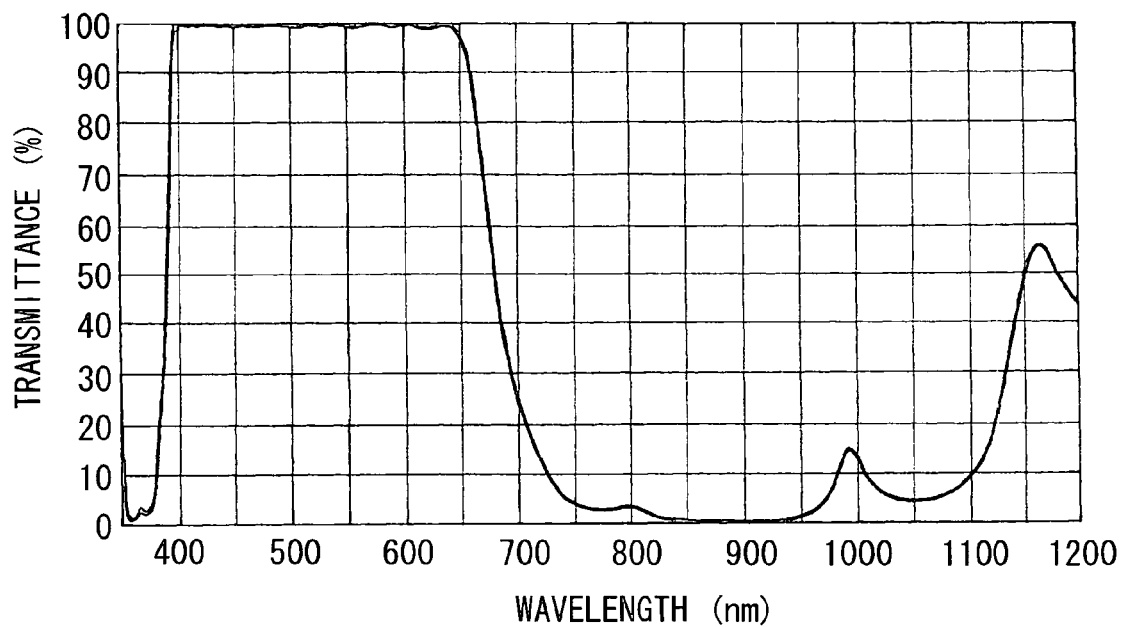
FIG. 5 is a graph showing a transmittance characteristic for one of an eighth face and a ninth face in the zoom lens system of Example 2.

The transmission characteristic at one of the eighth face and the nine face is as shown in FIG. 5.

Figure 6:
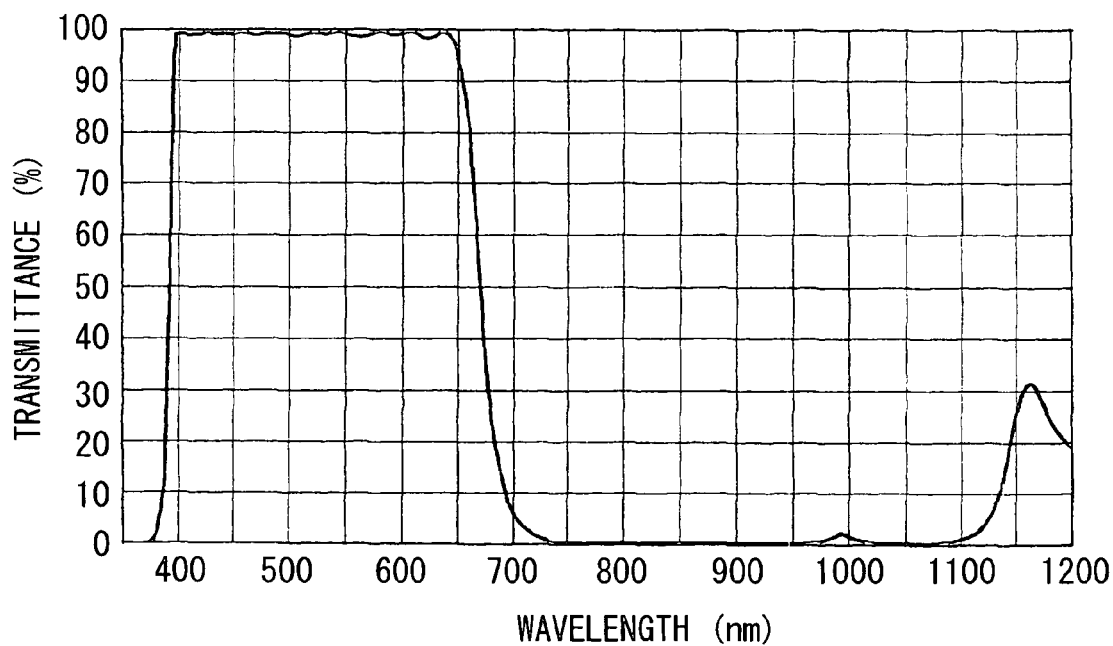
FIG. 6 is a graph showing a transmittance characteristic on an optical axis due to infrared-cut coatings on two surfaces, that is, the eighth face and the ninth face, in the zoom lens system of Example 2.

The transmission characteristic on an optical axis of Example 2 due to the infrared-cut coatings on the two surfaces, that is, the object-side surface (eighth face) and the image-side surface (ninth face), of the biconvex lens L31 is shown in FIG. 6.

As shown in FIG. 6, in this Example, infrared light can be suitably cut, and the desired wavelength characteristics can be obtained.

TABLE 2

| Number of layers | Film material | Optical film thickness |
| --- | --- | --- |
| 1 | $TiO_2$ | $0.181 \times \lambda/4$ |
| 2 | $SiO_2$ | $0.4108 \times \lambda/4$ |
| 3 | $TiO_2$ | $1.9224 \times \lambda/4$ |
| 4 | $SiO_2$ | $1.7824 \times \lambda/4$ |
| 5 | $TiO_2$ | $1.6345 \times \lambda/4$ |
| 6 | $SiO_2$ | $1.6908 \times \lambda/4$ |
| 7 | $TiO_2$ | $1.5826 \times \lambda/4$ |
| 8 | $SiO_2$ | $1.6646 \times \lambda/4$ |
| 9 | $TiO_2$ | $1.5763 \times \lambda/4$ |
| 10 | $SiO_2$ | $1.664 \times \lambda/4$ |
| 11 | $TiO_2$ | $1.6346 \times \lambda/4$ |
| 12 | $SiO_2$ | $1.7215 \times \lambda/4$ |
| 13 | $TiO_2$ | $1.8085 \times \lambda/4$ |
| 14 | $SiO_2$ | $1.9642 \times \lambda/4$ |
| 15 | $TiO_2$ | $2.0516 \times \lambda/4$ |
| 16 | $SiO_2$ | $2.0597 \times \lambda/4$ |
| 17 | $TiO_2$ | $2.0654 \times \lambda/4$ |
| 18 | $SiO_2$ | $2.0675 \times \lambda/4$ |
| 19 | $TiO_2$ | $2.0706 \times \lambda/4$ |
| 20 | $SiO_2$ | $2.0256 \times \lambda/4$ |

TABLE 2-continued

| Number of layers | Film material | Optical film thickness |
|---|---|---|
| 21 | $TiO_2$ | $1.9937 \times \lambda/4$ |
| 22 | $SiO_2$ | $1.0126 \times \lambda/4$ |

Note:
$\lambda = 500$ nm

TABLE 3

| Face | Incident angle (°) |
|---|---|
| $r_1$ | 51.5 |
| $r_2$ | 0.8 |
| $r_3$ | |
| $r_4$ | 22.2 |
| $r_5$ | 2.3 |
| $r_6$ | 6.2 |
| $r_7$ | 22.9 |
| $r_8$ | 27.0 (IR coating) |
| $r_9$ | 7.1 (IR coating) |

TABLE 4

| Face | Average of face angles (°) |
|---|---|
| Surface without IR coating | 17.7 |
| Surface with IR coating | 17.0 |

As shown in FIGS. 2A to 2C, the zoom lens system of Example 3 is constructed of the first lens group G1, which has negative refractive power and which is formed of the biconcave lens L11; the aperture stop S; the second lens group G2, which has positive refractive power and which is formed of the biconvex lens L21 and the biconcave lens L22; the third lens group G3, which has positive refractive power and which is formed of a positive meniscus lens L31 whose convex surface faces the image side; and the cover glass CG, in order from the object side.

In this example, the biconvex lens L21 of the second lens group G2 is made of glass; however, all other lenses are made of resin.

When zooming from the wide-angle end to the telephoto end, the first lens group G1 moves closer to the image side and then further away, as the telephoto end nears (that is, it moves away from the object side and then closer again), and the second lens group G2 moves towards the object side together with the aperture stop S. The third lens group G3 is stationary.

Aspheric surfaces are provided at both surfaces of the biconcave lens L11 of the first lens group G1, at both surfaces of the biconvex lens L21 of the second lens group G2, at the image-side surface of the biconcave lens L22 of the second lens group G2, and at the image-side surface of the positive meniscus lens L31 of the third lens group G3.

In Example 3, six-layer infrared-cut coatings are applied to four surfaces, that is, the object-side surface (fourth face) of the biconvex lens L21 and the object-side surface (sixth face) of the biconvex lens L22 in the second lens group G2, and the object-side surface (eighth face) and the image-side surface (ninth face) of the positive meniscus lens L31 in the third lens group G3. In this Example, infrared-cut coatings are not applied to opposing lens surfaces (for example, the fifth and sixth faces), even though the lens components are different from each other. By doing so, it is possible to prevent the occurrence of ghosting.

The film structure of the infrared-cut coating applied to the fourth, sixth, eighth, and ninth faces in the optical system of Example 3 is shown in Table 5, in order from the substrate side. Data regarding the incident angle of the chief ray at the maximum image height with respect to each face when the optical system of Example 3 is focused at the wide-angle end is shown in Table 6, and the average values of the incident angles at the surfaces where the infrared-cut coating is not applied and surfaces where it is applied are shown in Table 7.

Figure 7:
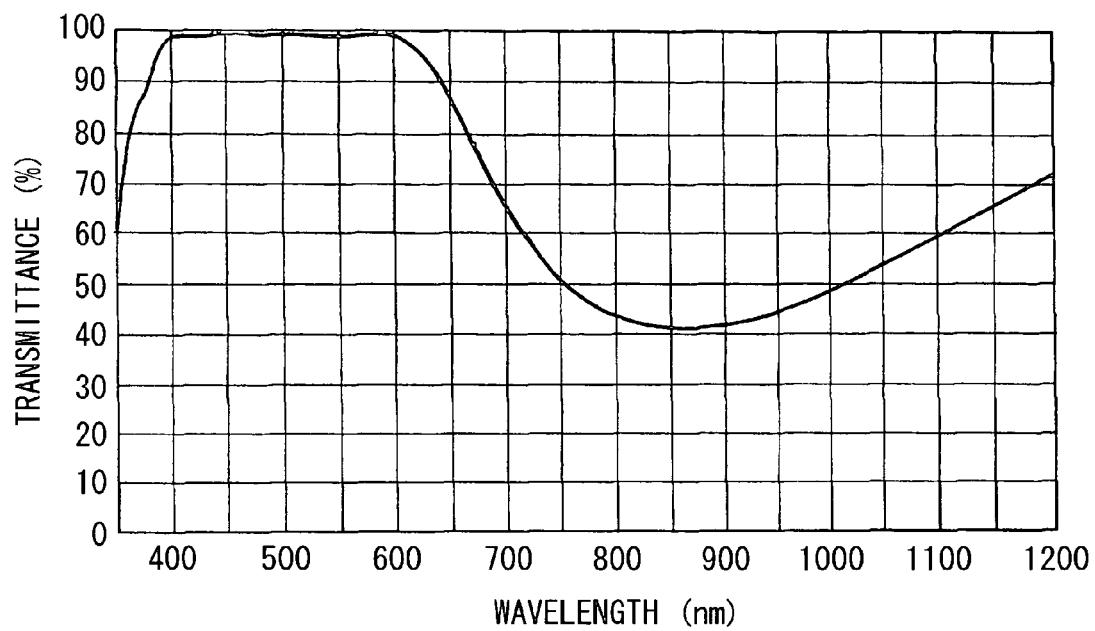
FIG. 7 is a graph showing a transmittance characteristic of one of the fourth, sixth, eighth, and ninth faces in the zoom lens system of Example 3.

The transmission characteristic at one of the fourth, sixth, eighth, and ninth faces is as shown in FIG. 7.

Figure 8:
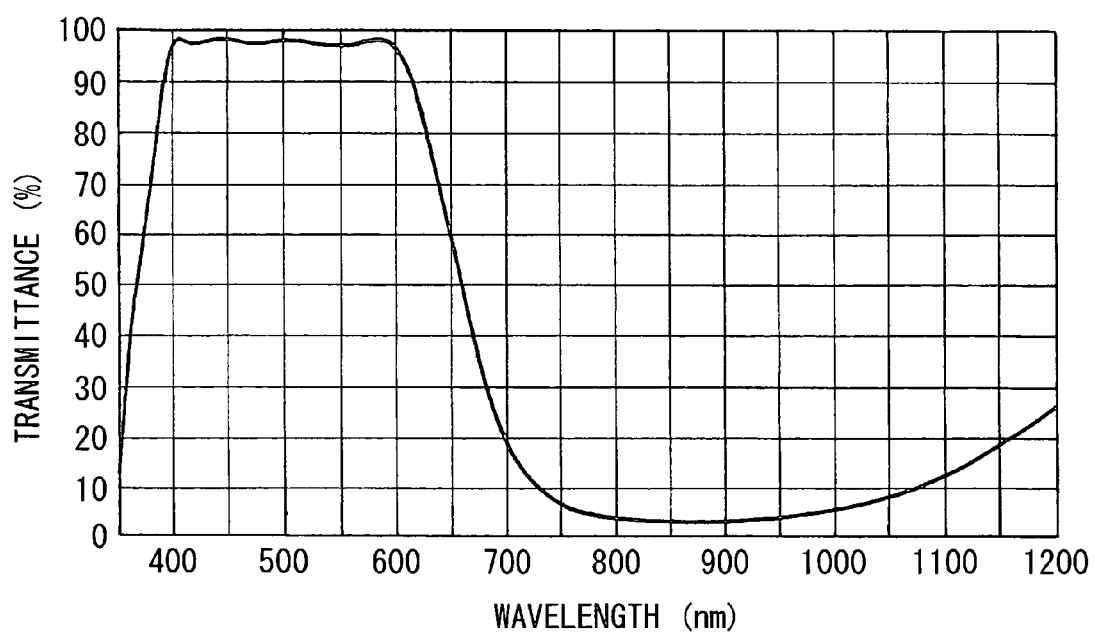
FIG. 8 is a graph showing a transmittance characteristic of the entire optical system on an optical axis of Example 3.

The transmission characteristic of the entire optical system on an optical axis of Example 3 is as shown in FIG. 8.

As shown in FIG. 8, in this Example, infrared light can be suitably cut, and it is possible to obtain the desired wavelength characteristics.

TABLE 5

| Number of layers | Film material | Optical film thickness |
|---|---|---|
| 1 | $TiO_2$ | $0.1398 \times \lambda/4$ |
| 2 | $SiO_2$ | $2.1496 \times \lambda/4$ |
| 3 | $TiO_2$ | $1.7933 \times \lambda/4$ |
| 4 | $SiO_2$ | $1.7406 \times \lambda/4$ |
| 5 | $TiO_2$ | $1.61 \times \lambda/4$ |
| 6 | $SiO_2$ | $0.8669 \times \lambda/4$ |

Note:
$\lambda = 500$ nm

TABLE 6

| Face | Incident angle (°) |
|---|---|
| $r_1$ | 46.8 |
| $r_2$ | 3.6 |
| $r_3$ | |
| $r_4$ | 18.6 (IR coating) |
| $r_5$ | 5.6 |
| $r_6$ | 7.9 (IR coating) |
| $r_7$ | 30.2 |
| $r_8$ | 32.7 (IR coating) |
| $r_9$ | 4.1 (IR coating) |

TABLE 7

| Face | Average of face angles (°) |
|---|---|
| Surface without IR coating | 21.5 |
| Surface with IR coating | 15.9 |

The zoom lens system of Example 4 has the same construction as the zoom lens system of Example 3 described above, except that the surface to which the infrared-cut coating is applied is different, and therefore, a description regarding the same construction shall be omitted.

In Example 4, a 22-layer infrared-cut coating is applied to the object-side surface (fourth face) of the biconvex lens L21 in the second lens group G2, and an 8-layer infrared-cut coating is applied to the image-side surface (ninth face) of the positive meniscus lens L31 in the third lens group G3.

The film structure of the infrared-cut coating applied to the fourth face in the optical system of Example 4 is shown in Table 8, in order from the substrate side. The film structure of the infrared-cut coating applied to the ninth face is shown in Table 9, in order from the substrate side. Also, data regarding the angle of incidence of the chief ray at the maximum image height with respect to each face when the optical system of Example 4 is focused at the wide-angle end is shown in Table 10, and the average values of the angles of incidence at surfaces where the infrared-cut coating is not applied and surfaces where it is applied are shown in Table 11.

Figure 9:
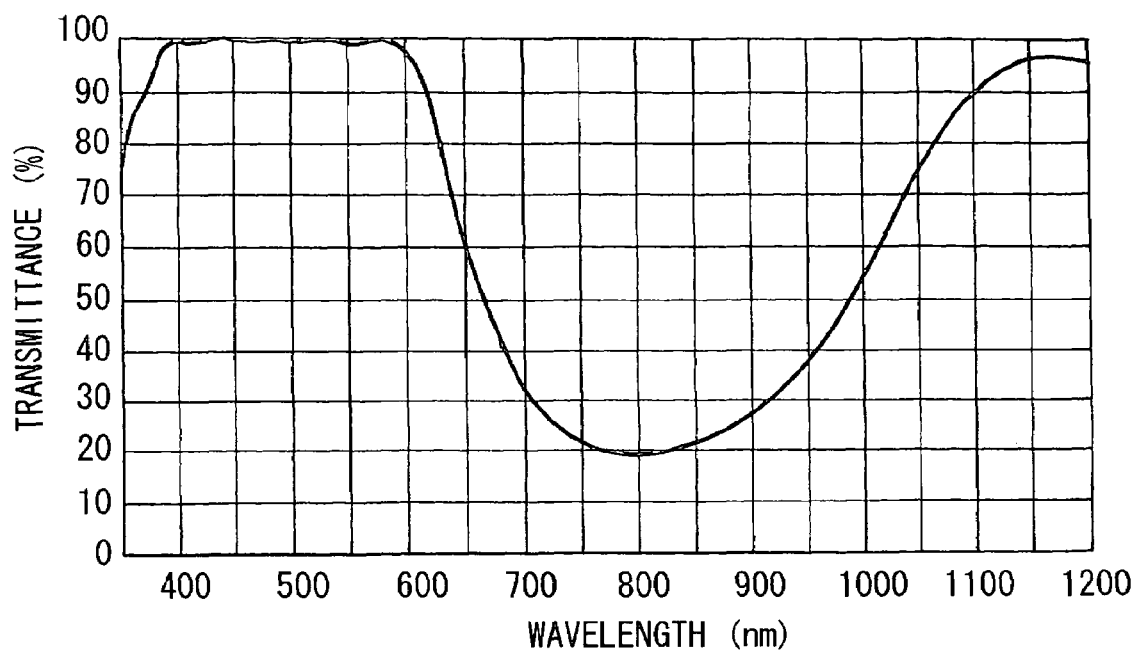
FIG. 9 is a graph showing a transmittance characteristic on an optical axis due to infrared-cut coatings on the fourth face in a zoom lens system of Example 4.

A single-surface transmission characteristic for the fourth face is as shown in FIG. 5. A single-surface transmission characteristic for the ninth face is as shown in FIG. 9. Also, the transmission characteristic of the entire optical system on an optical axis of Example 4 is as shown in FIG. 10.

Figure 10:
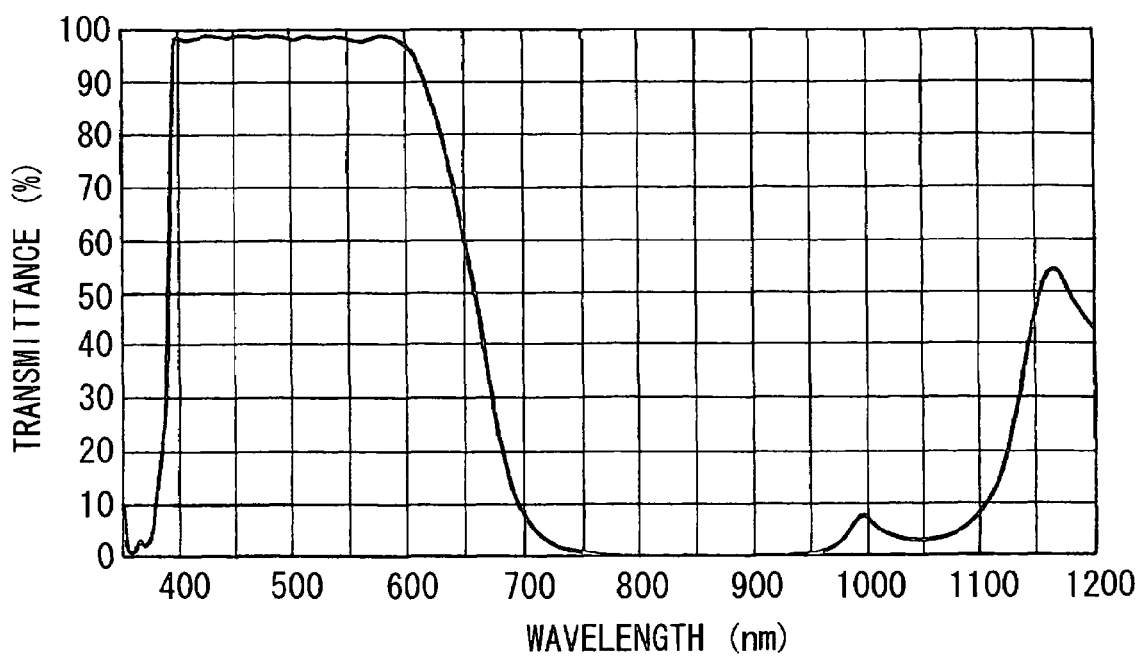
FIG. 10 is a graph showing a transmittance characteristic on an optical axis due an infrared-cut coating on the ninth face in the zoom lens system of Example 4.

As shown in FIG. 10, in this Example, infrared light can be suitably cut, and it is possible to obtain the desired wavelength characteristics.

TABLE 8

| Number of layers | Film material | Optical film thickness |
|---|---|---|
| 1 | TiO$_2$ | 0.181 × λ/4 |
| 2 | SiO$_2$ | 0.4108 × λ/4 |
| 3 | TiO$_2$ | 1.9224 × λ/4 |
| 4 | SiO$_2$ | 1.7824 × λ/4 |
| 5 | TiO$_2$ | 1.6345 × λ/4 |
| 6 | SiO$_2$ | 1.6908 × λ/4 |
| 7 | TiO$_2$ | 1.5826 × λ/4 |
| 8 | SiO$_2$ | 1.6646 × λ/4 |
| 9 | TiO$_2$ | 1.5763 × λ/4 |
| 10 | SiO$_2$ | 1.664 × λ/4 |
| 11 | TiO$_2$ | 1.6346 × λ/4 |
| 12 | SiO$_2$ | 1.7215 × λ/4 |
| 13 | TiO$_2$ | 1.8085 × λ/4 |
| 14 | SiO$_2$ | 1.9642 × λ/4 |
| 15 | TiO$_2$ | 2.0516 × λ/4 |
| 16 | SiO$_2$ | 2.0597 × λ/4 |
| 17 | TiO$_2$ | 2.0654 × λ/4 |
| 18 | SiO$_2$ | 2.0675 × λ/4 |
| 19 | TiO$_2$ | 2.0706 × λ/4 |
| 20 | SiO$_2$ | 2.0256 × λ/4 |
| 21 | TiO$_2$ | 1.9937 × λ/4 |
| 22 | SiO$_2$ | 1.0126 × λ/4 |

Note:
λ = 500 nm

TABLE 9

| Number of layers | Film material | Optical film thickness |
|---|---|---|
| 1 | TiO$_2$ | 0.1431 × λ/4 |
| 2 | SiO$_2$ | 2.0867 × λ/4 |
| 3 | TiO$_2$ | 1.7065 × λ/4 |
| 4 | SiO$_2$ | 1.6211 × λ/4 |
| 5 | TiO$_2$ | 1.5306 × λ/4 |
| 6 | SiO$_2$ | 1.6518 × λ/4 |
| 7 | TiO$_2$ | 1.5314 × λ/4 |
| 8 | SiO$_2$ | 0.8312 × λ/4 |

Note:
λ = 500 nm

TABLE 10

| Face | Incident angle (°) |
|---|---|
| $r_1$ | 46.8 |
| $r_2$ | 3.6 |
| $r_3$ | |
| $r_4$ | 18.6 (IR coating) |
| $r_5$ | 5.6 |
| $r_6$ | 7.9 |
| $r_7$ | 30.2 |
| $r_8$ | 32.7 |
| $r_9$ | 4.1 (IR coating) |

TABLE 11

| Face | Average of face angles (°) |
|---|---|
| Surface without IR coating | 21.1 |
| Surface with IR coating | 11.4 |

As shown in FIG. 3, the imaging lens system of Example 5 is constructed of an aperture stop S, a first positive meniscus lens L1 with an aspheric object-side surface, whose convex surface faces the object side, a biconvex second positive lens L2 with an aspheric image-side surface, a biconcave negative lens L3 with aspheric surfaces at both sides, and a cover glass CG, in this order from the object side.

In this Example, all lenses from the first lens L1 to the third lens L3 are made of resin.

The specifications of the optical system of Example 5 are: focal length f=3.83 mm, image height=2.30 mm, F-number=2.98, and full-angle field of view 2ω=63.0°.

In Example 5, 18-layer infrared-cut coatings are applied to two surfaces, that is, the image-side surface (fifth face) of the second positive lens L2 and the image-side surface (seventh face) of the third negative lens L3.

The film structure of the infrared-cut coatings applied to the fifth face and the seventh face in the optical system of Example 5 are shown in Table 12, in order from the substrate side. Also, data regarding the angle of incidence at each face for the chief ray at the maximum image height in the optical system of Example 5 is shown in Table 13, and the average values of the angles of incidence at surfaces where the infrared-cut coating is not applied and surfaces where it is applied are shown in Table 14.

Figure 11:
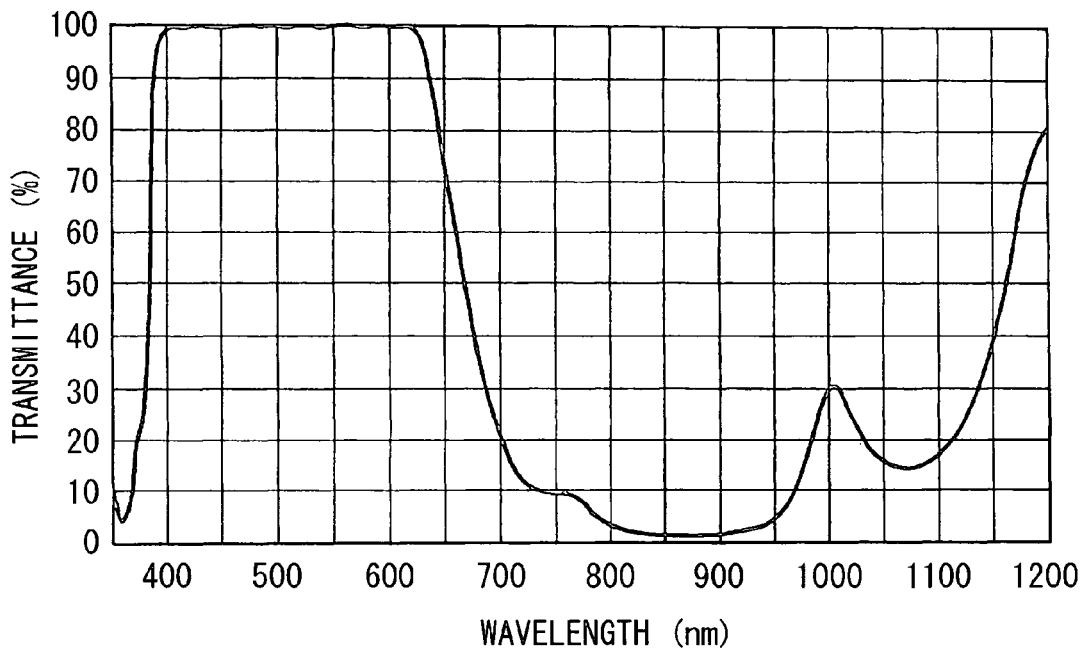
FIG. 11 is a graph showing a transmittance characteristic of one of a fifth face and a seventh face in an optical system of Example 5.

The transmission characteristic at one of the fifth face and the seventh face is as shown in FIG. 11. Also, the transmission characteristic of the entire optical system on an optical axis of Example 5 is as shown in FIG. 12.

Figure 12:
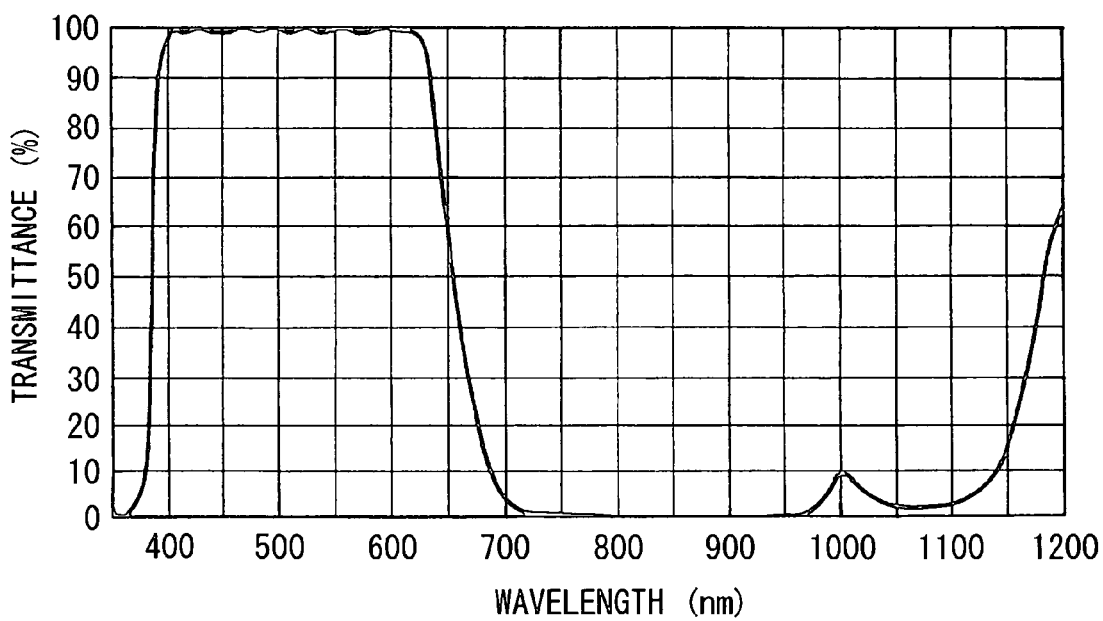
FIG. 12 is a graph showing a transmittance characteristic of the entire optical system on an optical axis of Example 5.

As shown in FIG. 12, in this Example, infrared light can be suitably cut, and it is possible to obtain the desired wavelength characteristics.

TABLE 12

| Number of layers | Film material | Optical film thickness |
|---|---|---|
| 1 | TiO$_2$ | 0.16 × λ/4 |
| 2 | SiO$_2$ | 0.3227 × λ/4 |
| 3 | TiO$_2$ | 1.7027 × λ/4 |
| 4 | SiO$_2$ | 1.6784 × λ/4 |
| 5 | TiO$_2$ | 1.512 × λ/4 |
| 6 | SiO$_2$ | 1.592 × λ/4 |
| 7 | TiO$_2$ | 1.4907 × λ/4 |
| 8 | SiO$_2$ | 1.5923 × λ/4 |
| 9 | TiO$_2$ | 1.539 × λ/4 |
| 10 | SiO$_2$ | 1.6504 × λ/4 |
| 11 | TiO$_2$ | 1.7057 × λ/4 |
| 12 | SiO$_2$ | 1.8937 × λ/4 |
| 13 | TiO$_2$ | 1.95 × λ/4 |
| 14 | SiO$_2$ | 1.9611 × λ/4 |
| 15 | TiO$_2$ | 1.9477 × λ/4 |

TABLE 12-continued

| Number of layers | Film material | Optical film thickness |
|---|---|---|
| 16 | SiO$_2$ | 1.9599 × λ/4 |
| 17 | TiO$_2$ | 1.8952 × λ/4 |
| 18 | SiO$_2$ | 0.9414 × λ/4 |

Note:
λ = 500 nm

TABLE 13

| Face | Incident angle (°) |
|---|---|
| r$_1$ | 32.8 |
| r$_2$ | 32.8 |
| r$_3$ | 26.1 |
| r$_4$ | 50.2 |
| r$_5$ | 15.6 (IR coating) |
| r$_6$ | 37.0 |
| r$_7$ | 7.9 (IR coating) |

TABLE 14

| Face | Average of face angles (°) |
|---|---|
| Surface without IR coating | 36.5 |
| Surface with IR coating | 11.7 |

The numerical data for each of the above-mentioned Examples is described below. Regarding the symbols used, except for those described above, f is the focal length of the entire system, $F_{NO}$ is the F-number, 2ω is the angular field of view, WE is the wide-angle end, ST is an intermediate position, TE is the telephoto end, $r_1$, $r_2$, etc. are the radii of curvature of each lens surface, $d_1$, $d_2$, etc. are the distances between each lens surface, $n_{d1}$, $n_{d2}$, etc. are the refractive indexes of each lens at the d-line, and $v_{d1}$, $v_{d2}$, etc. are the Abbe numbers of each lens. The shape of the aspheric surface is defined by the expression shown below, where x is the optical axis, which is positive in the propagation direction of light, and y is a direction orthogonal to the optical axis.

$$x=(y^2/r)/[1+\{1-(K+1)(y/r)^2\}^{1/2}]+A_4y^4+A_6y^6+A_8y^8$$

Here, r is the radius of curvature on the optical axis, K is a conic coefficient, and $A_4$, $A_6$, and $A_8$ are aspheric coefficients of fourth, sixth, and eighth order, respectively.

TABLE 15

Example 1 and Example 2

| | | | |
|---|---|---|---|
| r$_1$ = −7.898 (aspheric) | d$_1$ = 0.67 | n$_{d1}$ = 1.52542 | ν$_{d1}$ = 55.78 |
| r$_2$ = 6.245 (aspheric) | d$_2$ = variable | | |
| r$_3$ = ∞ (stop) | d$_3$ = 0.75 | | |
| r$_4$ = 2.581 (aspheric) | d$_4$ = 1.40 | n$_{d2}$ = 1.52542 | ν$_{d2}$ = 55.78 |
| r$_5$ = −3.679 (aspheric) | d$_5$ = 1.02 | | |
| r$_6$ = −8.795 | d$_6$ = 0.99 | n$_{d3}$ = 1.60687 | ν$_{d3}$ = 27.03 |
| r$_7$ = 3.222 (aspheric) | d$_7$ = variable | | |
| r$_8$ = 19.576 | d$_8$ = 0.88 | n$_{d4}$ = 1.52542 | ν$_{d4}$ = 55.78 |
| r$_9$ = −7.913 (aspheric) | d$_9$ = 1.40 | | |
| r$_{10}$ = ∞ | d$_{10}$ = 0.50 | n$_{d5}$ = 1.51633 | ν$_{d5}$ = 64.14 |
| r$_{11}$ = ∞ | | | |

Aspheric coefficients

First face

K = 0.000
A$_4$ = −4.4963 × 10$^{-3}$

TABLE 15-continued

A$_6$ = 1.1928 × 10$^{-3}$
A$_8$ = −6.1456 × 10$^{-5}$
Second face

K = 0.000
A$_4$ = −5.9954 × 10$^{-3}$
A$_6$ = 1.8182 × 10$^{-3}$
A$_8$ = 5.4713 × 10$^{-6}$
Fourth face K = −1.9920
A$_4$ = 6.8196 × 10$^{-3}$
A$_6$ = −4.6381 × 10$^{-4}$
A$_8$ = 0
Fifth face K = 0.000
A$_4$ = 1.1181 × 10$^{-2}$
A$_6$ = −1.2020 × 10$^{-3}$
A$_8$ = 8.4288 × 10$^{-5}$
Seventh face K = 3.1471
A$_4$ = −1.3938 × 10$^{-2}$
A$_6$ = 4.6177 × 10$^{-3}$
A$_8$ = −1.5879 × 10$^{-3}$
Ninth face K = −0.7915
A$_4$ = 6.5630 × 10$^{-3}$
A$_6$ = −1.1630 × 10$^{-3}$
A$_8$ = 7.0550 × 10$^{-5}$ Zoom data (∞)

| | WE | ST | TE |
|---|---|---|---|
| f(mm) | 3.219 | 5.073 | 8.487 |
| F$_{NO}$ | 2.80 | 3.52 | 4.84 |
| 2ω(°) | 76.2 | 49.4 | 28.8 |
| d$_2$ | 5.83321 | 3.29698 | 1.52569 |
| d$_7$ | 0.65023 | 2.25107 | 5.19828 |

TABLE 16

Example 3 and Example 4

| | | | |
|---|---|---|---|
| r$_1$ = −9.540 (aspheric) | d$_1$ = 0.50 | n$_{d1}$ = 1.52542 | ν$_{d1}$ = 55.80 |
| r$_2$ = 7.264 (aspheric) | d$_2$ = variable | | |
| r$_3$ = ∞ (stop) | d$_3$ = 0.30 | | |
| r$_4$ = 2.328 (aspheric) | d$_4$ = 1.11 | n$_{d2}$ = 1.48749 | ν$_{d2}$ = 70.23 |
| r$_5$ = −3.540 (aspheric) | d$_5$ = 1.65 | | |
| r$_6$ = −7.568 | d$_6$ = 0.50 | n$_{d3}$ = 1.60686 | ν$_{d3}$ = 27.04 |
| r$_7$ = 2.371 (aspheric) | d$_7$ = variable | | |
| r$_8$ = −80.915 | d$_8$ = 1.45 | n$_{d4}$ = 1.52542 | ν$_{d4}$ = 55.80 |
| r$_9$ = −2.771 (aspheric) | d$_9$ = 0.35 | | |
| r$_{10}$ = ∞ | d$_{10}$ = 0.50 | n$_{d5}$ = 1.51633 | ν$_{d5}$ = 64.14 |
| r$_{11}$ = ∞ | | | |

Aspheric coefficients

First face

K = 0.000
A$_4$ = −1.9086 × 10$^{-2}$
A$_6$ = 4.9653 × 10$^{-3}$
A$_8$ = −3.5838 × 10$^{-4}$
Second face K = 0.000
A$_4$ = −2.0726 × 10$^{-2}$
A$_6$ = 5.9923 × 10$^{-3}$
A$_8$ = 3.1807 × 10$^{-4}$ TABLE 16-continued Fourth face K = −1.9712
$A_4 = 7.5983 \times 10^{-3}$
$A_6 = -8.6524 \times 10^{-4}$
$A_8 = 0$ Fifth face K = 0.000
$A_4 = 1.1441 \times 10^{-2}$
$A_6 = -1.5539 \times 10^{-3}$
$A_8 = 1.0720 \times 10^{-4}$ Seventh face K = 2.1787
$A_4 = -1.7149 \times 10^{-2}$
$A_6 = 4.6266 \times 10^{-3}$
$A_8 = -8.1781 \times 10^{-3}$ Ninth face K = −5.2351
$A_4 = -2.1273 \times 10^{-3}$
$A_6 = -1.1166 \times 10^{-3}$
$A_8 = 8.9849 \times 10^{-5}$ Zoom data (∞)

|  | WE | ST | TE |
|---|---|---|---|
| f(mm) | 3.700 | 4.971 | 10.115 |
| $F_{NO}$ | 2.80 | 3.30 | 5.28 |
| 2ω(°) | 65.6 | 47.4 | 24.6 |
| $d_2$ | 5.55135 | 3.83147 | 1.28395 |
| $d_7$ | 0.89118 | 1.73424 | 5.14757 |

TABLE 17

Example 5

| | | | |
|---|---|---|---|
| $r_1 = \infty$ (stop) | $d_1 = 0.10$ | | |
| $r_2 = 1.365$ (aspheric) | $d_2 = 0.63$ | $n_{d1} = 1.50913$ | $\nu_{d1} = 56.20$ |
| $r_3 = 2.622$ (stop) | $d_3 = 0.46$ | | |
| $r_4 = 2.750$ | $d_4 = 0.70$ | $n_{d2} = 1.50913$ | $\nu_{d2} = 56.20$ |
| $r_5 = -47.775$ (aspheric) | $d_5 = 1.60$ | | |
| $r_6 = -5.474$ | $d_6 = 0.62$ | $n_{d3} = 1.57268$ | $\nu_{d3} = 33.51$ |
| $r_7 = 2.645$ (aspheric) | $d_7 = 0.40$ | | |
| $r_8 = \infty$ | $d_8 = 0.50$ | $n_{d4} = 1.51633$ | $\nu_{d4} = 64.14$ |
| $r_9 = \infty$ | | | |

Aspheric coefficients

Second face

Figure 13A:
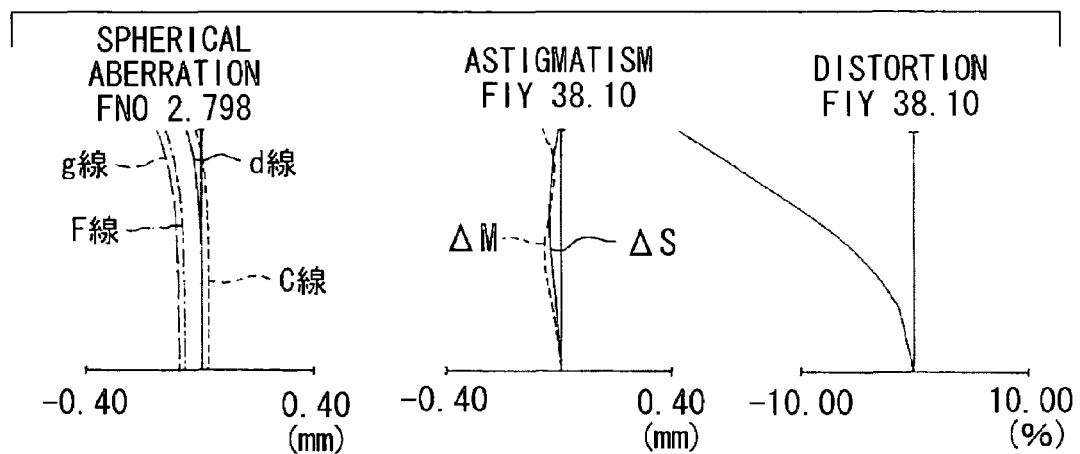
FIG. 13A is an aberration diagram showing spherical aberration, astigmatism, and distortion in Example 1 at a wide angle end, when focused at infinity.
Figure 13B:
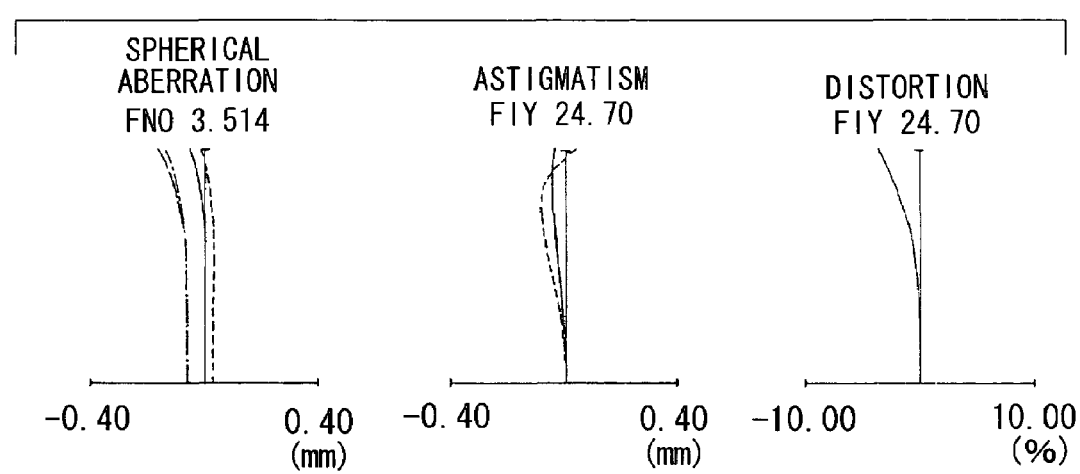
FIG. 13B is an aberration diagram showing spherical aberration, astigmatism, and distortion in Example 1 at an intermediate position, when focused at infinity.
Figure 13C:
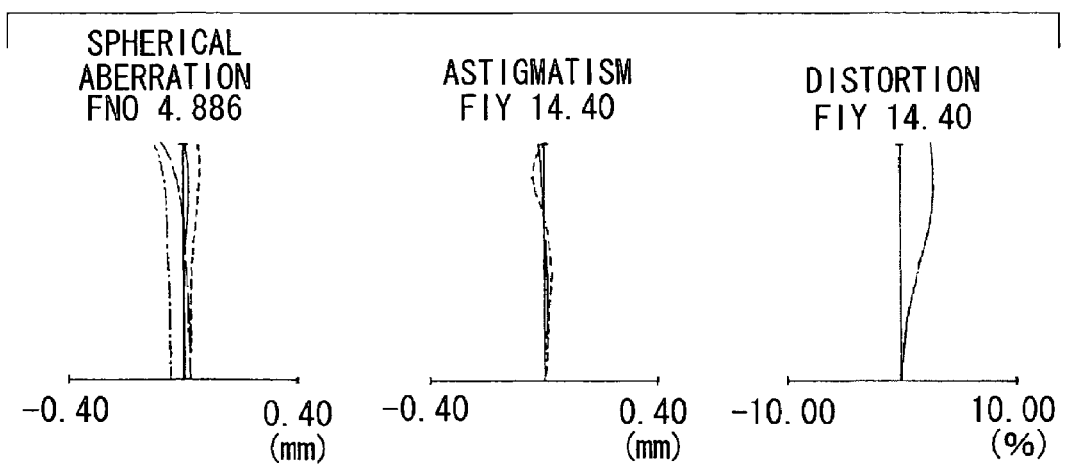
FIG. 13C is an aberration diagram showing spherical aberration, astigmatism, and distortion in Example 1 at a telephoto end, when focused at infinity.
Figure 14A:
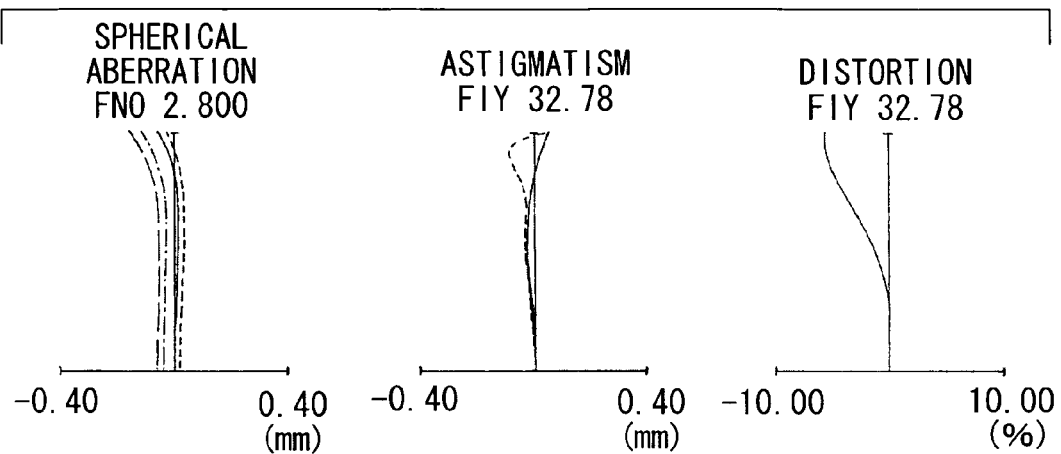
FIG. 14A is an aberration diagram showing spherical aberration, astigmatism, and distortion in Example 3 at a wide-angle end, when focused at infinity.
Figure 14B:
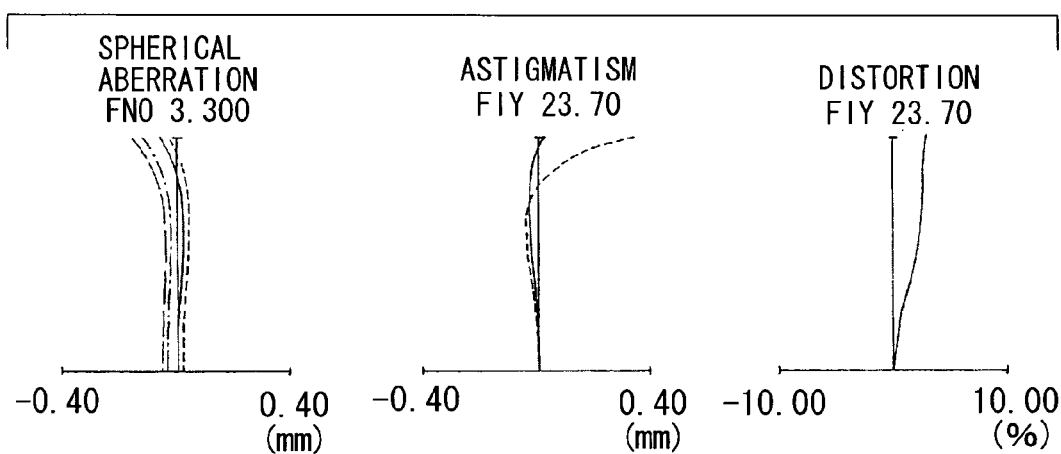
FIG. 14B is an aberration diagram showing spherical aberration, astigmatism, and distortion in Example 3 at an intermediate position, when focused at infinity.
Figure 14C:
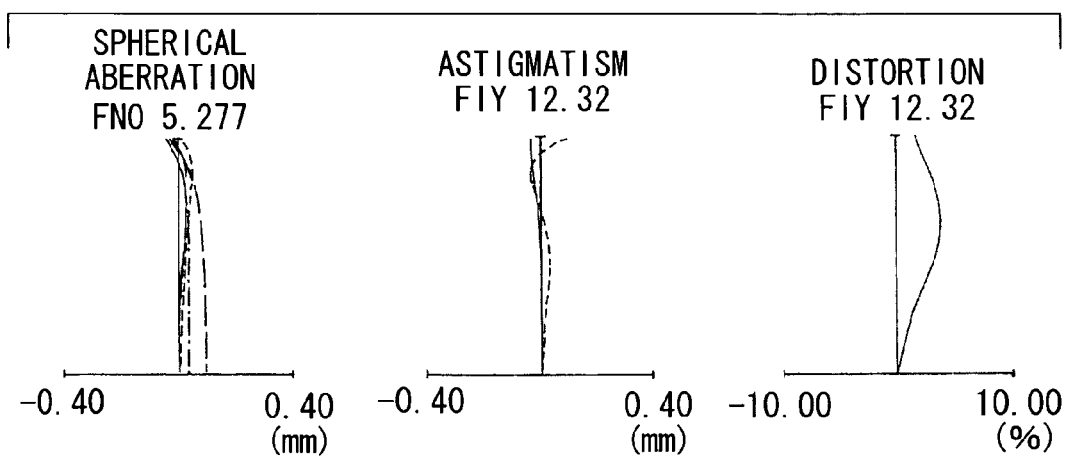
FIG. 14C is an aberration diagram showing spherical aberration, astigmatism, and distortion in Example 3 at a telephoto end, when focused at infinity.
Figure 15:
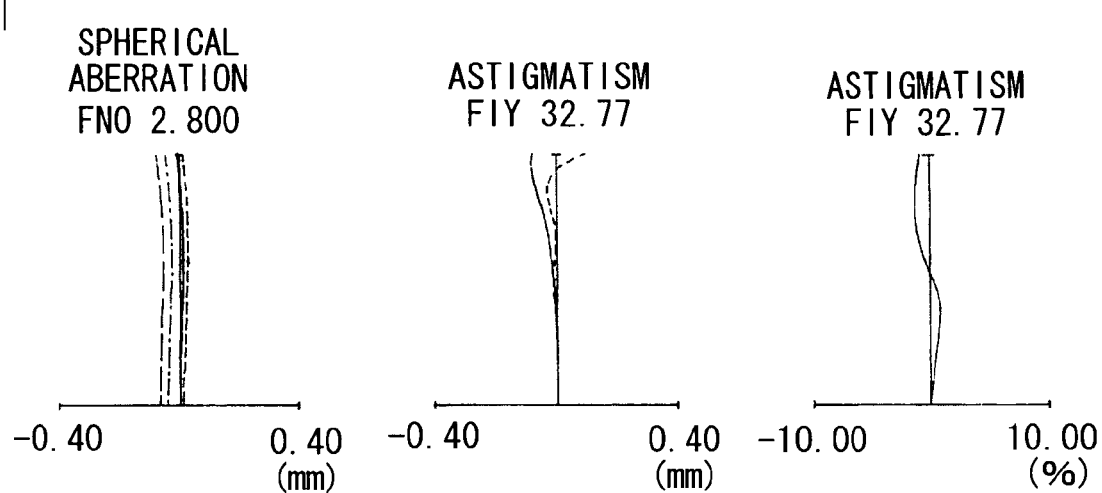
FIG. 15 is an aberration diagram showing spherical aberration, astigmatism, and distortion in Example 5 when focused at infinity.

K = −0.644
$A_4 = 7.93801 \times 10^{-3}$
$A_6 = 1.59402 \times 10^{-2}$
$A_8 = -2.69710 \times 10^{-3}$ Fifth face K = 312.567
$A_4 = -2.69780 \times 10^{-2}$
$A_6 = 1.22057 \times 10^{-2}$
$A_8 = 4.19450 \times 10^{-2}$ Sixth face K = −43.850
$A_4 = -4.22561 \times 10^{-1}$
$A_6 = -5.25463 \times 10^{-2}$
$A_8 = -7.90009 \times 10^{-2}$ TABLE 17-continued Seventh face K = 0.000
$A_4 = -2.59494 \times 10^{-1}$
$A_6 = 5.15201 \times 10^{-2}$
$A_8 = -4.92327 \times 10^{-3}$ Aberration diagrams showing spherical aberration, astigmatism, and distortion of the optical systems of Examples 1 to 5, when focused at infinity, are shown in FIGS. 13A to 13C, FIGS. 14A to 14C, and FIGS. 15A to 15C, respectively. FIGS. 13A and 14A show aberrations at the wide-angle end, FIGS. 13B and 14B show aberrations at the intermediate position, and FIGS. 13C and 14C show aberrations at the telephoto end. In these aberration diagrams, "FIY" indicates the image height.

The resin material used for the optical systems in the Examples described above include, for example, acrylic resins, cycloolefin resins, polycarbonate resins, amorphous polyester copolymer resins, and so on. However, cycloolefin resins and polycarbonate resins are particularly desirable in view of their hygroscopic properties.

For example, ZEONEX (R) 480R, ZEONEX (R) 330R, etc. may be used as the cycloolefin resin, and Panlite (R), Iupilon (R), etc. may be used as the polycarbonate resin. Here, (R) indicates a registered trademark.

According to the optical system of Example 1, applying a 44-layer infrared-cut coating to one surface allows desired wavelength characteristics to be easily obtained. Also, since all lens components are made of resin in Example 1, the weight of the overall optical system can be reduced, which provides an advantage in that the weight and size of an imaging apparatus using such an optical system can be reduced.

In such a case, in the process for performing coating by vacuum deposition, the coating procedure should be carried out while taking care not to raise the temperature of the resin material beyond the thermal deformation temperature due to radiant heat emitted from a plasma or evaporation source.

According to the optical system of Example 2, the desired wavelength characteristics can be obtained by applying 22-layer infrared-cut coatings to two lens surfaces. More specifically, since the number of layers (number of films) on one lens surface may be about half of that in an optical system where the infrared-cut coating is applied to only one surface, it is possible to reduce the variation in film thickness of each infrared-cut coating. By doing so, the incidence of defective components can be reduced, which is advantageous in improving the yield and lowering the costs.

In particular, when applying the infrared-cut coating to a resin lens, if the number of layers on one lens surface is small, the time required for the coating process can be shortened, and it is possible to suppress the rise in temperature of the lens during the coating process. As a result, deformation of the resin lens due to the increased temperature can be prevented, and the risk of inferior imaging performance due to deterioration of the surface accuracy can be lessened.

Since all lens components in Example 1 and Example 2 are made of resin, the weight of the overall optical system can be reduced, which provides an advantage in that imaging apparatuses and so on employing such optical systems can be reduced in weight and size. Furthermore, since resin lenses can be fabricated at lower cost than glass lenses, it is possible to reduce the fabrication costs of optical products, imaging apparatuses, and the like. Also, since resin can be shaped more easily than glass, it is possible to easily fabricate lenses having the desired shape.

In general, resin lenses are fabricated by injection molding of resin material. Injection molding is a process in which resin that has been made fluid by heating is injected into a metal mold and shaped.

By using this method, the cost per lens can be reduced compared to fabricating lenses by grinding or molding glass. As a result, the cost of the optical system can be reduced.

According to the optical system of Example 3, the desired wavelength characteristics can be obtained by applying a 6-layer infrared-cut coating to each of four lens surfaces. More specifically, since the number of layers (number of films) on one lens surface is half or less that in an optical system in which an infrared-cut coating is applied to only one surface, it is possible to reduce the variation in film thickness of each infrared-cut coating. Accordingly, the incidence of defective components can be reduced, which is advantageous in reducing the yield and lowering costs.

By reducing the number of layers on one lens surface, it is possible to further reduce the time required for the coating process. Thus, deformation of the resin lens due to the rise in temperature can be advantageously prevented, and the risk of inferior imaging performance due to deterioration of the surface accuracy can be lessened.

According to the optical system Example 4, the desired wavelength characteristics can be obtained by applying a 22-layer infrared-cut coating to the fourth face and applying an 8-layer infrared-cut coating to the ninth face. More specifically, since the number of layers (number of films) on one lens surface is half or less that in an optical system in which an infrared-cut coating is applied to only one surface, it is possible to further reduce the variation in film thickness of each infrared-cut coating. Accordingly, the incidence of defective components can be reduced, which is advantageous in improving the yield and lowering costs.

By reducing the number of layers on one lens surface, it is possible to further reduce the time required for the coating process. Thus, deformation of the resin lenses due to the rise in temperature can be advantageously prevented, and it is possible to lessen the risk of inferior imaging performance due to deterioration of the surface accuracy.

The optical system of Example 4 has at least one glass lens and at least one resin lens, an infrared-cut coating is applied to at least one surface of the glass lenses, and an infrared-cut coating is applied to at least one surface of the resin lenses. In addition, the number of layers in the infrared-cut coating applied to the glass lenses is greater than the number of layers in the infrared-cut coating applied to the resin lenses.

By including glass lenses, which are heat resistant, in the optical system in this way, it is possible to reduce the number of layers in the infrared-cut coating on the resin lenses, and therefore, it is possible to prevent deformation of the resin lenses due to the rise in temperature during the coating process.

According to the optical system of Example 5, like Examples 1 and 2, all lens components are made of resin, and it is possible to suitably cut infrared light even though the number of lenses is small. Therefore, an advantage is provided in that the weight and size of an imaging apparatus or the like using a unifocal lens can be reduced.

Although Examples 1 to 5 have been described above, the present invention is not limited to these Examples. Various modifications may be made so long as they do not depart from the spirit of the present invention.

For example, in the Examples described above, the infrared-cut coating is applied by vacuum deposition, but the present invention is not limited thereto. The coating may be performed by sputtering.

In particular, when applying an infrared-cut coating to the surface of a resin lens, it is preferable to use a magnetron sputtering method or an ion-beam sputtering method, in which evaporation of a deposition material by heating is not performed. Magnetron sputtering is a technique in which material is given off by ions that are contained on the material by a magnetron, and it is preferable to position the substrate at a distance where it is not exposed to the plasma generated on the material. Ion-beam sputtering is a technique in which material is given off by an ion beam and is deposited on the substrate. Since the substrate is not directly exposed to the ion beam, the deposition can be carried out at a temperature lower than in the sputtering method. With such techniques, it is possible to suppress the temperature rise of the resin lenses, and deformation can thus be prevented.

Figure 16:
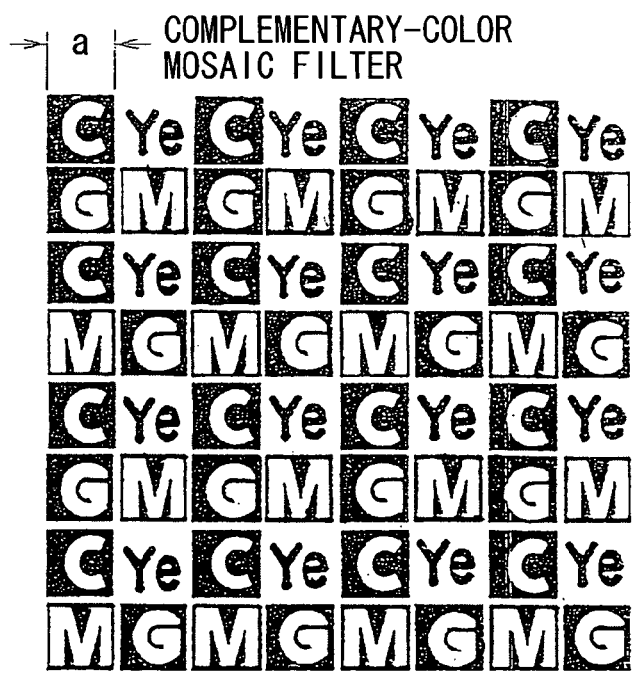
FIG. 16 is a diagram showing the color filter arrangement of a complementary-color mosaic filter.

As shown in FIG. 16, a complementary-color mosaic filter, in which color filters of four colors, that is, cyan, magenta, yellow, and green, are disposed in the form of a mosaic to correspond to image pixels, is provided at the image plane I of the CCD. These four types of color filter are disposed in the form of a mosaic such that their numbers are substantially the same and such that neighboring pixels are not associated with color filters of the same type. By doing so, more faithful color reproduction is possible.

Specifically, the complementary-color mosaic filter is formed of at least four types of color filter, as shown in FIG. 16; the characteristics of those four types of color filter are preferably as specified below.

The green color filter G has a spectral intensity peak at a wavelength $G_P$, the yellow color filter Ye has a spectral intensity peak at a wavelength $Y_P$, the cyan color filter C has a spectral intensity peak at a wavelength $C_P$, and the magenta color filter M has peaks at wavelengths $M_{P1}$ and $M_{P2}$, where these wavelengths satisfy the conditions shown below.

$$510 \text{ nm} < G_P < 540 \text{ nm}$$

$$5 \text{ nm} < Y_P - G_P < 35 \text{ nm}$$

$$-100 \text{ nm} < C_P - G_P < -5 \text{ nm}$$

$$430 \text{ nm} < M_{P1} < 480 \text{ nm}$$

$$580 \text{ nm} < M_{P2} < 640 \text{ nm}$$

It is more preferable in view of improving the color reproducibility that the green, yellow, and cyan color filters have, at a wavelength of 530 nm, intensities of 80% or more with respect to their respective spectral intensity peaks, and the magenta filter has, at a wavelength of 530 nm, an intensity of 10% to 50% with respect to the spectral intensity peak thereof.

Figure 17:
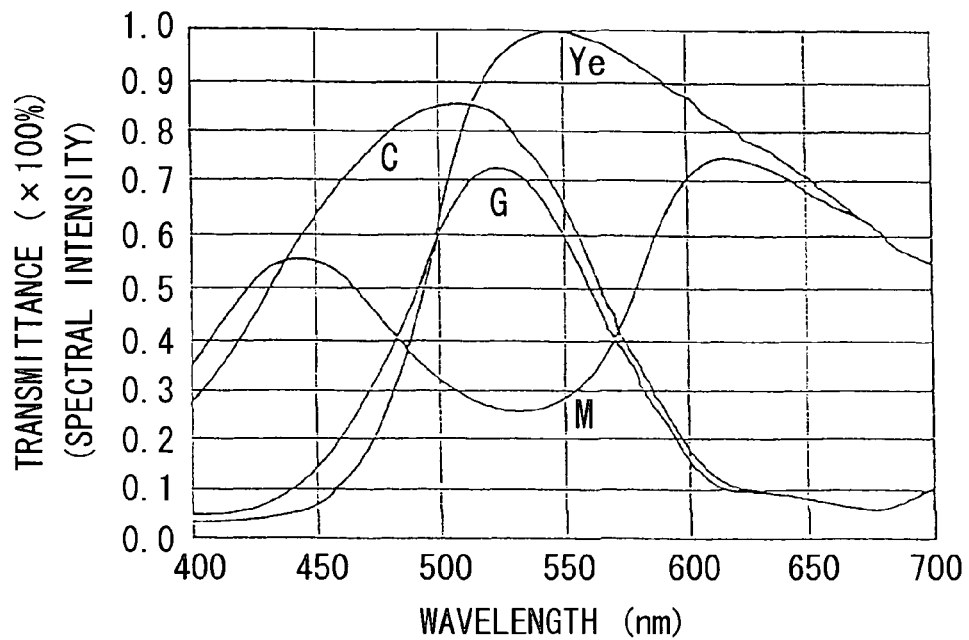
FIG. 17 is a diagram showing one example of a wavelength characteristic of the complementary-color mosaic filter.

One example of the wavelength characteristics of each of the Examples described above is shown in FIG. 17. The green color filter G has a spectral intensity peak at 525 nm. The yellow color filter Ye has a spectral intensity peak at 555 nm. The cyan color filter C has a spectral intensity peak at 510 nm. The magenta color filter M has peaks at 445 nm and 620 nm. Also, the intensities of the color filters at 530 nm with respect to their respective peak spectral intensities are 99% for G, 95% for Ye, 97% for C, and 38% for M.

For such a complementary-color filter, the following signal processing is electronically carried out by a controller (or, by a controller used in a digital camera), which is not shown in the drawings:

Luminance Signal $Y=|G+M+Ye+C|\times\frac{1}{4}$

Hue Signals $R-Y=|(M+Ye)-(G+C)|$ $B-Y=|(M+C)-(G+Ye)|$

Figure 18:
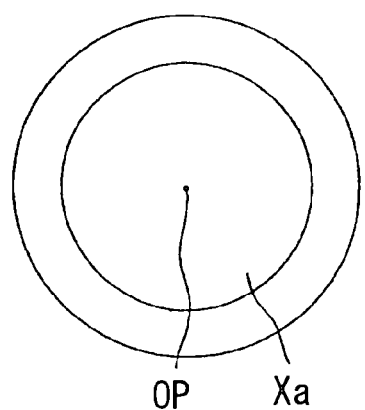
FIG. 18 is a diagram showing the shape of an opening of a stop when in the fully opened state.
Figure 19:
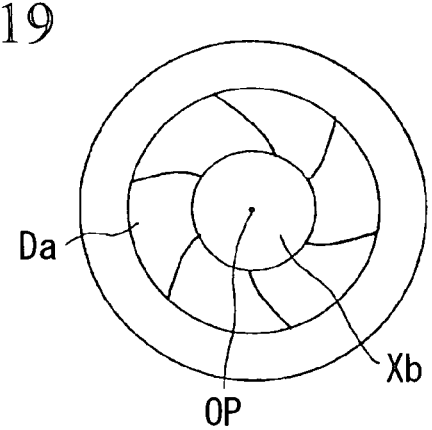
FIG. 19 is a diagram showing the shape of an opening of a stop when stopped down two positions.

In order to adjust the light intensity in the imaging apparatus of this invention, an aperture stop S may be constructed of a plurality of aperture blades, and a variable aperture that can be adjusted by varying the shape of the opening may be used. FIG. 18 is a diagram showing an example in which the aperture stop is fully open, and FIG. 19 shows an example in which the aperture stop is stopped down two positions. In FIGS. 18 and 19, OP indicates the optical axis, Da indicates six aperture plates, and Xa and Xb indicate the openings. In the present invention, the shape of the stop can be of only two types, the fully open state (FIG. 18) and an aperture value that defines an F-number satisfying predetermined conditions (the aperture that is stopped down two positions in FIG. 19).

Alternatively, the aperture mechanism can be made thinner by using a configuration in which a turret provided with a plurality of aperture stops of fixed shape and having different shapes or transmittances is used. One of the aperture stops is placed on the optical axis at the object side in the imaging optical system, according to the required brightness. Also, it is possible to use a configuration in which an intensity reducing filter having a lower transmittance than the transmittance of other aperture stops is disposed in an opening where the intensity is to be reduced the most, from among the openings of the plurality of aperture stops provided on the turret. By doing so, the diameter of the stop opening is not excessively reduced, and it is therefore possible to suppress deterioration of the imaging performance due to diffraction occurring as a result of reducing the diameter of the opening of the stop.

Figure 20:
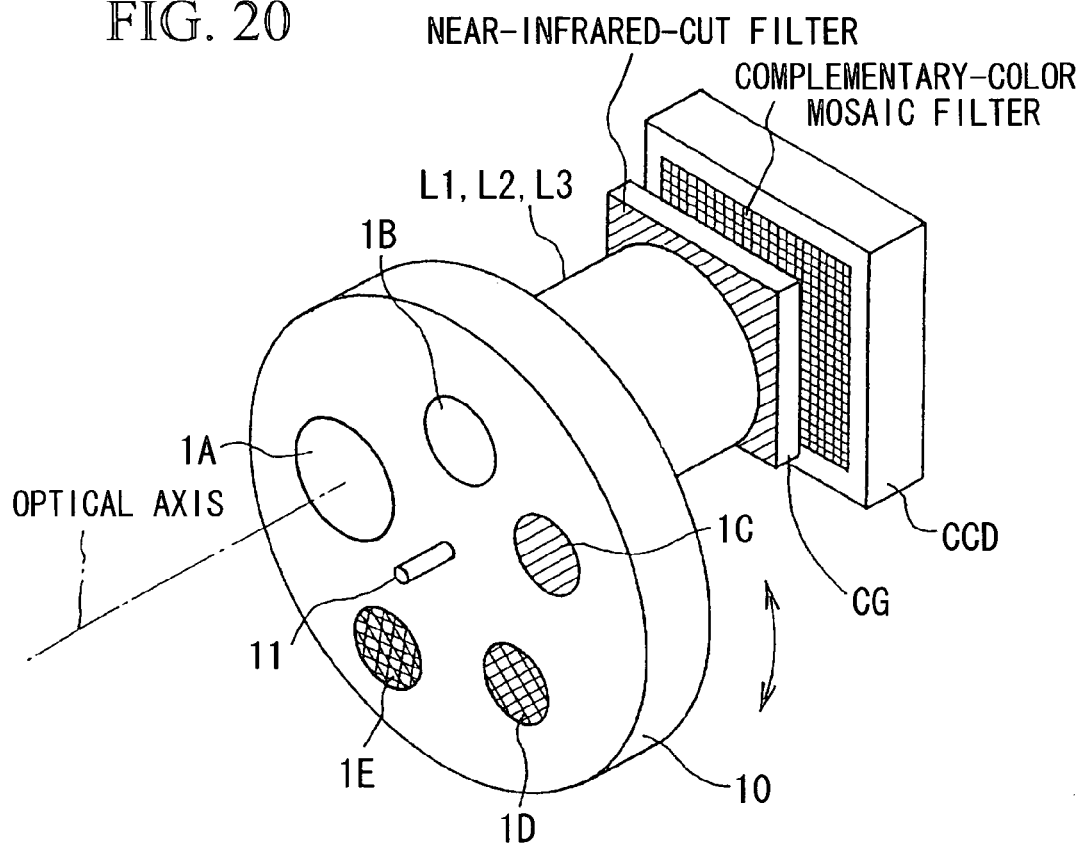
FIG. 20 is a perspective view showing the arrangement of an imaging optical system of the present invention provided with a turret in which a plurality of fixed-shape aperture stops having different shapes and transmittances are set.

A perspective view showing one example configuration in such a case is shown in FIG. 20. A turret 10 that is capable of brightness adjustment in steps of 0 f-stops, −1 f-stop, −2 f-stops, −3 f-stops, and −4 f-stops is disposed at the position of the stop S on the optical axis at the object side of the first positive lens L1 in the imaging lens system of Example 4.

The turret 10 has an opening 1A (with a transmittance of 100% at a wavelength of 550 nm) formed of an empty space and having a fixed opening in the shape of a circle of maximum stop diameter, which performs an adjustment of 0 f-stops; an opening 1B (with a transmittance of 99% at a wavelength of 550 nm) formed of a transparent flat plate whose opening is of a fixed shape and whose area is about half of the area of the opening 1A, for an adjustment of −1 f-stop; and openings 1C, 1D, and 1E having circular openings with the same area as the opening 1B, in which neutral density (ND) filters whose respective transmittances are 50%, 25%, and 13% at a wavelength of 550 nm are provided, for adjustments of −2 f-stops, −3 f-stops, and −4 f-stops, respectively.

Then, brightness adjustment is performed by rotating the turret 10 about a rotation shaft 11 on which it is disposed to position one of the openings at the stop position.

Figure 21:
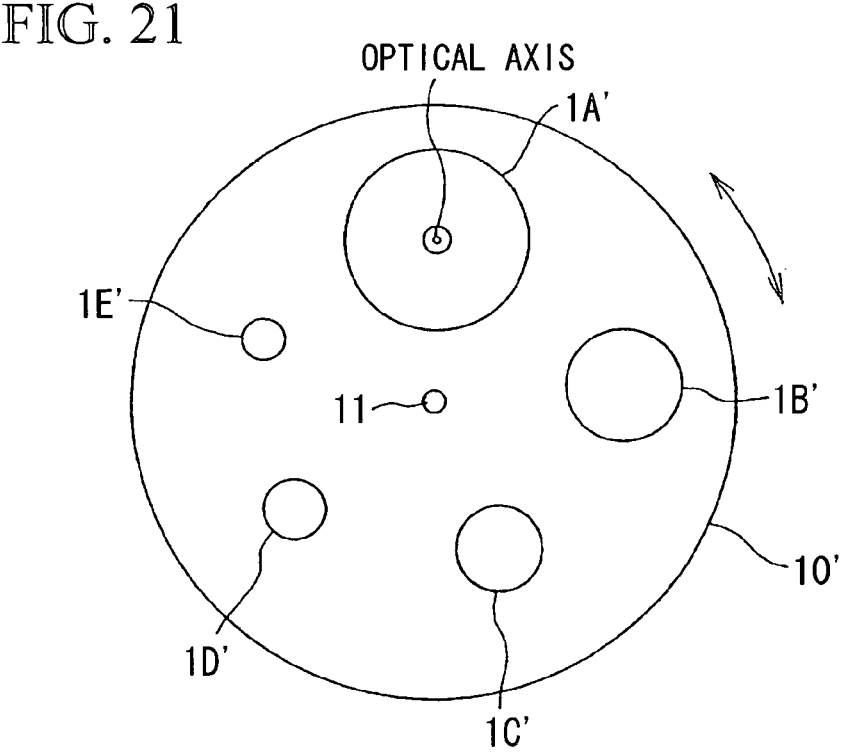
FIG. 21 is an elevational view showing another turret instead of the turret shown in FIG. 20.

Instead of the turret 10 shown in FIG. 20, a turret 10' shown in plan view in FIG. 21 can be used. The turret 10', which is capable of brightness adjustment in steps of 0 f-stops, −1 f-stop, −2 f-stops, −3 f-stops, and −4 f-stops is disposed at the position of the stop S on the optical axis at the object side of the first positive lens L1 in the imaging lens system.

The turret 10' has an opening 1A' having a fixed opening in the shape of a circle of maximum stop diameter, which performs an adjustment of 0 f-stops; an opening 1B' whose opening is of a fixed shape and having an area about half of the area of the opening 1A, for an adjustment of −1 f-stop; and openings 1C', 1D', and 1E' whose areas become progressively smaller and whose openings are of fixed shapes, for adjustments of −2 f-stops, −3 f-stops, and −4 f-stops, respectively.

Then, brightness adjustment is performed by rotating the turret 10' about a rotation shaft 11 on which it is disposed to position one of the openings at the stop position.

Figure 22:
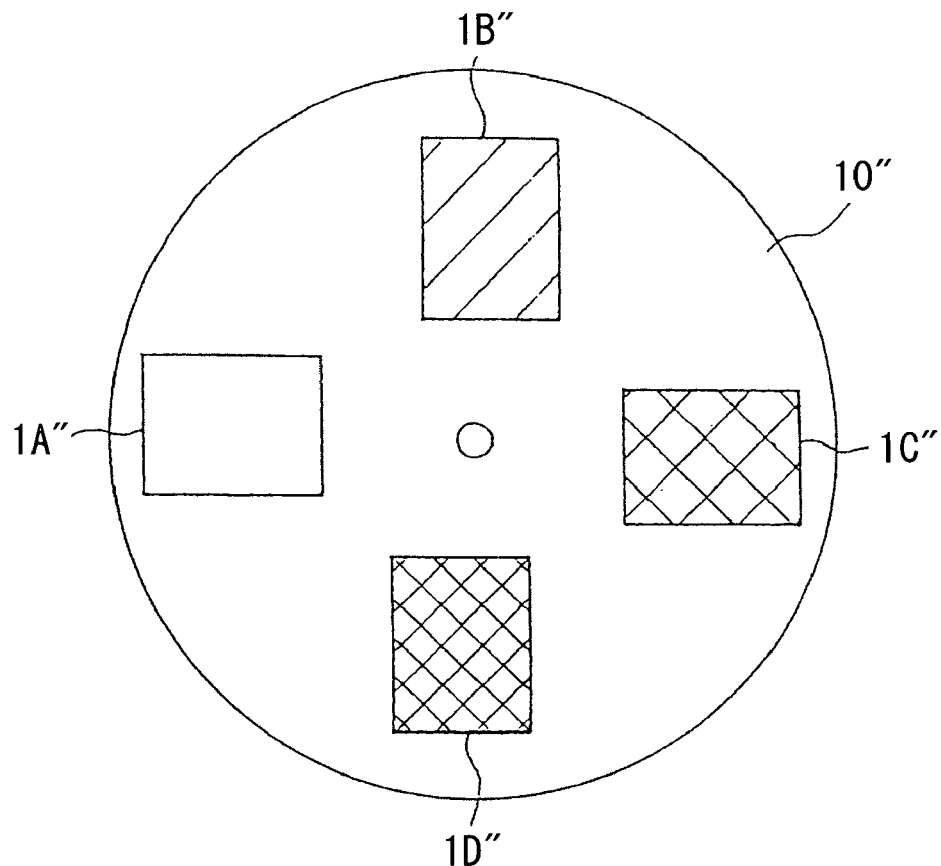
FIG. 22 shows another turret-type intensity adjusting filter that can be used in the present invention.

To reduce the thickness even more, the shape and position of the opening of the aperture stop S may both be fixed, and intensity adjustment may be carried out by electrically adjusting the output signal from the imaging device. Also, a configuration in which an ND filter is inserted in and removed from another space in the lens system, for example, between the third negative lens L3 and the CCD cover glass CG, may be used. FIG. 22 shows one example of this, using a turret-like structure, turret 10", which is provided with an opening 1A", which is an optically plain face hollow opening, an opening 1B", which is an ND filter with a transmittance of ½, an opening 1C", which is an ND filter with a transmittance of ¼, and an opening 1D", which is an ND filter with a transmittance of ⅛. By rotating the turret 10" about a central rotation shaft, one of the openings can be placed at any position in the light path to perform brightness adjustment.

Figure 23:
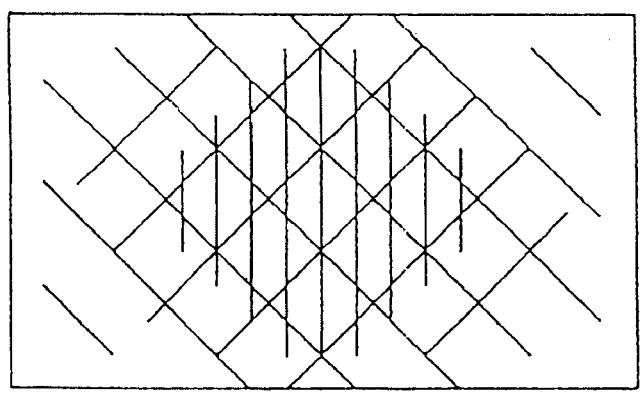
FIG. 23 shows an example of a filter that suppresses intensity variations.

A filter surface that is capable of adjusting the brightness while suppressing intensity unevenness may be provided as the brightness adjusting filter. For example, as shown in FIG. 23, it is possible to use a configuration in which filters having reduced brightness towards the center are disposed as concentric circles so that, for a dark subject, maintaining the intensity at the central part is given priority in order to make the transmittance uniform, and brightness unevenness is compensated for only with bright subjects.

The stop S may be realized by blackening around a circumferential region at the incident side of the first positive lens L1.

When the imaging apparatus according to the present invention stores video as still pictures, like a camera, a shutter for adjusting the light intensity may be provided in the light path.

Such a shutter may be a focal-plane shutter or rotary shutter disposed in front of the CCD or a liquid crystal shutter. In addition, the aperture stop itself may be constructed as a shutter.

Figure 24A:
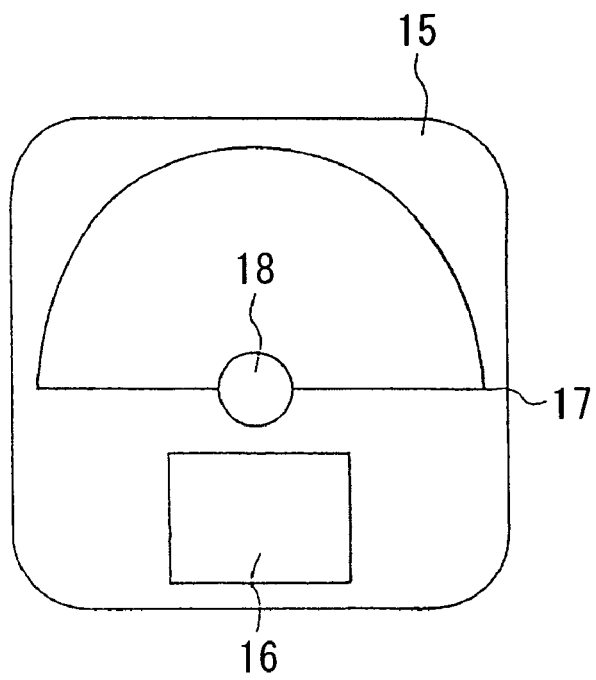
FIG. 24A is a rear view of an example of a rotary focal-plane shutter.
Figure 24B:
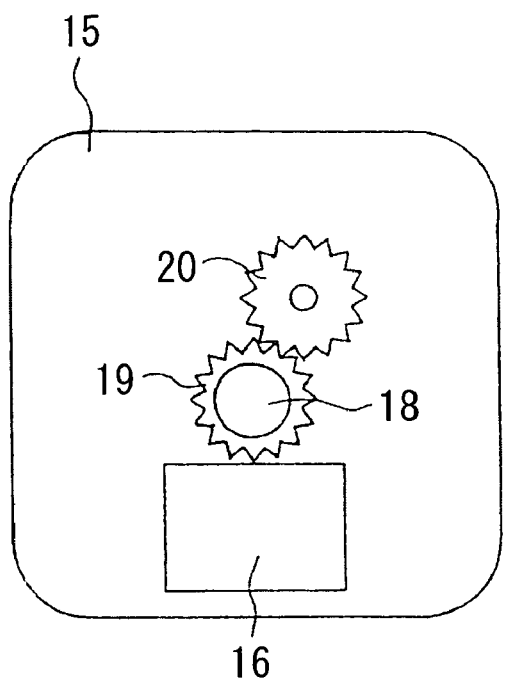
FIG. 24B is a front view of the example of the rotary focal-plane shutter.
Figure 25A:
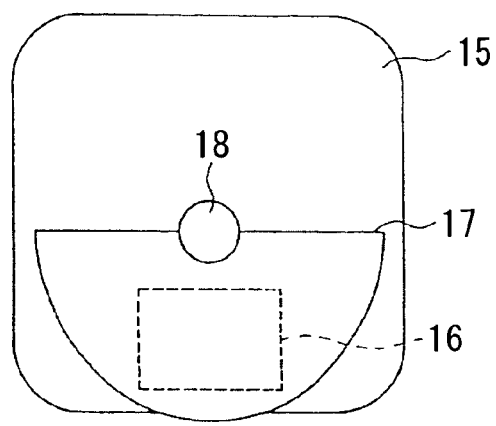
FIG. 25A shows a rotational state of a rotary shutter screen in the shutter shown in FIGS. 24A and 24B.
Figure 25B:
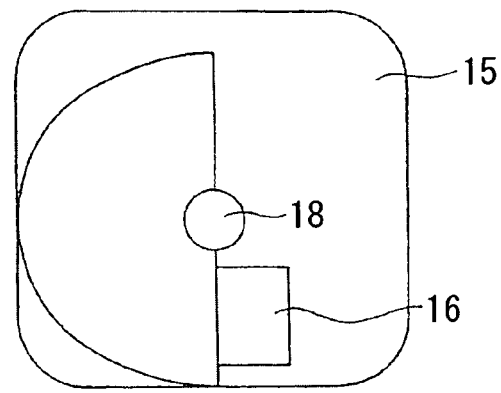
FIG. 25B shows a rotational state of the rotary shutter screen in the shutter shown in FIGS. 24A and 24B.
Figure 25C:
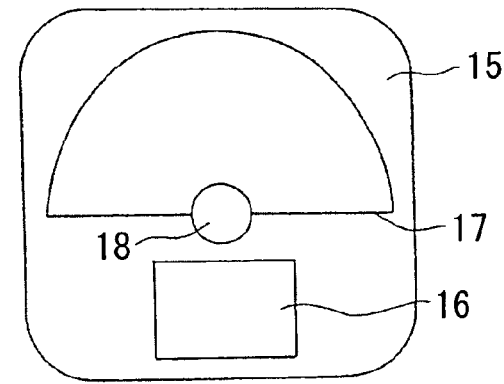
FIG. 25C shows a rotational state of the rotary shutter screen in the shutter shown in FIGS. 24A and 24B.
Figure 25D:
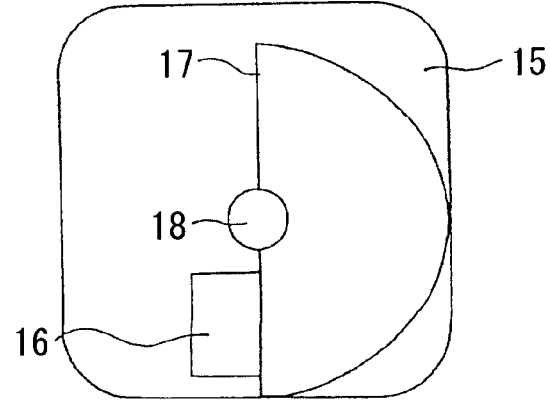
FIG. 25D shows a rotational state of the rotary shutter screen in the shutter shown in FIGS. 24A and 24B.

FIGS. 24A and 24B show an example of a shutter. The structure shown in FIGS. 24A and 24B is an example of a rotary focal-plane shutter, which is one type of focal-plane shutter. FIG. 24A shows a view from the rear side, and FIG. 24B shows a view from the front side. Reference numeral 15 is a shutter substrate (hereinafter referred to as "substrate"), which is arranged so as to be disposed in front of the image plane or at any position in the light path. An opening 16 that transmits light rays of the optical system is provided in the substrate 15. Reference numeral 17 is a rotary shutter screen. Reference numeral 18 is a rotation shaft of the rotary shutter screen 17. The rotation shaft 18 is integrated with the rotary shutter screen 17 and is rotated with respect to the substrate 15. The rotation shaft 18 is engaged with gears 19 and 20 on the front face of the substrate 15. These gears 19 and 20 are engaged with a motor (not shown).

In this structure, the rotary shutter screen 17 is rotated about the rotation shaft 18, via the gears 19 and 20 and the rotation shaft 18, by driving the motor (not shown).

The rotary shutter screen 17 is formed in a substantially semicircular shape and blocks and unblocks the opening 16 in the substrate 15 when rotated, thus serving as a shutter. The shutter speed is adjusted by varying the rotating speed of the rotary shutter screen 17.

FIGS. 25A to 25D are views, taken from the image side, showing positions of the rotary shutter screen 17 during rotation. Time proceeds in the order FIG. 25A, FIG. 25B, FIG. 25C, FIG. 25D, and FIG. 25A again.

As described above, by positioning the aperture stop S having a fixed shape and either a filter that performs intensity adjustment or a shutter at different positions of the lens system, the effect of diffraction can be suppressed to maintain high image quality, and it is possible to realize an imaging apparatus in which intensity adjustment is performed by a filter or shutter and in which the overall length of the optical system can be reduced.

Figure 26:
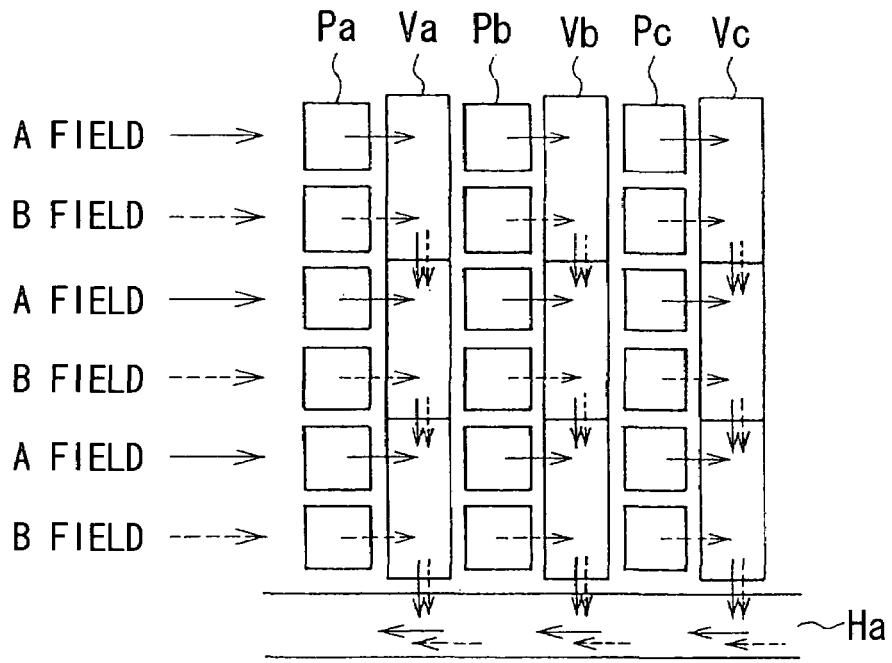
FIG. 26 is a diagram depicting an interlaced-scan CCD image acquisition operation.

Without using a mechanical shutter, shuttering may be performed under electronic control by extracting part of the electrical signal from the CCD to obtain a still image. An example of such a configuration will be described by explaining the CCD image-acquisition operation using FIGS. 26 and 27. FIG. 26 is a diagram depicting a CCD image-acquisition operation in which sequential readout of signals is performed in an interlaced format (interlaced scanning format). In FIG. 26, Pa to Pc are photosensitive units using photodiodes, Va to Vc are CCD vertical transfer units, and Ha is a CCD horizontal transfer unit. Field A indicates an odd field and field B indicates an even field.

The basic operation with the configuration shown in FIG. 26 is as follows: (1) Accumulation of signal charge at the photosensitive units due to light irradiation (photoelectric conversion); (2) shifting of the signal charge from the photosensitive units to the vertical transfer units (field shift); (3) transfer of the signal charge in the vertical transfer units (vertical transfer); (4) transfer of the signal charge from the vertical transfer units to the horizontal transfer unit (line shift); (5) transfer of the signal charge (horizontal transfer); (6) detection of the signal charge the output end of the horizontal transfer unit. This type of sequential readout can be realized using either field A (odd field) or field B (even field).

The interlaced (interlaced scanning) CCD image acquisition in FIG. 26 uses a TV broadcasting format or analog video format, in which the accumulation timing of the field B is shifted by 1/60 second from the field A. If a frame is formed as a DSC (Digital Spectrum Compatible) image, in the case of a moving subject, blurring like a double image occurs. Therefore, with this type of CCD image acquisition, the fields A and B are simultaneously exposed and the signals for adjacent fields are combined. Then, after blocking the light with the mechanical shutter when exposure is completed, a field A and a field B are separately read out and their signals are combined.

In the structure described above, by using the mechanical shutter only to prevent smearing and by sequentially reading out only the field A, or simultaneously reading out the fields A and B in a combined fashion, the vertical resolution is reduced. However, a high speed shutter can be switched off regardless of the driving speed of the mechanical shutter (since shuttering can be controlled with the electronic shutter alone). In the example in FIG. 26, since the number of the vertical transfer units of the CCD is half of the number of photodiodes constituting the photosensitive elements, an advantage is afforded in that the device can be easily made more compact.

Figure 27:
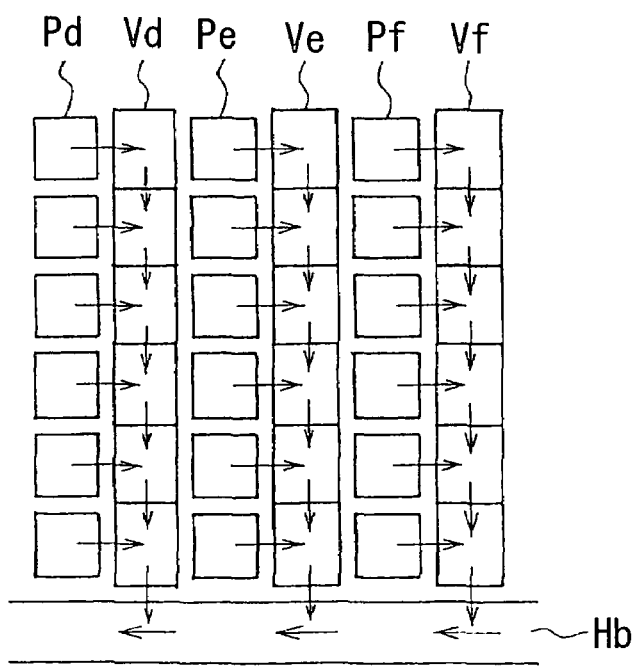
FIG. 27 is a diagram depicting a progressive-scan CCD image acquisition operation.

FIG. 27 is a diagram depicting a CCD image-acquisition operation in which sequential readout of a signal is performed with a progressive scanning format. In FIG. 27, Pd to Pf are photosensitive units using photodiodes, Vd to Vf are CCD vertical transfer units, and Hb is a CCD horizontal transfer unit.

In FIG. 27, since rows of pixels can be read out in turn, it is possible to control the readout of accumulated charges completely electronically. Therefore, the exposure time can be shortened to about 1/10000 second. In the example in FIG. 27, the number of vertical CCDs is larger than in the case in FIG. 26, which is problematic in terms of size reduction, but since the advantage described above is also provided here, either of the types shown in FIGS. 26 and 27 can be employed in the present invention.

An imaging apparatus having a configuration as described above can be used in a photographic device that forms an image of an object with an imaging lens system and senses that image at imaging elements to take pictures, especially a digital camera or video camera, a personal computer, which is one example of an information processing device, a telephone, a mobile telephone, which is particularly convenient in terms of its portability, and so on. Embodiments thereof will be exemplified below.

Figure 28:
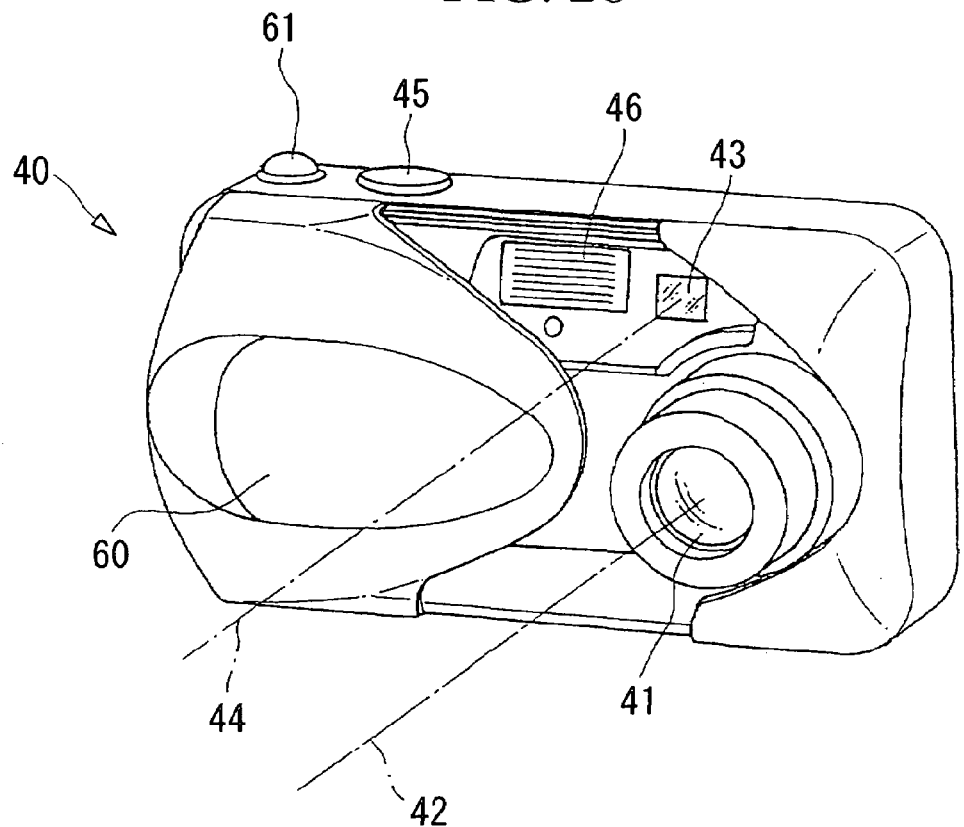
FIG. 28 is a conceptual diagram of a configuration in which one of the optical systems of Example 1 to Example 5 of the present invention is incorporated in a photographic optical system in a digital camera.
Figure 29:
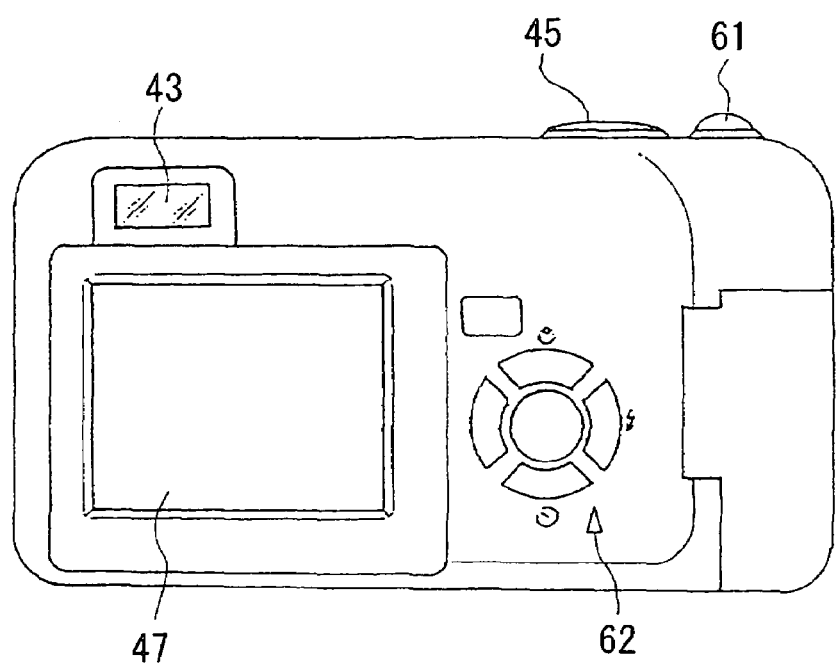
FIG. 29 is a rear perspective view of the digital camera in FIG. 28.
Figure 30:
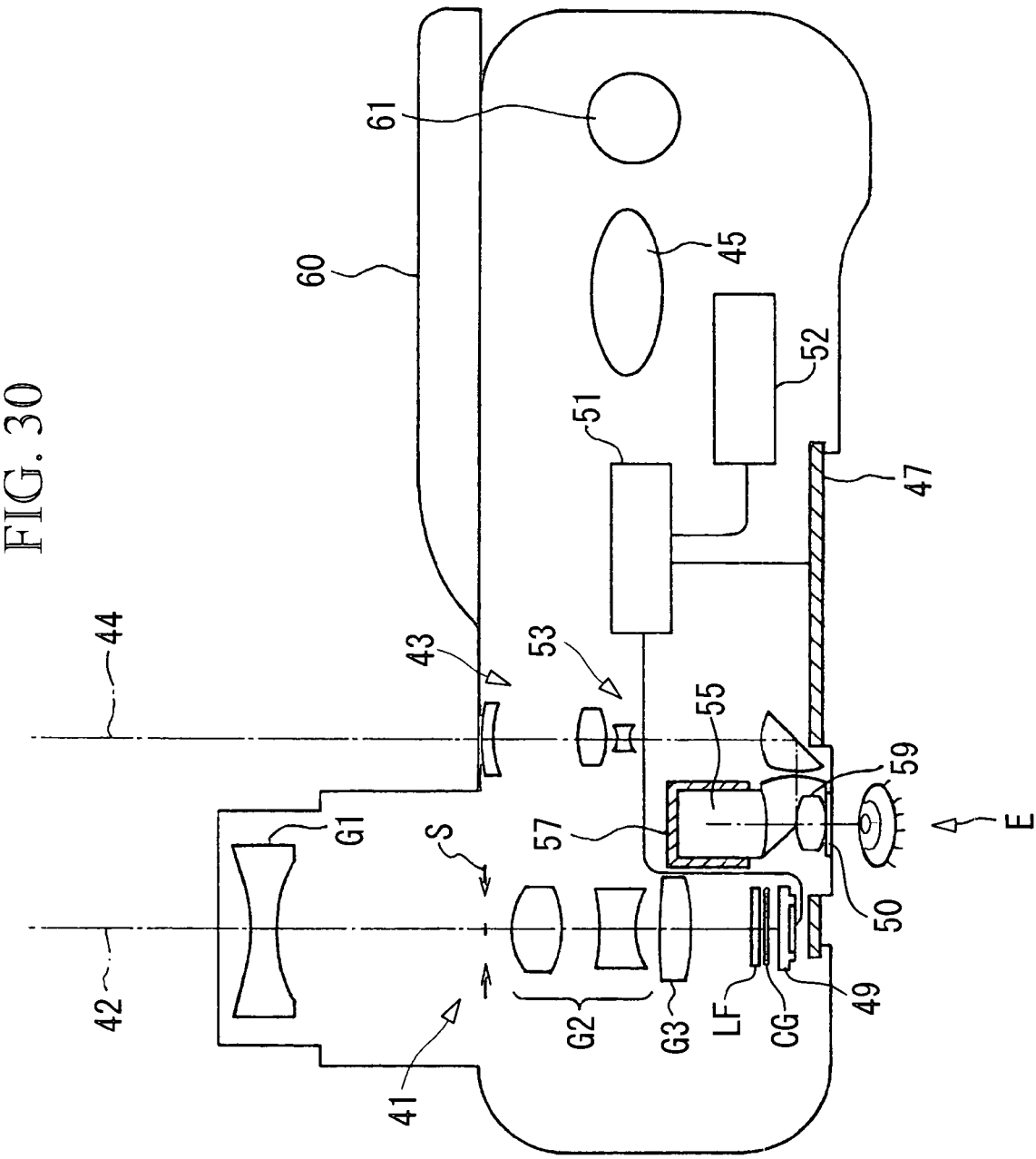
FIG. 30 is a cross sectional diagram of the digital camera in FIG. 28.

FIGS. 28 to 30 show conceptual diagrams of structures in which the optical systems according to Examples 1 to 5 are incorporated into a photographic optical system 41 of a digital camera 40. FIG. 28 is a perspective view showing the external appearance of the digital camera 40, FIG. 29 is a rear elevation thereof, and FIG. 30 is schematic transparent plan view showing the structure of the digital camera 40. FIGS. 28 and 30 show the photographic optical system 41 in an uncollapsed state. In this example, the digital camera 40 includes the photographic optical system 41, which has a photographing light path 42, a finder optical system 43, which has a finder light path 44, a shutter release 45, a flash 46, a liquid crystal display monitor 47, a focal-length changing button 61, a settings changing switch 62, and so on. When the photographic optical system 41 is collapsed, by sliding a cover 60, the photographic optical system 41, the finder optical system 43, and the flash 46 are covered by this cover 60. Then, when the cover 60 is opened to set the camera 40 in a photographing mode, the photographic optical system 41 changes to the uncollapsed state shown in FIG. 30, and when the shutter release 45 disposed at the top of the camera 40 is pressed, photographing is carried out via the photographic optical system 41, for example, the zoom lens system of Example 1. The image formed by the photographic optical system 41 is formed on an imaging surface of a CCD 49 via a low pass filter LF and a cover glass CG. After passing through a processing unit 51, the image received by this CCD 49 is displayed as an electronic image on the liquid crystal monitor 47 provided on the back of the camera 40. A memory 52 is also connected to the processing unit 51, which allows the captured electronic image to be stored. This memory 52 may be provided separately from the processing unit 51, and may be configured to carry out electronic recording using a floppy disk, a memory card, a magneto-optical disk, or the like. Furthermore, instead of the CCD 49, the apparatus may be constructed as a film-based camera in which a silver-halide film is loaded.

In addition, a finder objective optical system 53 for the finder is disposed in the finder light path 44. The finder objective optical system 53 is formed of a plurality of lens groups (three groups in the case shown in the figure) and two prisms. It is formed of a zoom optical system whose focal length changes in conjunction with the zoom lens system of the photographic optical system 41, and the image formed by this finder objective optical system 53 is formed on a field frame 57 of an upright prism 55, which is an image-righting member. An eyepiece optical system 59, which guides the upright image to an observer's eye E, is provided behind this upright prism 55. A cover member 50 is disposed at the exit side of the eyepiece optical system 59.

Since the photographic optical system 41 can be collapsed and stored in a highly efficient and compact manner, the digital camera 40 configured in this way can be made highly efficient and compact.

Figure 31:
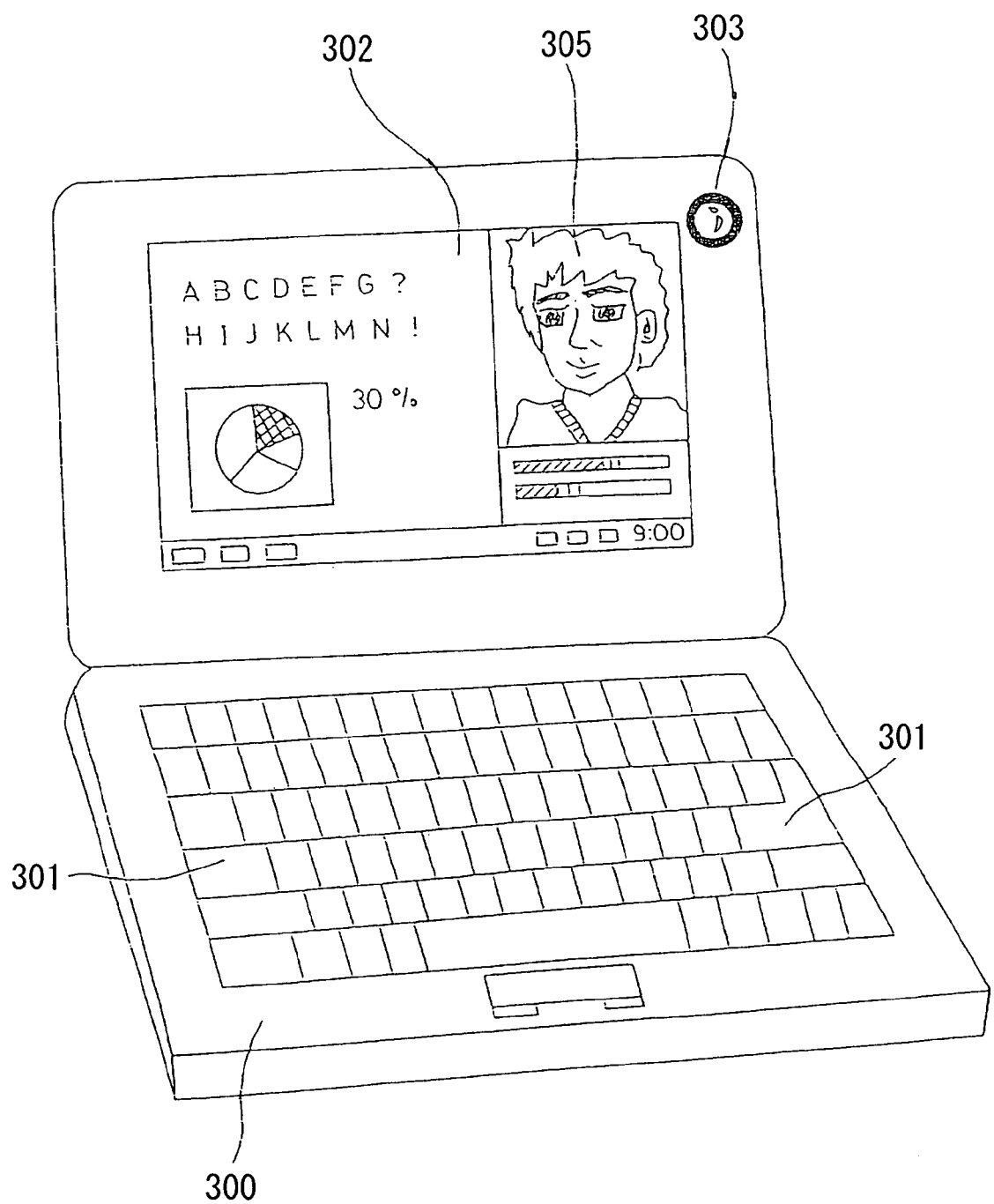
FIG. 31 is a front perspective view of a personal computer in which one of the optical systems in Examples 1 to 5 of the present invention is incorporated as an objective lens system, showing a cover open.
Figure 32:
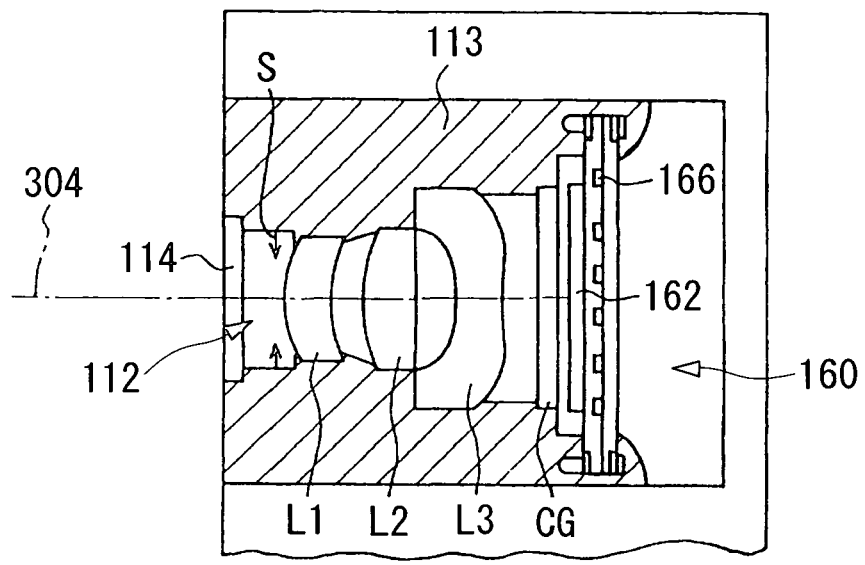
FIG. 32 is a cross-sectional diagram of the photographic optical system in the personal computer.
Figure 33:
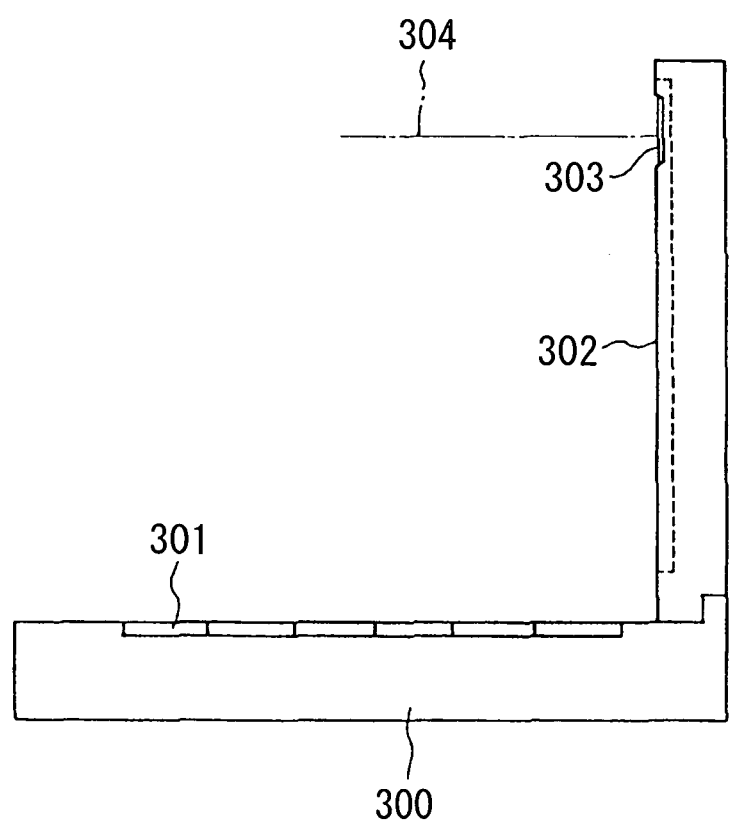
FIG. 33 is a side view of the state shown in FIG. 31.

Next, a personal computer which is one example of an information processing device incorporating the optical systems of Examples 1 to 5 of the present invention as objective optical systems is shown in FIGS. 31 to 33. FIG. 31 is a front perspective view in which a cover of the personal computer 300 is open, FIG. 32 is a cross section of a photographic optical system 303 of the personal computer 300, and FIG. 33 is a side view of the same state shown in FIG. 31. As shown in FIGS. 31 to 33, the personal computer 300 includes a keyboard 301 for the user to input information, an information processing unit and recording unit, which are omitted from the drawings, a monitor 302 for displaying information to the user, and the photographic optical system 303 for taking pictures of the user or the surroundings. The monitor 302 may be a transmissive liquid crystal display device that is illuminated from the rear surface by a backlight (not shown), a reflective liquid crystal display that performs display by reflecting light from the front surface, a CRT display, and so forth. In the figures, the photographic optical system 303 is included at the upper right side of the monitor 302; however, it is not limited to this position and may located anywhere around the monitor 302 or the keyboard 301.

This photographic optical system 303 includes, in a photographing light path 304, an objective lens 112 formed of an optical system according to the present invention (shown in outline in the drawings) and an imaging-element chip 162 that senses the image. These elements are built into the personal computer 300.

In addition, a cover glass CG functioning as a low-pass filter is bonded to the imaging-element chip 162 to form an integral imaging unit 160 and can be easily attached to the rear end of a lens barrel 113 of the objective lens 112 simply by fitting them together. Therefore, it is not necessary to align the centers of the objective lens 112 and the imaging-element chip 162 nor to adjust the distance between the surfaces, which simplifies the assembly. Also, a cover glass 114 for protecting the objective lens 112 is provided at the distal end of the lens barrel 113.

The image received by the imaging-element chip 162 is input to the processing unit of the personal computer 300 via a terminal 166 and is displayed as an electronic image on the monitor 302. An image 305 photographed by the user is shown in FIG. 31 as one example thereof. This image 305 can be displayed, via the processing unit, on a personal computer communicating from a remote location via the internet or by telephone.

Figure 34A:
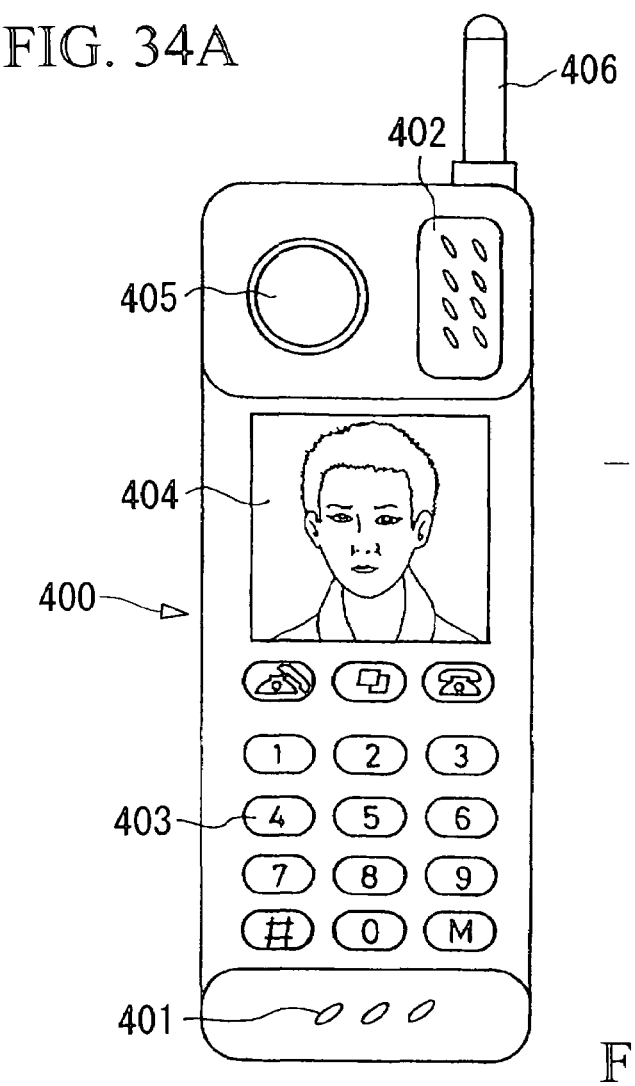
FIG. 34A is a front elevational view of a mobile telephone in which one of the optical systems in Examples 1 to 5 of the present invention is incorporated as an objective optical system.
Figure 34B:
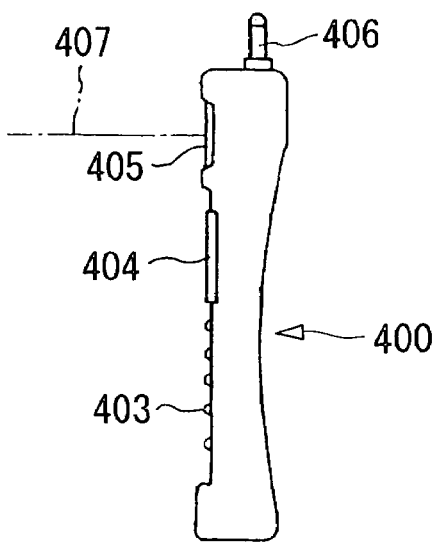
FIG. 34B is a side view of the mobile telephone shown in FIG. 34A.
Figure 34C:
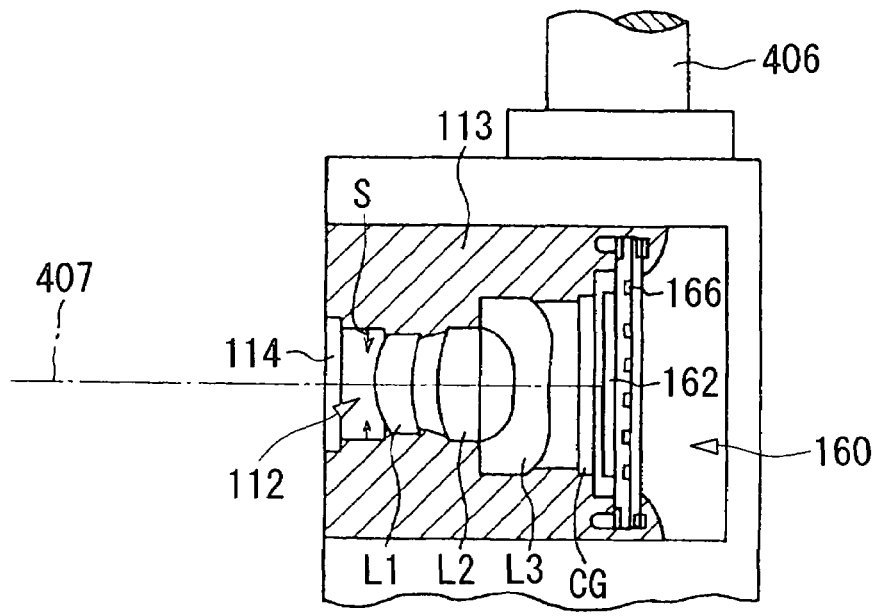
FIG. 34C is a cross-sectional diagram showing a photographic optical system of the mobile telephone in FIG. 34A.

Next, a telephone, particularly a mobile telephone which is convenient in terms of portability, which is an example of an information processing device incorporating the optical systems of Examples 1 to 5 described above as a photographic optical system, is shown in FIGS. 34A to 34C. FIG. 34A is an elevational view of a mobile telephone 400, FIG. 34B is a side view thereof, and FIG. 34C is a cross section of a photographic optical system 405. As shown in FIGS. 34A to 34C, the mobile telephone 400 includes a microphone unit 401 for inputting the user's voice as information, a speaker unit 402 for outputting the voice of another party with whom the user is communicating, an input dial 403 for the user to input information, a monitor 404 for displaying information such as the user himself or an image, telephone number, and so on of the other party, the photographic optical system 405, an antenna 406 for transmitting and receiving electromagnetic waves for communication, and a processing unit (not shown) for processing image information, communication information, input signals, and so on. The monitor 404 is a liquid crystal display device. The position of each element is not particularly limited to the construction shown in the drawings. The photographic optical system 405 includes an objective lens 112 formed of an optical system according to the present invention (shown in outline form in the drawings) and an imaging-element chip 162 that senses the image, which are provided in a photographing light path 407. These elements are built into the mobile telephone 400.

In addition, a cover glass CG functioning as a low-pass filter is bonded to the imaging-element chip 162 to form an integral imaging unit 160 and can be easily attached to the rear end of a lens barrel 113 of the objective lens 112 simply by fitting them together. Therefore, it is not necessary to align the centers of the objective lens 112 and the imaging-element chip 162 nor to adjust the distance between the surfaces, which simplifies the assembly. Also, a cover glass 114 for protecting the objective lens 112 is provided at the distal end of the lens barrel 113.

The image detected by the imaging-element chip 162 is input to a processing unit (not shown) via a terminal 166 and is displayed as an electronic image on the monitor 404, on a monitor of the other party, or on both monitors. When transmitting the image to the other party, a signal-processing function for converting the image data detected by the imaging-element chip 162 into a signal that can be transmitted is included in the processing unit.

In the optical systems according to Examples 1 to 5 of the present invention described above, resin lenses and infrared-cut coatings applied to the resin lenses are preferable, as shown below.

Recently, there have been demands for manufacturing imaging apparatuses such as digital cameras and video cameras as cheaply as possible by producing them by volume manufacturing. Therefore, it is also essential to reduce the costs associated with the optical systems as much as possible. One solution is to use resin as the material of the lens components (optical elements) constituting the optical system used in such imaging apparatuses.

In general, resin lenses are produced by injection molding of resin material. Injection molding is a process in which resin that has been made fluid by heating is injected into a metal mold and shaped.

By using this method, the cost per lens can be reduced compared to fabricating lenses by grinding or molding glass. As a result, the cost of the optical system can be reduced.

Next, a case in which an infrared-cut coating is applied to resin lenses will be described.

When applying an infrared-cut coating to resin lenses, it is necessary to consider the following points. Namely, as described above, when performing coating using vacuum deposition, since the material to be deposited is heated, heat is also applied to the substrate to be subjected to coating (lenses in the Examples described above).

Figure 37:
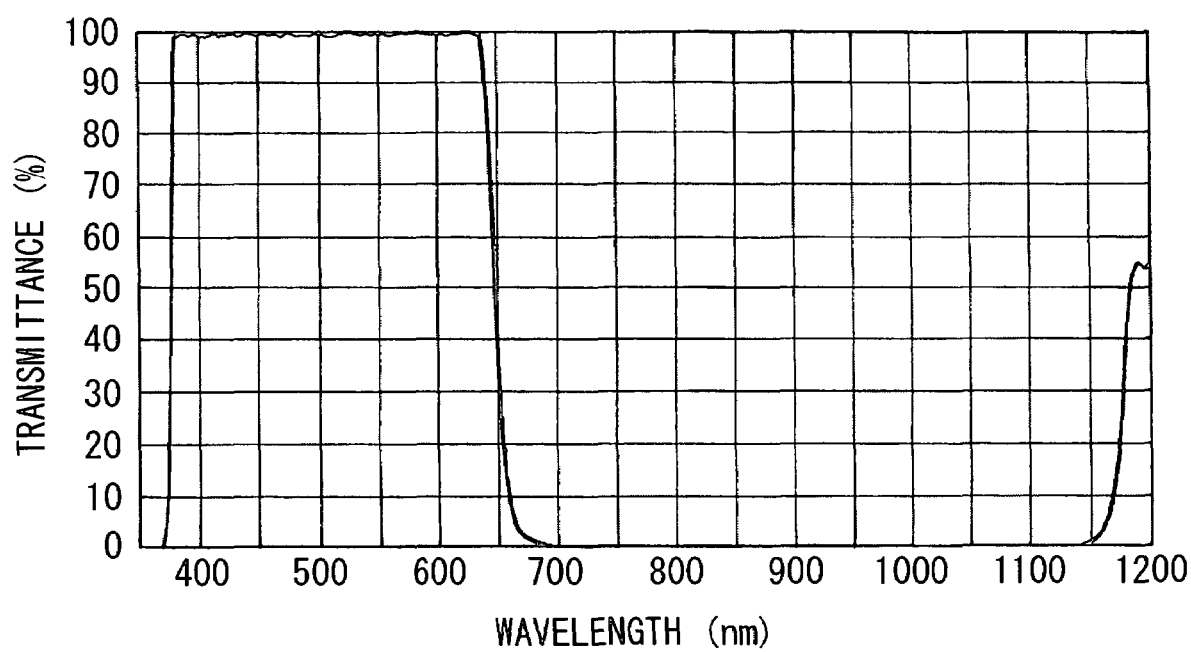
FIG. 37 is a graph showing an example of the transmittance-versus-wavelength characteristic of a reflective-type infrared-cut filter.

For example, to obtain the wavelength characteristics shown in FIG. 37, the following processes (1) to (3) are repeated 44 times, when applying a 44-layer infrared-cut coating to the deposition surface:

(1) heating the deposition material;
(2) vaporizing the deposition material; and
(3) coating the deposition surface (lens surface in this Example).

As the number of layers increases, the substrate (lens) temperature rises.

Normally, since the thermal deformation temperature of resin is about 120° C., which is lower than that of glass lenses and glass filters used in optical systems, when coating resin material using the same method as used for glass lenses and glass filters, the temperature of the resin material gradually rises above the thermal deformation temperature due to radiant heat produced by a plasma or evaporation source even in an unheated environment, and variations in shape may occur during the formation of the multiple layers.

However, as in the Examples 1 to 5 described above, by reducing the number of layers coated on the surface of the resin lenses, deposition can be completed before the thermal deformation temperature is exceeded, and therefore, it is possible to prevent deformation during deposition.

In particular, when applying an infrared-cut coating to the surface of a resin lens, it is preferable to use a magnetron sputtering method or an ion-beam sputtering method, in which evaporation of a deposition material by heating is not performed. Magnetron sputtering is a technique in which material is given off by ions that are contained on the material by a magnetron, and it is preferable to position the substrate at a distance where it is not exposed to the plasma generated on the material. Ion-beam sputtering is a technique in which material is given off by an ion beam and is deposited on the substrate. Since the substrate is not directly exposed to the ion beam, the deposition can be carried out at a temperature lower than in the sputtering method. With such techniques, it is possible to suppress the temperature rise of the resin lenses, and deformation can thus be prevented.

Thus, in the optical systems in Examples 1 to 5 described above, by applying an infrared-cut coating like that described above to resin lenses, it is possible to employ such optical systems in objective optical systems of endoscopes, eyepiece optical systems of microscopes, and so on, not just in digital cameras, information processing devices, and mobile telephones, which are given as examples above. As one example, a case in which such an optical system is employed in an endoscope is described below with reference to the drawings.

Figure 35:
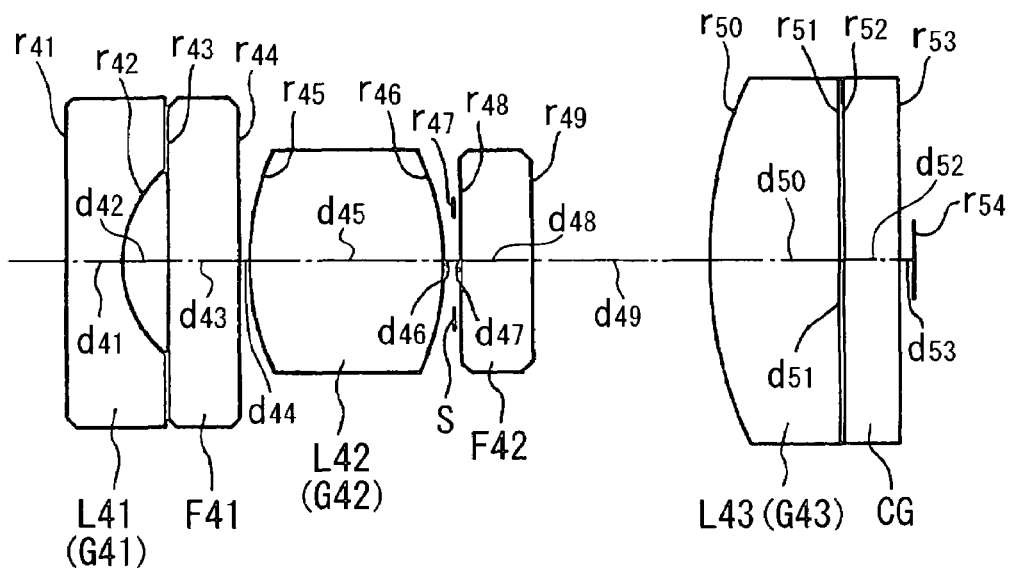
FIG. 35 is a cross-sectional diagram showing an example in which one of the optical systems in Examples 1 to 5 of the present invention is employed in an objective optical system of an endoscope.
Figure 36:
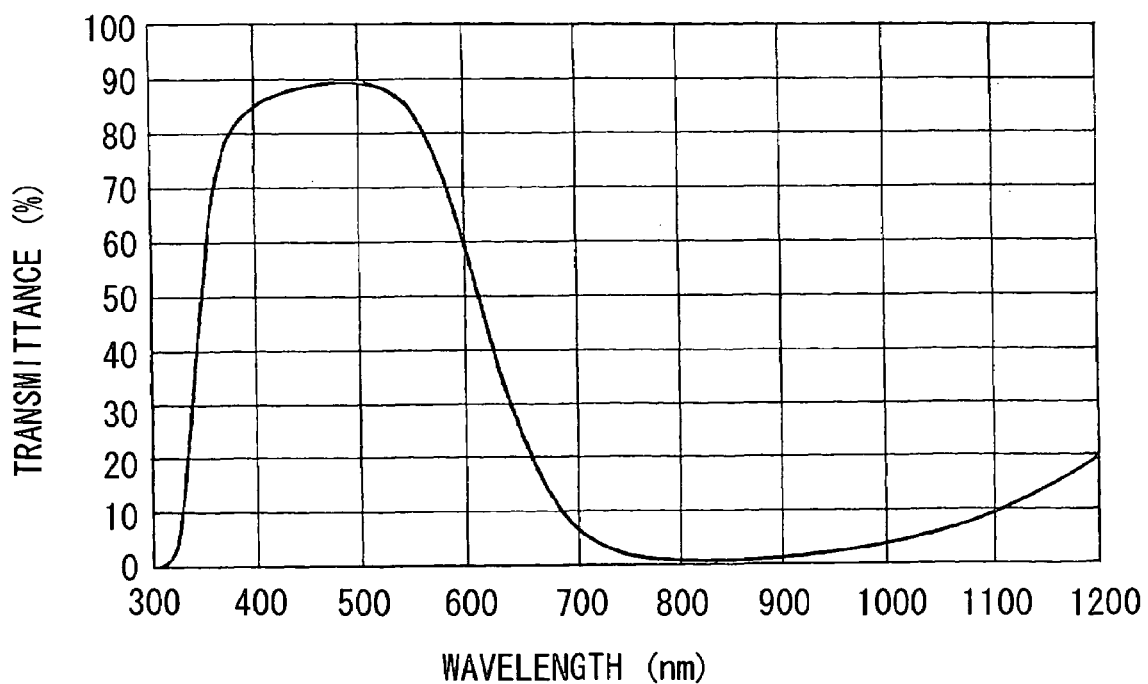
FIG. 36 is a graph showing an example of the transmittance-versus-wavelength characteristic of an absorbing-type infrared-cut filter.

The example applied to an objective optical system of an endoscope is shown in FIG. 35. The endoscope objective optical system shown in FIG. 35 includes, in order from an object side, a first lens group G1 formed of a plano-concave lens L1 whose concave surface faces the image side, a glass flat or optical filter F1, a second lens group G2 formed of a biconvex lens L2, an aperture stop S, a filter F2 for preventing infrared light from entering the solid-state imaging device (CCD), a third lens group G3 formed of a plano-convex lens L3 whose convex surface faces the object side, and a CCD cover glass CG.

In the endoscope objective optical system shown in FIG. 35, an interference coating that reflects infrared light is applied to a regular infrared-absorbing filter, and accordingly, using the weak filter F2, a spectral characteristic that is relatively close to the spectral characteristic of a conventional absorption-type infrared-cut filter can be realized, which makes the endoscope objective optical system more compact.

When applying the present invention to this endoscope objective optical system, for example, by applying 22-layer infrared-cut coatings to the object-side surface (eighth face) and the image-side surface (ninth face) of the filter F2, the spectral characteristics can be further improved. Furthermore, as another example, it is possible apply 22-layer infrared-cut coatings to the object-side surface (fifth face) of the biconvex lens L2 and to the object-side surface (tenth face) of the plano-convex lens L3, which makes the filter F2 unnecessary. Accordingly, it is possible to make the endoscope objective optical system more compact.

In a microscope, the optical system from a light source to the objective optical system is normally designed to also transmit infrared light, and a film having an antireflection function over a wide spectral range and that transmits light from the visible to the infrared is provided so that the observer can select any wavelength from the visible to the infrared. However, in order to reduce costs, the eyepiece optical system is normally designed to include a visible-light antireflection coating, which transmits damaging infrared light.

Therefore, by employing the optical system of the present invention, in which infrared-cut coatings are applied to multiple surfaces of the optical system, in such a microscope eyepiece optical system, it is possible to cut infrared light with the eyepiece optical system of the microscope, without providing a separate element for cutting infrared light.

First Embodiment

Next, an infrared-cut filter according to a first embodiment of the present invention will be described with reference to the drawings.

Figure 38:
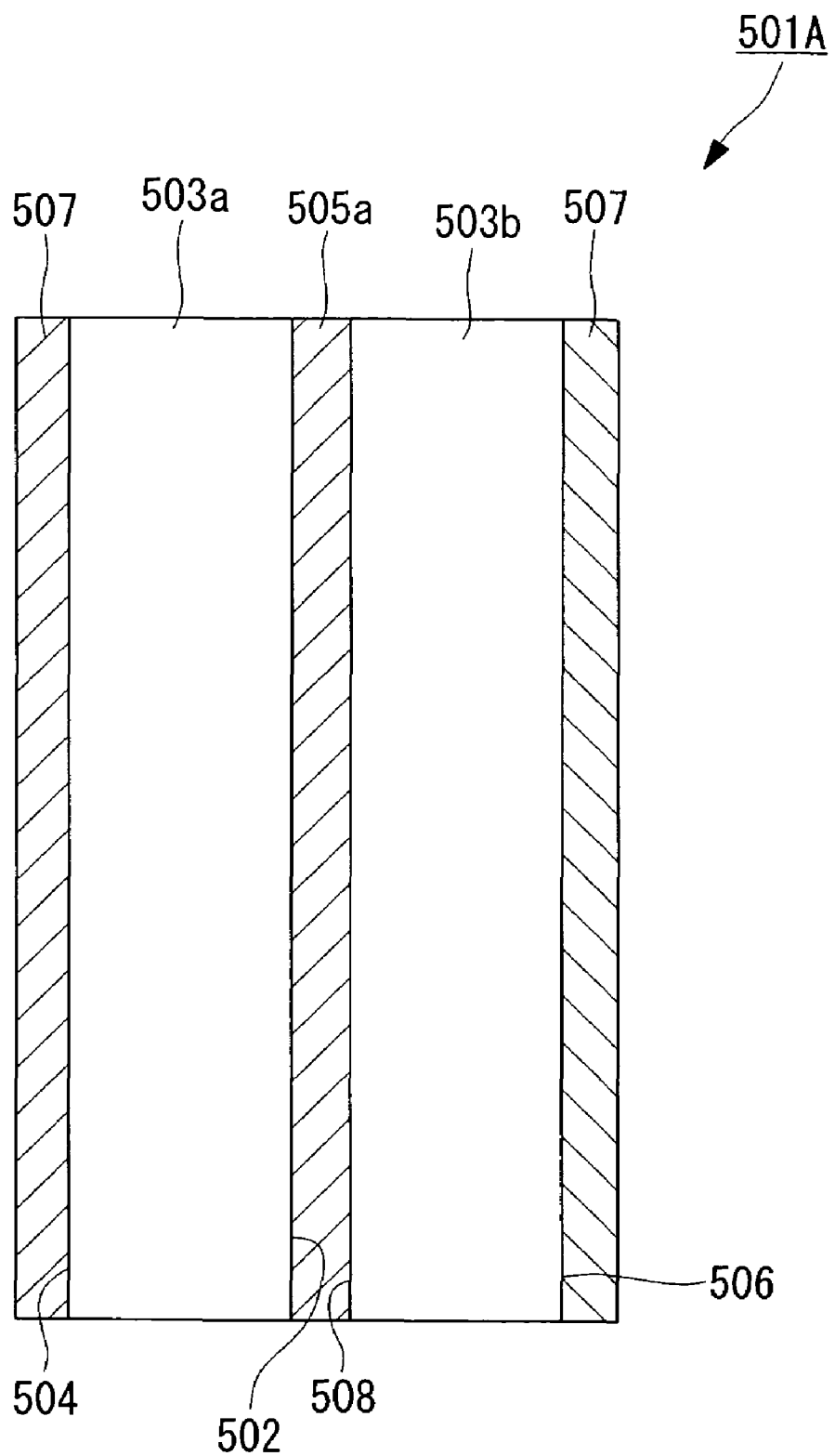
FIG. 38 is a diagram depicting the structure of an infrared-cut filter according to a first embodiment of the present invention.

FIG. 38 is a diagram depicting the structure of an infrared-cut filter 501A according to this embodiment.

As shown in FIG. 38, the infrared-cut filter (optical filter) 501A is roughly formed of two infrared-absorbing filters that absorb infrared, that is, an infrared-absorbing filter (first substrate) 503a and an infrared-absorbing filter (second substrate) 503b, an infrared-cut coating (infrared-cut layer) 505a that reflects infrared, and an antireflection coating 507 that suppresses the reflection of light.

The infrared-absorbing filters 503a and 503b are plate-like members formed of glass or a resin such as plastic; one example is Lumimcle (registered trademark) from Kureha Chemical Industry Co., Ltd.

The transmittance (T %) versus wavelength of the infrared-absorbing filters 503a and 503b used in this embodiment is shown in Table 18 below.

TABLE 18

| Wavelength (nm) | Transmittance (T %) |
| --- | --- |
| 300 | 0.00 |
| 310 | 0.00 |
| 320 | 0.00 |
| 330 | 0.05 |
| 340 | 1.49 |
| 350 | 9.46 |
| 360 | 26.92 |
| 370 | 47.29 |
| 380 | 63.11 |
| 390 | 72.66 |
| 400 | 77.43 |
| 410 | 80.02 |
| 420 | 81.70 |
| 430 | 82.95 |
| 440 | 84.01 |
| 450 | 84.89 |
| 460 | 85.76 |
| 470 | 86.52 |
| 480 | 87.24 |
| 490 | 87.90 |
| 500 | 88.38 |
| 510 | 88.80 |
| 520 | 88.88 |
| 530 | 88.73 |
| 540 | 88.17 |
| 550 | 87.10 |
| 560 | 85.47 |

TABLE 18-continued

| Wavelength (nm) | Transmittance (T %) |
|---|---|
| 570 | 82.98 |
| 580 | 79.65 |
| 590 | 75.35 |
| 600 | 70.17 |
| 610 | 64.10 |
| 620 | 57.38 |
| 630 | 50.31 |
| 640 | 43.21 |
| 650 | 36.37 |
| 660 | 30.04 |
| 670 | 24.59 |
| 680 | 19.85 |
| 690 | 15.96 |
| 700 | 12.82 |
| 710 | 10.36 |
| 720 | 8.44 |
| 730 | 6.98 |
| 740 | 5.87 |
| 750 | 5.04 |
| 760 | 4.42 |
| 770 | 3.97 |
| 780 | 3.65 |
| 790 | 3.42 |
| 800 | 3.29 |
| 810 | 3.21 |
| 820 | 3.19 |
| 830 | 3.22 |
| 840 | 3.26 |
| 850 | 3.61 |
| 860 | 3.86 |
| 870 | 3.97 |
| 880 | 4.17 |
| 890 | 4.34 |
| 900 | 4.57 |
| 910 | 4.82 |
| 920 | 5.10 |
| 930 | 5.41 |
| 940 | 5.77 |
| 950 | 6.16 |
| 960 | 6.61 |
| 970 | 7.12 |
| 980 | 7.65 |
| 990 | 8.23 |
| 1000 | 8.90 |
| 1010 | 9.62 |
| 1020 | 10.44 |
| 1030 | 11.29 |
| 1040 | 12.24 |
| 1050 | 13.25 |
| 1060 | 14.33 |
| 1070 | 15.49 |
| 1080 | 16.68 |
| 1090 | 18.06 |
| 1100 | 19.36 |
| 1110 | 20.72 |
| 1120 | 22.08 |
| 1130 | 23.42 |
| 1140 | 24.80 |
| 1150 | 26.18 |
| 1160 | 27.53 |
| 1170 | 28.90 |
| 1180 | 30.42 |
| 1190 | 32.15 |
| 1200 | 33.58 |

The infrared-cut coating 505a is formed of a multilayer film in which layers of different refractive index are alternately laminated, namely, layers of titanium oxide ($TiO_2$ thin-film layers, high refractive index) and layers of silicon oxide ($SiO_2$ thin-film layers, low refractive index). This embodiment is described in terms of a structure in which 14 layers of titanium oxide and silicon oxide are laminated. Detailed data of the infrared-cut coating 505a, such as the film thicknesses and so on, is shown in Table 19 below.

TABLE 19

| Number of layers | Film material | Optical film thickness |
|---|---|---|
| 1 | $TiO_2$ | $0.1718 \times \lambda/4$ |
| 2 | $SiO_2$ | $0.3986 \times \lambda/4$ |
| 3 | $TiO_2$ | $1.8764 \times \lambda/4$ |
| 4 | $SiO_2$ | $1.7662 \times \lambda/4$ |
| 5 | $TiO_2$ | $1.6109 \times \lambda/4$ |
| 6 | $SiO_2$ | $1.6755 \times \lambda/4$ |
| 7 | $TiO_2$ | $1.5564 \times \lambda/4$ |
| 8 | $SiO_2$ | $1.6709 \times \lambda/4$ |
| 9 | $TiO_2$ | $1.5723 \times \lambda/4$ |
| 10 | $SiO_2$ | $1.6928 \times \lambda/4$ |
| 11 | $TiO_2$ | $1.7880 \times \lambda/4$ |
| 12 | $SiO_2$ | $2.1593 \times \lambda/4$ |
| 13 | $TiO_2$ | $0.2000 \times \lambda/4$ |
| 14 | $SiO_2$ | $2.2107 \times \lambda/4$ |

$\lambda = 500$ nm

The antireflection coating 507 is also formed of alternately laminated layers of different refractive index, that is, layers of titanium oxide ($TiO_2$ thin-film layers, high refractive index) and layers of silicon oxide ($SiO_2$ thin-film layers, low refractive index). This embodiment is described in terms of a structure in which 5 layers of titanium oxide and silicon oxide are laminated. Detailed data of the antireflection coating 507, such as the film thicknesses and so on, is shown in Table 20 below.

TABLE 20

| Number of layers | Film material | Optical film thickness |
|---|---|---|
| 1 | $SiO_2$ | $1.3584 \times \lambda/4$ |
| 2 | $TiO_2$ | $0.1824 \times \lambda/4$ |
| 3 | $SiO_2$ | $0.3985 \times \lambda/4$ |
| 4 | $TiO_2$ | $1.9257 \times \lambda/4$ |
| 5 | $SiO_2$ | $0.9413 \times \lambda/4$ |

$\lambda = 500$ nm

Next, the fabrication method of the infrared-cut filter 501A will be described.

Figure 39A:
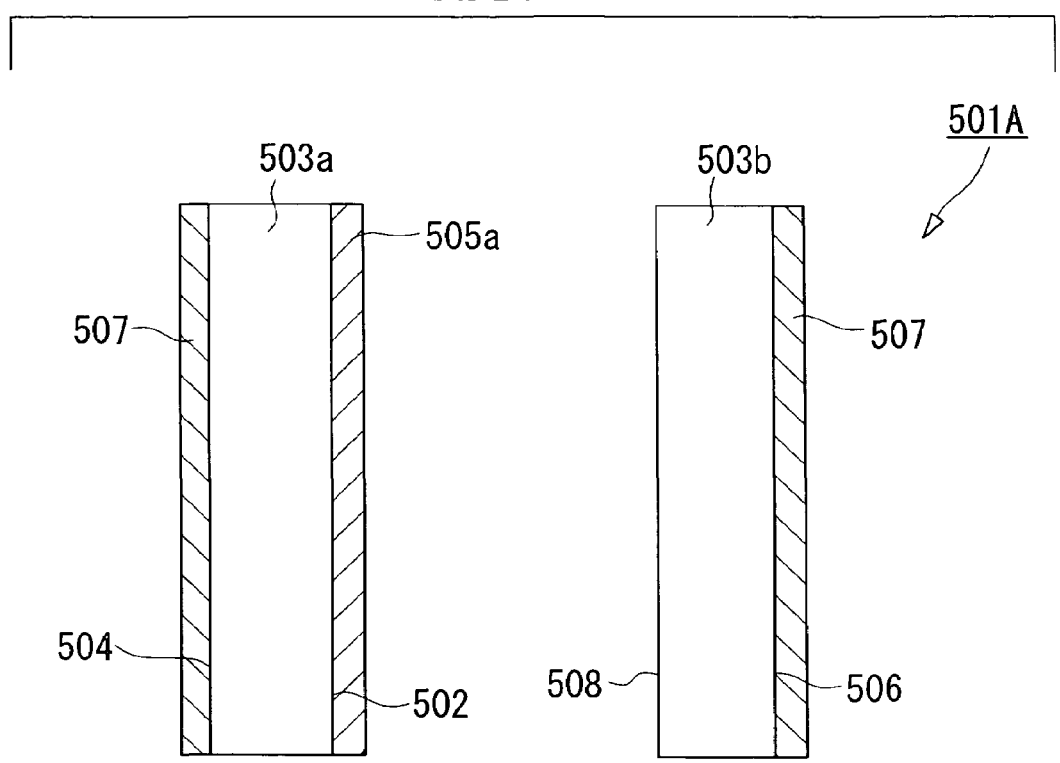
FIG. 39A is a diagram depicting the method of fabricating the infrared-cut filter in FIG. 38.
Figure 39B:
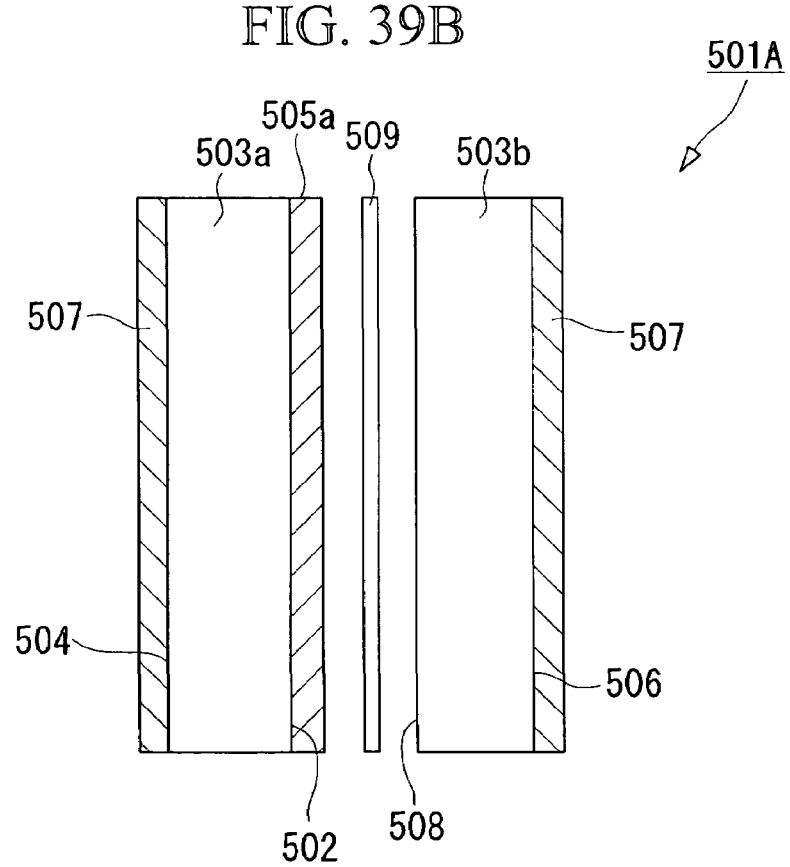
FIG. 39B is a diagram depicting the method of fabricating the infrared-cut filter in FIG. 38.

FIGS. 39A and 39B are diagrams for explaining the method of fabricating the infrared-cut filter 501A of this embodiment. FIG. 39A is a diagram explaining the process of forming the infrared-cut coating 505a and so forth on the infrared-absorbing filters 503a and 503b, and FIG. 39B is a diagram explaining the process of joining the infrared-absorbing filters 503a and 503b on which the infrared-cut coating 505a and so forth has been formed.

First, as shown in FIG. 39A, the infrared-cut coating 505a is formed on an inner surface (one surface) 502 of the infrared-absorbing filter 503a, and the antireflection coating 507 is formed on an outer surface 504. In addition, the antireflection coating 507 is also formed on an outer surface 506 of the infrared-absorbing filter 503b (forming process).

The method of forming the infrared-cut coating 505a and the antireflection coatings 507 may be vapor deposition, for example.

Thereafter, as shown in FIG. 39B, the infrared-cut coating 505a formed on the infrared-absorbing filter 503a and an inner surface (opposing surface) 508 of the infrared-absorbing filter 503b are joined (joining process).

The method of performing the joining may be, for example, bonding with an adhesive. In the description of this embodiment, in which joining is achieved by means of an adhesive, a joining layer 509, which is an adhesive layer, is formed between the infrared-cut coating 505a and the infrared-absorbing filter 503b.

The structure is not particularly limited, however; the infrared-cut coating 505a may be formed on the infrared-absorbing filter 503a, as described above, or the infrared-cut coating 505a may be formed on the infrared-absorbing filter 503b.

Next, the effects achieved by the infrared-cut filter 501A mentioned above will be described.

For example, light incident on the infrared-cut filter 501A from the infrared-absorbing filter 503a side (the left side in FIG. 38) is transmitted through the antireflection coating 507 and enters the infrared-absorbing filter 503a. Forming the antireflection coating 507 on the surface where light is incident prevents the light incident on the infrared-absorbing filter 503a from being reflected.

Some of the infrared light in the incident light is absorbed in the infrared-absorbing filter 503a, and the remaining light is transmitted through the infrared-absorbing filter 503a and is incident on the infrared-cut coating 505a. Some of the infrared light transmitted through the infrared-absorbing filter 503a is reflected at the infrared-cut coating 505a, and the remaining infrared light is transmitted through the infrared-cut coating 505a and is incident on the infrared-absorbing filter 503b. Some of the infrared light transmitted through the infrared-cut coating 505a is absorbed in the infrared-absorbing filter 503b, and the remaining infrared light is emitted from the infrared-cut filter 501A.

Figure 40:
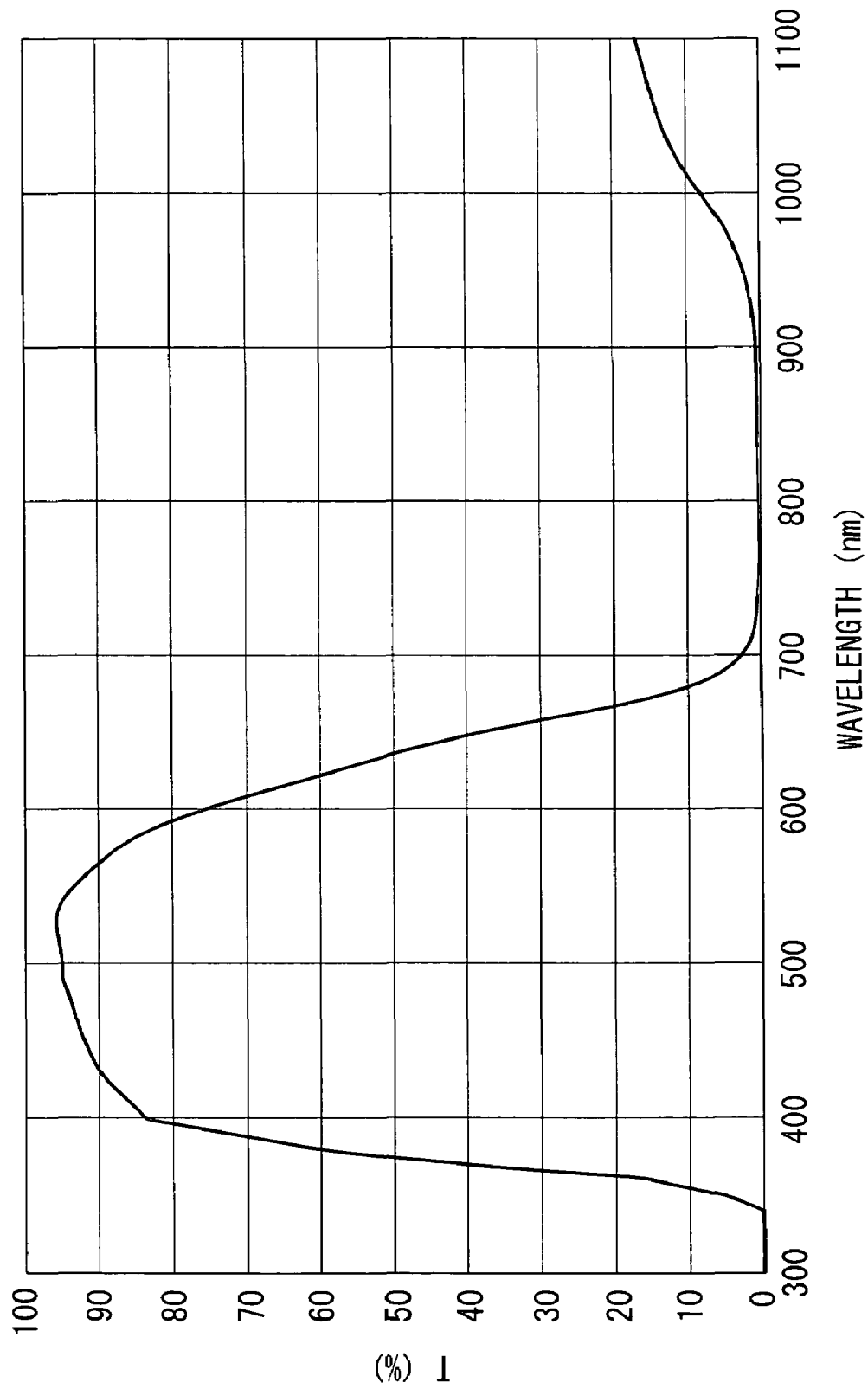
FIG. 40 is a graph showing the transmittance (T %) versus wavelength of the infrared-cut filter in FIG. 38.

FIG. 40 is a graph showing the transmittance (T %) versus wavelength of the infrared-cut filter 501A of this embodiment.

The transmittance versus wavelength of the infrared-cut filter 501A, which absorbs and reflects infrared light in this way, is as shown in FIG. 40. The transmittance of light in a wavelength range from 750 nm to 850 nm is approximately 10% or less than the average transmittance of light in a wavelength range from 500 nm to 550 nm.

According to the structure described above, because the infrared-absorbing filters 503a and 503b that absorb infrared light are used, it is possible to reduce the thickness of the infrared-cut coating 505a compared to a case in which, for example, a substrate that does not absorb infrared light is used.

In other words, by absorbing some of the infrared light in the infrared-absorbing filters 503a and 503b, it is possible to reduce the proportion of infrared light to be reflected at the infrared-cut coating 505a. Accordingly, the thickness of the infrared-cut coating 505a can be reduced, which allows the infrared-cut filter 501A to be made more compact.

Since the infrared-cut coating 505a is sandwiched between the infrared-absorbing filters 503a and 503b, the infrared-cut coating 505a can be protected from damage, and infrared light can thus be prevented from being transmitted from such a damaged portion. Also, since the infrared-cut coating 505a can be protected from damage, the construction of the infrared-cut filter 501A can be simplified.

By sandwiching the infrared-cut coating 505a between the infrared-absorbing filters 503a and 503b, contact with outside air is blocked and humidity contained therein is not easily absorbed. Therefore, it is possible to prevent the occurrence of warpage of the infrared-cut filter 501A due to a difference in expansion coefficient between the infrared-absorbing filters 503a and 503b and the infrared-cut coating 505a.

Since the thickness of the infrared-cut coating 505a can be made small, it is possible to easily prevent warpage of the infrared-cut filter 501A.

Furthermore, by blocking contact with outside air, thus making it difficult for moisture therein to be absorbed, changes in the properties of the infrared-cut filter 501A can be prevented, and it is thus possible to prevent a shift in the characteristics of the infrared-cut filter 501A.

Because the infrared-cut coating 505a is formed on the inner surface 502 of the infrared-absorbing filter 503a, and the joining layer 509 is disposed between the infrared-absorbing filter 503a and the infrared-absorbing filter 503b, it is possible to join the infrared-absorbing filter 503a and the infrared-absorbing filter 503b in a state where the infrared-cut layer is disposed therebetween.

If a material having low durability at high temperatures, such as a resin, is used in the infrared-absorbing filters 503a and 503b, it is not possible to deposit the infrared-cut coating 505a on the inner surface 502 of the infrared-absorbing filter 503a in a high-temperature environment, which causes the strength of the infrared-cut coating 505a to be lowered. Because the infrared-cut coating 505a is sandwiched between the infrared-absorbing filters 503a and 503b, it is also possible in this case, too, to protect the infrared-cut coating 505a from being damaged.

Because the infrared-absorbing filters 503a and 503b are formed in flat shapes, it is easy to form the infrared-cut coating 505a with a uniform thickness. As a result, it is possible to prevent the infrared-cutting characteristics of the infrared-cut filter 501A from exhibiting variation over the region where light is transmitted.

If the infrared-absorbing filters 503a and 503b are made of resin, the infrared-cut filter 501A can be reduced in weight and can be fabricated at low cost.

Second Embodiment

Next, an infrared-cut filter according to a second embodiment of the present invention will be described with reference to the drawings.

Figure 41:
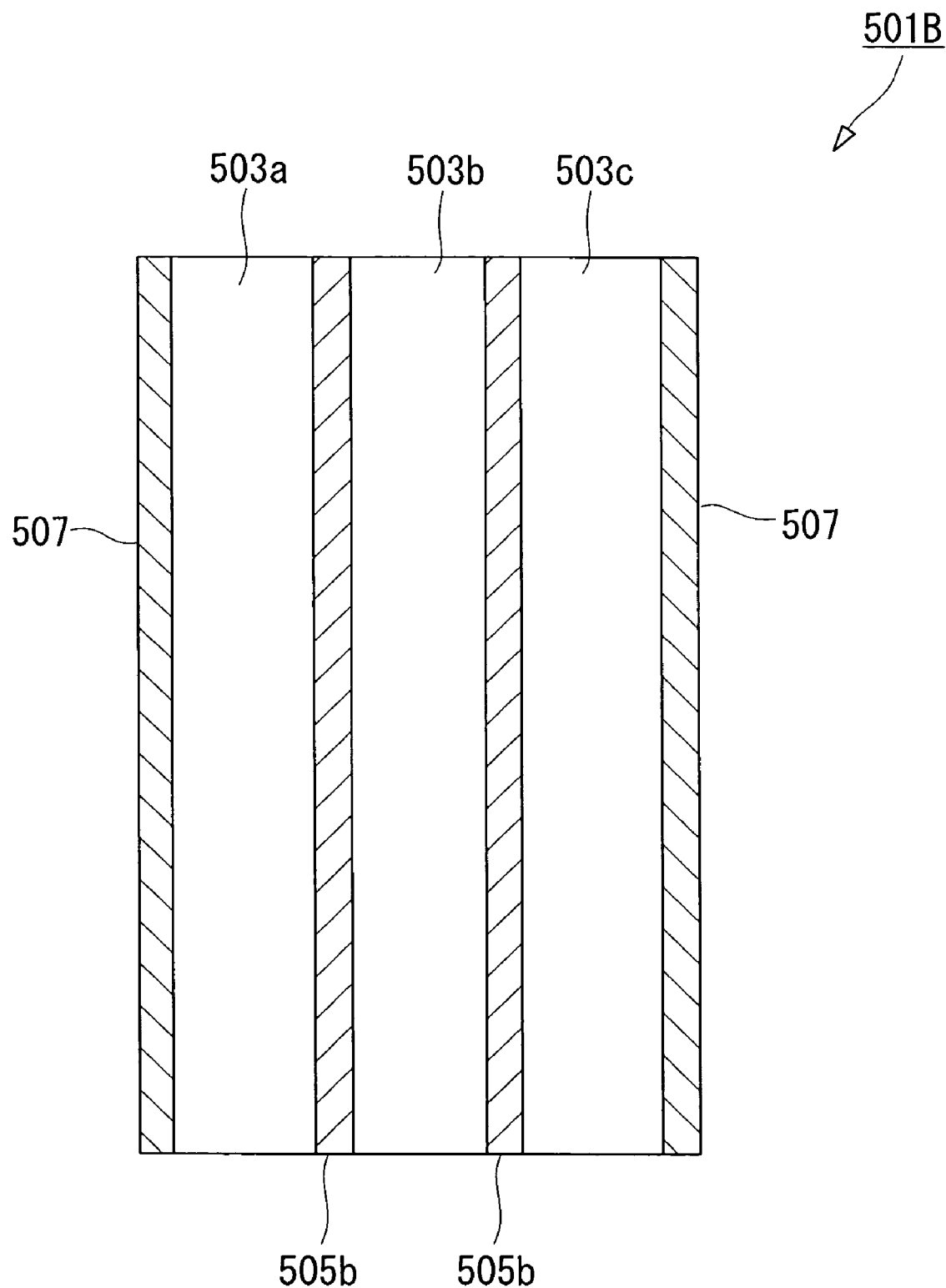
FIG. 41 is a diagram depicting the structure of an infrared-cut filter according to a second embodiment of the present invention.

FIG. 41 is a diagram for explaining the structure of the infrared-cut filter 501B of this embodiment.

Components that are the same as those in the first embodiment are assigned the same reference numerals and a description thereof shall be omitted.

As shown in FIG. 41, the infrared-cut filter (optical filter) 501B roughly includes three infrared-absorbing filters (substrates) 503a, 503b, and 503c that absorb infrared light, an infrared-cut coatings (infrared-cut layer) 505b that reflect infrared light, and antireflection coatings 507 that suppress the reflection of light.

The infrared-absorbing filter 503c is made of the same material and has the same shape as the infrared-absorbing filters 503a and 503b, and the transmittance (T %) versus wavelength is also the same.

The infrared-cut coatings 505b are formed of multilayer films in which layers of different refractive index are alternately laminated, namely, layers of titanium oxide ($TiO_2$ thin-film layers, high refractive index) and layers of silicon oxide ($SiO_2$ thin-film layers, low refractive index). This embodiment is described in terms of a structure in which 10 layers of titanium oxide and silicon oxide are laminated. Detailed data of the infrared-cut coatings 505b, such as the film thicknesses and so on, is shown in Table 21 below.

TABLE 21

| Number of layers | Film material | Optical film thickness |
|---|---|---|
| 1 | TiO$_2$ | 0.1632 × λ/4 |
| 2 | SiO$_2$ | 0.3713 × λ/4 |
| 3 | TiO$_2$ | 1.8810 × λ/4 |
| 4 | SiO$_2$ | 1.8055 × λ/4 |
| 5 | TiO$_2$ | 1.6489 × λ/4 |
| 6 | SiO$_2$ | 1.7593 × λ/4 |
| 7 | TiO$_2$ | 1.8287 × λ/4 |
| 8 | SiO$_2$ | 2.2141 × λ/4 |
| 9 | TiO$_2$ | 0.1595 × λ/4 |
| 10 | SiO$_2$ | 2.2147 × λ/4 |

λ = 500 nm

The method of fabricating the infrared-cut filter 501B is the same as in the first embodiment and shall thus be omitted.

Figure 42:
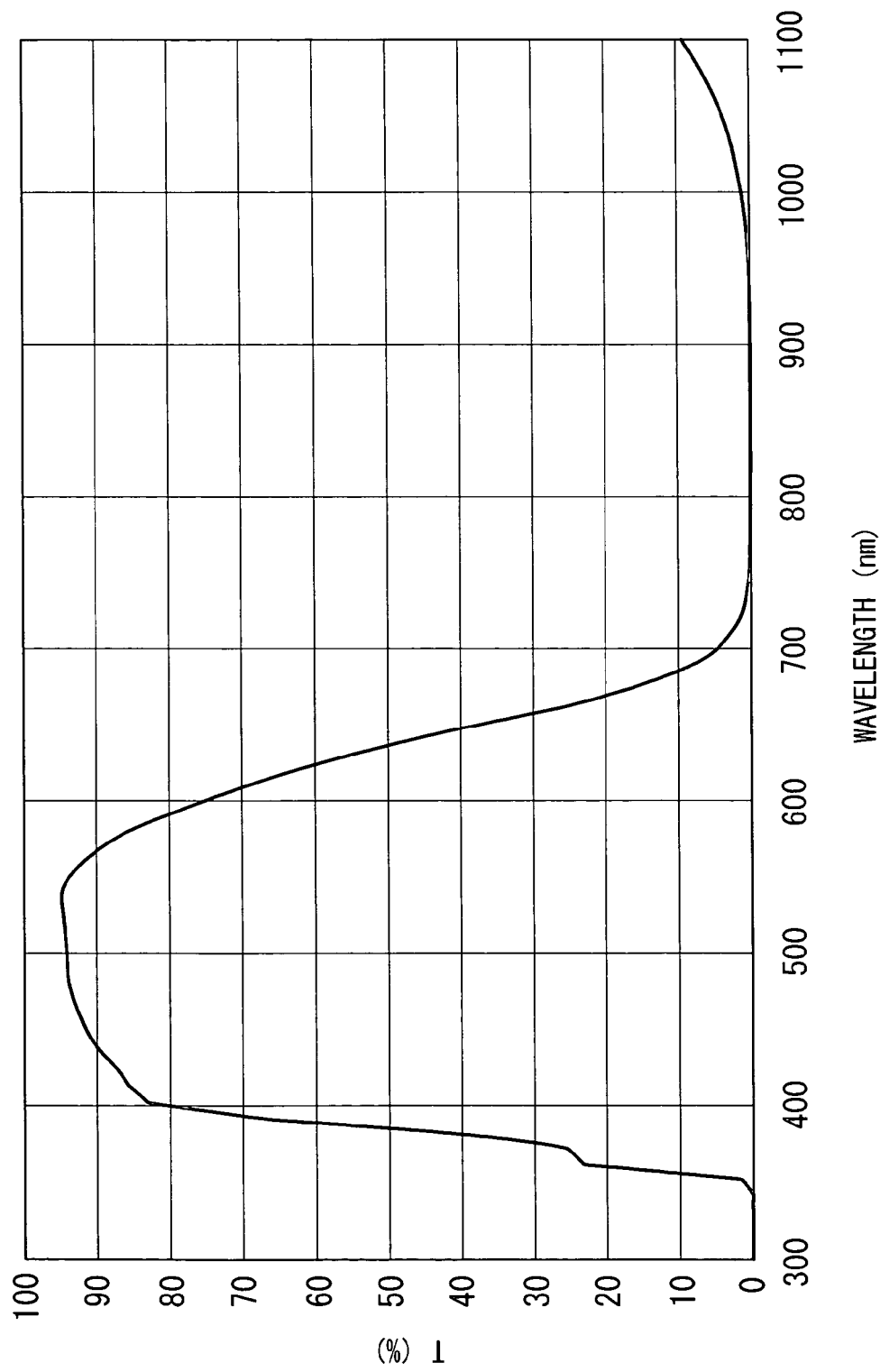
FIG. 42 is a graph showing the transmittance (T %) versus wavelength of the infrared-cut filter in FIG. 41.

The effects of the infrared-cut filter 501B are the same as those of the first embodiment, except that the infrared-absorbing filter 503c and the infrared-cut coating 505b are additionally provided. Therefore, a graph showing the transmittance (T %) versus wavelength of the infrared-cut filter 501B of this embodiment is merely shown in FIG. 42, and an explanation thereof is omitted.

With the structure described above, because the number of laminated layers in the infrared-cut coating 505b is less than that in the infrared-cut filter 501A according to the first embodiment, warpage can be easily prevented when forming the infrared-cut coating 505b on the infrared-absorbing filter 503a and so on.

Third Embodiment

Next, an infrared-cut filter according to a third embodiment of the present invention will be described with reference to the drawings.

Figure 43:
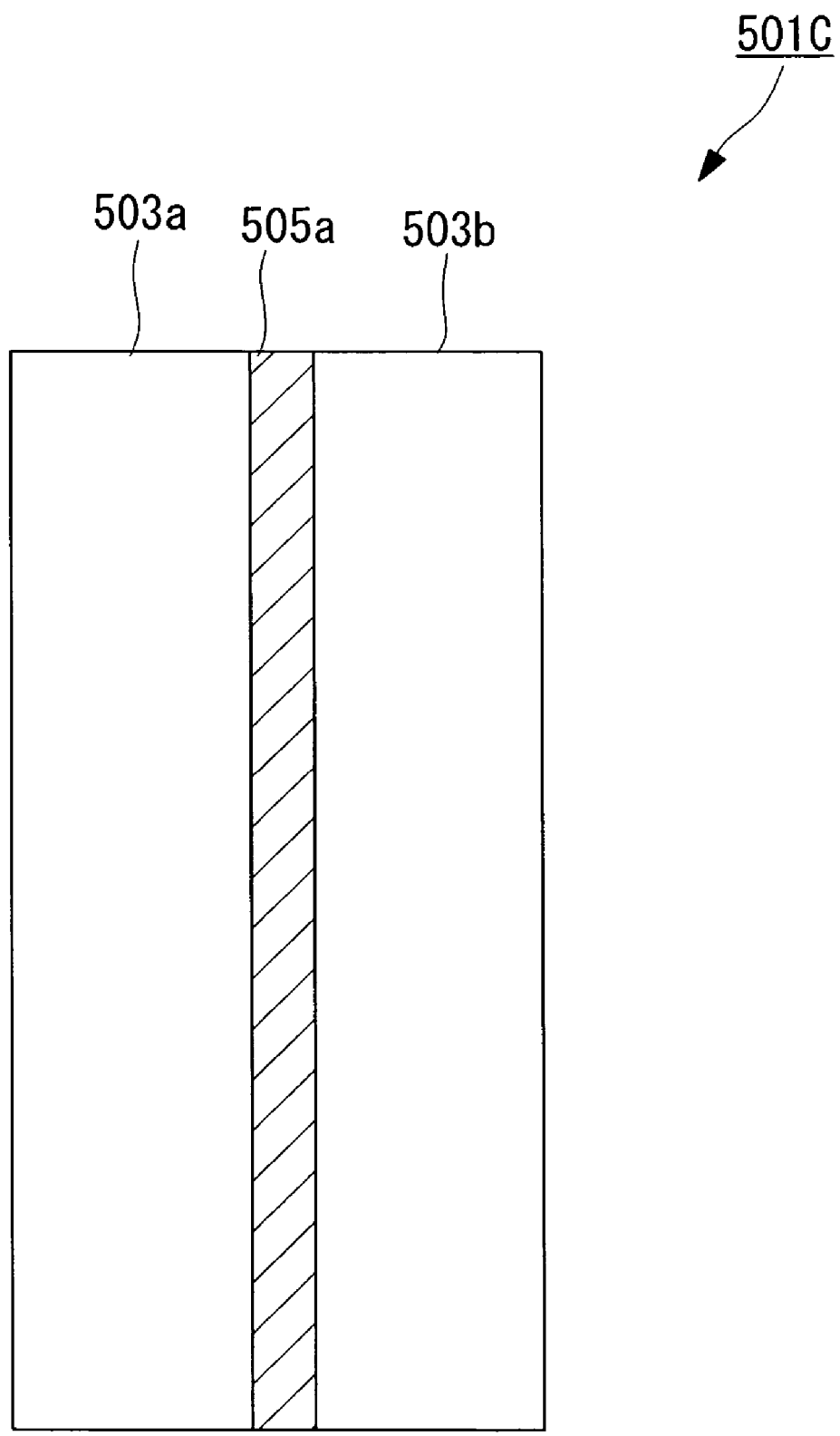
FIG. 43 is a diagram depicting the structure of an infrared-cut filter according to a third embodiment of the present invention.

FIG. 43 is a diagram depicting the structure of an infrared-cut filter 501C of this embodiment.

Components that are the same as those in the first embodiment are assigned the same reference numerals, and a description thereof shall be omitted.

As shown in FIG. 43, the infrared-cut filter (optical filter) 501C roughly includes two infrared-absorbing filters 503a and 503b that absorb infrared light and an infrared-cut coating 505a that reflects infrared light.

The method of fabricating the infrared-cut filter 501C is the same as that of the first embodiment, except that an antireflection coating is not formed, and a description thereof is thus omitted.

Figure 44:
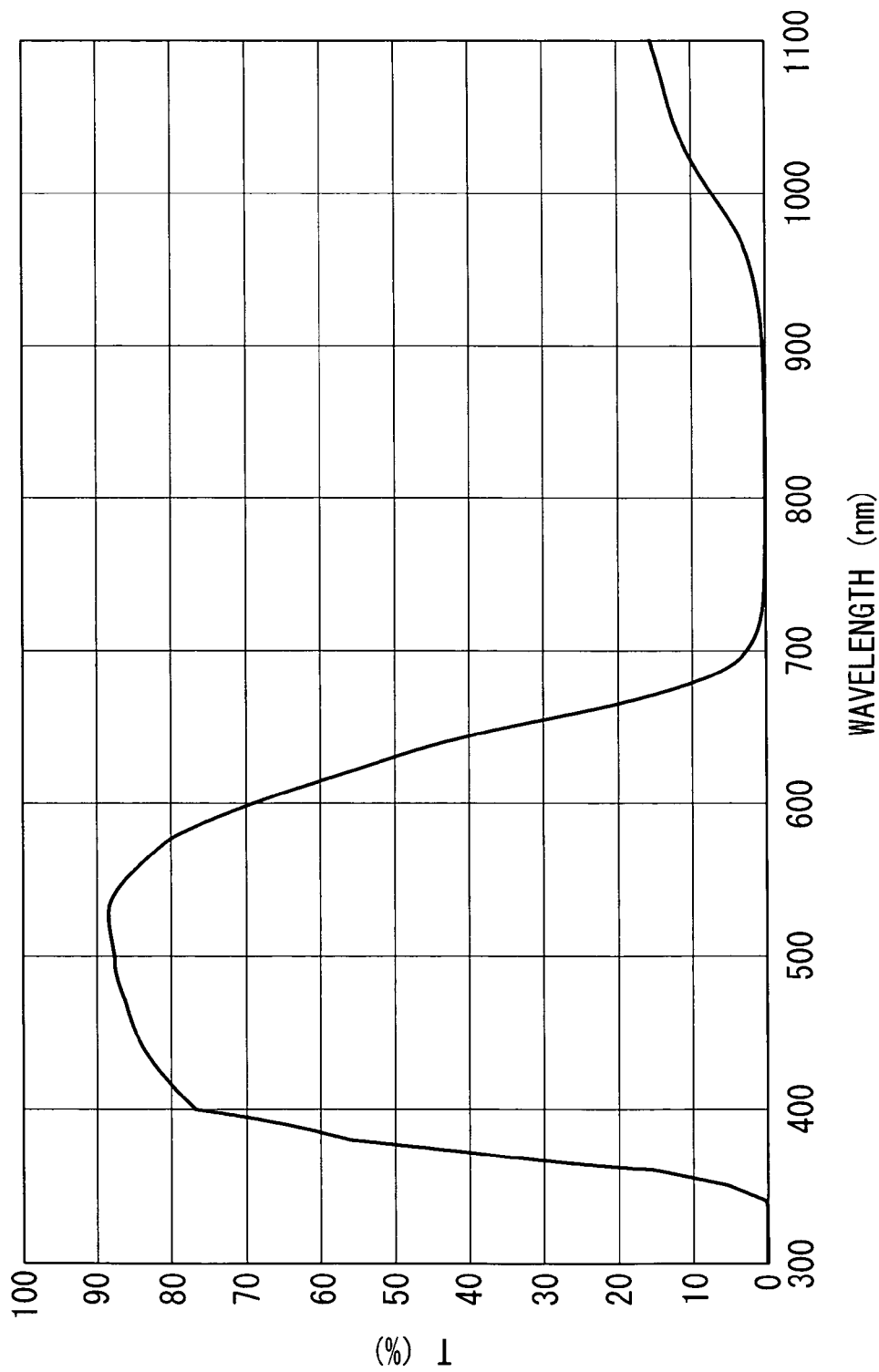
FIG. 44 is a graph showing the transmittance (T %) versus wavelength of the infrared-cut filter in FIG. 43.

Moreover, since the effects of the infrared-cut filter 501C are also the same as those of the first embodiment, except for the absence of the antireflection coating, a graph showing the transmittance (T %) versus wavelength of the infrared-cut filter 501C in this embodiment is merely shown in FIG. 44, but an explanation thereof is omitted.

According to the structure described above, since the antireflection coating is not formed, unlike the infrared-cut filter 501A according to the first embodiment, the number of processing steps can be reduced, which allows the filter to be fabricated at lower cost.

Fourth Embodiment

Next, an infrared-cut filter according to a fourth embodiment of the present invention will be described with reference to the drawings.

Figure 45:
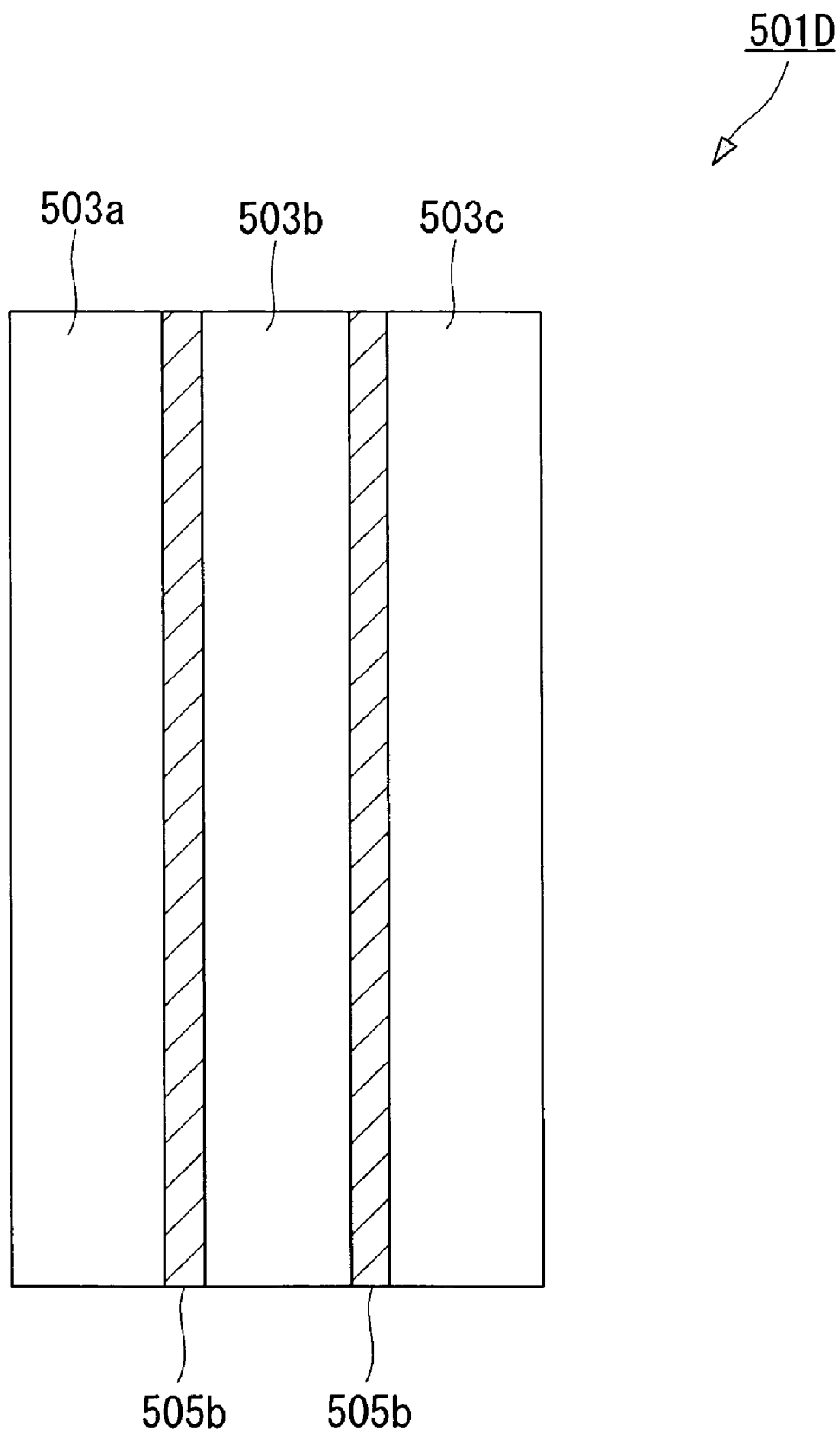
FIG. 45 is a diagram depicting the structure of an infrared-cut filter according to a fourth embodiment of the present invention.

FIG. 45 is a diagram depicting the structure of an infrared-cut filter 501D of this embodiment.

Components that are the same as those in the second embodiment are assigned the same reference numerals, and a description thereof shall be omitted.

As shown in FIG. 45, the infrared-cut filter (optical filter) 501D roughly includes three infrared-absorbing filters 503a, 503b, and 503c that absorb infrared light and infrared-cut coatings 505b that reflect infrared light.

The method of fabricating the infrared-cut filter 501D is the same as that of the second embodiment, except that the antireflection coating is not formed, and therefore, a description thereof is omitted.

Figure 46:
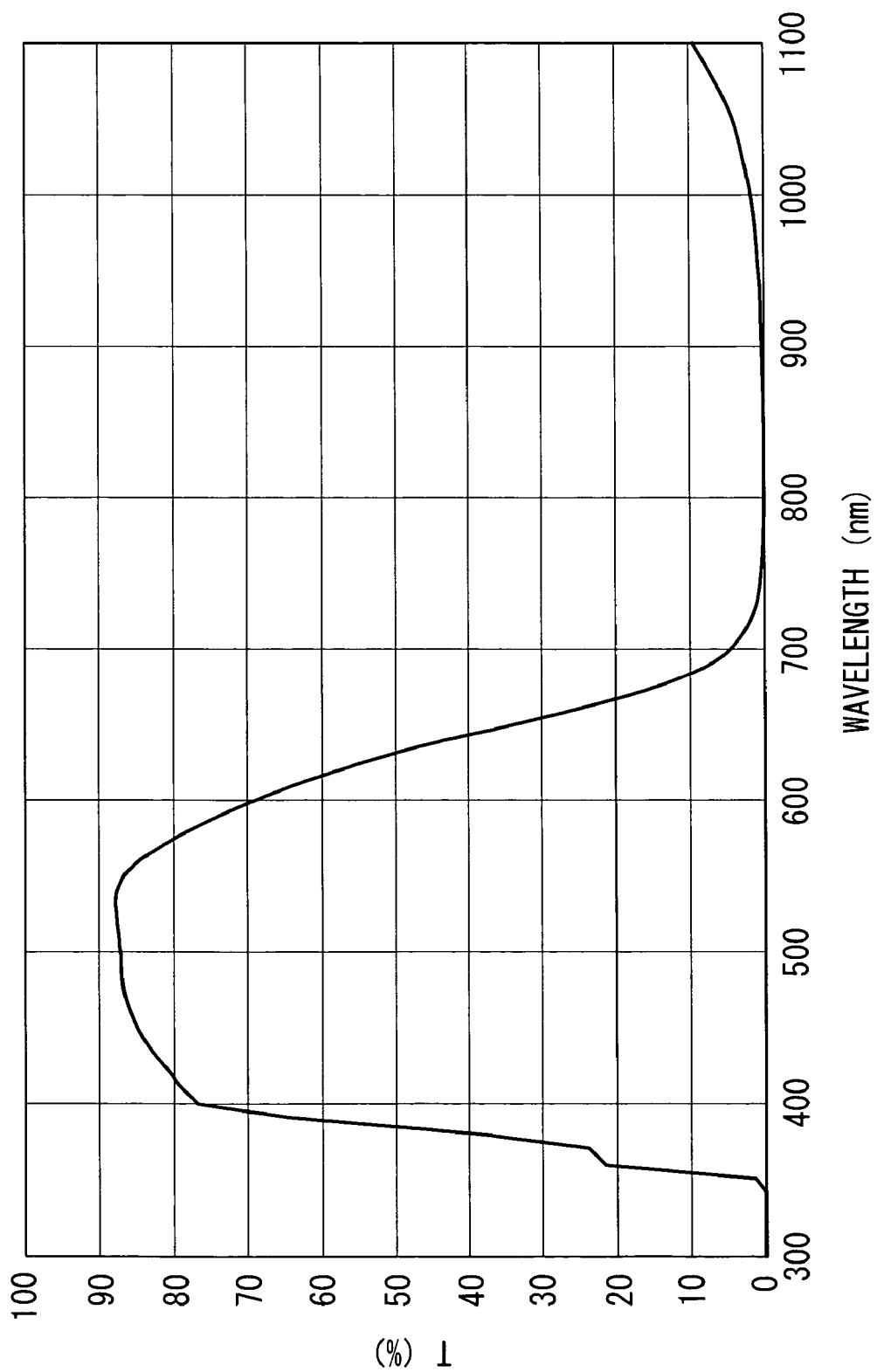
FIG. 46 is a graph showing the transmittance (T %) versus wavelength of the infrared-cut filter in FIG. 45.

Moreover, since the effects of the infrared-cut filter 501D are the same as those of the second embodiment, except for the absence of the antireflection coating, a graph showing the transmittance (T %) versus wavelength of the infrared-cut filter 501D of this embodiment is merely shown in FIG. 46, but an explanation thereof is omitted.

According to the structure described above, since the antireflection coating is not formed, compared to the infrared-cut filter 501B according to the second embodiment, the number of fabrication steps can be reduced, which allows the filter to be produced at lower cost.

Fifth Embodiment

Next, an infrared-cut filter according to a fifth embodiment of the present invention will be described with reference to the drawings.

Figure 47:
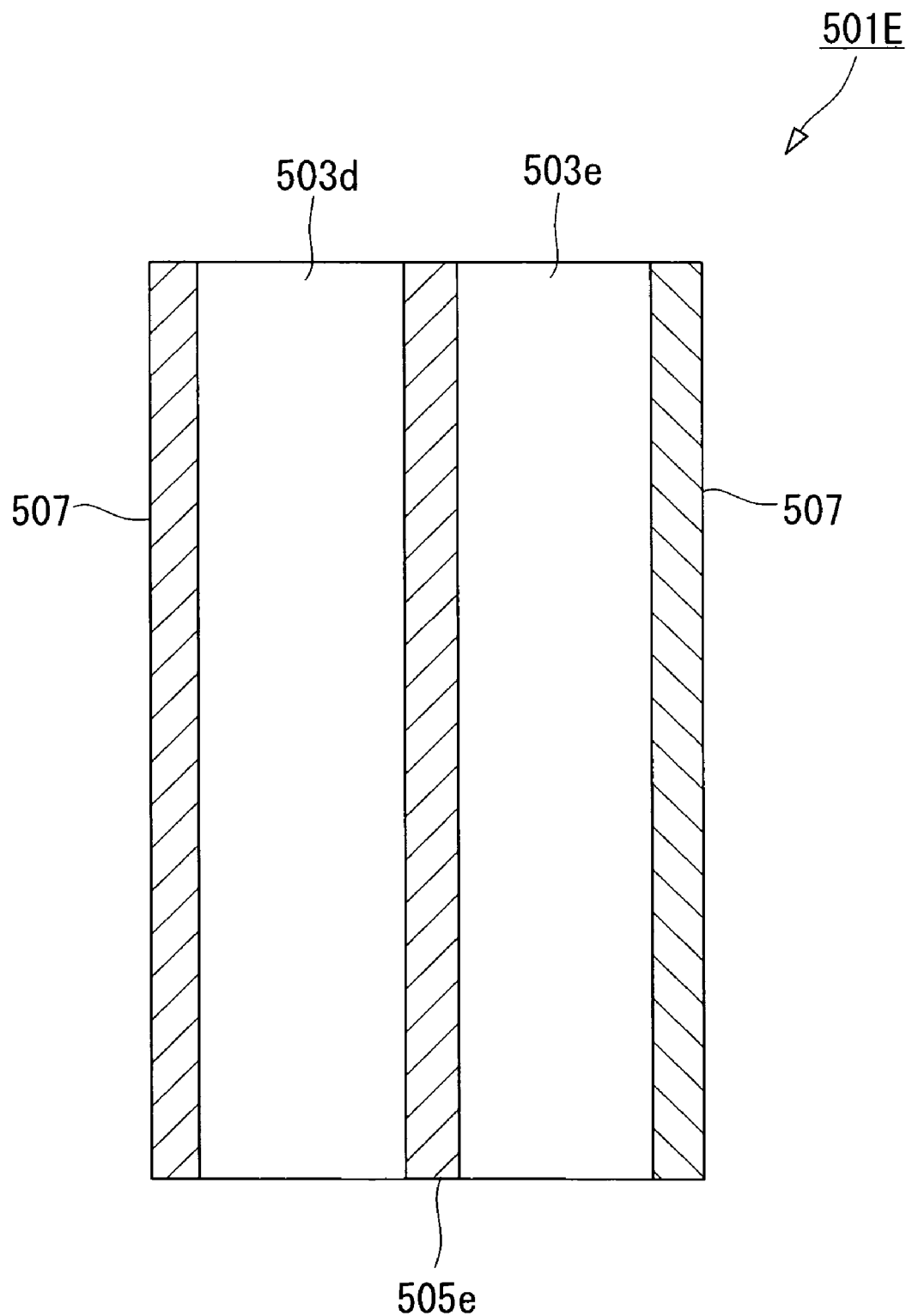
FIG. 47 is a diagram depicting the structure of an infrared-cut filter according to a fifth embodiment of the present invention.

FIG. 47 is a diagram depicting the structure of an infrared-cut filter 501E of this embodiment.

As shown in FIG. 47, the infrared-cut filter (optical filter) 501E roughly includes two substrates, namely, a substrate (first substrate) 503d and a substrate (second substrate) 503e, that are transparent at the wavelengths used, an infrared-cut coating (infrared-cut layer) 505e that reflects infrared light, and antireflection coatings 507 that suppress the reflection of light.

The substrates 503d and 503e are plate-shaped members made of glass or resin.

The infrared-cut coating 505e is formed of a multilayer film in which layers of different refractive index are alternately laminated, namely, layers of titanium oxide (TiO$_2$ thin-film layers, high refractive index) and layers of silicon oxide (SiO$_2$ thin-film layers, low refractive index). This embodiment is described in terms of a structure in which 43 layers of titanium oxide and silicon oxide are laminated. Detailed data of the infrared-cut coating 505e, such as the film thicknesses and so on, is shown in Table 22 below.

TABLE 22

| Number of layers | Film material | Optical film thickness |
|---|---|---|
| 1 | TiO$_2$ | 0.2016 × λ/4 |
| 2 | SiO$_2$ | 0.4076 × λ/4 |
| 3 | TiO$_2$ | 2.0047 × λ/4 |
| 4 | SiO$_2$ | 1.8640 × λ/4 |
| 5 | TiO$_2$ | 1.7797 × λ/4 |
| 6 | SiO$_2$ | 1.8367 × λ/4 |
| 7 | TiO$_2$ | 1.9464 × λ/4 |
| 8 | SiO$_2$ | 2.0352 × λ/4 |
| 9 | TiO$_2$ | 2.0593 × λ/4 |
| 10 | SiO$_2$ | 2.0471 × λ/4 |
| 11 | TiO$_2$ | 2.0304 × λ/4 |
| 12 | SiO$_2$ | 1.9674 × λ/4 |
| 13 | TiO$_2$ | 1.8981 × λ/4 |

TABLE 22-continued

| Number of layers | Film material | Optical film thickness |
|---|---|---|
| 14 | SiO$_2$ | 1.9177 × λ/4 |
| 15 | TiO$_2$ | 1.9730 × λ/4 |
| 16 | SiO$_2$ | 2.0189 × λ/4 |
| 17 | TiO$_2$ | 2.0235 × λ/4 |
| 18 | SiO$_2$ | 2.0018 × λ/4 |
| 19 | TiO$_2$ | 1.9238 × λ/4 |
| 20 | SiO$_2$ | 1.8170 × λ/4 |
| 21 | TiO$_2$ | 1.6788 × λ/4 |
| 22 | SiO$_2$ | 1.6623 × λ/4 |
| 23 | TiO$_2$ | 1.5680 × λ/4 |
| 24 | SiO$_2$ | 1.6010 × λ/4 |
| 25 | TiO$_2$ | 1.5277 × λ/4 |
| 26 | SiO$_2$ | 1.5767 × λ/4 |
| 27 | TiO$_2$ | 1.5108 × λ/4 |
| 28 | SiO$_2$ | 1.5674 × λ/4 |
| 29 | TiO$_2$ | 1.5015 × λ/4 |
| 30 | SiO$_2$ | 1.5644 × λ/4 |
| 31 | TiO$_2$ | 1.5026 × λ/4 |
| 32 | SiO$_2$ | 1.5641 × λ/4 |
| 33 | TiO$_2$ | 1.5072 × λ/4 |
| 34 | SiO$_2$ | 1.5684 × λ/4 |
| 35 | TiO$_2$ | 1.5162 × λ/4 |
| 36 | SiO$_2$ | 1.5819 × λ/4 |
| 37 | TiO$_2$ | 1.5411 × λ/4 |
| 38 | SiO$_2$ | 1.6161 × λ/4 |
| 39 | TiO$_2$ | 1.6057 × λ/4 |
| 40 | SiO$_2$ | 1.7557 × λ/4 |
| 41 | TiO$_2$ | 1.9164 × λ/4 |
| 42 | SiO$_2$ | 0.3997 × λ/4 |
| 43 | TiO$_2$ | 0.1920 × λ/4 |

λ = 500 nm

The method of fabricating the infrared-cut filter 501E is the same as that of the first embodiment, except that the infrared-absorbing filters 503a and 503b are replaced with the substrates 503d and 503e, and therefore, a description thereof is omitted.

The effects of the infrared-cut filter 501E described above shall be described next.

Figure 48:
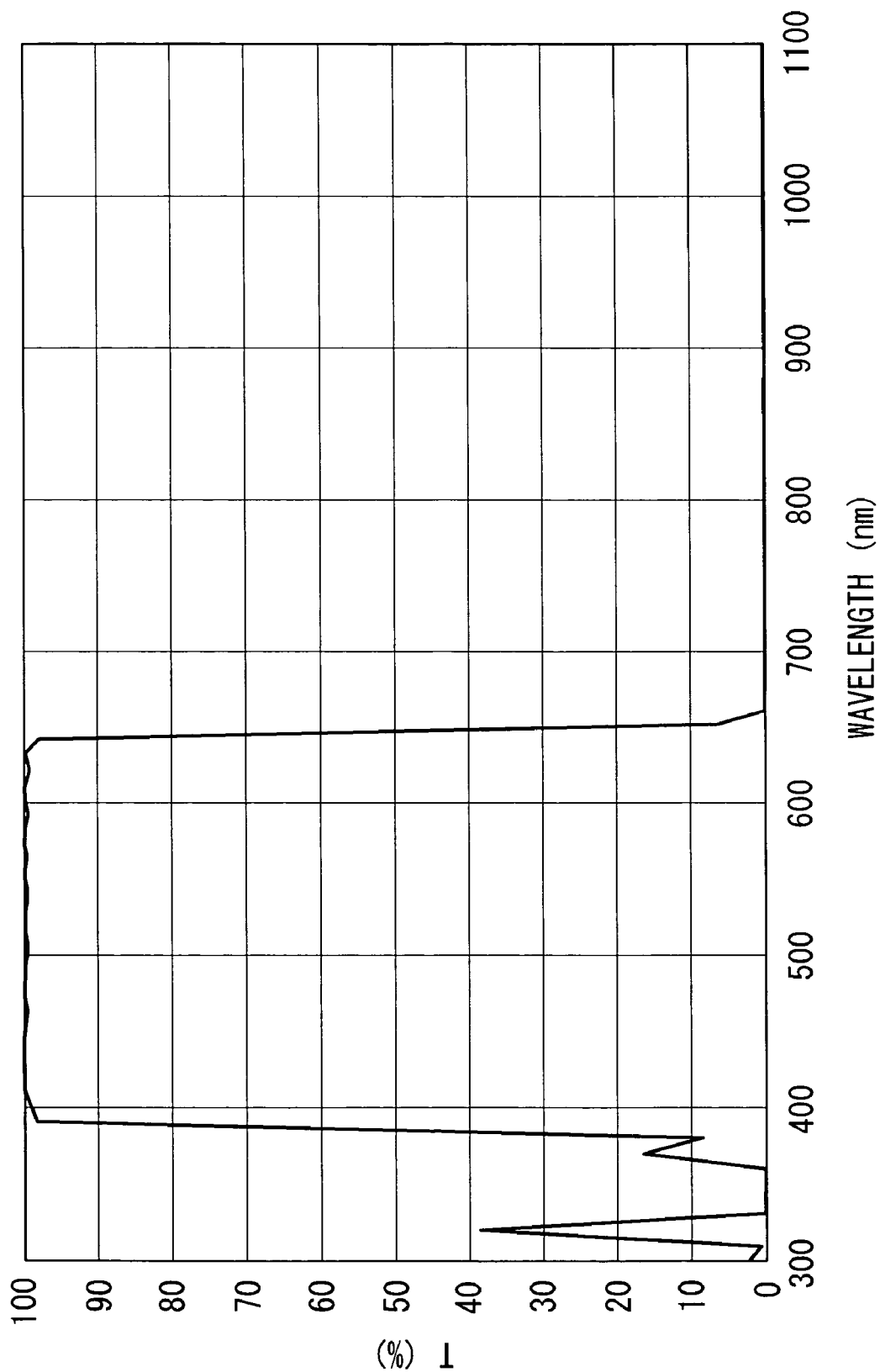
FIG. 48 is a graph showing the transmittance (T %) versus wavelength of the infrared-cut filter in FIG. 47.

FIG. 48 is a graph showing the transmittance (T %) versus wavelength of the infrared-cut filter 501E in this embodiment.

For example, light incident on the infrared-cut filter 501E from the substrate 503d side (the left side in FIG. 47) first passes through the antireflection coating 507 and enters the substrate 503d. By forming the antireflection coating 507 on the light-incident surface, it is possible to prevent reflection of the incident light at the substrate 503d.

The incident light is transmitted through the substrate 503d and some of the infrared light is reflected at the infrared-cut coating 505e. The remaining light, including infrared light, is transmitted through the infrared-cut coating 505e and the substrate 503e and is then emitted from the infrared-cut filter 501E.

Regarding the transmittance versus wavelength of the infrared-cut filter 501E which reflects infrared light in this way, as shown in FIG. 48, the transmittance of light in a wavelength range from 750 nm to 850 nm is approximately 10% or less with respect to the average transmittance for light in a wavelength range from 500 nm to 550 nm.

With the structure described above, since glass, resin, or the like that is transparent at the wavelengths used is employed as the substrates 503d and 503e, the infrared-cut filter 501E can be fabricated at low cost compared to the case in which the infrared-absorbing filters 503a and 503b are used.

Sixth Embodiment

Next, an infrared-cut filter according to a sixth embodiment of the present invention is described with reference to the drawings.

Figure 49:
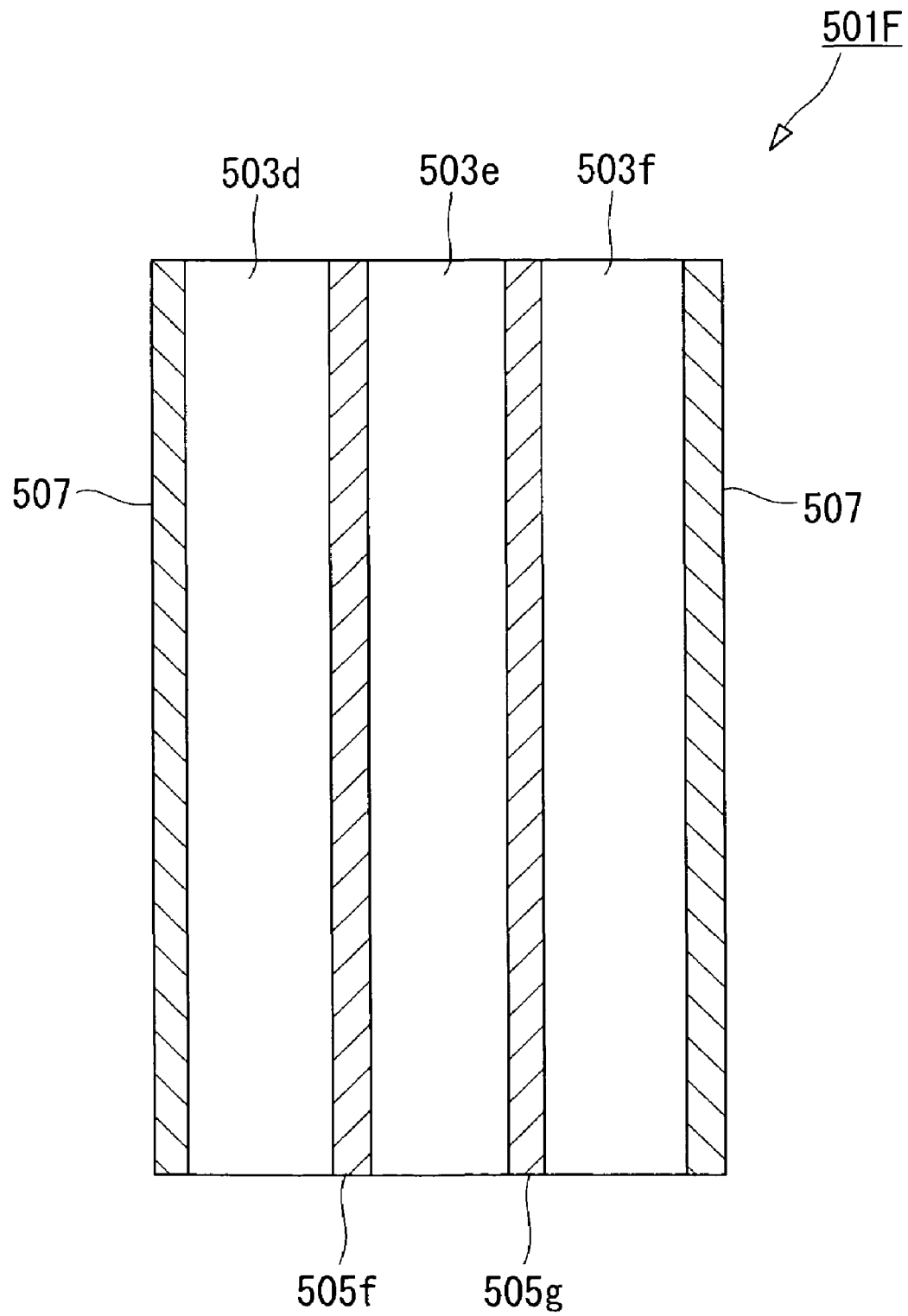
FIG. 49 is a diagram depicting the structure of an infrared-cut filter according to a sixth embodiment of the present invention.

FIG. 49 is a diagram depicting the structure of an infrared-cut filter 501F of this embodiment.

Components that are the same as those in the fifth embodiment are assigned the same reference numerals, and a description thereof shall be omitted.

As shown in FIG. 49, the infrared-cut filter (optical filter) 501F roughly includes three substrates 503d, 503e, and 503f that are transparent at the wavelengths used, infrared-cut coatings (infrared-cut layers) 505f and 505g that reflect infrared light, and antireflection coatings 507 that suppress the reflection of light.

The substrate 503f, like the substrates 503d and 503e, is a flat member that is made of glass, resin, or the like.

The infrared-cut coatings 505f and 505g are formed of multilayer films in which layers of different refractive index are alternately laminated, namely, layers of titanium oxide (TiO$_2$ thin-film layers, high refractive index) and layers of silicon oxide (SiO$_2$ thin-film layers, low refractive index). This embodiment is described in terms of a structure in which 19 layers of titanium oxide and silicon oxide are laminated.

The infrared-cut coating 505f is for cutting out short-wavelength infrared light, and the infrared cut coating 505g is for cutting out long-wavelength infrared light. Detailed data for the infrared-cut coating 505f, such as the film thicknesses and so on, is shown in Table 23 below, and detailed data of the infrared-cut coating 505g, such as the film thicknesses and so on, is shown in Table 24 below.

TABLE 23

| Number of layers | Film material | Optical film thickness |
|---|---|---|
| 1 | TiO$_2$ | 0.2226 × λ/4 |
| 2 | SiO$_2$ | 0.3827 × λ/4 |
| 3 | TiO$_2$ | 1.9452 × λ/4 |
| 4 | SiO$_2$ | 1.7734 × λ/4 |
| 5 | TiO$_2$ | 1.5889 × λ/4 |
| 6 | SiO$_2$ | 1.6197 × λ/4 |
| 7 | TiO$_2$ | 1.5222 × λ/4 |
| 8 | SiO$_2$ | 1.5886 × λ/4 |
| 9 | TiO$_2$ | 1.5051 × λ/4 |
| 10 | SiO$_2$ | 1.5776 × λ/4 |
| 11 | TiO$_2$ | 1.5051 × λ/4 |
| 12 | SiO$_2$ | 1.5886 × λ/4 |
| 13 | TiO$_2$ | 1.5222 × λ/4 |
| 14 | SiO$_2$ | 1.6197 × λ/4 |
| 15 | TiO$_2$ | 1.5889 × λ/4 |
| 16 | SiO$_2$ | 1.7734 × λ/4 |
| 17 | TiO$_2$ | 1.9452 × λ/4 |
| 18 | SiO$_2$ | 0.3827 × λ/4 |
| 19 | TiO$_2$ | 0.2226 × λ/4 |

λ = 500 nm

TABLE 24

| Number of layers | Film material | Optical film thickness |
|---|---|---|
| 1 | TiO$_2$ | 0.2390 × λ/4 |
| 2 | SiO$_2$ | 0.3858 × λ/4 |
| 3 | TiO$_2$ | 2.1242 × λ/4 |
| 4 | SiO$_2$ | 1.9891 × λ/4 |
| 5 | TiO$_2$ | 1.9157 × λ/4 |
| 6 | SiO$_2$ | 1.8802 × λ/4 |
| 7 | TiO$_2$ | 1.8004 × λ/4 |

TABLE 24-continued

| Number of layers | Film material | Optical film thickness |
|---|---|---|
| 8 | SiO$_2$ | 1.8490 × λ/4 |
| 9 | TiO$_2$ | 1.8111 × λ/4 |
| 10 | SiO$_2$ | 1.8196 × λ/4 |
| 11 | TiO$_2$ | 1.8111 × λ/4 |
| 12 | SiO$_2$ | 1.8490 × λ/4 |
| 13 | TiO$_2$ | 1.8004 × λ/4 |
| 14 | SiO$_2$ | 1.8802 × λ/4 |
| 15 | TiO$_2$ | 1.9157 × λ/4 |
| 16 | SiO$_2$ | 1.9891 × λ/4 |
| 17 | TiO$_2$ | 2.1242 × λ/4 |
| 18 | SiO$_2$ | 0.3858 × λ/4 |
| 19 | TiO$_2$ | 0.2390 × λ/4 |

λ = 500 nm

The method of fabricating the infrared-cut filter 501F is the same as that of the fifth embodiment, and therefore, a description thereof is omitted.

Next, the effects of the infrared-cut filter 501F shall be described.

Figure 50:
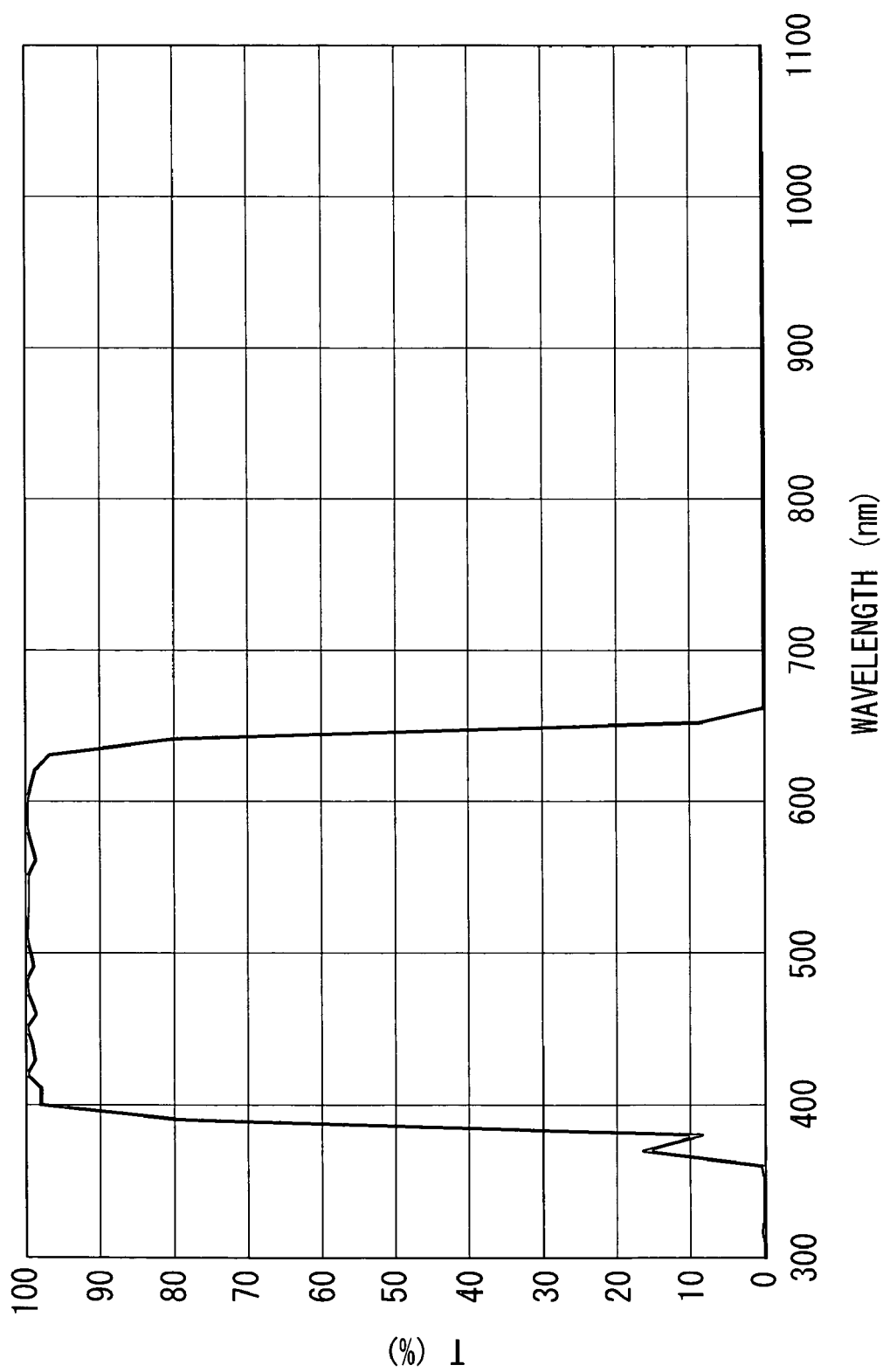
FIG. 50 is a graph showing the transmittance (T %) versus wavelength of the infrared-cut filter in FIG. 49.

FIG. 50 is a graph showing the transmittance (T %) versus wavelength of the infrared-cut filter 501F in this embodiment.

For example, light incident on the infrared-cut filter 501F from the substrate 503d side (the left side in FIG. 49) first passes through the antireflection coating 507 and enters the substrate 503d. By forming the antireflection coating 507 on the light-incident face, it is possible to prevent reflection of the incident light at the substrate 503d.

The incident light is transmitted through the substrate 503d and some of the short-wavelength infrared light is reflected at the infrared-cut coating 505f. The remaining light, including infrared light, is transmitted through the infrared-cut coating 505f and the substrate 505e. The light transmitted through the substrate 503e is incident on the infrared-cut coating 505g, which reflects some of the long-wavelength infrared light, and the remaining light, including infrared light, is transmitted through the infrared-cut coating 505g and the substrate 503f and is emitted from the infrared-cut filter 501F.

Regarding the transmittance versus wavelength of the infrared-cut filter 501F which reflects infrared light in this way, as shown in FIG. 50, the transmittance for light in a wavelength range from 750 nm to 850 nm is approximately 10% or less with respect to the average transmittance for light in a wavelength range from 500 nm to 550 nm.

In addition, as shown in FIG. 50, the infrared-cut filter 501F can transmit ultraviolet light having wavelengths of about 360 nm and above.

Using the infrared-cut coating 505f and the infrared cut coating 505g, which have different infrared reflectance characteristics, allows the characteristic of the infrared-cut filter 501F to be designed with a greater degree of flexibility compared to a case in which only one infrared-cut coating is used.

Figure 51:
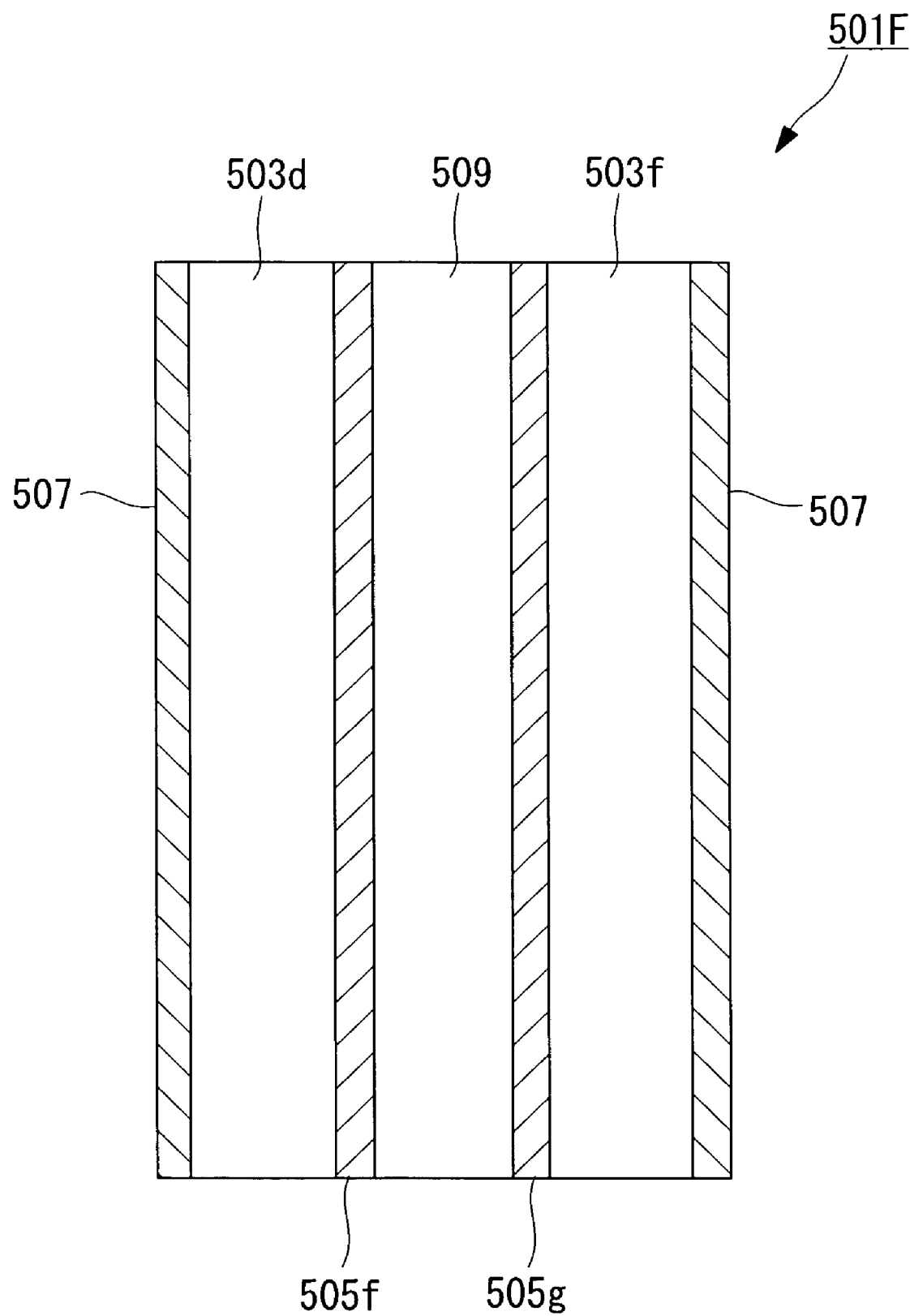
FIG. 51 is a diagram depicting the structure of another embodiment of the infrared-cut filter in FIG. 49.

It is possible to use a structure in which the substrate 503e is disposed between the infrared-cut coating 505f and the infrared-cut coating 505g, as described above, or alternatively, as shown in FIG. 51, it is possible to use a structure in which a joining layer 509 is disposed between the infrared-cut coating 505f and the infrared-cut coating 505g. In such a case, it is preferable that the joining layer 509 be a material that is transparent at the wavelengths used, and it is preferable that it be formed with a sufficient thickness such that the infrared-cut coatings 505f and 505g are not affected.

Seventh Embodiment

Next, an infrared-cut filter according to a seventh embodiment of the present invention will be described with reference to the drawings.

Figure 58:
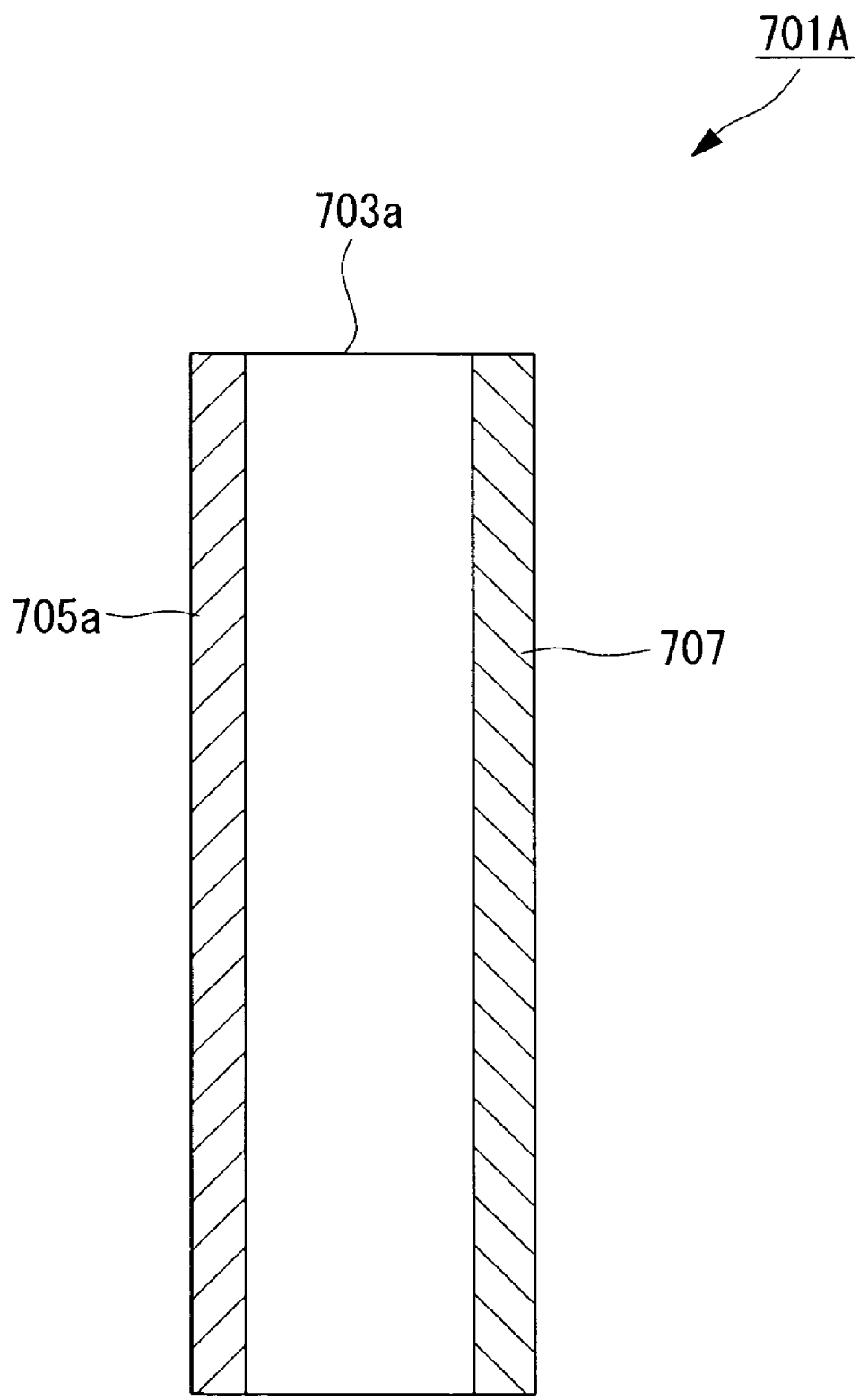
FIG. 58 is a diagram depicting the structure of an infrared-cut filter according to a seventh embodiment of the present invention.

FIG. 58 is a diagram depicting the structure of an infrared-cut filter 701A of this embodiment.

As shown in FIG. 58, the infrared-cut filter (optical filter) 701A roughly includes an infrared-absorbing filter (substrate) 703a, which is a substrate that absorbs infrared light, an infrared-cut coating (infrared-cut layer) 705a that reflects infrared light, and an antireflection coating (antireflection layer) 707 that suppress the reflection of light.

The infrared-absorbing filter 703a is a flat member made of a resin, such as plastic or the like, for example, Lumicle (registered trademark) manufactured by Kureha Chemical Industries Co., Ltd. Forming the infrared-absorbing filter 703a of resin allows the infrared-cut filter 701A to be reduced in weight and to be fabricated at lower cost.

The infrared-cut coating 705a is formed of a multilayer film in which layers of different refractive index are alternately laminated by vapor deposition, namely, layers of titanium oxide (TiO$_2$ thin-film layers) and layers of silicon oxide (SiO$_2$ thin-film layers). This embodiment is described in terms of a structure in which 14 layers of titanium oxide and silicon oxide are laminated, the total film thickness of the infrared-cut coating 705a being 1.49 μm. Detailed data for the infrared-cut coating 705a, including the film thicknesses and so on, is shown in Table 25 below.

TABLE 25

| Number of layers | Film material | Optical film thickness |
|---|---|---|
| 1 | TiO$_2$ | 0.1445 × λ/4 |
| 2 | SiO$_2$ | 2.1660 × λ/4 |
| 3 | TiO$_2$ | 1.7860 × λ/4 |
| 4 | SiO$_2$ | 1.7289 × λ/4 |
| 5 | TiO$_2$ | 1.5588 × λ/4 |
| 6 | SiO$_2$ | 1.6738 × λ/4 |
| 7 | TiO$_2$ | 1.5482 × λ/4 |
| 8 | SiO$_2$ | 1.6522 × λ/4 |
| 9 | TiO$_2$ | 1.5746 × λ/4 |
| 10 | SiO$_2$ | 1.6523 × λ/4 |
| 11 | TiO$_2$ | 1.6321 × λ/4 |
| 12 | SiO$_2$ | 1.7186 × λ/4 |
| 13 | TiO$_2$ | 1.6774 × λ/4 |
| 14 | SiO$_2$ | 0.8775 × λ/4 |

λ = 500 nm

The antireflection coating 707 is formed by alternately laminating layers of different refractive index by vapor deposition, namely, layers of titanium oxide (TiO$_2$ thin-film layers) and layers of silicon oxide (SiO$_2$ thin-film layers). This embodiment is described in terms of a structure in which 5 layers of titanium oxide and silicon oxide are laminated, the total film thickness of the antireflection coating 707 being 0.34 μm. Detailed data for the antireflection coating 707, including the film thicknesses and so on, is shown in Table 26 below.

TABLE 26

| Number of layers | Film material | Optical film thickness |
|---|---|---|
| 1 | SiO$_2$ | 1.3584 × λ/4 |
| 2 | TiO$_2$ | 0.1824 × λ/4 |
| 3 | SiO$_2$ | 0.3985 × λ/4 |

TABLE 26-continued

| Number of layers | Film material | Optical film thickness |
|---|---|---|
| 4 | TiO$_2$ | 1.9257 × λ/4 |
| 5 | SiO$_2$ | 0.9413 × λ/4 |

λ = 500 nm

The ratio of the film thickness of the antireflection coating 707 to the film thickness of the infrared-cut coating 705a, that is, 0.34 μm/1.49 μm=0.228, satisfies condition (11) below.

$$0.05 \leq (\text{layer thickness } AR)/(\text{layer thickness } IR) \leq 1 \quad (11)$$

Here, layer thickness AR is the thickness of the antireflection layer, and layer thickness IR is the thickness of the infrared-cut layer.

Accordingly, the stress acting on the infrared-absorbing filter 703a due to the infrared-cut coating 705a and the stress acting on the infrared-absorbing filter 703a due to the antireflection coating 707 cancel each other out, which enables deformation of the infrared-absorbing filter 703a to be kept within a predetermined range. As a result, the angle of incidence of light to the infrared-cut filter 701A can be kept within a predetermined angular range, which allows deterioration of the transmission characteristics and so on of the infrared-cut filter 701A to be prevented.

The ratio of the number of layers in the infrared-cut coating 705a to the number of layers in the antireflection coating 707, namely, 14/5=2.8, satisfies condition (12) below.

$$1 < (\text{number of layers } IR)/(\text{number of layers } AR) \leq 5 \quad (12)$$

Here, number of layers IR is the number of layers in the infrared-cut coating, and number of layers AR is the number of layers in the antireflection coating.

Accordingly, the stress acting on the infrared-absorbing filter 703a due to the infrared-cut coating 705a and the stress acting on the infrared-absorbing filter 703a due to the antireflection coating 707 cancel each other out, which allows deformation of the infrared-absorbing filter 703a to be kept within a predetermined range. As a result, the angle of incidence of light to the infrared-cut filter 701A can be kept within a predetermined angular range, which allows deterioration of the transmission characteristics and so on of the infrared-cut filter 701A to be prevented.

Next, the stress acting on the infrared-absorbing filter 703a, which is a substrate, will be explained.

Figure 59A:
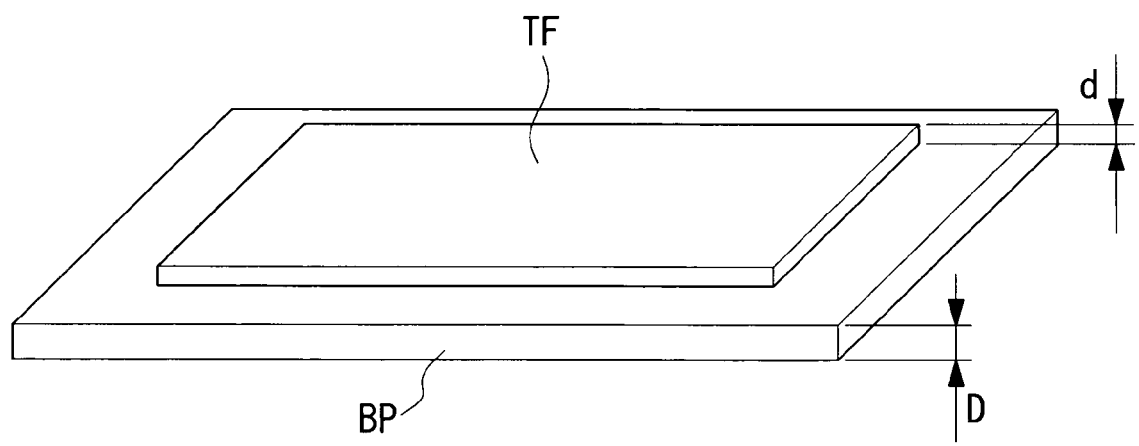
FIG. 59A is a diagram depicting a computational model used in calculating the stress acting on a thin substrate having a thin film formed on one surface thereof.
Figure 59B:
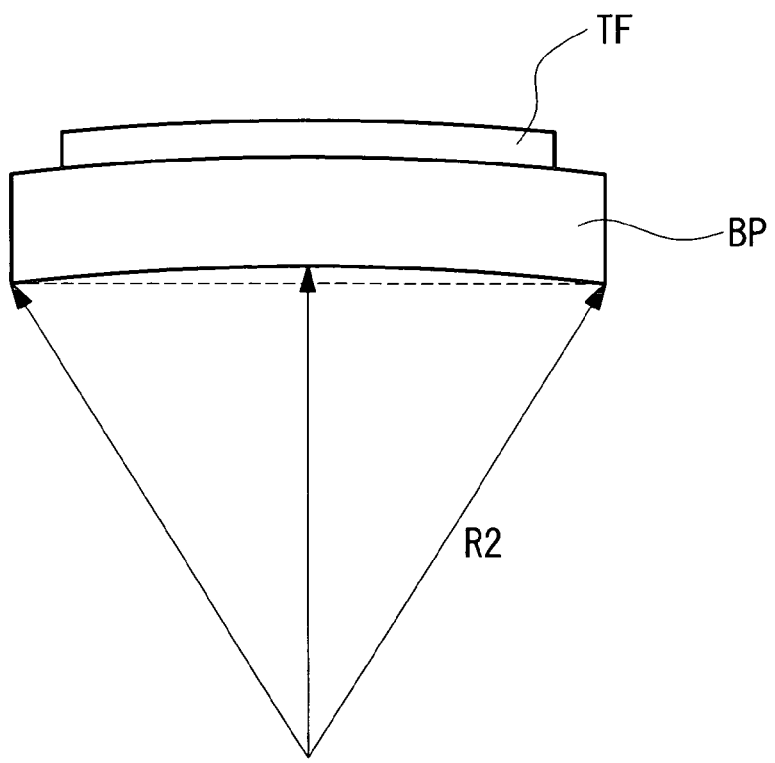
FIG. 59B is a diagram depicting the computational model used when calculating the stress acting on the thin substrate having the thin film formed on one surface thereof

FIGS. 59A and 59B are diagrams depicting a calculation model used when calculating the stress acting on a laminar substrate having a thin film formed on one surface thereof. FIG. 59A is a perspective view taken from above the laminar substrate, and FIG. 59B is a side view taken from a side surface of the laminar substrate.

For the sake of simplifying the explanation, as shown in FIGS. 59A and 59B, when the infrared-absorbing filter 703a defines a strip-shaped laminar substrate BP having thickness D, and a thin film TF having thickness d is formed on one surface of this laminar substrate BP, the stress a produced in the longitudinal direction of the laminar substrate BP will be explained.

The relationship between stress σ, substrate thickness D, film thickness d, and other parameters can be represented by expression (14) shown below. 1/R in expression (14) can be obtained using the radius of curvature R1 of the substrate BP before forming the thin film TF and the radius of curvature R2 of the substrate BP after forming the thin film TF, from expression (15).

$$\frac{1}{R} = \frac{6d(1 - vs)}{E_S(D^2)} \sigma \quad (14)$$

Here, d is the film thickness of the thin film TF, vs is Poisson's ratio, Es is Young's modulus, D is the thickness of the substrate BP, and R is the radius of curvature given by expression (15).

$$\frac{1}{R} = \frac{1}{R2} - \frac{1}{R1} \quad (15)$$

Here, R1 is the radius of curvature of the substrate BP before forming the thin film TF, and R2 is the radius of curvature of the substrate BP after forming the thin film TF.

If the substrate BP is flat before forming the thin film TF, R1 is infinitely large, and so 1/R1≈0. R2 can be obtained from the amount of warpage of the substrate.

When the stress produced by the thin film TF is a compressive stress, as shown in FIG. 59B, warping occurs such that the surface on which the thin film TF is formed becomes curved in a convex shape, and conversely, if a tensile stress is produced, warping occurs such that the surface on which the thin film TF is formed becomes curved in a concave shape.

Since the film stress produced in the thin film depends on the method used to form the film, the relationship between the film stress and the film-forming method shall be described below.

If the thin film is formed using vapor deposition, the film stress differs depending on the kind of film formation used. For example, when forming silicon oxide (SiO2) layers, a compressive stress is produced, but when introducing oxygen and forming titanium oxide (TiO2) layers, a tensile stress is produced. Therefore, in the infrared-cut coating 705a and the antireflection coating 707 of this embodiment, which are formed by laminating silicon oxide layers and titanium oxide layers, the compressive stress and the tensile stress are balanced out, and the overall film stress can thus be reduced.

When forming films using a method in which high-density films are formed, such as ion plating, ion-assisted vapor deposition, sputtering, and so forth, a large compressive stress is produced in both silicon oxide layers and titanium oxide layers. Therefore, the overall compressive stress produced in the infrared-cut coating 705 and the antireflection coating 707 of this embodiment would become large.

Next, the effects of the infrared-cut filter 701A discussed above will be described.

For example, light incident on the infrared-cut filter 701 from the antireflection coating 707 side (the right side in FIG. 58) first passes through the antireflection coating 707 and enters the infrared-absorbing filter 703a. By forming the antireflection coating 707 on the light-incident surface, reflection of the incident light at the infrared-absorbing filter 703a can be prevented.

Some of the infrared light in the incident light is absorbed in the infrared-absorbing filter 703a, and the remaining light is transmitted through the infrared-absorbing filter 703a and is incident on the infrared-cut coating 705a. Some of the infrared light transmitted through the infrared-absorbing filter 703a is reflected at the infrared-cut coating 705a, and the remaining light, including infrared light, is emitted from the infrared-cut filter 701A.

Figure 60:
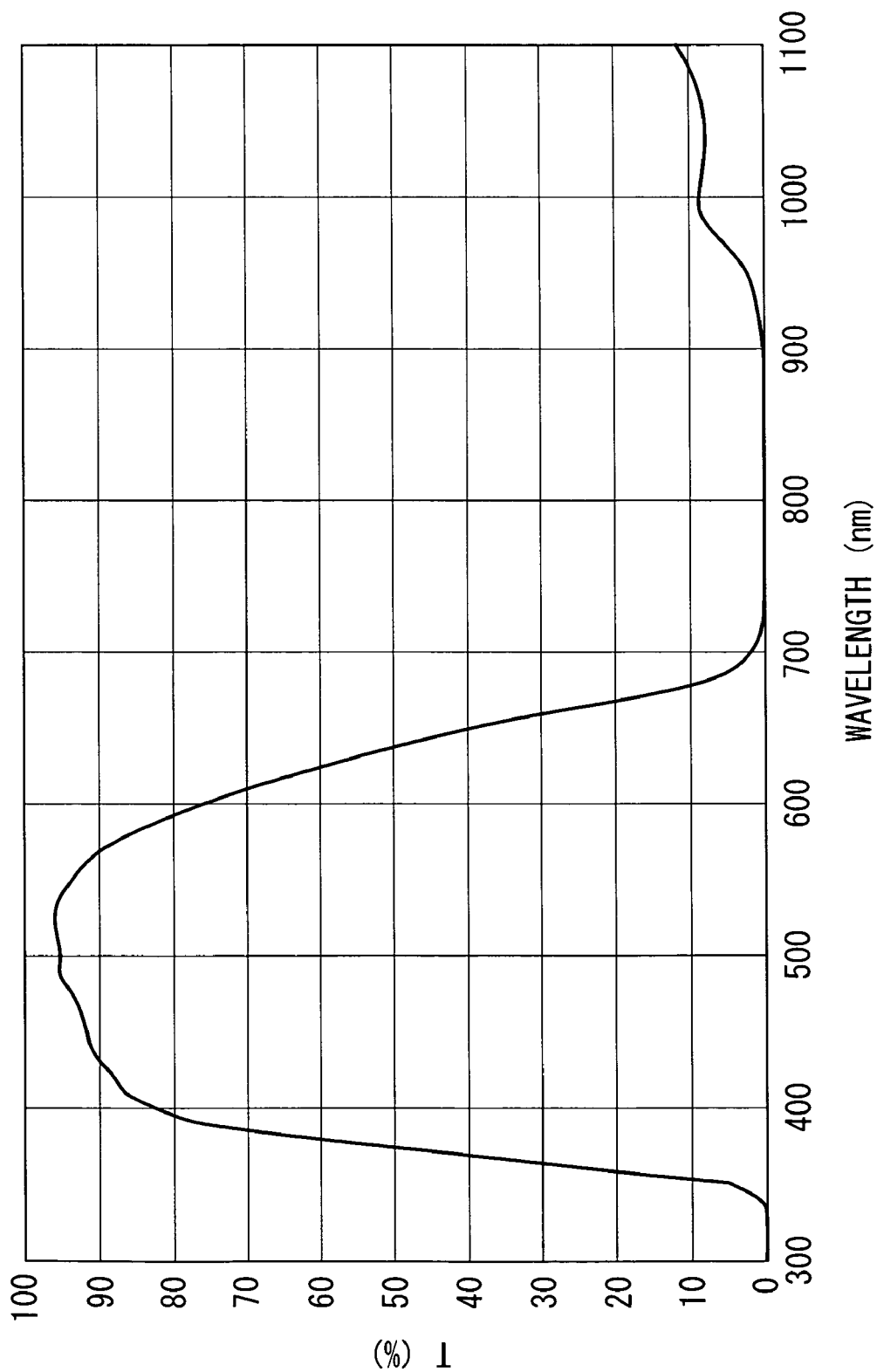
FIG. 60 is a graph showing the transmittance (T %) versus wavelength of the infrared-cut filter in FIG. 58.

FIG. 60 is a graph showing the transmittance (T %) versus wavelength of the infrared-cut filter 701A in this embodiment.

Regarding the transmittance versus wavelength of the infrared-cut filter 701A, which absorbs and reflects infrared light in this way, as shown in FIG. 60, the transmittance for light in a wavelength range of 750 nm to 850 nm is approximately 10% or less with respect to the average transmittance for light in a wavelength range of 500 nm to 550 nm.

According to the structure described above, by using the infrared-absorbing filter 703a, which absorbs infrared light, some of the infrared light to be cut in the infrared-cut filter 701A can be absorbed in the infrared-absorbing filter 703a, and the rest can be reflected at the infrared-cut coating 705a. As a result, with the infrared-cut filter 701A, infrared light can be satisfactorily cut, the infrared reflection characteristics required by the infrared-cut coating 705a can be relaxed, and the number of layers in the infrared-cut coating 705a can be reduced. Accordingly, the infrared-cut filter 701A can be made thinner and more compact.

In addition, since the number of layers in the infrared-cut coating 705a can be reduced, it is possible to reduce the stress acting on the infrared-cut filter 701A, and deformation of the infrared-absorbing filter 703a due to the antireflection coating 707 can be compensated for. Therefore, light can be made incident on the infrared-cut filter 701A substantially perpendicularly, which allows deterioration of the transmission characteristics of the infrared-cut filter 701A to be prevented.

Eighth Embodiment

Next, an infrared-cut filter according to an eighth embodiment of the present invention will be described with reference to the drawings.

Figure 61:
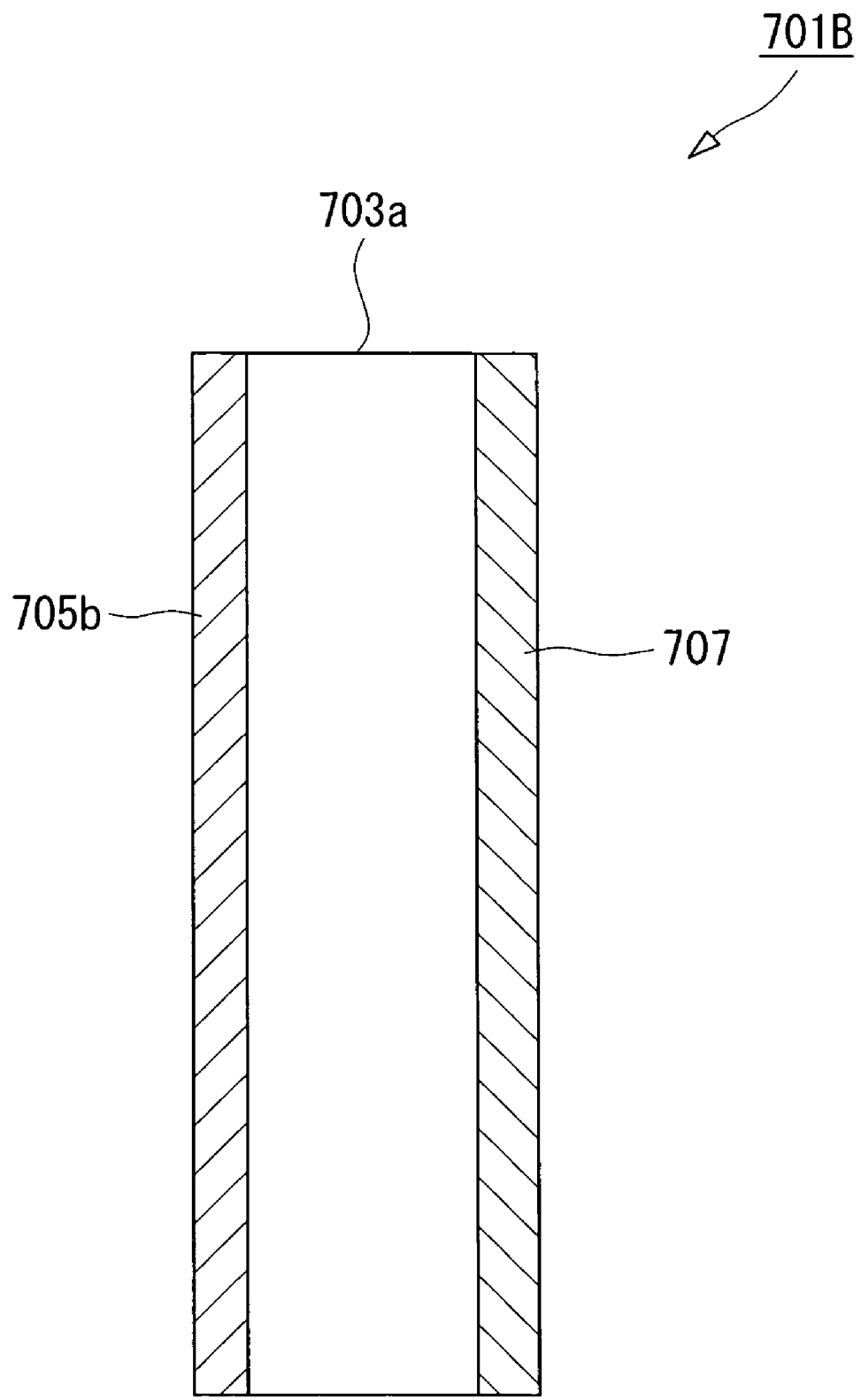
FIG. 61 is a diagram depicting the structure of an infrared-cut filter according to an eighth embodiment of the present invention.

FIG. 61 is a diagram depicting the structure of an infrared-cut filter 701B in this embodiment.

Components that are the same as those in the seventh embodiment are assigned the same reference numerals, and a description thereof shall be omitted.

As shown in FIG. 61, the infrared-cut filter (optical filter) 701B roughly includes, an infrared-absorbing filter 703a, which is a substrate that absorbs infrared light, an infrared-cut coating (infrared-cut layer) 705b that reflects infrared light, and an antireflection coating 707 that suppresses the reflection of light.

The infrared-cut coating 705b is formed of a multilayer film in which layers of different refractive index are alternately laminated, namely, layers of titanium oxide (TiO$_2$ thin-film layers) and layers of silicon oxide (SiO$_2$ thin-film layers). This embodiment is described in terms of a structure in which 12 layers of titanium oxide and silicon oxide are laminated, the total film thickness of the infrared-cut coating 705b being 1.19 μm. Detailed data for the infrared-cut coating 705b, including the film thicknesses and so on, is shown in Table 27 below.

TABLE 27

| Number of layers | Film material | Optical film thickness |
|---|---|---|
| 1 | TiO$_2$ | 0.2005 × λ/4 |
| 2 | SiO$_2$ | 0.3968 × λ/4 |
| 3 | TiO$_2$ | 1.9451 × λ/4 |

TABLE 27-continued

| Number of layers | Film material | Optical film thickness |
|---|---|---|
| 4 | SiO$_2$ | 1.8263 × λ/4 |
| 5 | TiO$_2$ | 1.7002 × λ/4 |
| 6 | SiO$_2$ | 1.7079 × λ/4 |
| 7 | TiO$_2$ | 1.6438 × λ/4 |
| 8 | SiO$_2$ | 1.7107 × λ/4 |
| 9 | TiO$_2$ | 1.6705 × λ/4 |
| 10 | SiO$_2$ | 1.7717 × λ/4 |
| 11 | TiO$_2$ | 1.7196 × λ/4 |
| 12 | SiO$_2$ | 0.8856 × λ/4 |

λ = 500 nm

The ratio of the film thickness of the antireflection coating 707 to the film thickness of the infrared-cut coating 705b, namely, 0.34 μm/1.19 μm=0.286, satisfies condition (11) above.

As a result, the stress acting on the infrared-absorbing filter 703a due to the infrared-cut coating 705b and the stress acting on the infrared-absorbing filter 703a due to the antireflection coating 707 cancel each other out, and it is thus possible to keep the deformation of the infrared-absorbing filter 703a to within a predetermined range. Accordingly, the angle of incidence of light to the infrared-cut filter 701B can be kept within a predetermined angular range, which allows deterioration of the transmittance characteristics and so forth of the infrared-cut filter 701B to be prevented.

The ratio of the number of layers in the infrared-cut coating 705b to the number of layers in the antireflection coating 707, namely, 12/5=2.4, satisfies condition (13) below.

$$1 < (\text{number of layers } IR)/(\text{number of layers } AR) \leq 2.5 \quad (13)$$

Here, number of layers IR is the number of layers in the infrared-cut layer, and number of layers AR is the number of layers in the antireflection layer.

As a result, the stress acting on the infrared-absorbing filter 703a due to the infrared-cut coating 705b and the stress acting on the infrared-absorbing filter 703a due to the antireflection coating 707 balance each other out, which allows deformation of the infrared-absorbing filter 703a to be kept within a more narrow predetermined range. Accordingly, the angle of incidence of light to the infrared-cut filter 701B can be kept within a predetermined angular range, which allows deterioration of the transmittance characteristics and so forth of the infrared-cut filter 701B to be prevented more effectively.

Figure 62:
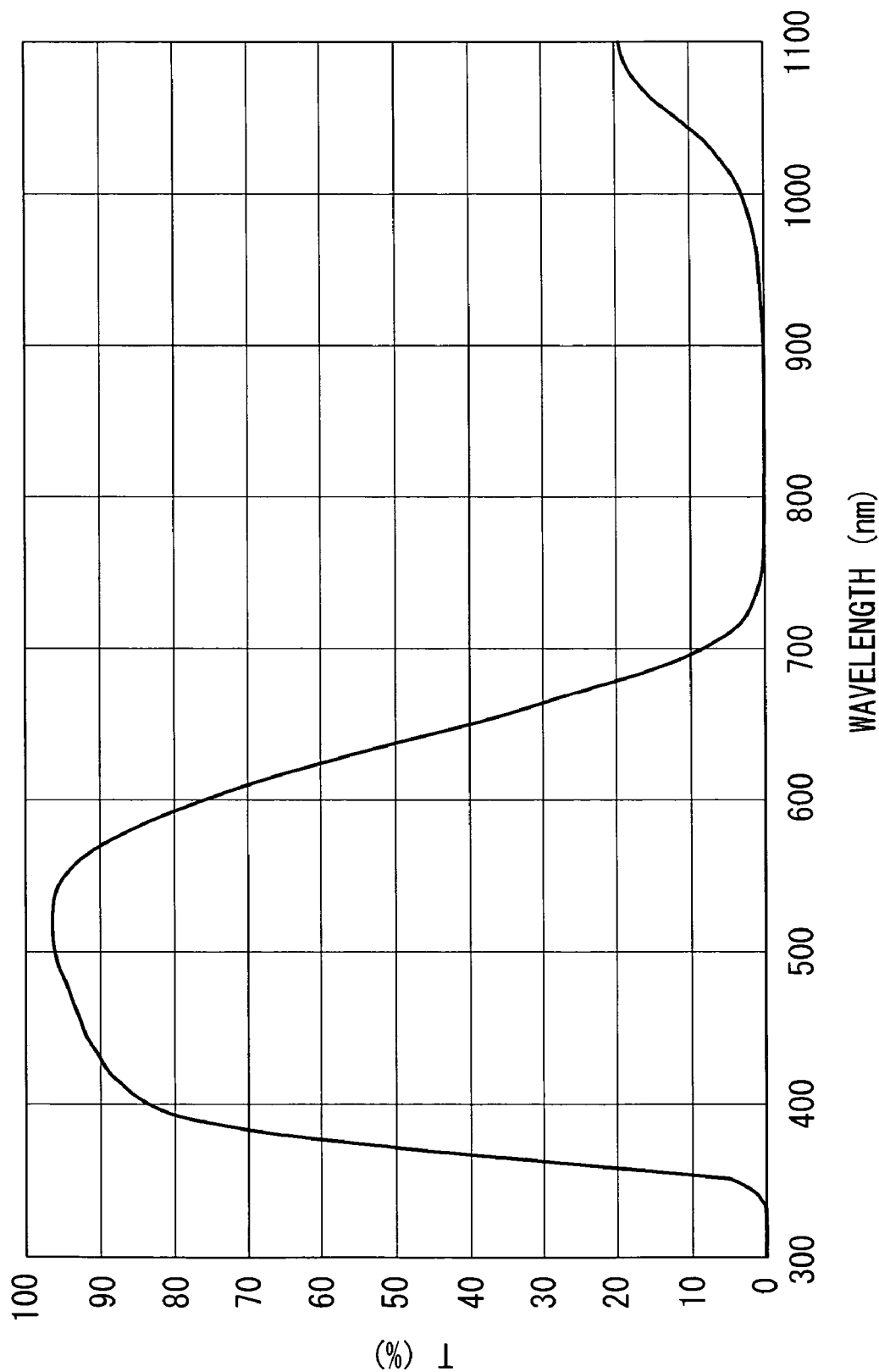
FIG. 62 is a graph showing the transmittance versus wavelength (T %) of the infrared-cut filter in FIG. 61.

The effects of the infrared-cut filter 701B are the same as those of the seventh embodiment, except that the infrared-cut coating 705a having a 14-layer multilayer film structure is replaced with the infrared-cut coating 705b having a 12-layer multilayer film structure. Therefore, a graph showing the transmittance (T %) versus wavelength of the infrared-cut filter 701B according to this embodiment is merely shown in FIG. 62, but an explanation thereof is omitted.

According to the structure described above, by using the infrared-cut coating 705b which is thinner than the infrared-cut coating 705a according to the seventh embodiment, the infrared-cut filter 701B can be made more compact and thinner. Also, since it is possible to prevent deformation of the infrared-cut filter 701B, deterioration of the transmittance characteristics and so forth of the infrared-cut filter 701B can be prevented more effectively.

Ninth Embodiment

Next, an infrared-cut filter according to a ninth embodiment of the present invention will be described with reference to the drawings.

Figure 63:
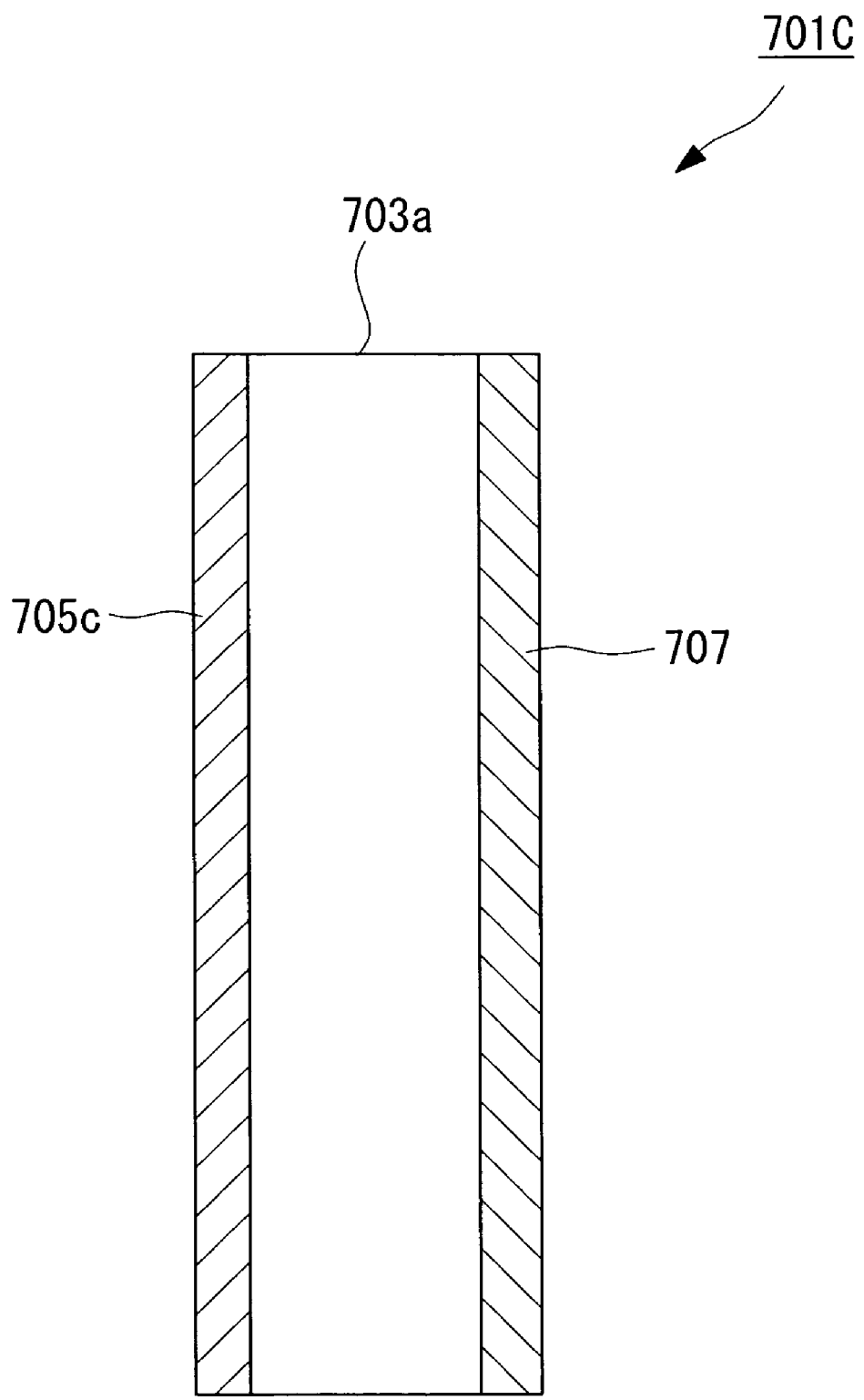
FIG. 63 is a diagram depicting the structure of an infrared-cut filter according to a ninth embodiment of the present invention.

FIG. 63 is diagram depicting the structure of an infrared-cut filter 701C of this embodiment.

Components that are the same as those in the seventh embodiment are assigned the same reference numerals, and a description thereof shall be omitted.

As shown in FIG. 63, the infrared-cut filter (optical filter) 701C roughly includes an infrared-absorbing filter 703a, which is a substrate that absorbs infrared light, an infrared-cut coating (infrared-cut layer) 705c that reflects infrared light, and an antireflection coating 707 that suppresses the reflection of light.

The infrared-cut coating 705c is formed of a multilayer film in which layers of different refractive index are alternately laminated by vapor deposition, namely, layers of titanium oxide ($TiO_2$ thin-film layers) and layers of silicon oxide ($SiO_2$ thin-film layers). This embodiment is described in terms of a structure in which 22 layers of titanium oxide and silicon oxide are laminated, the total film thickness of the infrared-cut coating 705c being 2.49 µm. Detailed data for the infrared-cut coating 705c, including the film thicknesses and so on, is shown in Table 28 below.

TABLE 28

| Number of layers | Film material | Optical film thickness |
|---|---|---|
| 1 | $TiO_2$ | $0.1774 \times \lambda/4$ |
| 2 | $SiO_2$ | $0.4117 \times \lambda/4$ |
| 3 | $TiO_2$ | $1.9131 \times \lambda/4$ |
| 4 | $SiO_2$ | $1.7815 \times \lambda/4$ |
| 5 | $TiO_2$ | $1.6431 \times \lambda/4$ |
| 6 | $SiO_2$ | $1.6967 \times \lambda/4$ |
| 7 | $TiO_2$ | $1.5894 \times \lambda/4$ |
| 8 | $SiO_2$ | $1.6723 \times \lambda/4$ |
| 9 | $TiO_2$ | $1.5815 \times \lambda/4$ |
| 10 | $SiO_2$ | $1.6716 \times \lambda/4$ |
| 11 | $TiO_2$ | $1.6433 \times \lambda/4$ |
| 12 | $SiO_2$ | $1.7244 \times \lambda/4$ |
| 13 | $TiO_2$ | $1.8016 \times \lambda/4$ |
| 14 | $SiO_2$ | $1.9557 \times \lambda/4$ |
| 15 | $TiO_2$ | $2.0481 \times \lambda/4$ |
| 16 | $SiO_2$ | $2.0617 \times \lambda/4$ |
| 17 | $TiO_2$ | $2.0616 \times \lambda/4$ |
| 18 | $SiO_2$ | $2.0617 \times \lambda/4$ |
| 19 | $TiO_2$ | $2.0696 \times \lambda/4$ |
| 20 | $SiO_2$ | $2.0233 \times \lambda/4$ |
| 21 | $TiO_2$ | $1.9799 \times \lambda/4$ |
| 22 | $SiO_2$ | $0.9976 \times \lambda/4$ |

$\lambda = 500$ nm

The ratio of the film thickness of the antireflection coating 707 to the film thickness of the infrared-cut coating 705c, namely, 0.34 µm/2.49 µm=0.137, satisfies condition (11) above.

As a result, the stress acting on the infrared-absorbing filter 703a due to the infrared-cut coating 705c and the stress acting on the infrared-absorbing filter 703a due to the antireflection coating 707 cancel each other out, which allows the deformation of the infrared-absorbing filter 703a to be kept within a predetermined range. Accordingly, the angle of incidence of light to the infrared-cut filter 701C can be kept within a predetermined angular range, which allows the deterioration of the transmittance characteristics and so forth of the infrared-cut filter 701C to be prevented.

The ratio of the number of layers in the infrared-cut coating 705c to the number of layers in the antireflection coating 707 is 14/5=4.4.

Figure 64:
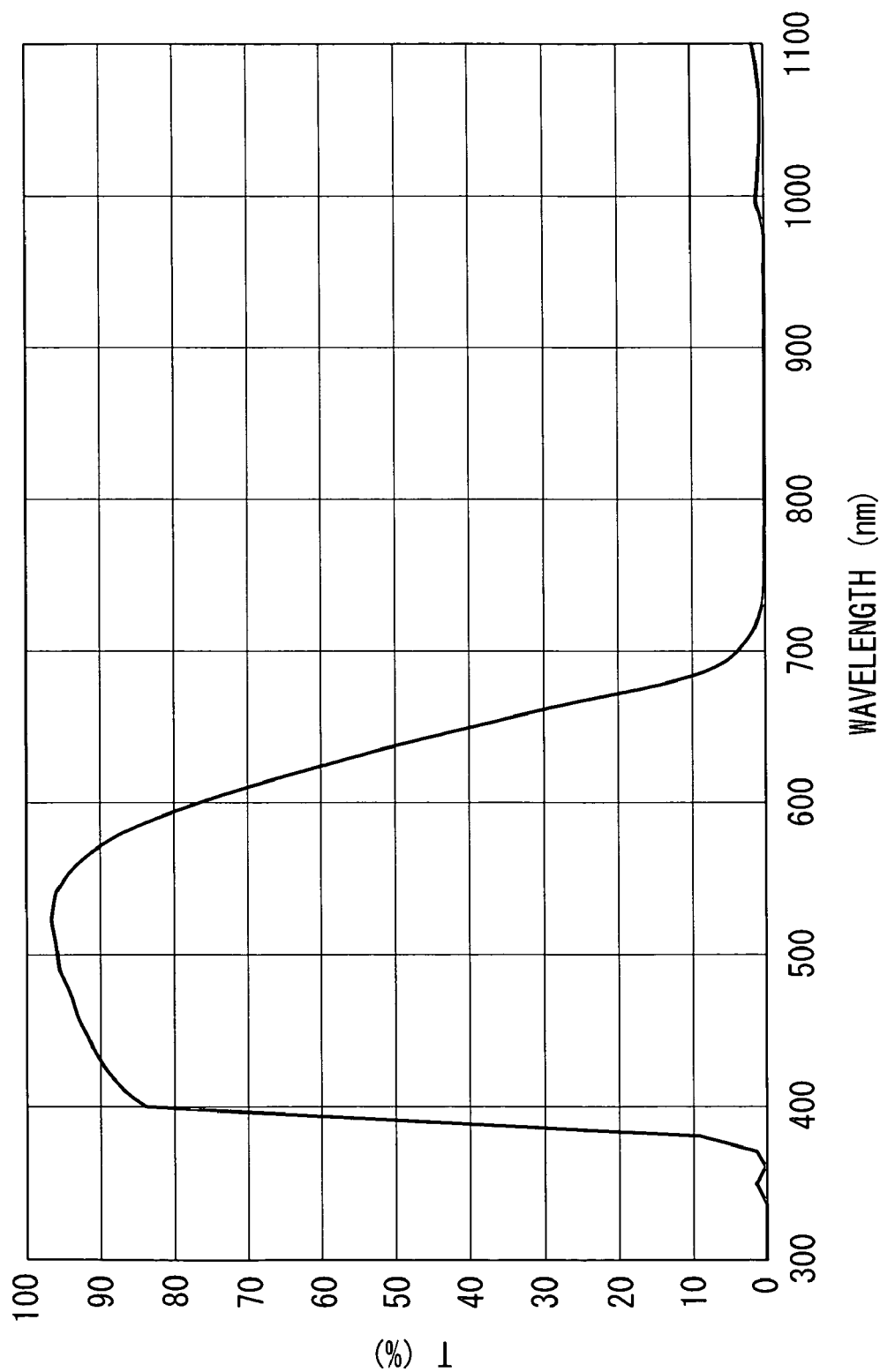
FIG. 64 is a graph showing the transmittance (T %) versus wavelength of the infrared-cut filter in FIG. 63.

The effects of the infrared-cut filter 701C are the same as those of the seventh embodiment, except that the infrared-cut coating 705a having a 14-layer multilayer film structure is replaced with the infrared-cut coating 705c having a 22-layer multilayer film structure. Therefore, a graph showing the transmittance (T %) versus wavelength of the infrared-cut filter 701C according to this embodiment is merely shown in FIG. 64, but an explanation thereof is omitted.

According to the structure described above, the reflection characteristics for infrared light can be improved by using the infrared-cut coating 705c having a multilayer film structure with 22 layers, and it is possible to satisfactorily cut infrared light by means of the infrared-cut filter 701C.

Next, an embodiment of a unifocal optical system using the infrared-cut filters according to the first to ninth embodiments described above will be described with reference to the drawings.

Figure 52:
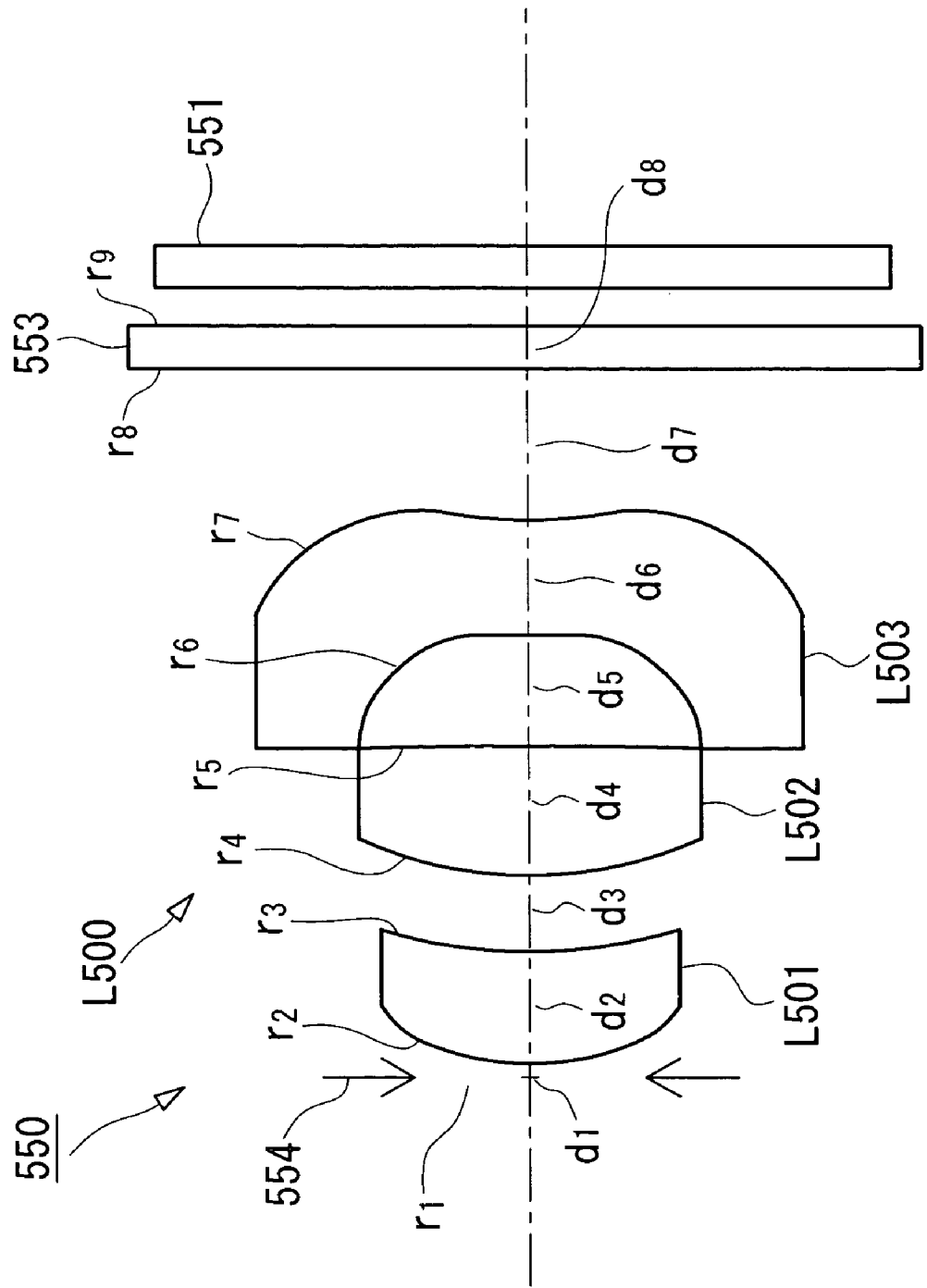
FIG. 52 is a lens diagram of a unifocal optical system using one of the infrared-cut filters according to the first to sixth embodiments of the present invention, when focused at infinity.

FIG. 52 is a lens diagram of a unifocal optical system 550 using the infrared-cut filters according to the first to ninth embodiments described above, when focused at infinity.

As shown in FIG. 52, the unifocal optical system (imaging apparatus) 550 roughly includes an imaging lens system (optical system) L500, an electronic imaging device 551 for capturing images, and an infrared-cut filter (optical filter 553 that also serves as a cover glass of the electronic imaging device 551.

The infrared-cut filter 553 employs one of the infrared-cut filters according to the first to ninth embodiments described above. Also, a CCD or CMOS device can be used as the electronic imaging device 551.

The imaging lens system L500 includes a stop 554, a first positive meniscus lens L501 with an aspheric surface at the object side, whose convex surface faces the object side (the left side in FIG. 52), a biconvex second positive lens L502 having an aspheric surface at the image side, and a biconcave third negative lens L503 having aspheric surfaces at both sides In the description of this embodiment, all lenses from the first lens L501 to the third lens L503 are made of resin.

The specifications of the imaging lens system L500 of this embodiment are as follows: focal length f=3.83 mm, image height 2.30 mm, F-number=2.98, and full-angle field of view 2ω=63.0°. Data for the imaging lens system L of this embodiment is the same as the numerical data for Example 5 described above (see Table 17), and a description thereof is thus omitted.

According to the structure described above, using the infrared-cut filter 553 of the present invention allows the fabrication of the unifocal optical system 550 to be simplified and its thickness in the optical-axis direction can be reduced.

When fabricating the unifocal optical system 550, the infrared-cut coating of the infrared-cut filter 553 can be protected from damage, and therefore, transmission of infrared light from such a damaged portion can be prevented. As a result, in an image acquired by the electronic imaging device 551, color variations due to transmitted infrared light can be prevented.

Figure 53:
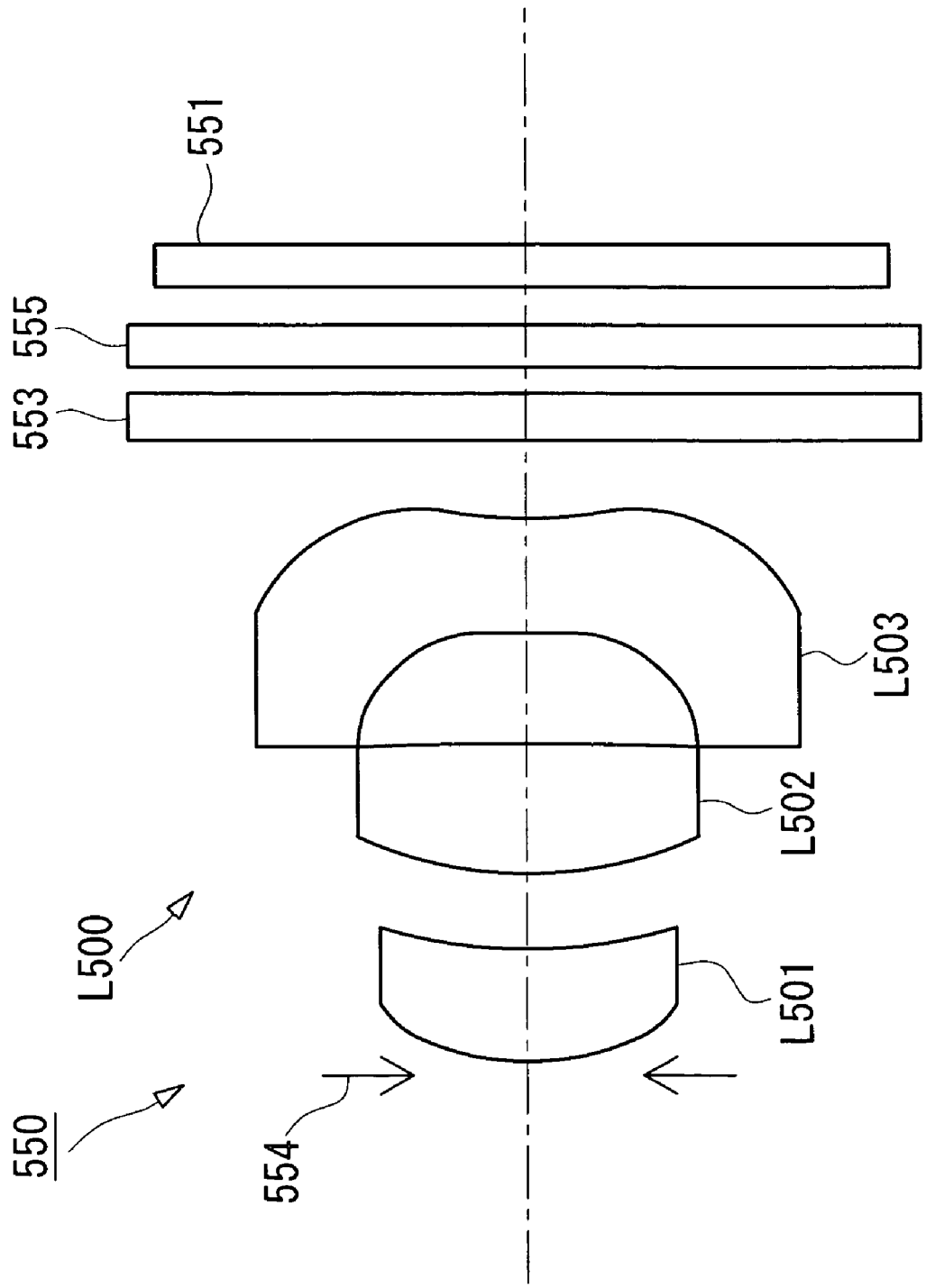
FIG. 53 is a diagram depicting the structure of another embodiment of the unifocal optical system in FIG. 52.

The infrared-cut filter 553 may also serve as the cover glass of the electronic imaging device 551, as described above, or, as shown in FIG. 53, the infrared cut filter 553 and a covers glass 555 may be provided separately, and the infrared-cut filter 553 may also serve as a low-pass filter.

Figure 54:
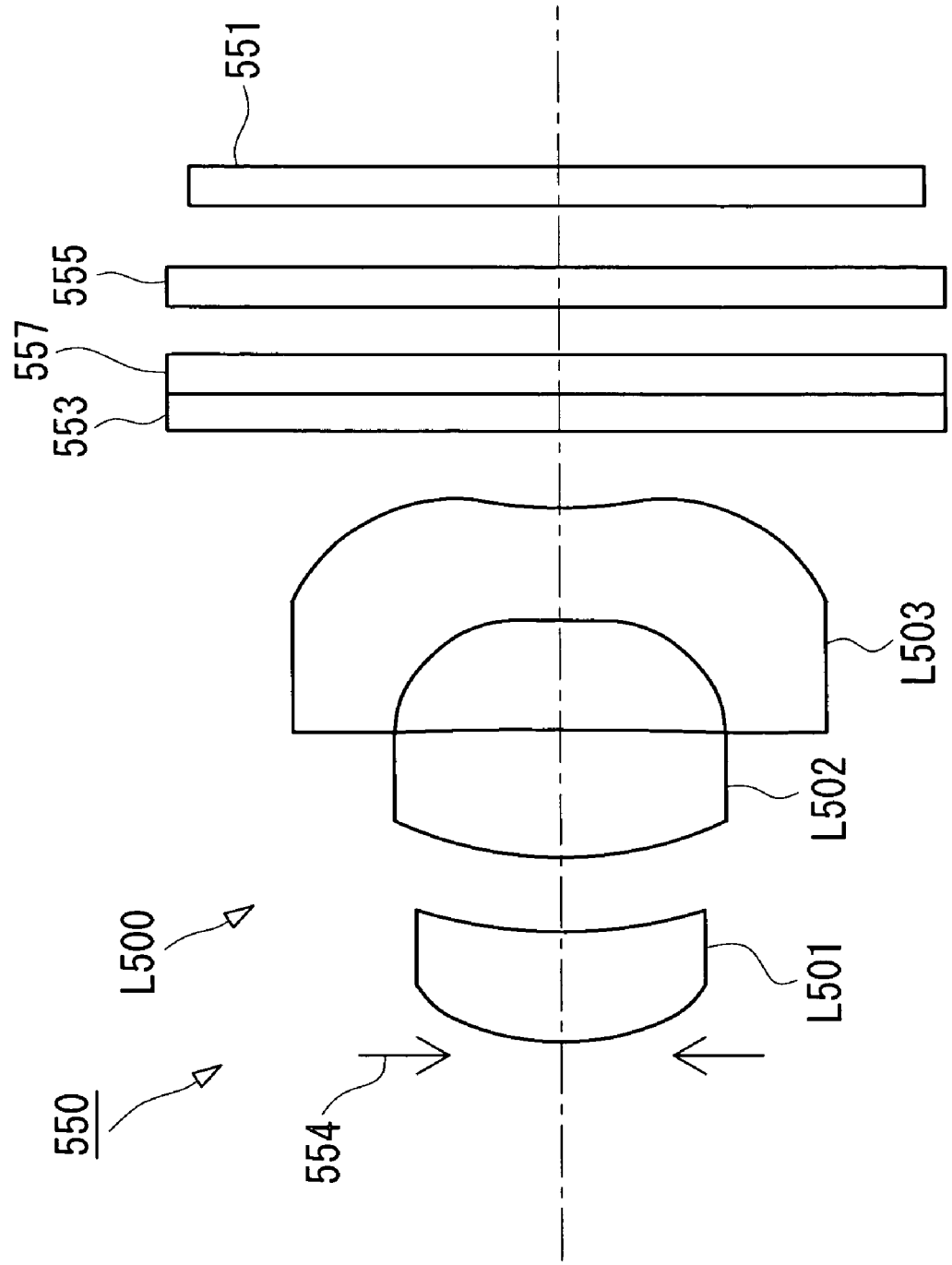
FIG. 54 is a diagram depicting the structure of yet another embodiment of the unifocal optical system in FIG. 52.

As shown in FIG. 54, the infrared-cut filter 553, the cover glass 555, and a low-pass filter 557 may be provided as separate elements.

Next, an optical system with freeform surfaces using the infrared-cut filters according to the first to ninth embodiments described above will be described with reference to the drawings.

Figure 55:
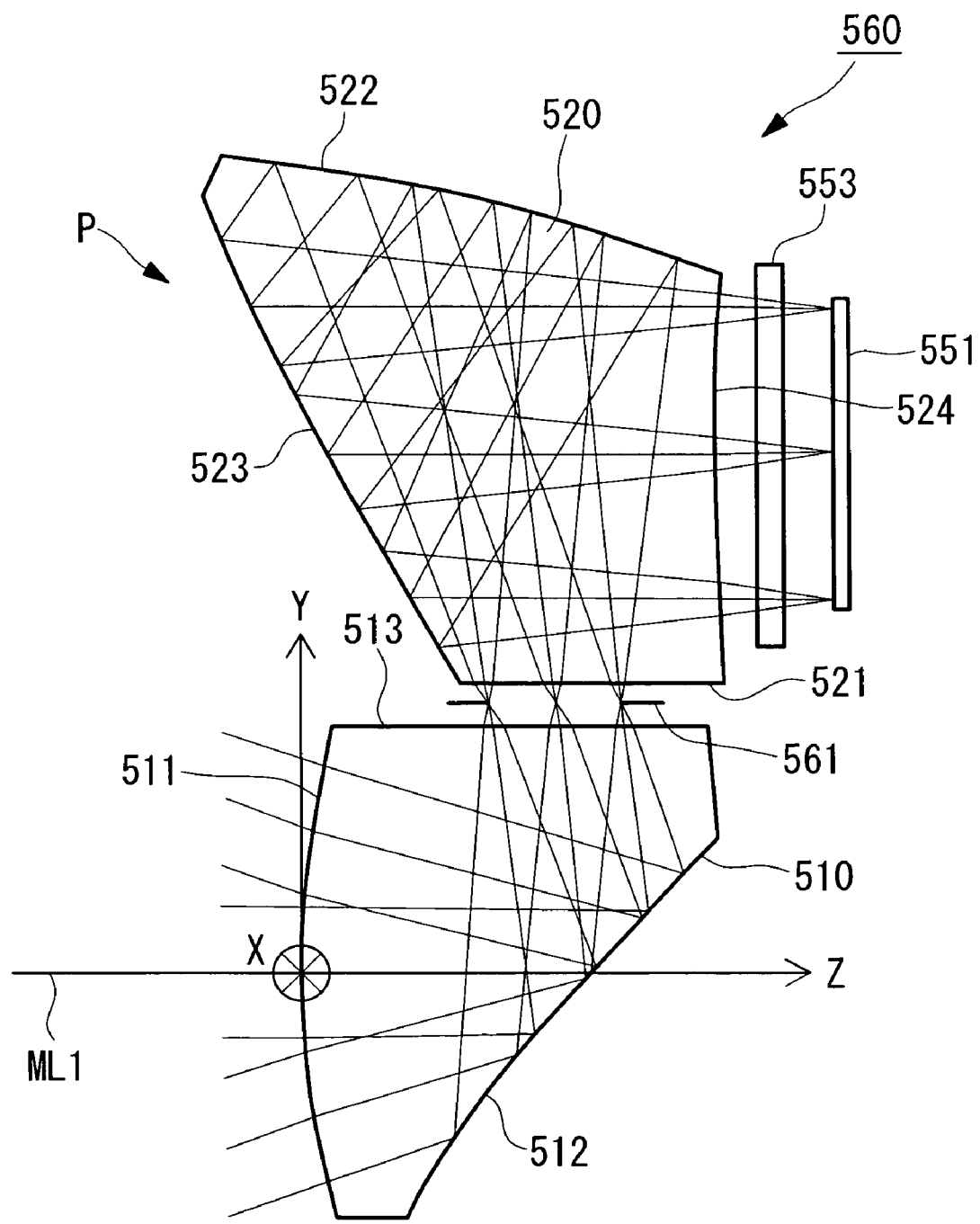
FIG. 55 is a cross-sectional diagram depicting an embodiment of a freeform-surface optical system in which one of the infrared-cut filters according to the first to sixth embodiments of the present invention is used.

FIG. 55 is a cross-sectional diagram depicting an embodiment of a freeform-surface optical system using an infrared-cut filter of the present invention.

First, the structural parameters used in the description of this embodiment will be described using FIG. 55.

Regarding the structural parameters of this embodiment, as shown in FIG. 55, when tracing the rays, an on-axis chief ray ML1 is defined by a ray coming from the center of an object, orthogonally passing through the center of a stop 561 in the optical system, and extending to the center of the electronic imaging device 551. Then, the position intersecting with the on-axis chief ray ML1 of a first face (in FIG. 55, an eleventh face 511) at the extreme object side of the optical system is defined as the origin of the decentered optical faces of the decentered optical system, the direction parallel to the on-axis chief ray ML1 is defined as a Z-axis direction, the direction from the object toward the first face is defined as the Z-axis positive direction, a plane where the optical axis is folded is defined as the Y-Z plane, the direction orthogonal to the Y-Z plane through the origin is defined as the X-axis direction, the direction from the plane of the drawing in FIG. 55 towards the rear is defined as the positive X-axis direction, and the axis constituting a right-handed coordinate system together with the X-axis and the Z-axis is defined as the Y-axis.

In this embodiment, each face is decentered in the Y-Z plane, and the unique plane of symmetry of each rotationally asymmetric freeform surface is defined as the Y-Z plane.

Regarding decentered faces, each face is given displacements in the X-, Y-, and Z-directions (displacements X, Y, and Z) of the vertex position of the face from the origin of the optical system, and tilt angles ($\alpha$, $\beta$, and $\gamma$ (°), respectively) of the center axis of the face (for freeform surfaces, the Z-axis of equation (a) in the reference cited below) with respect to the X-, Y-, and Z-axes. In this case, positive $\alpha$ and $\beta$ indicate anticlockwise rotation relative to the positive direction of the respective axes, and positive $\gamma$ indicates clockwise rotation relative to the positive direction of the Z-axis.

Regarding the method of rotating by angles $\alpha$, $\beta$, and $\gamma$ about the center axis of the face, the center axis of the face and the XYZ coordinate system thereof are first rotated anticlockwise by angle $\alpha$ about the X-axis; then, the center axis of that rotated face is rotated anticlockwise by angle $\beta$ about the Y-axis of the new coordinate system, and the coordinate system that was rotated once is also rotated anticlockwise by angle $\beta$ about the Y-axis; next, the center axis of the face that was rotated twice is rotated anticlockwise by angle $\gamma$ about the Z-axis of the new coordinate system.

Among those faces having an optical effect, which constitute the optical system of this embodiment, if specific faces and faces subsequent thereto form a coaxial optical system, a gap is provided between the faces, and in addition, the refractive indexes and Abbe numbers of the media are set according to the application.

The surface shape of the freeform surface used in the present invention is defined, for example, by equation (a) in U.S. Pat. No. 6,124,989 (Japanese Patent Application No. 2000-66105), where the Z-axis in that equation is the axis of the freeform surfaces.

Items regarding freeform surfaces for which no data is given are indicated by 0. The refractive indexes and Abbe numbers are given with respect to the d-line (wavelength 587.56 nm). Lengths are given in millimeter units.

Therefore, FIG. 55 is a Y-Z cross-sectional diagram including the on-axis chief ray in a freeform-surface optical system of this embodiment.

As shown in FIG. 55, the freeform-surface optical system (imaging apparatus) 560 roughly includes a prism optical system (optical system) P including prisms, an electronic imaging device 551 that captures images, and an infrared-cut filter 553 that also serves as a cover glass of the electronic imaging device 551. The prism optical system P includes a first prism 510 that constitutes a front group, a stop 561, and a second prism 520 that constitutes a rear group, in this order along the propagation direction of light from the object side.

As shown in FIG. 55, the first prism 510 is formed of an eleventh face 511 to a thirteenth face 513. The eleventh face 511 is a first transmissive surface, the twelfth face 512 is a first reflective surface, and the thirteenth face 513 is a second transmissive surface.

These faces are arranged such that the light rays from the object are transmitted through the eleventh face 511, that is, the first transmissive surface, are reflected at the inner side of the twelfth face 512, that is, the first reflective surface, are transmitted through the thirteenth face 513, that is, the second transmissive surface, and are emitted towards the second prism 520.

The second prism surface 520 is formed of a twenty-first face 521 to a twenty-fourth face 524. The twenty-first face 521 is a first transmissive surface, the twenty-second face 522 is a first reflective surface, the twenty-third face 523 is a second reflective surface, and the twenty-fourth face 524 is a second transmissive surface.

These faces are arranged such that rays of light from the first prism 510 are transmitted through the twenty-first face 521, that is, the first transmissive surface, are reflected at the inner side of the twenty-second face 522, that is, the first reflective surface, are reflected at the inner side of the twenty-third face 523, that is, the second reflective surface, are transmitted through the twenty-fourth face 524, that is, the second transmissive surface, and are emitted towards an imaging unit 530.

The twenty-first face 521 and the twenty-second face 522 of the second prism 520 are disposed opposite to each other on either side of the prism medium, and the twenty-third face 523 and the twenty-fourth face 524 are disposed opposite each other on either side of the prism medium. These faces are arranged so that the light path joining the twenty-first face 521 and the twenty-second face 522 intersects with the light path joining the twenty-third face 523 and the twenty-fourth face 524 inside the prism.

The imaging optical system formed of the first prism 510 and the second prism 520 described above does not form an intermediate image.

The eleventh face 511 and the twelfth face 512 of the first prism 510 are freeform surfaces, and the thirteenth face 513 is a flat surface. The twenty first face 521 of the second prism 520 is a flat surface, and the twenty-second face 522 to the twenty-fourth face 524 are freeform surfaces.

In the embodiment described above, for example, the size of the image plane is 4.8 mm×3.6 mm, the angular field of view is 51.3° horizontally and 39.6° vertically, and the entrance pupil diameter is 1.77 mm. This embodiment can be used at an F-number equivalent to 2.8.

The embodiment described above is not particularly limited and may employ other sizes and so on.

Numerical data for the first prism 510 and the second prism 520 is shown in Table 29 below. "FFS" in the table indicates a freeform surface, and "RE" indicates a reflective surface.

TABLE 29

| Face No. | Radius of curvature | Face distance | Decentering | Refractive index | Abbe Number |
|---|---|---|---|---|---|
| Objective side | ∞ | ∞ | | | |
| 1 | FFS[1] | | | 1.5254 | 55.8 |
| 2 | FFS[2](RE) | | Decentering (1) | 1.5254 | 55.8 |
| 3 | ∞ | | Decentering (2) | | |
| 4 | ∞(stop) | | Decentering (3) | | |
| 5 | ∞ | | Decentering (4) | 1.5254 | 55.8 |
| 6 | FFS[3](RE) | | Decentering (5) | 1.5254 | 55.8 |
| 7 | FFS[4](RE) | | Decentering (6) | 1.5254 | 55.8 |
| 8 | FFS[5] | | Decentering (7) | | |
| 9 | ∞ | | Decentering (8) | 1.5230 | 55.0 |
| 10 | ∞ | | Decentering (9) | | |
| Image side | ∞ | | Decentering (10) | | |

FFS[1]

$C_4$ $-8.3188 \times 10^{-3}$ $C_6$ $3.4101 \times 10^{-2}$ $C_8$ $-1.4706 \times 10^{-3}$
$C_{10}$ $-1.1420 \times 10^{-3}$ $C_{11}$ $-6.5609 \times 10^{-5}$ $C_{13}$ $-1.7003 \times 10^{-4}$
$C_{15}$ $2.9132 \times 10^{-4}$ $C_{17}$ $9.7267 \times 10^{-5}$ $C_{19}$ $1.5357 \times 10^{-5}$
$C_{21}$ $-7.7116 \times 10^{-6}$

FFS[2]

$C_4$ $-6.7737 \times 10^{-4}$ $C_6$ $9.5729 \times 10^{-3}$ $C_8$ $-4.6635 \times 10^{-5}$
$C_{10}$ $3.2706 \times 10^{-4}$ $C_{11}$ $4.7807 \times 10^{-5}$ $C_{13}$ $-1.7131 \times 10^{-6}$
$C_{15}$ $5.7208 \times 10^{-5}$ $C_{17}$ $1.8852 \times 10^{-5}$ $C_{19}$ $-1.0239 \times 10^{-5}$
$C_{21}$ $5.2505 \times 10^{-6}$

FFS[3]

$C_4$ $1.8027 \times 10^{-2}$ $C_6$ $1.9843 \times 10^{-2}$ $C_8$ $2.7422 \times 10^{-4}$
$C_{10}$ $6.5409 \times 10^{-4}$ $C_{11}$ $-5.5779 \times 10^{-5}$ $C_{13}$ $7.9255 \times 10^{-6}$
$C_{15}$ $-1.3926 \times 10^{-5}$ $C_{17}$ $-1.0429 \times 10^{-5}$ $C_{19}$ $-2.8931 \times 10^{-5}$
$C_{21}$ $3.4435 \times 10^{-7}$

FFS[4]

$C_4$ $1.5424 \times 10^{-2}$ $C_6$ $1.1204 \times 10^{-2}$ $C_8$ $-1.0357 \times 10^{-4}$
$C_{10}$ $3.0996 \times 10^{-4}$ $C_{11}$ $5.5084 \times 10^{-5}$ $C_{13}$ $4.6769 \times 10^{-5}$
$C_{15}$ $2.6581 \times 10^{-5}$ $C_{17}$ $1.3231 \times 10^{-5}$ $C_{19}$ $-3.7769 \times 10^{-5}$
$C_{21}$ $-2.3725 \times 10^{-7}$

FFS[5]

$C_4$ $3.0719 \times 10^{-2}$ $C_6$ $-1.8684 \times 10^{-3}$ $C_8$ $-2.1354 \times 10^{-2}$
$C_{10}$ $1.9201 \times 10^{-3}$ $C_{11}$ $-2.9223 \times 10^{-3}$ $C_{13}$ $4.3539 \times 10^{-3}$
$C_{15}$ $2.0659 \times 10^{-3}$ $C_{17}$ $2.8765 \times 10^{-3}$ $C_{19}$ $-4.0186 \times 10^{-4}$
$C_{21}$ $2.7366 \times 10^{-4}$ Decentering (1)

| X | 0.00 | Y | 0.00 | Z | 3.81 |
| α | −41.81 | β | 0.00 | γ | 0.00 |

Decentering (2)

| X | 0.00 | Y | 3.26 | Z | 3.44 |
| α | 90.00 | β | 0.00 | γ | 0.00 |

Decentering (3)

| X | 0.00 | Y | 3.55 | Z | 3.39 |
| α | 90.00 | β | 0.00 | γ | 0.00 |

TABLE 29-continued

Decentering (4)

| X | 0.00 | Y | 3.85 | Z | 3.34 |
| α | 90.00 | β | 0.00 | γ | 0.00 |

Decentering (5)

| X | 0.00 | Y | 10.20 | Z | 2.63 |
| α | −103.66 | β | 0.00 | γ | 0.00 |

Decentering (6)

| X | 0.00 | Y | 6.85 | Z | 0.39 |
| α | 28.25 | β | 0.00 | γ | 0.00 |

Decentering (7)

| X | 0.00 | Y | 6.87 | Z | 5.55 |
| α | 0.59 | β | 0.00 | γ | 0.00 |

Decentering (8)

| X | 0.00 | Y | 6.87 | Z | 5.87 |
| α | 0.00 | β | 0.00 | γ | 0.00 |

Decentering (9)

| X | 0.00 | Y | 6.87 | Z | 6.42 |
| α | 0.00 | β | 0.00 | γ | 0.00 |

Decentering (10)

| X | 0.00 | Y | 6.87 | Z | 7.12 |
| α | 0.00 | β | 0.00 | γ | 0.00 |

According to the structure described above, using the infrared-cut filter 553 allows the fabrication of the freeform-surface optical system 560 to be simplified and the thickness in the optical-axis direction can be reduced.

Also, when fabricating the freeform-surface optical system 560, the infrared-cut coating of the infrared-cut filter 553 can be protected from damage, which allows transmission of infrared-light through such damaged portions to be prevented. As a result, in the image acquired by the electronic imaging device 551, color irregularities due to transmitted infrared light can be prevented.

Figure 56:
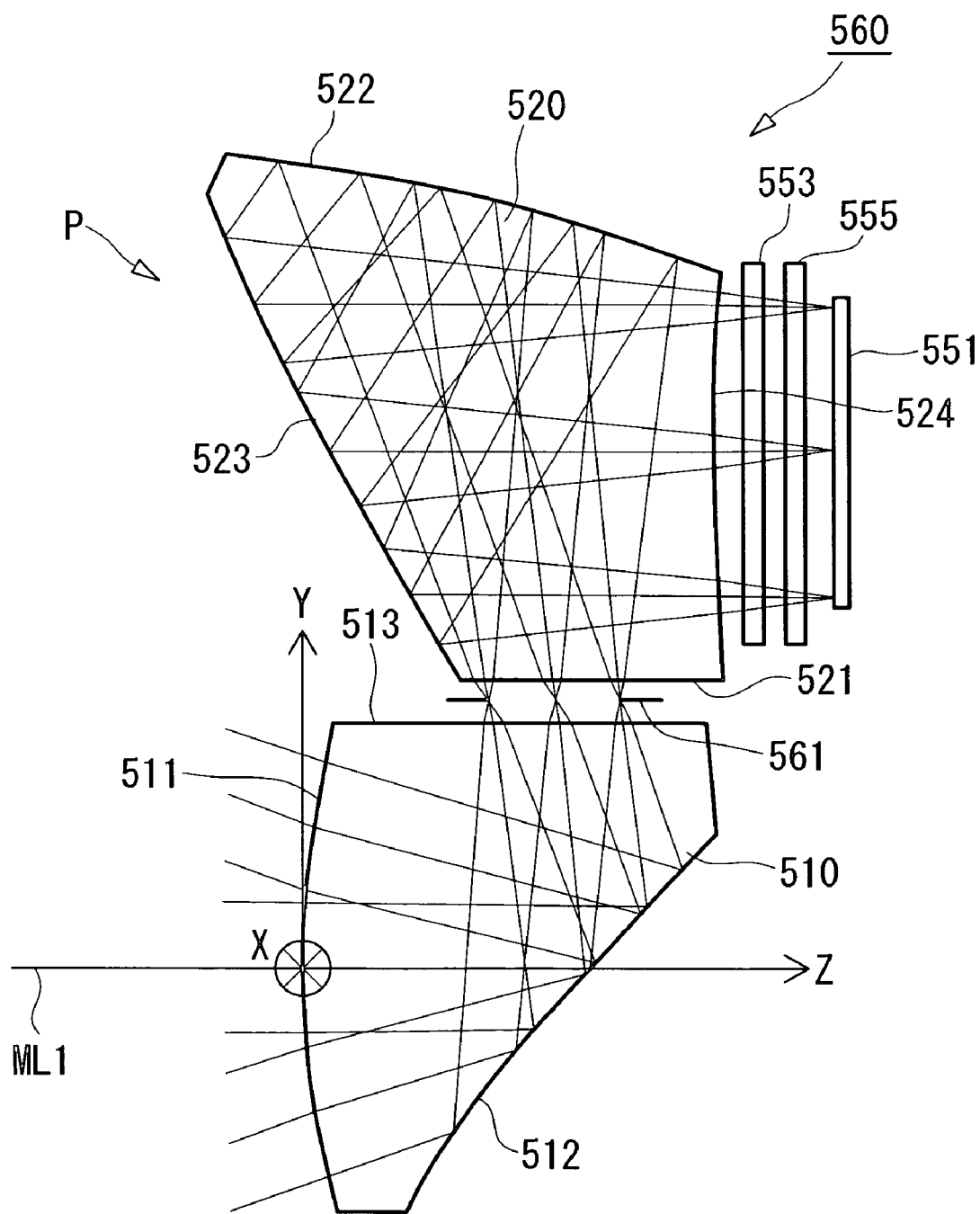
FIG. 56 is a diagram depicting the structure of another embodiment of the freeform-surface optical system in FIG. 55.

The infrared-cut filter 553 may also serve as the cover glass of the electronic imaging device 551, as described above, or, as shown in FIG. 56, the infrared-cut filter 553 and a cover glass 555 may be provided separately, and the infrared-cut filter 553 may also serve as a low-pass filter.

Figure 57:
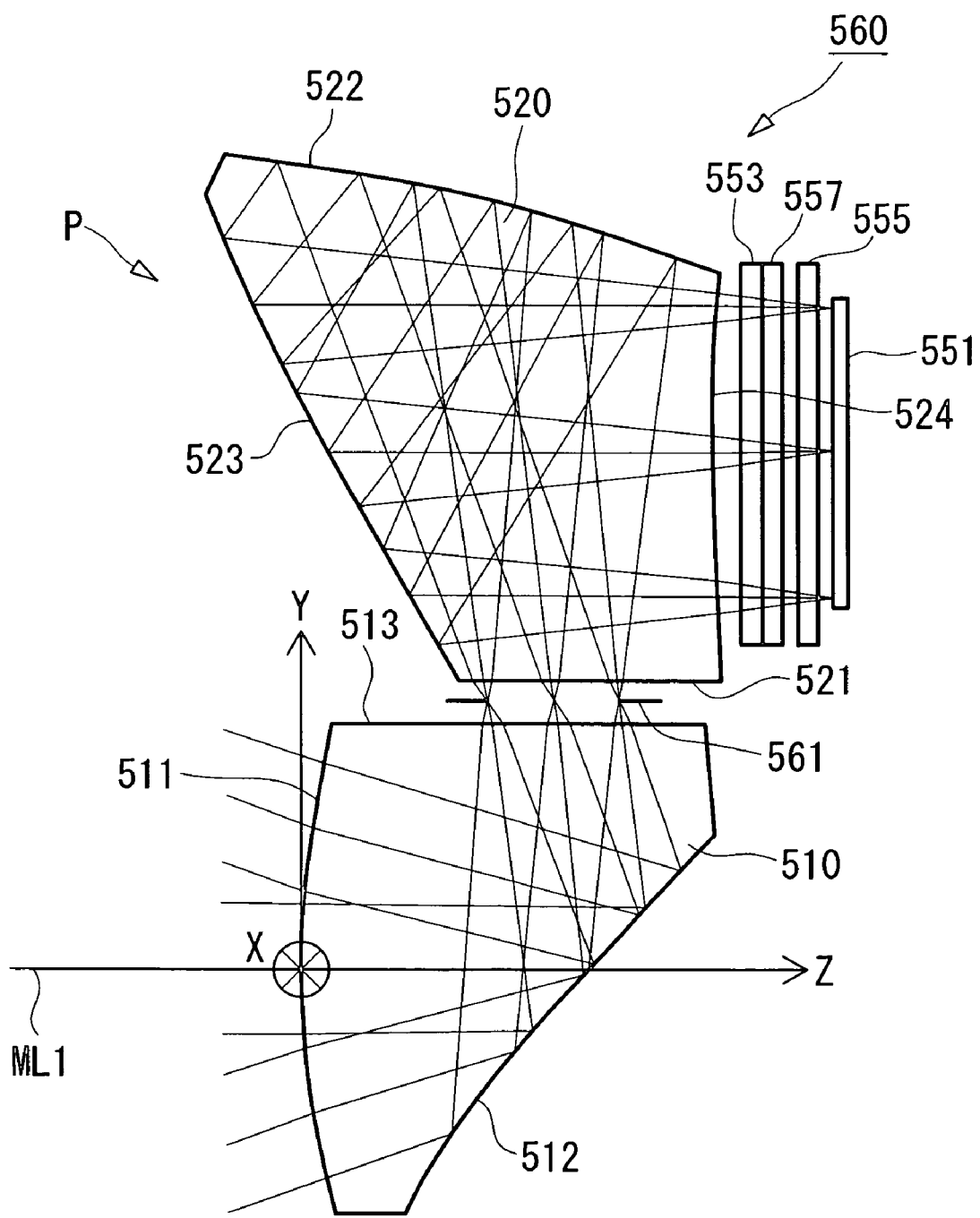
FIG. 57 is a diagram depicting the structure of yet another embodiment of the freeform-surface optical system in FIG. 55.

As shown in FIG. 57, the infrared-cut filter 553, the cover glass 555, and a low-pass filter 557 may be provided separately.

The scope of the present invention is not limited to the embodiments described above; it is possible to make various modifications so long as they do not depart from the spirit of the invention.

For example, in the embodiments described above, the application of an infrared-cut filter of the present invention to a unifocal optical system is described; however, the present invention is not limited to a unifocal optical system and may be applied to various other types of optical system, such as a zoom optical system.

Furthermore, in the embodiments described above, an infrared-cut coating is formed by alternately laminating high-refractive-index layers ($TiO_2$) and low-refractive-index layers ($SiO_2$), but the present invention is not limited thereto. The infrared-cut coating may be formed by alternately laminating high-refractive-index layers, medium-refractive-index layers, and low-refractive-index layers.

Tenth Embodiment

Next, an imaging optical system (imaging apparatus) according to a tenth embodiment of the present invention will be described with reference to the drawings.

Figure 65:
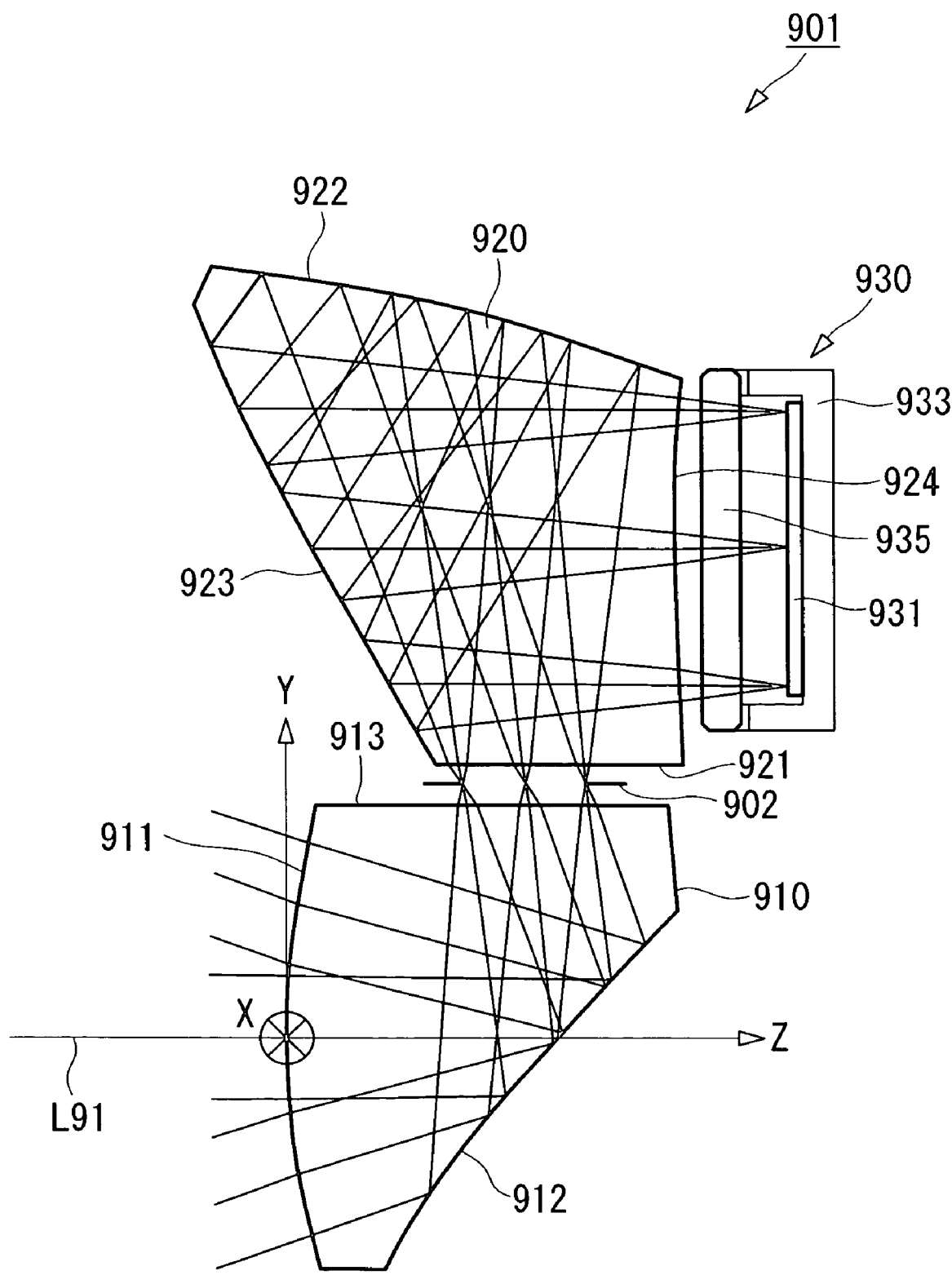
FIG. 65 is a cross-sectional diagram depicting an imaging optical system according to a tenth embodiment of the present invention.

FIG. 65 is a cross-sectional diagram of an imaging optical system according to this embodiment.

First, the structural parameters used in the description of this embodiment shall be described using FIG. 65.

Regarding the structural parameters of this embodiment, as shown in FIG. 65, when tracing the rays, an on-axis chief ray L91 is defined by a ray coming from the center of an object, orthogonally passing through the center of a stop 902 in the optical system, and extending to the center of the electronic imaging device 931. Then, the position intersecting with the on-axis chief ray L91 of a first face (in FIG. 65, an eleventh face 911) at the extreme object side of the optical system is defined as the origin of the decentered optical faces of the decentered optical system, the direction parallel to the on-axis chief ray L91 is defined as a Z-axis direction, the direction from the object toward the first face is defined as the positive Z-axis direction, a plane where the optical axis is folded is defined as the Y-Z plane, the direction orthogonal to the Y-Z plane through the origin is defined as the X-axis direction, the direction from the plane of the drawing in FIG. 65 towards the rear is defined as the positive X-axis direction, and the axis constituting a right-handed coordinate system together with the X-axis and the Z-axis is defined as the Y-axis.

In this embodiment, each face is decentered in the Y-Z plane, and the unique plane of symmetry of each rotationally asymmetric freeform surface is defined as the Y-Z plane.

Regarding decentered faces, each face is given displacements in the X-, Y-, and Z-directions (displacements X, Y, and Z) of the vertex position of the face from the origin of the optical system, and tilt angles ($\alpha$, $\beta$, and $\gamma$ (°), respectively) of the center axis of the face (for freeform surfaces, the Z-axis of equation (a) in the reference cited below) with respect to the X-, Y-, and Z-axes. In this case, positive $\alpha$ and $\beta$ indicates anticlockwise rotation relative to the positive direction of the respective axes, and positive y indicates clockwise rotation relative to the positive direction of the Z-axis.

Regarding the method of rotating by angles $\alpha$, $\beta$, and $\gamma$ about the center axis of the face, first, the center axis of the face and the XYZ coordinate system thereof are rotated anticlockwise by angle a about the X-axis; then, the center axis of that rotated face is rotated anticlockwise by angle $\beta$ about the Y-axis of the new coordinate system, and the coordinate system that was rotated once is also rotated anticlockwise by angle $\beta$ about the Y-axis; next, the center axis of the face that was rotated twice is rotated anticlockwise by angle $\gamma$ about the Z-axis of the new coordinate system.

Among those faces having an optical effect, which constitute the optical system of this embodiment, if specific faces and faces subsequent thereto form a coaxial optical system, a gap is provided between the faces, and in addition, the refractive indexes and Abbe numbers of the media are set according to the application.

The surface shape of the freeform surface used in the present invention is defined, for example, by equation (a) in U.S. Pat. No. 6,124,989 (Japanese Patent Application No. 2000-66105), where the Z-axis in that equation is the axis of the freeform surfaces.

Items regarding freeform surfaces for which no data is given are indicated by 0. The refractive indexes and Abbe numbers are given with respect to the d-line (wavelength 587.56 nm). Lengths are given in millimeter units.

Therefore, FIG. 65 is a Y-Z cross-sectional diagram including the on-axis chief ray in an imaging optical system of this embodiment.

As shown in FIG. 65, the imaging optical system (imaging apparatus) 901 roughly includes a first prism (prism member) 910 which is an optical system constituting a front group, a stop 902, a second prism (prism member) 920 which is an optical system constituting a rear group, and an imaging unit 930 that captures images, in this order along the propagation direction of light from the object side.

Figure 66:
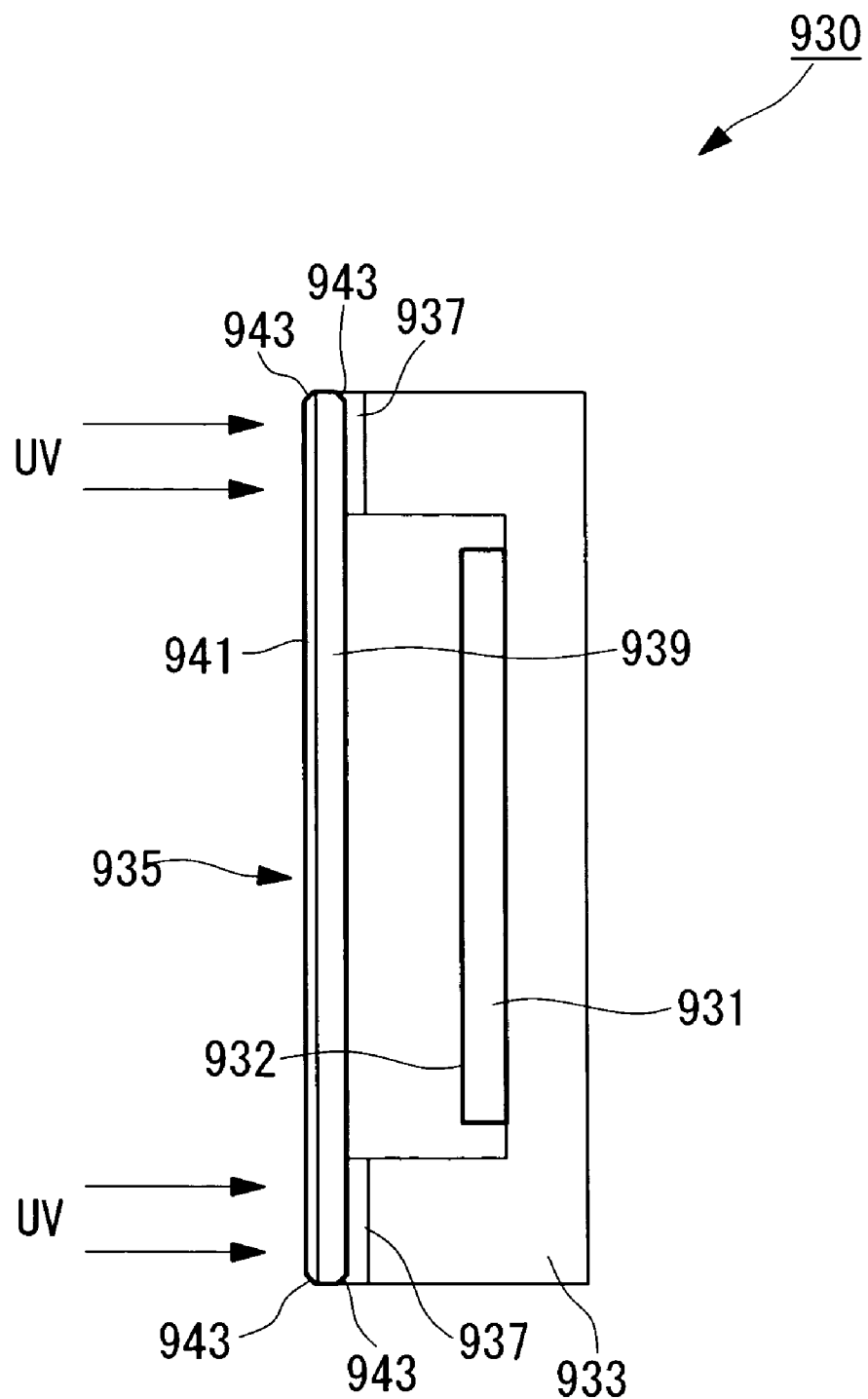
FIG. 66 is a magnified cross-sectional diagram depicting the structure of an imaging unit in FIG. 65.

FIG. 66 is an enlarged cross-sectional diagram depicting the structure of the imaging unit 930 in FIG. 65.

As shown in FIG. 66, the imaging unit 930 roughly includes the electronic imaging device 931 that takes pictures of an image formed on a light-incident surface 932, a container 933 that accommodates the electronic imaging device 931, a cover member (protection member) 935 that protects the light-incident surface, and a joining member 937 that fixes the container 933 and the cover member 935. An imaging device such as a CCD or CMOS device can be used as the electronic imaging device 931.

The cover member 935 is formed of a substrate 939 that is transparent for at least light of visible wavelengths and an infrared-cut coating (infrared-cut layer, infrared non-transparent member) 941 formed on the surface of the substrate 939 at the light incident side. The cover member 935 is formed in a planar configuration, and a chamfer is formed around the edge thereof.

The substrate 939 is preferably made of a material exhibiting birefringence and functions as a low pass filter; an example includes a single liquid crystal panel or a plurality of laminated liquid crystal panels. Forming the substrate 939 of a birefringent material allows the occurrence of Moire fringes in the image acquired by the electronic imaging device 931 to be prevented.

Because the cover member 935 is formed in a planar configuration, the infrared-cut coating 941 can be easily formed with a uniform film thickness. Also, forming the chamfer 943 allows chipping of the edge of the cover member 935 to be prevented during fabrication and so on, and it is thus possible to prevent small fragments caused by the chipping from adhering to the light-incident surface 932.

As mentioned above, the substrate 939 may be formed of a single or a plurality of liquid crystal panels. Alternatively, it may be made of glass or resin exhibiting birefringence, or glass or resin serving as an infrared-absorbing component (for example, Lumicle (registered trademark) of Kureha Chemical Industries Co., Ltd.) may be used in the substrate 939. The use of an infrared-absorbing component in the substrate 939 enables infrared light to be cut more effectively compared to the case where only the infrared-cut coating 941 is used. Also, the use of resin allows the substrate 939 to be reduced in weight and also allows the costs to be reduced.

Figure 67:
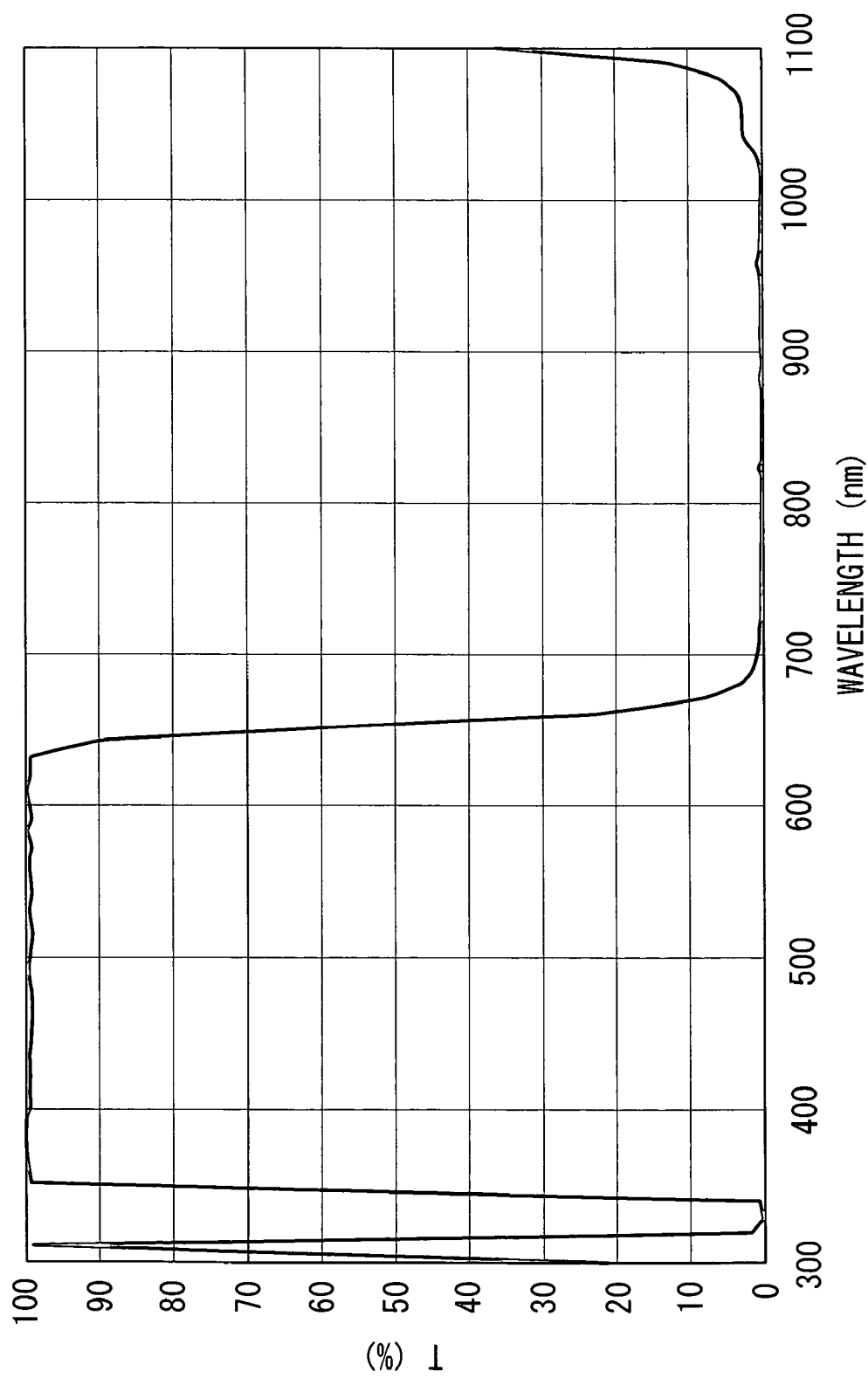
FIG. 67 is a graph showing the transmittance versus wavelength of an infrared-cut coating in FIG. 66.

FIG. 67 is a graph showing the transmittance versus wavelength of the infrared-cut coating 941 in FIG. 66.

The infrared-cut coating 941 is formed of a 44-layer structure by alternately laminating layers of titanium oxide ($Ta_2O_5$) and silicon oxide ($SiO_2$). The details of each layer, such as the film thicknesses etc., are shown in Table 30 below. The infrared-cut coating 941 formed in this way cuts long-wavelength light from about 700 nm, as shown in FIG. 67.

TABLE 30

| Number of layers | Film material | Optical film thickness |
|---|---|---|
| 1 | $Ta_2O_5$ | $0.1774 \times \lambda/4$ |
| 2 | $SiO_2$ | $0.3658 \times \lambda/4$ |
| 3 | $Ta_2O_5$ | $1.8123 \times \lambda/4$ |
| 4 | $SiO_2$ | $1.6679 \times \lambda/4$ |
| 5 | $Ta_2O_5$ | $1.5415 \times \lambda/4$ |
| 6 | $SiO_2$ | $1.5370 \times \lambda/4$ |
| 7 | $Ta_2O_5$ | $1.4848 \times \lambda/4$ |
| 8 | $SiO_2$ | $1.5085 \times \lambda/4$ |
| 9 | $Ta_2O_5$ | $1.4619 \times \lambda/4$ |
| 10 | $SiO_2$ | $1.5017 \times \lambda/4$ |
| 11 | $Ta_2O_5$ | $1.4534 \times \lambda/4$ |
| 12 | $SiO_2$ | $1.5023 \times \lambda/4$ |
| 13 | $Ta_2O_5$ | $1.4561 \times \lambda/4$ |
| 14 | $SiO_2$ | $1.5073 \times \lambda/4$ |
| 15 | $Ta_2O_5$ | $1.4677 \times \lambda/4$ |
| 16 | $SiO_2$ | $1.5173 \times \lambda/4$ |
| 17 | $Ta_2O_5$ | $1.4879 \times \lambda/4$ |
| 18 | $SiO_2$ | $1.5372 \times \lambda/4$ |
| 19 | $Ta_2O_5$ | $1.5204 \times \lambda/4$ |
| 20 | $SiO_2$ | $1.5747 \times \lambda/4$ |
| 21 | $Ta_2O_5$ | $1.5755 \times \lambda/4$ |
| 22 | $SiO_2$ | $1.6436 \times \lambda/4$ |
| 23 | $Ta_2O_5$ | $1.6731 \times \lambda/4$ |
| 24 | $SiO_2$ | $1.7607 \times \lambda/4$ |
| 25 | $Ta_2O_5$ | $1.8090 \times \lambda/4$ |
| 26 | $SiO_2$ | $1.8641 \times \lambda/4$ |
| 27 | $Ta_2O_5$ | $1.8779 \times \lambda/4$ |
| 28 | $SiO_2$ | $1.9021 \times \lambda/4$ |
| 29 | $Ta_2O_5$ | $1.9056 \times \lambda/4$ |
| 30 | $SiO_2$ | $1.9194 \times \lambda/4$ |
| 31 | $Ta_2O_5$ | $1.9161 \times \lambda/4$ |
| 32 | $SiO_2$ | $1.9251 \times \lambda/4$ |
| 33 | $Ta_2O_5$ | $1.9225 \times \lambda/4$ |
| 34 | $S_iO_2$ | $1.9292 \times \lambda/4$ |
| 35 | $Ta_2O_5$ | $1.9203 \times \lambda/4$ |
| 36 | $SiO_2$ | $1.9239 \times \lambda/4$ |
| 37 | $Ta_2O_5$ | $1.9188 \times \lambda/4$ |
| 38 | $SiO_2$ | $1.9234 \times \lambda/4$ |
| 39 | $Ta_2O_5$ | $1.9078 \times \lambda/4$ |
| 40 | $SiO_2$ | $1.9032 \times \lambda/4$ |
| 41 | $Ta_2O_5$ | $1.8826 \times \lambda/4$ |
| 42 | $SiO_2$ | $1.8777 \times \lambda/4$ |
| 43 | $Ta_2O_5$ | $1.8630 \times \lambda/4$ |
| 44 | $SiO_2$ | $0.9323 \times \lambda/4$ |

$\lambda = 500$ nm

Figure 68A:
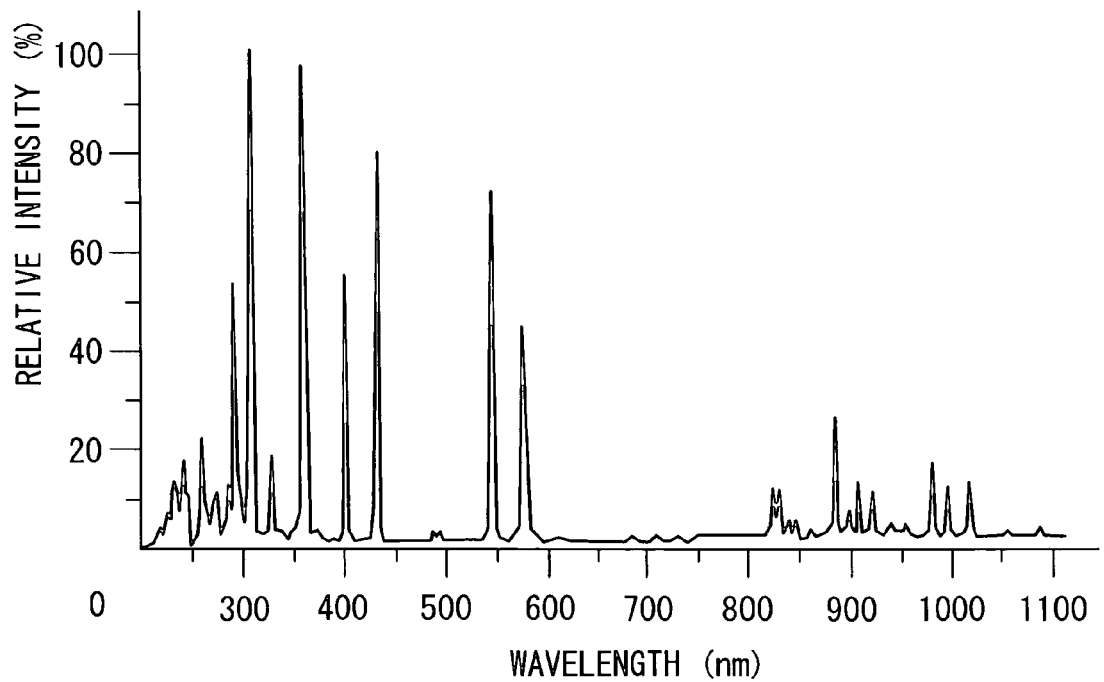
FIG. 68A is a graph showing an example of the spectral distribution of ultraviolet (UV) light emitted from a UV lamp used to cure a joining member in FIG. 66.
Figure 68B:
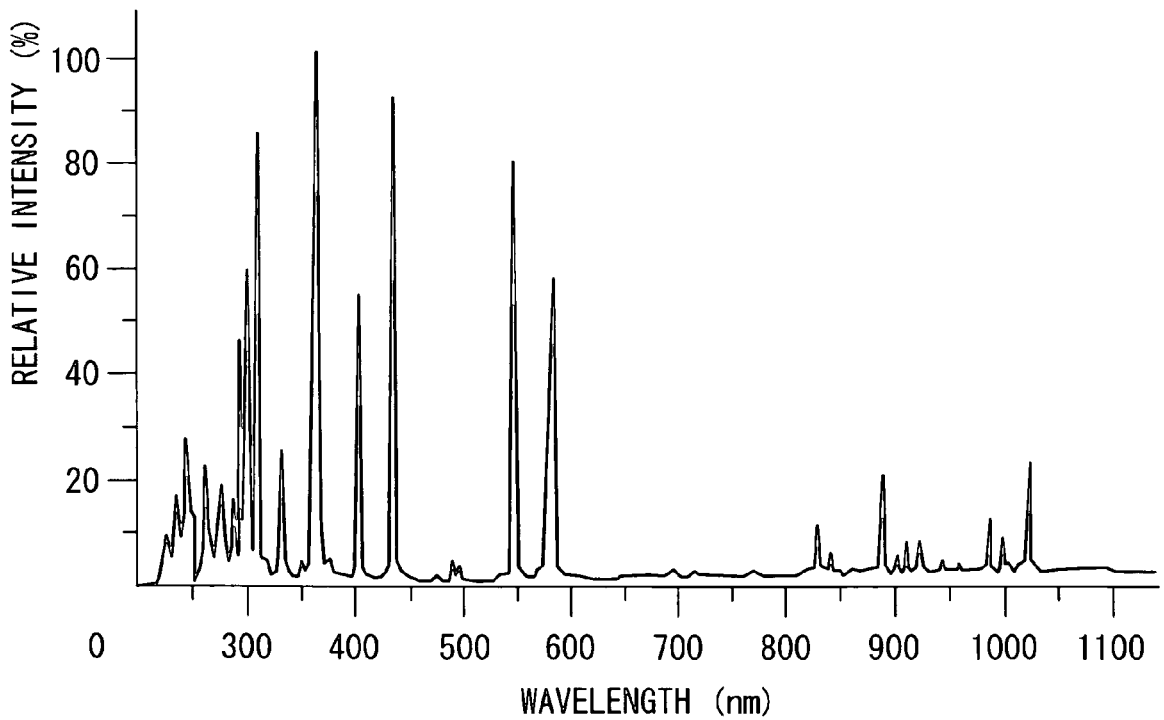
FIG. 68B is a graph showing an example of the spectral distribution of UV light emitted from the UV lamp used to cure the joining member in FIG. 66.

The joining member 937 is an adhesive made of ultraviolet-cured resin or the like that is cured by irradiation with ultraviolet (UV) light. In this embodiment, a joining member 937 made of an ultraviolet-curing resin that is cured by ultraviolet light UV corresponding to the mercury emission line (about 365 nm), which is emitted from a UV lamp that includes metal vapor, such as mercury vapor, based on a xenon lamp, is used. Examples of the spectral distribution of the ultraviolet light UV emitted from the UV lamp described above are shown in FIGS. 68A and 68B.

As shown in FIG. 67, the infrared-cut coating 941 can transmit ultraviolet light with a wavelength of 360 nm or above, which cures the joining member 937. The transmittance of this ultraviolet light is preferably about 20% or more, but a transmittance of below about 20% is also acceptable. Making the transmittance 20% or above allows the time required to cure the joining member 937 to be reduced compared to a transmittance of below about 20%.

As shown in FIG. 65, the first prism 910 is formed of surfaces from an eleventh face 911 to a thirteenth face 913. The eleventh face 911 is a first transmissive surface, the twelfth face (reflective surface with a rotationally asymmetric shape) 912 is a first reflective surface, and the thirteenth face 913 is a second transmissive surface.

These faces are arranged so that rays of light from the object are transmitted through the eleventh face 911, that is, the first transmissive surface, are reflected at the inner side of the twelfth face 912, that is, the first reflective surface, are transmitted through the thirteenth face 913, that is, the second transmissive surface, and are emitted towards the second prism 920.

The second prism 920 is formed of surfaces from a twenty-first face 921 to a twenty-fourth face 924. The twenty-first face 921 is a first transmissive surface, the twenty-second face (reflective surface with a rotationally asymmetric shape) 922 is a first reflective surface, the twenty-third surface (reflective surface with rotationally asymmetric shape) 923 is a second reflective surface, and the twenty-fourth face 924 is a second transmissive surface.

These faces are arranged so that rays of light from the first prism 910 are transmitted through the twenty-first face 921, that is, the first transmissive surface, are reflected at the inner side of the twenty-second face 922, that is, the first reflective surface, are reflected at the inner side of the twenty-third face 923, that is, the second reflective surface, are transmitted through the twenty-fourth face 924, that is, the second transmissive surface, and are emitted towards the imaging unit 930.

The twenty-first face 921 and the twenty-second face 922 of the second prism 920 are disposed opposite each other on either side of the prism medium, and the twenty-third face 923 and the twenty-fourth face 924 are also disposed opposite each other on either side of the prism medium. Furthermore, these faces are arranged so that the light path joining the twenty-first face 921 and the twenty-second face 922 intersects with the light path joining the twenty-third face 923 and the twenty-fourth face 924 inside the prism.

No intermediate image is formed in the imaging optical system formed of the first prism 910 and the second prism 920 described above.

The eleventh face 911 and the twelfth face 912 of the first prism 910 are freeform surfaces, and the thirteenth face 913 is a planar surface. The twenty first face 921 of the second prism 920 is a planar surface, and the surfaces from the twenty-second face 922 to the twenty-fourth face 924 are freeform surfaces.

By making the thirteenth face 913 of the first prism 910 and the twenty-first face 921 of the second prism 920, which oppose each other, planar surfaces, it is possible to reduce the degradation in performance due to misalignment of the optical axes of the two prisms 910 and 920. As a result, the positioning of the two prisms 910 and 920 can be simplified, and the fabrication and assembly costs can be reduced.

In the embodiment described above, for example, the size of the image plane is 4.8 mm×3.6 mm, the angular field of view is 51.3° horizontally and 39.60 vertically, and the entrance pupil diameter is 1.77 mm. This embodiment can be used at an F-number equivalent to 2.8.

The embodiment described above is not particularly limited and may employ other sizes and so on.

The numerical data for the first prism 910 and the second prism 920 is the same as that of the freeform-surface optical system using the infrared-cut filter according to the first to ninth embodiments shown in Table 29, and a description thereof is thus omitted.

According to the structure described above, by using the first prism 910 having the twelfth face 912 which is a reflective surface with a rotationally asymmetric shape and the second prism 920 having the twenty-second face and the twenty-third face, the optical system can be reduced in size in the optical-axis direction, in other words, made thinner.

Therefore, reductions in size, weight, and thickness of the imaging optical system 1 can be realized.

If the imaging optical system 901 is reduced in size, that is, thickness, in the optical-axis direction, light can be made incident on the cover member 935 and the electronic imaging device 931 with an angle closer to the perpendicular than when using a coaxial optical system. Accordingly, light can be made incident on the reflective-type infrared cut coating 941 with an angle closer to the perpendicular, and variations in the angle of incidence of the incident light can be reduced. As a result, variations in the wavelength range of light cut by the infrared-cut coating 941 can be suppressed, and therefore, the occurrence of color irregularities in the image captured by the electronic imaging device 931 can be prevented. Since the infrared-cut coating 941 is provided on the cover member 935 of the electronic imaging device 931, the imaging optical system 901 can be reduced in size, that is, thickness, in the optical-axis direction compared to a case where a member that does not transmit infrared light is provided separately from the cover member 935.

By furnishing the cover member 935 with ultraviolet transmitting properties and fixing the cover member 935 to the housing 933 using the joining member 937 that is cured by ultraviolet light UV, it is possible to control the time required for joining the cover member 935 and the housing 933. In other words, by joining the cover member 935 and the housing 933 using the joining member 937 and controlling the amount of ultraviolet light irradiated from the cover member 935 side, it is possible to control the time required to cure the joining member 937.

For example, by increasing the intensity of the ultraviolet light irradiated, the time required for joining can be reduced. Alternatively, by controlling the intensity of the irradiated ultraviolet light within a predetermined standard range, the bonding strength between the cover member 935 and the housing 933 can be kept within a predetermined standard range.

Next, an embodiment in which the imaging optical system 901 according to the tenth embodiment described above is applied to an imaging optical system of a digital camera will be described with reference to the drawings.

Figure 69:
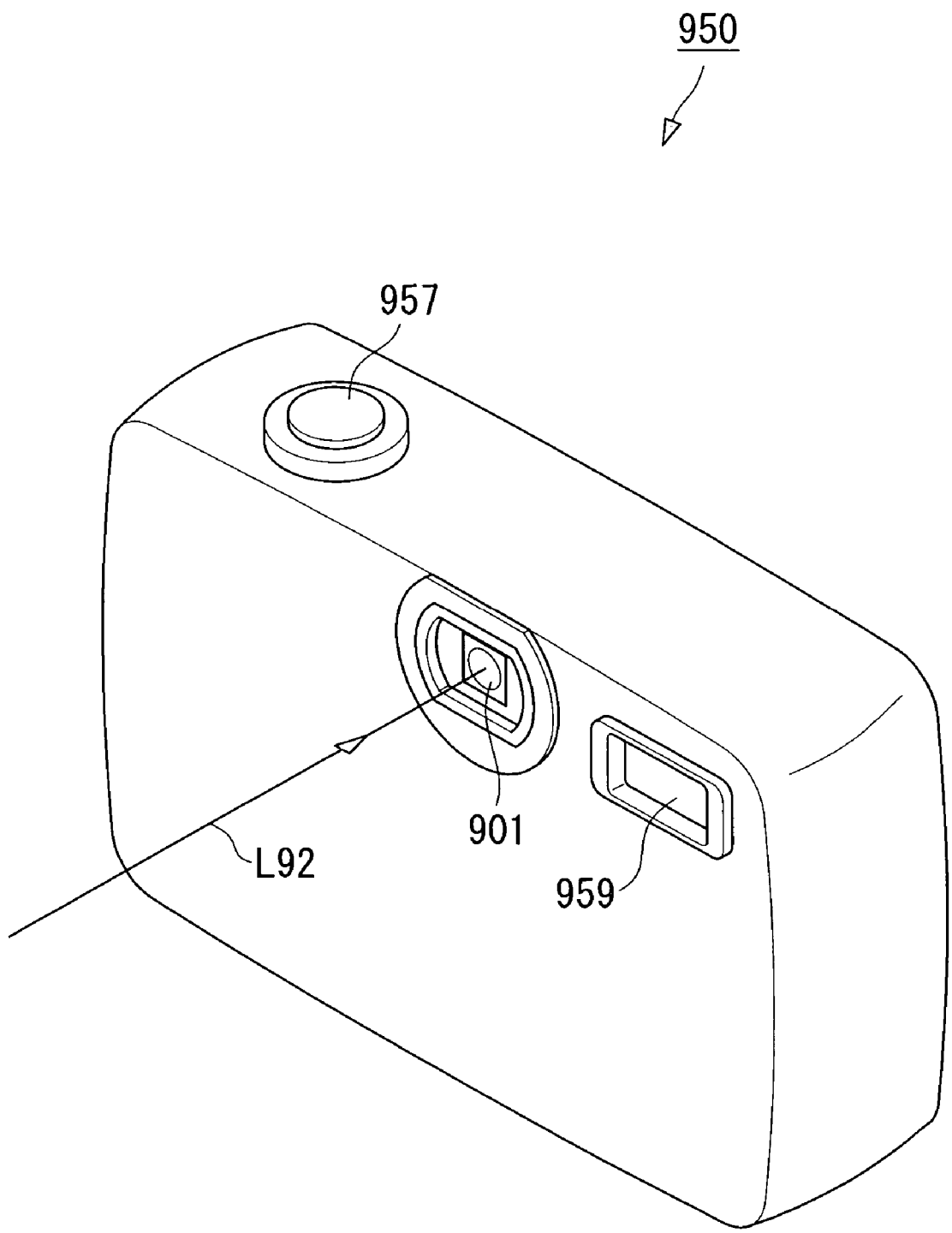
FIG. 69 is a front perspective view showing the external appearance of a digital camera including the imaging optical system according to the tenth embodiment of the present invention.
Figure 70:
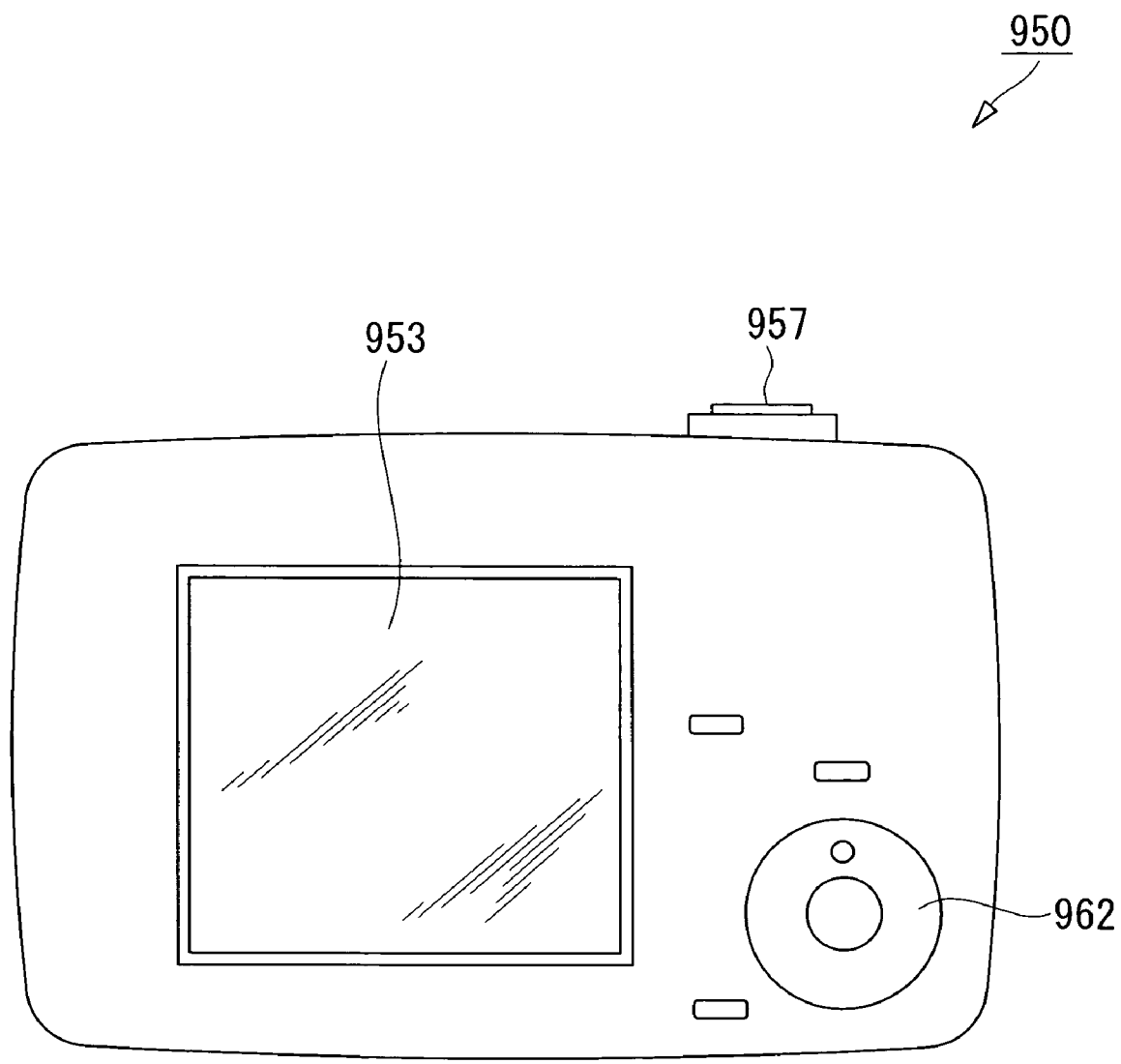
FIG. 70 is a rear elevational view of the digital camera in FIG. 69.
Figure 71:
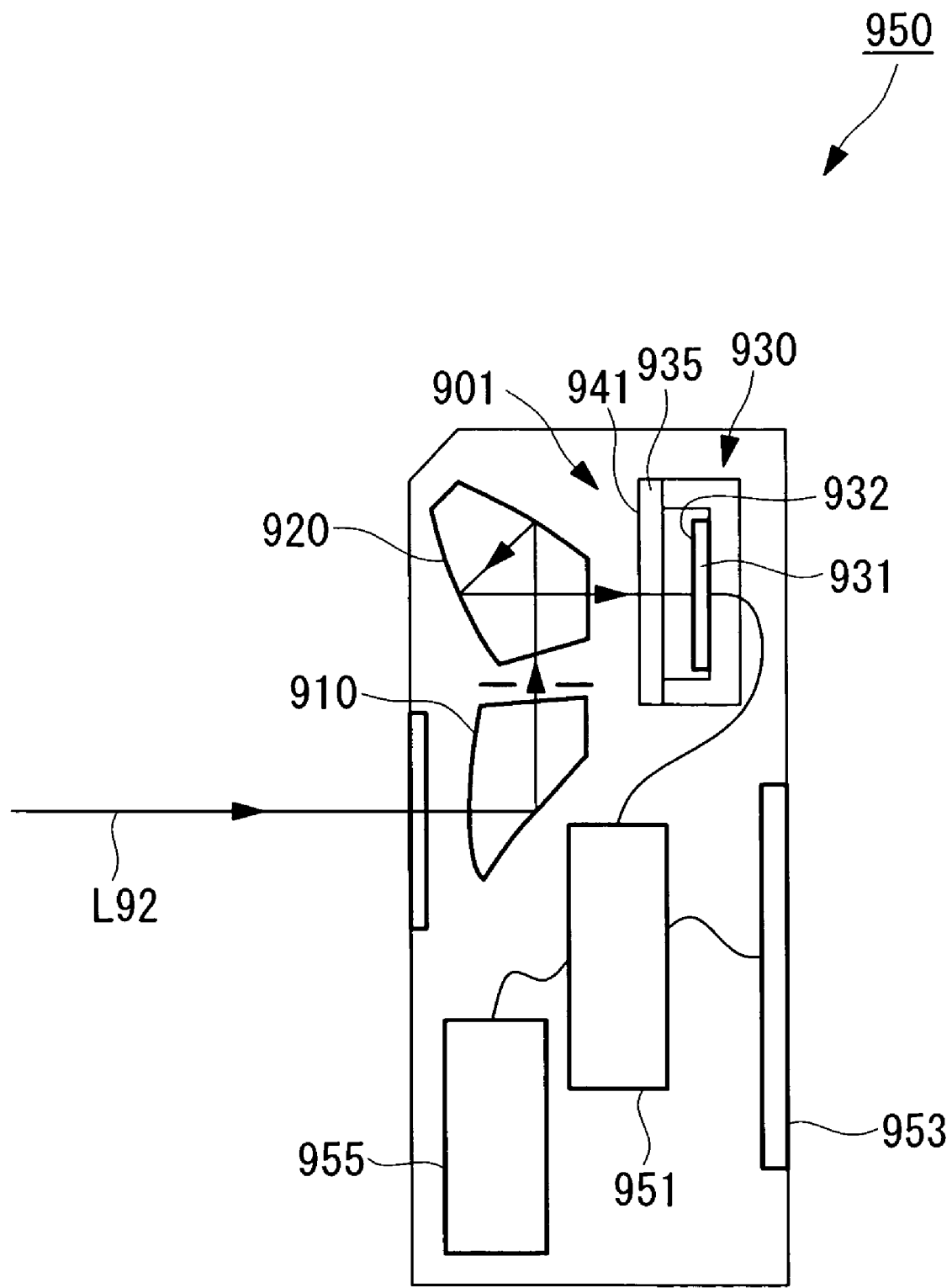
FIG. 71 is a typical see-through plan view showing the configuration of the digital camera in FIG. 69.

FIG. 69 is a front oblique perspective view showing the external appearance of a digital camera 950 of this embodiment, FIG. 70 is a rear elevational view of the digital camera 950 shown in FIG. 69, and FIG. 71 is a typical see-through top view showing the configuration of the digital camera 950 in FIG. 69.

Elements that are the same as those in the imaging optical system 901 described above are assigned the same reference numerals, and a description thereof shall be omitted.

As shown in FIG. 71, the digital camera 950 roughly includes an imaging optical system 901, having a photographing light path L92, for taking pictures of an object, a processing unit 951 that carries out computational processing on the captured image, a liquid crystal display monitor 953 that displays processed images, and a memory 955 that stores the processed images.

As shown in FIG. 69 and FIG. 70, a shutter release 957, a flash 959, a settings-changing switch 962, and so on are disposed on outer surfaces of the digital camera 950.

Next, the operation (image capturing) of the digital camera 950 will be described.

Upon pressing the shutter release 957, which is disposed on top of the camera 950, image acquisition is carried out by the electronic imaging device 931 in the imaging unit 930, via the imaging optical system 901.

Object light forming the acquired image enters the imaging optical system 901 and is imaged on the light-incident surface 932, which constitutes the imaging surface, of the electronic imaging device 931. This light is transmitted through the cover member 935 which has the infrared-cut coating 941 applied thereto, and during transmission, infrared light is cut by the infrared-cut coating 941.

The image is converted to an electrical signal by the electronic imaging device 931 and is output to the processing unit 951. The electrical signal is output to the liquid crystal display monitor 953 as an electronic image signal on which predetermined computational processing has been applied, and an electronic image is displayed on the liquid crystal display monitor 953.

Also, when the captured image is to be stored, the electronic image signal is output from the processing unit 951 to the memory 955 and is stored in the memory 955 as an electronic image.

According to this configuration, by using the imaging optical system 901 described above, it is possible to reduce the size, weight, and thickness of the digital camera 950, images can be acquired that are free of color irregularities, and the performance can be improved.

As shown in FIG. 71, the memory 955 may be provided separately from the processing unit 951, and it may be configured to perform storage electronically on a floppy disk, a memory card, a magneto-optical disk, or the like, although it is not particularly limited thereto.

The digital camera 950 using the electronic imaging device 931 may be used, as described above, or a silver halide camera in which a silver halide film is provided instead of the electronic imaging device 931 may also be used.

Next, an embodiment of a personal computer, as one example of an information processing apparatus in which the imaging optical system 901 according to the tenth embodiment of the present invention described above is incorporated, shall be described with reference to the drawings.

Figure 72:
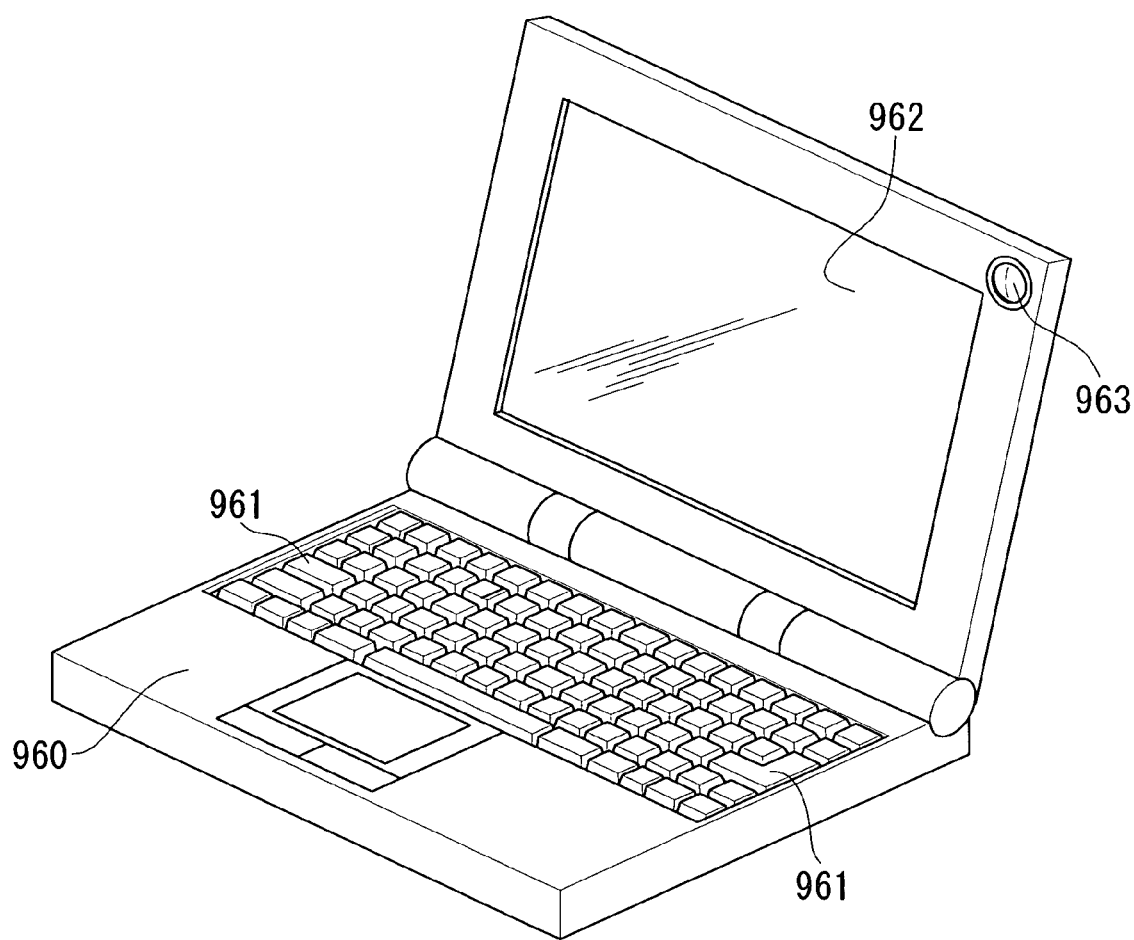
FIG. 72 is a front perspective view depicting a personal computer including the imaging optical system according to the tenth embodiment of the present invention.
Figure 73:
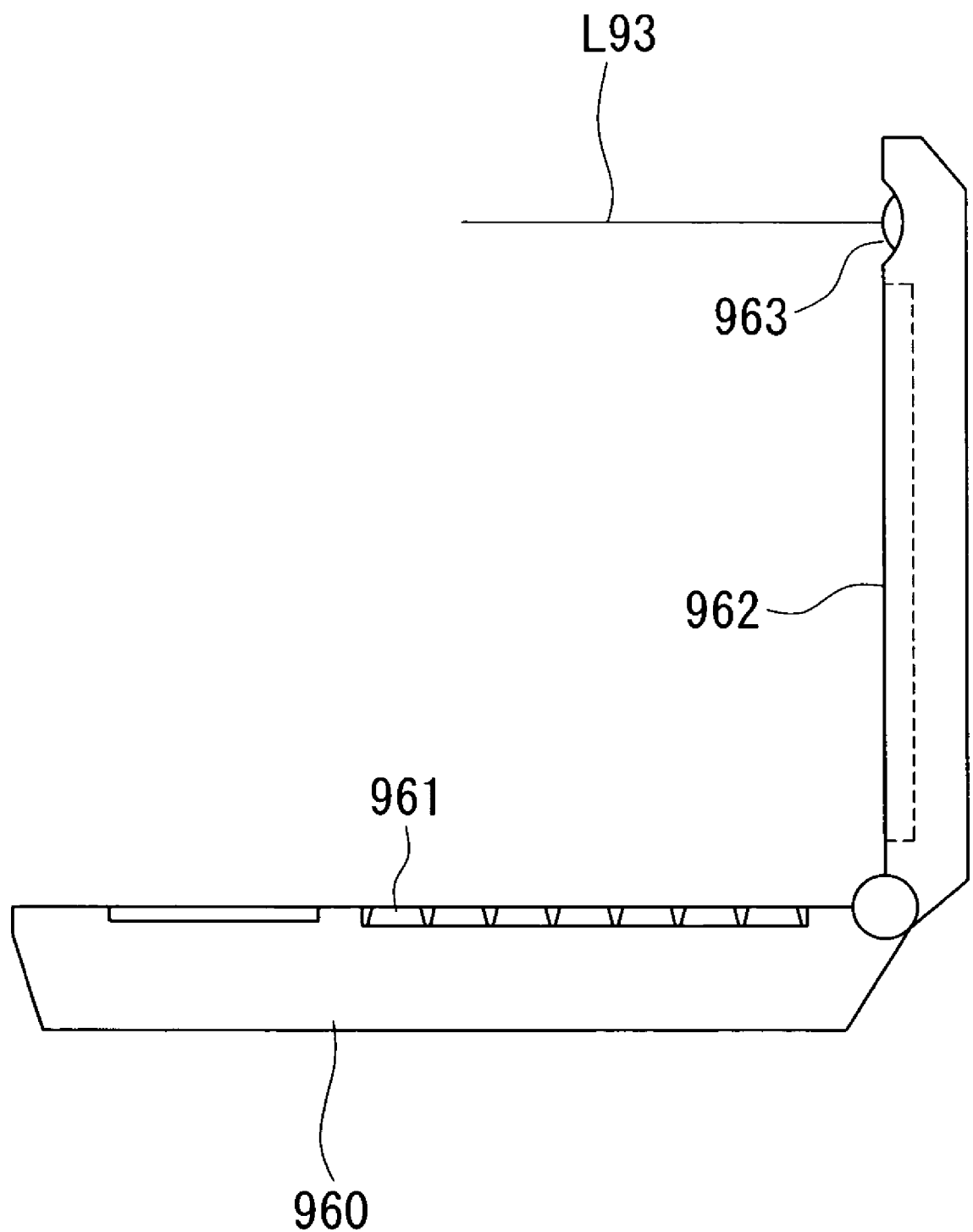
FIG. 73 is a side view of the personal computer in FIG. 72.
Figure 74:
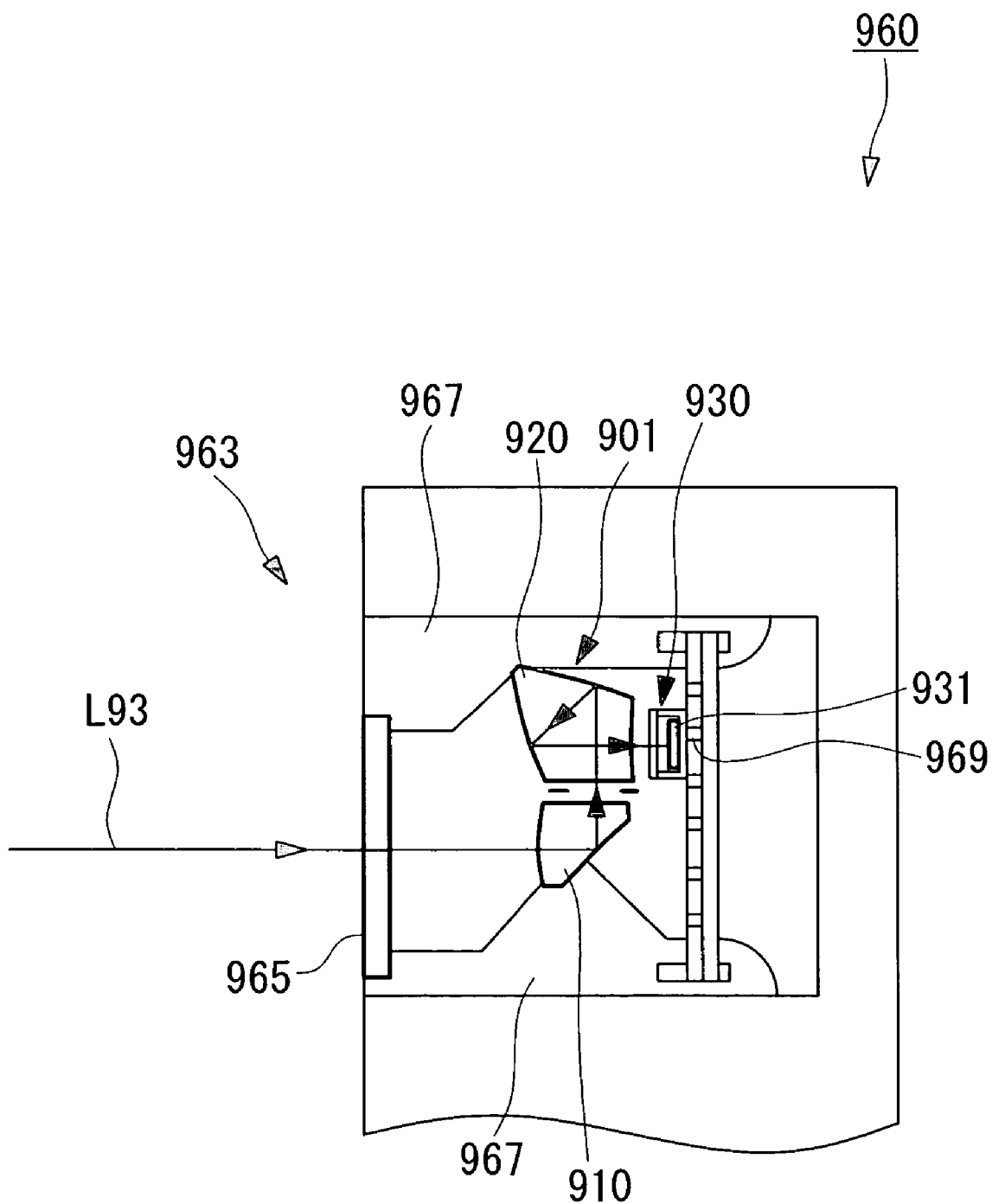
FIG. 74 is a cross-sectional view depicting the structure of an image-capturing unit in the personal computer in FIG. 72.

FIG. 72 is front perspective view depicting the overall configuration of a personal computer 960 according to this embodiment, showing a cover in an open state. FIG. 73 is a side view of the personal computer 960 shown in FIG. 72, and FIG. 74 is a cross-sectional view showing the structure of an image-capturing unit 963 in the personal computer 960 shown in FIG. 72.

Elements that are the same as those in the imaging optical system 901 described above are assigned the same reference numerals, and a description thereof shall be omitted.

As shown in FIGS. 72 and 73, the personal computer 960 roughly includes a keyboard 961 for the user to input information, a computing unit (not shown) that carries out computational processing on the input information, a memory (not shown) that stores predetermined information, a monitor 962 for displaying information to the user, and the image-capturing unit 963 that captures images of the user or the surroundings.

The monitor 962 may be formed of a transmissive-type liquid crystal display device that is illuminated from a rear surface by a backlight or the like. The monitor 962 is not particularly limited, however, and may also be formed of a reflective liquid crystal display device that performs display by reflecting light from the front surface, a cathode ray tube (CRT) display, or the like.

The image-capturing unit 963 may be integrated at the upper right side of the monitor 962, as in this embodiment, in the periphery of the monitor 962, or in the periphery of the keyboard 961, but the configuration is not particularly limited to those locations.

As shown in FIG. 74, the image-capturing unit 963 roughly includes a cover glass 965, an imaging optical system 901, and a barrel 967 that contains the cover glass 965 and the imaging optical system 901. The cover glass 965 and the imaging optical system 901 are disposed on an photographing light path L93 and are disposed so as to be incorporated in the personal computer 960.

The imaging unit 930 of the imaging optical system 901 is capable of being attached to the rear end of the barrel 967 simply by fitting them together. Therefore, it is not necessary to adjust the alignment of the first prism 910, the second prism 920, and the electronic imaging device 931, nor to adjust the spacing between surfaces, which simplifies the assembly. Also, since the cover glass 965 is disposed at the distal end of the barrel 967, the first prism 910 and the second prism 920 can be protected.

Next, the operation (image capturing) of the image-capturing unit 963 provided in the above-mentioned personal computer 960 will be described.

The image detected by the electronic imaging device 931 is converted to an electrical signal and is output to a processing unit (not shown) in the personal computer 960 via a terminal 969. The electrical signal is output to the monitor 962 as an electronic image signal on which predetermined computational processing has been applied in the processing unit, and an electronic image is displayed on the monitor 962. The electronic image signal can also be transmitted from the processing unit to another personal computer at a remote location, via the Internet or telephone, and can be displayed on the other personal computer.

With the configuration described above, using the imaging optical system 901 allows the size, weight, and thickness of the personal computer 960 to be reduced, and in addition, images with no color irregularities can be acquired, and the performance can be improved.

Next, an embodiment of a telephone, particularly a mobile telephone which can be conveniently carried, as an example of an information processing apparatus incorporating the imaging optical system 901 according to the tenth embodiment of the invention described above as a photographic optical system, will be described with reference to the drawings.

Figure 75:
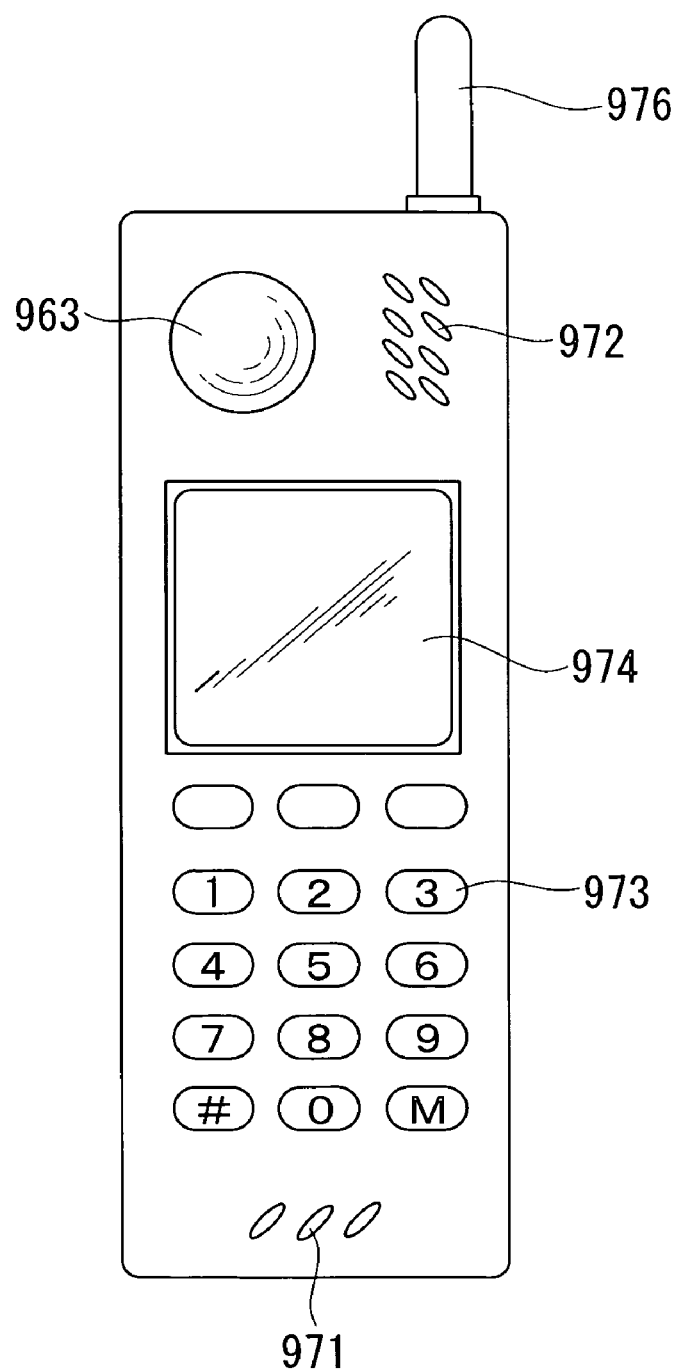
FIG. 75 is a front elevational view showing a mobile telephone including the imaging optical system according to the tenth embodiment of the present invention.
Figure 76:
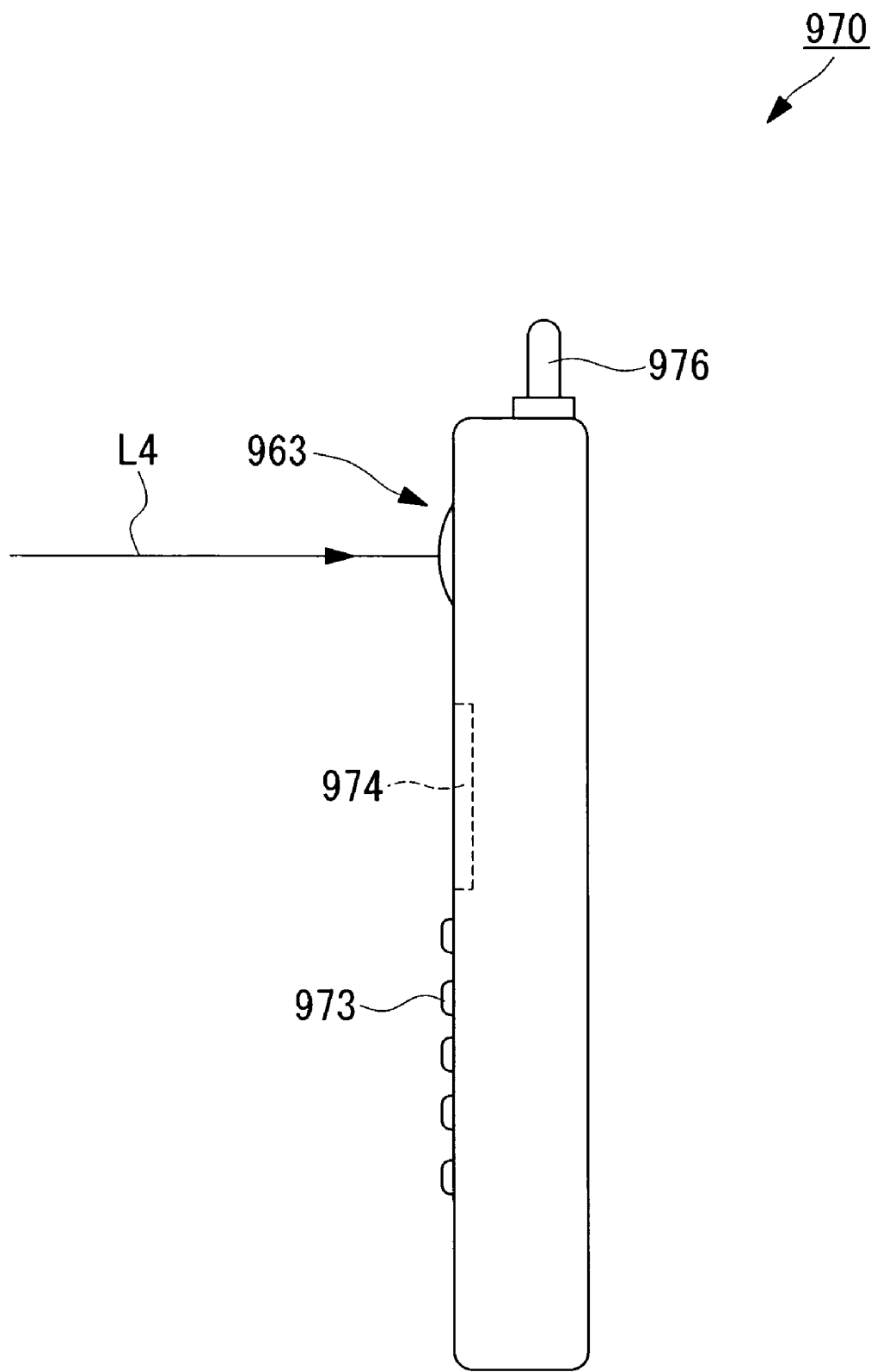
FIG. 76 is a side view of the mobile telephone in FIG. 75.

FIG. 75 is an elevational view depicting the overall configuration of a mobile telephone 970 according to this embodiment. FIG. 76 is a side view of the mobile telephone 970 shown in FIG. 75, and FIG. 77 is a cross-sectional diagram depicting the structure of an image-capturing unit 963 in the mobile telephone 970 shown in FIG. 75.

Components that are the same as those in the image-capturing unit 963 described above are assigned the same reference numerals, and a description thereof shall be omitted.

As shown in FIG. 75 and FIG. 76, the mobile telephone 970 roughly includes a microphone unit 971 for inputting the user's voice as information, a speaker unit 972 for outputting the voice of another party with whom the user is communicating, an input dial 973 for the user to input information, a monitor 974 that displays an acquired image of the user or the other party or information such as a telephone number, the image-capturing unit 963, an antenna 974 for transmitting and receiving communication radio waves, and a processing unit (not shown) for processing image information, communication information, input signals, and the like.

Figure 77:
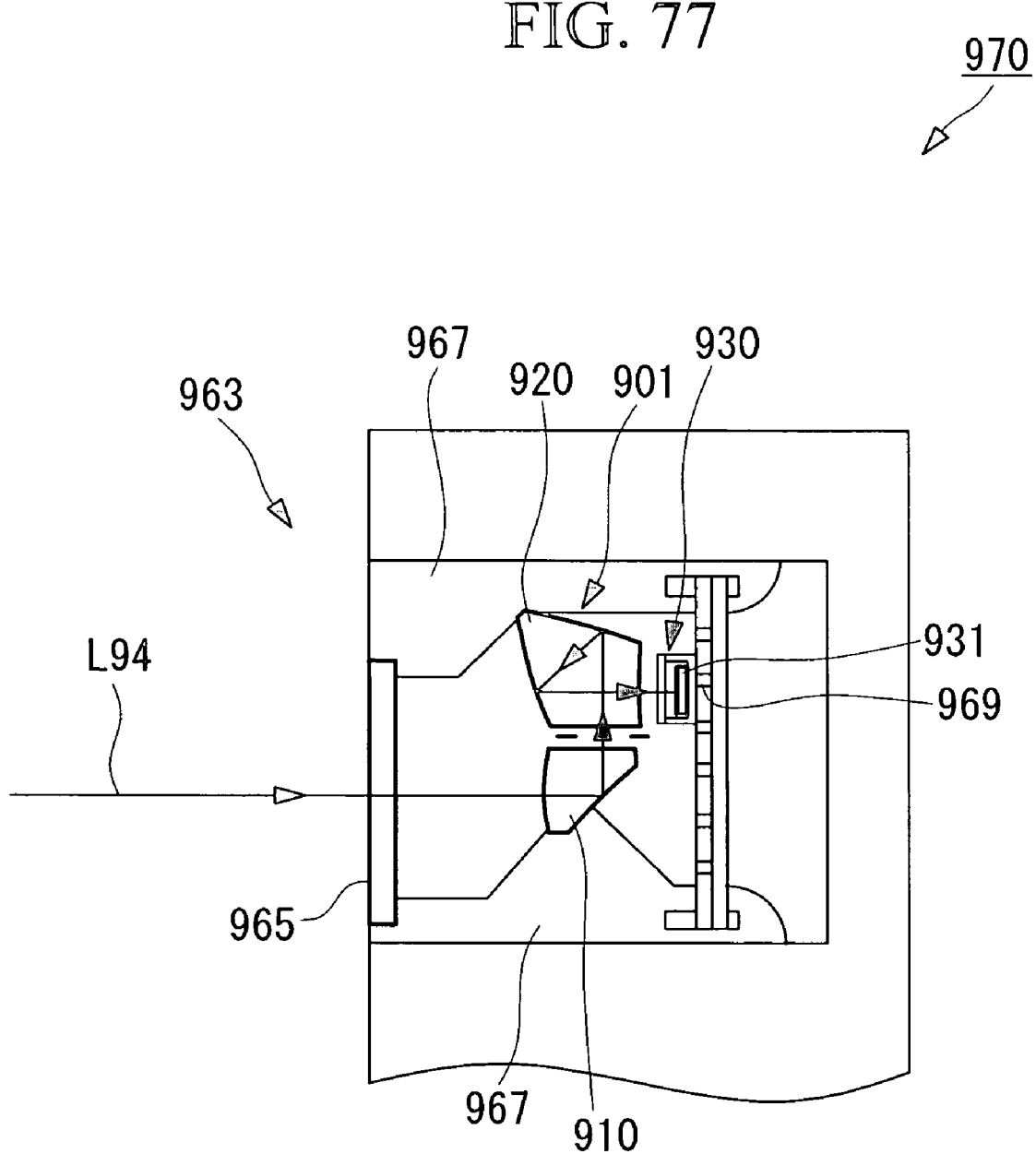
FIG. 77 is a cross-sectional view depicting the structure of an image-capturing unit in the mobile telephone in FIG. 75.

As shown in FIG. 77, the image-capturing unit 963 roughly includes a cover glass 965, an imaging optical system 901, and a barrel 967, and these components are incorporated in the mobile telephone 970.

The monitor 974 may be formed of a liquid crystal display device, and each of the components described above may be arranged as shown in FIGS. 75 and 76. The configuration is not particularly limited, however, and other arrangements are also possible.

Next, the operation (image capturing) of the image-capturing unit 963 provided in the above-mentioned mobile telephone 970 will be described.

The image detected by the electronic imaging device 931 is converted to an electrical signal and is output to a processing unit (not shown) in the mobile telephone 970 via a terminal 963. The electrical signal is output to the monitor 974 as an electronic image signal that has been subjected to predetermined computational processing in the processing unit, and an electronic image is displayed on the monitor 974.

The processing unit converts the electronic signal to a image signal that can be transmitted and transmits it from the antenna 976. In addition, the processing unit converts an image signal received at the antenna 976 into an electronic image signal and displays it on the monitor 974. Therefore, the image acquired by the image-capturing unit 963 can be displayed on the local monitor 974, and it can be displayed on the monitor of another party. Furthermore, images transmitted by the other party can be displayed on the local monitor 974.

With the configuration described above, by using the imaging optical system 901, the size, weight, and thickness of the mobile telephone 970 can be reduced, and in addition, it is possible to capture images with no color irregularities and to improve the performance.

What is claimed is:

1. An imaging apparatus comprising:
    a zoom optical system including a plurality of optical elements having refractive power;
    an electronic imaging device disposed at an image side of the optical system; and
    infrared-cut coatings applied to a plurality of faces of the optical elements;
    wherein at least one of the plurality of optical elements, to the faces of which the infrared-cut coatings are applied, moves when zooming; and
    wherein when the focal length of the zoom optical system is at a wide-angle end, the average value of incident angles of a chief ray at a maximum image height with respect to each surface face to which the infrared-cut coating is applied is smaller than an incident angle with respect to at least one surface face to which the infrared-cut coating is not applied.

2. An imaging apparatus according to claim 1, wherein the infrared-cut coatings are applied to a plurality of refractive surfaces.

3. An imaging apparatus according to claim 1, wherein the infrared-cut coatings are applied to at least three faces.

4. An imaging apparatus according to claim 1, wherein the number of layers in the infrared-cut coating applied to at least one face is 25 or less.

5. An imaging apparatus according to claim 1, wherein the number of layers of the infrared-cut coating applied to at least one face is 15 or less.

6. An imaging apparatus according to claim 1, wherein the number of layers of the infrared-cut coating applied to at least one face is 5 or more.

7. An imaging apparatus according to claim 1, wherein the infrared-cut coatings are applied to faces of different optical elements.

8. An imaging apparatus according to claim 1, wherein the transmittance of the entire optical system on an optical axis at wavelengths from 750 nm to 850 nm is approximately 10% or less of the average transmittance at wavelengths from 500 nm to 550 nm.

9. An imaging apparatus according to claim 1, wherein at least one of the plurality of optical elements is made of resin.

10. An imaging apparatus according to claim 1, wherein at least one of the plurality of optical elements is made of resin and at least one is made of glass.

11. An imaging apparatus according to claim 10, wherein the infrared-cut coating is applied to at least one face of the at least one optical element that is made of glass and to at least one face of the at least one optical element that is made of resin; and the number of layers in the infrared-cut coating applied to the at least one face of the at least one optical element that is made of glass is larger than the number of layers in the infrared-cut coating applied to the at least one face of the at least one optical element that is made of resin.

* * * * *

UNITED STATES PATENT AND TRADEMARK OFFICE
CERTIFICATE OF CORRECTION

PATENT NO. : 7,411,729 B2  Page 1 of 1
APPLICATION NO. : 11/196761
DATED : August 12, 2008
INVENTOR(S) : Iyama et al.

It is certified that error appears in the above-identified patent and that said Letters Patent is hereby corrected as shown below:

Title Page, Item (73) Assignee should read:

-- (73) Assignee:   Olympus Corporation, Tokyo (JP)
                    Olympus Imaging Corp., Tokyo (JP) --.

Signed and Sealed this

First Day of September, 2009

David J. Kappos
*Director of the United States Patent and Trademark Office*